US008622806B2

(12) United States Patent
Kelly et al.

(10) Patent No.: US 8,622,806 B2

(45) Date of Patent: *Jan. 7, 2014

(54) SYSTEM GAMING

(75) Inventors: Bryan M. Kelly, Alamo, CA (US); Robert W. Crowder, Jr., Las Vegas, NV (US); Dennis Lockard, Tracy, CA (US); Robert A. Luciano, Jr., Reno, NV (US); Jeffrey Talcott, Pleasanton, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,177

(22) Filed: Jun. 10, 2011

(65) Prior Publication Data

US 2011/0281654 A1 Nov. 17, 2011

Related U.S. Application Data

(60) Division of application No. 11/470,606, filed on Sep. 6, 2006, which is a continuation-in-part of application No. 11/225,770, filed on Sep. 12, 2005, now abandoned.

(60) Provisional application No. 60/714,754, filed on Sep. 7, 2005.

(51) Int. Cl.

*A63F 9/24* (2006.01)

*A63F 13/00* (2006.01)

(52) U.S. Cl.

USPC .................. 463/20; 463/16; 463/25; 463/29; 463/42

(58) Field of Classification Search

USPC ......................... 463/1, 40–42, 16, 20, 25, 29

See application file for complete search history.

(56) References Cited

U.S. PATENT DOCUMENTS

| | | | |
|---|---|---|---|
| 3,662,105 | A | 5/1972 | Hurst et al. |
| 4,448,419 | A | 5/1984 | Telnaes |
| 4,676,506 | A | 6/1987 | Crouch |
| 4,718,672 | A | 1/1988 | Okada |
| 4,837,728 | A | 6/1989 | Barrie et al. |

(Continued)

FOREIGN PATENT DOCUMENTS

| | | |
|---|---|---|
| AU | 704691 | 4/1997 |
| EP | 0769769 A1 | 4/1997 |

(Continued)

OTHER PUBLICATIONS

Unknown, Unreal Tournament 2003 PC Manual, Epic Games, p. 1-29.*

(Continued)

*Primary Examiner* — Dmitry Suhol

*Assistant Examiner* — Ryan Hsu

(74) *Attorney, Agent, or Firm* — Brooke Quist; Marvin Hein

(57) ABSTRACT

A system provides a player tracking system and system gaming apparatus for playing non-base games by funding the credit side of a gaming cycle. The system further includes at least one gaming device having a base game. The player tracking system and system gaming apparatus includes a player tracking user interface. The player tracking user interface provides a player with an opportunity to select and play a non-base game that may be promotional-funded or player-funded.

3 Claims, 49 Drawing Sheets

(56) References Cited

U.S. PATENT DOCUMENTS 4,856,787 A 8/1989 Itkis
5,083,271 A 1/1992 Thacher
5,332,219 A 7/1994 Marnell, II et al.
5,342,047 A 8/1994 Heidel et al.
5,393,057 A 2/1995 Marnell, II
5,429,361 A 7/1995 Raven et al.
5,564,700 A 10/1996 Celona
5,575,717 A 11/1996 Houriet, Jr. et al.
5,599,231 A 2/1997 Hibino et al.
5,643,086 A 7/1997 Alcorn et al.
5,655,961 A 8/1997 Acres et al.
5,664,999 A 9/1997 Kurihara
5,702,304 A 12/1997 Acres et al.
5,725,428 A 3/1998 Achmuler
5,741,183 A 4/1998 Acres et al.
5,752,882 A 5/1998 Acres et al.
5,759,102 A 6/1998 Pease et al.
5,769,716 A 6/1998 Saffari et al.
5,770,533 A 6/1998 Franchi
5,772,213 A * 6/1998 McGlew ....................... 273/308
5,779,545 A 7/1998 Berg et al.
5,779,549 A 7/1998 Walker et al.
5,796,389 A 8/1998 Bertram et al.
5,809,482 A 9/1998 Strisower
5,816,918 A 10/1998 Kelly et al.
5,820,459 A 10/1998 Acres et al.
5,833,536 A 11/1998 Davids et al.
5,833,540 A 11/1998 Miodunski et al.
5,836,817 A 11/1998 Acres et al.
5,846,132 A 12/1998 Junkin
5,851,148 A 12/1998 Brune et al.
5,855,516 A 1/1999 Eiba
5,860,862 A 1/1999 Junkin
5,876,284 A 3/1999 Acres et al.
5,885,158 A 3/1999 Torango et al.
5,919,091 A 7/1999 Bell et al.
5,935,002 A 8/1999 Falciglia
5,951,397 A 9/1999 Dickinson
5,967,896 A 10/1999 Jorasch et al.
5,973,696 A 10/1999 Agranat et al.
5,984,779 A 11/1999 Bridgeman et al.
6,008,784 A 12/1999 Acres et al.
6,010,404 A 1/2000 Walker et al.
6,014,664 A 1/2000 Fagin et al.
6,015,346 A 1/2000 Bennett
6,039,648 A 3/2000 Guinn et al.
6,041,347 A 3/2000 Harsham et al.
6,068,552 A 5/2000 Walker et al.
6,071,190 A 6/2000 Weiss et al.
6,077,163 A 6/2000 Walker et al.
6,083,105 A 7/2000 Ronin et al.
6,089,975 A 7/2000 Dunn
6,093,100 A 7/2000 Singer et al.
6,102,394 A 8/2000 Wurz et al.
6,102,798 A 8/2000 Bennett
6,110,041 A 8/2000 Walker et al.
6,113,495 A 9/2000 Walker et al.
6,135,884 A 10/2000 Hedrick et al.
6,146,273 A 11/2000 Olsen
6,149,522 A 11/2000 Alcorn et al.
6,159,097 A 12/2000 Gura
6,162,122 A 12/2000 Acres et al.
6,203,428 B1 3/2001 Giobbi et al.
6,224,486 B1 5/2001 Walker et al.
6,234,897 B1 5/2001 Frohm et al.
6,244,958 B1 6/2001 Acres
6,254,483 B1 7/2001 Acres
6,257,981 B1 7/2001 Acres et al.
6,267,675 B1 7/2001 Lee
6,280,328 B1 8/2001 Holch et al.
6,293,866 B1 9/2001 Walker et al.
6,302,790 B1 10/2001 Brossard
6,312,333 B1 11/2001 Acres
6,315,666 B1 11/2001 Mastera
6,319,125 B1 11/2001 Acres
6,319,127 B1 11/2001 Walker et al.
6,332,099 B1 12/2001 Heidel et al.
6,358,150 B1 3/2002 Mir
6,364,768 B1 4/2002 Acres et al.
6,371,852 B1 4/2002 Acres
6,375,567 B1 4/2002 Acres
6,375,569 B1 4/2002 Acres
6,409,602 B1 6/2002 Wiltshire et al.
6,425,828 B2 7/2002 Walker
6,431,983 B2 8/2002 Acres
6,457,099 B1 9/2002 Gilbert
RE37,885 E 10/2002 Acres
6,488,585 B1 12/2002 Wells et al.
6,565,434 B1 5/2003 Acres
6,595,856 B1 7/2003 Ginsburg et al.
6,607,441 B1 8/2003 Acres
6,638,167 B1 10/2003 Sawyer et al.
6,645,077 B2 11/2003 Rowe
6,652,378 B2 11/2003 Cannon et al.
6,682,423 B2 1/2004 Brosnan et al.
6,699,125 B2 3/2004 Kirmse et al.
6,712,697 B2 3/2004 Acres
6,712,698 B2 3/2004 Paulsen et al.
6,712,702 B2 3/2004 Goldberg et al.
6,722,985 B2 4/2004 Criss-Puszkiewicz
6,722,986 B1 4/2004 Lyons et al.
6,749,510 B2 6/2004 Giobbi
6,749,511 B2 6/2004 Day
6,769,986 B2 8/2004 Vancura
6,780,111 B2 8/2004 Cannon et al.
6,800,030 B2 10/2004 Acres
6,832,958 B2 12/2004 Acres et al.
6,843,724 B2 1/2005 Walker et al.
6,860,810 B2 3/2005 Cannon
6,866,586 B2 3/2005 Oberberger et al.
6,884,167 B2 4/2005 Walker et al.
6,884,174 B2 4/2005 Lundy et al.
6,887,154 B1 5/2005 Luciano, et al.
6,908,391 B2 6/2005 Gatto et al.
6,910,964 B2 6/2005 Acres
6,916,247 B2 7/2005 Gatto et al.
6,935,957 B1 8/2005 Yates et al.
6,945,870 B2 9/2005 Gatto et al.
RE38,812 E 10/2005 Acres et al.
6,996,444 B2 2/2006 Ach, III
7,007,278 B2 2/2006 Gungabeesoon
7,025,674 B2 4/2006 Adams et al.
7,070,506 B1 7/2006 Ropp et al.
7,093,040 B1 8/2006 Mach
7,103,650 B1 9/2006 Vetrivelkumaran et al.
7,111,845 B2 9/2006 Walker et al.
7,112,138 B2 9/2006 Hedrick
D531,333 S 10/2006 Acres et al.
7,124,413 B1 10/2006 Klemm et al.
7,169,051 B1 1/2007 Mossbarger
7,192,352 B2 3/2007 Walker et al.
7,201,662 B2 4/2007 LeMay et al.
7,278,919 B2 10/2007 Souza et al.
7,291,068 B2 11/2007 Bryant
7,296,007 B1 * 11/2007 Funge et al. .................... 706/47
7,297,062 B2 11/2007 Gatto et al.
7,416,489 B2 8/2008 Smith, III
7,473,174 B2 1/2009 Cuddy et al.
7,540,805 B2 6/2009 Takeda et al.
7,542,487 B2 6/2009 Gatto et al.
7,654,897 B2 2/2010 Devaull et al.
7,780,516 B2 8/2010 Gauselmann
7,798,901 B2 9/2010 Nguyen
7,867,082 B2 * 1/2011 Vali-Tepper .................... 463/25
7,874,906 B2 1/2011 Tulley
7,878,899 B2 2/2011 Duhamel
7,993,197 B2 8/2011 Kaminkow
8,202,165 B2 6/2012 Duhamel
8,210,927 B2 7/2012 Hedrick
2001/0031654 A1 10/2001 Walker et al.
2001/0044339 A1 11/2001 Cordero
2002/0002075 A1 1/2002 Rowe
2002/0025846 A1 2/2002 Bennett et al.
2002/0039923 A1 4/2002 Cannon

(56) References Cited

U.S. PATENT DOCUMENTS

2002/0107065 A1 8/2002 Rowe
2002/0119824 A1 8/2002 Allen
2002/0142825 A1 10/2002 Lark
2002/0142842 A1 10/2002 Easley
2002/0142846 A1 10/2002 Paulsen
2002/0152120 A1 10/2002 Howington
2002/0155879 A1 10/2002 Walker et al.
2002/0155887 A1 10/2002 Criss-Puszkiewicz et al.
2002/0183105 A1 12/2002 Cannon
2002/0198052 A1 12/2002 Soltys et al.
2003/0027631 A1 2/2003 Hedrick et al.
2003/0032474 A1 2/2003 Kaminkow
2003/0054868 A1 3/2003 Paulsen et al.
2003/0054878 A1 3/2003 Benoy et al.
2003/0054881 A1 3/2003 Hedrick
2003/0060264 A1 3/2003 Chilton et al.
2003/0060279 A1 3/2003 Torango
2003/0064807 A1 4/2003 Walker
2003/0083943 A1 5/2003 Adams et al.
2003/0093168 A1 5/2003 Nagaoka
2003/0104860 A1 6/2003 Cannon
2003/0109307 A1 6/2003 Boyd
2003/0119573 A1 6/2003 McClintic
2003/0171149 A1 9/2003 Rothschild
2003/0181241 A1 9/2003 Oakes et al.
2003/0186745 A1 10/2003 Nguyen et al.
2003/0190960 A1* 10/2003 Jokipii et al. .................. 463/42
2003/0236110 A1 12/2003 Beaulieu
2004/0038733 A1 2/2004 Walker et al.
2004/0054445 A1 3/2004 Vollmer et al.
2004/0064352 A1 4/2004 Gordon et al.
2004/0072618 A1 4/2004 Bartholomew et al.
2004/0077422 A1 4/2004 Bryant et al.
2004/0100490 A1 5/2004 Boston et al.
2004/0110555 A1 6/2004 Devaull et al.
2004/0142750 A1 7/2004 Glisson et al.
2004/0147306 A1 7/2004 Randall et al.
2004/0166940 A1 8/2004 Rothschild
2004/0198496 A1 10/2004 Gatto
2004/0224772 A1 11/2004 Canessa
2004/0229700 A1 11/2004 Cannon et al.
2004/0254013 A1 12/2004 Quraishi et al.
2004/0259640 A1 12/2004 Gentles et al.
2005/0003878 A1 1/2005 Updike
2005/0020340 A1 1/2005 Cannon
2005/0032573 A1 2/2005 Acres et al.
2005/0043088 A1* 2/2005 Nguyen et al. .................. 463/29
2005/0043094 A1 2/2005 Nguyen et al.
2005/0054419 A1 3/2005 Souza et al.
2005/0054439 A1 3/2005 Rowe et al.
2005/0059496 A1 3/2005 Hanchar
2005/0107164 A1 5/2005 Muir
2005/0113162 A1 5/2005 Olive et al.
2005/0137017 A1 6/2005 Lechner et al.
2005/0141509 A1 6/2005 Rabbie
2005/0143166 A1 6/2005 Walker et al.
2005/0172336 A1 8/2005 Gatto
2005/0209006 A1 9/2005 Gatto
2005/0209007 A1 9/2005 Gatto
2005/0221882 A1* 10/2005 Nguyen et al. .................. 463/16
2005/0221898 A1 10/2005 Gatto
2005/0223219 A1 10/2005 Gatto
2005/0233794 A1 10/2005 Cannon
2005/0233811 A1 10/2005 Gatto
2005/0239546 A1 10/2005 Hedrick et al.
2005/0261056 A1 11/2005 Smolucha
2005/0277472 A1 12/2005 Gillan et al.
2005/0278041 A1* 12/2005 Bortnik et al. .................. 700/91
2005/0282637 A1 12/2005 Gatto
2006/0030960 A1 2/2006 Duhamel
2006/0046819 A1 3/2006 Nguyen et al.
2006/0068906 A1 3/2006 Morrow et al.
2006/0100010 A1 5/2006 Gatto
2006/0178202 A1 8/2006 Hughes et al.
2006/0258446 A1* 11/2006 Nguyen et al. .................. 463/30
2006/0287046 A1* 12/2006 Walker et al. .................. 463/16
2006/0287100 A1* 12/2006 Inubushi et al. ................ 463/42
2007/0026941 A1 2/2007 Block et al.
2007/0117608 A1 5/2007 Roper
2007/0155488 A1 7/2007 Kubota et al.
2008/0051171 A1 2/2008 Lutnick et al.
2008/0254893 A1* 10/2008 Patel et al. ...................... 463/42
2009/0117969 A1 5/2009 Englman
2009/0186691 A1 7/2009 Pau
2009/0186692 A1 7/2009 Thomas et al.

FOREIGN PATENT DOCUMENTS

EP 1004970 A 5/2000
EP 1074955 A 2/2001
GB 2042234 A 9/1980
GB 2121569 7/1986
GB 2092796 A 7/2001
JP 07-059944 A 3/1995
JP 0200107660 2/2001
JP 2002-273055 A 9/2002
JP 2003-190588 A 8/2003
JP 2003-190589 A 8/2003
WO 9623288 A 8/1996
WO 00/07099 2/2000
WO 2004004855 A1 1/2004
WO 2004/024260 3/2004

OTHER PUBLICATIONS

IGWB, New "97" Games, Mar. 1997 pp. 1-30.
International Search Report of PCT/US05/32809.
International Search Report of PCT/US06/33018.
Supplementary European Search Report for EP02 77 8385.1-2218 PCT/US02/30820, dated Sep. 26, 2006, Applicant Bally Gaming, Inc.
Advertisement in Gaming Products & Services/Bingo Manager Magazine, Table of Contents vol. 5, No. 7, Jul. 1997.

* cited by examiner

2700

216

216

216

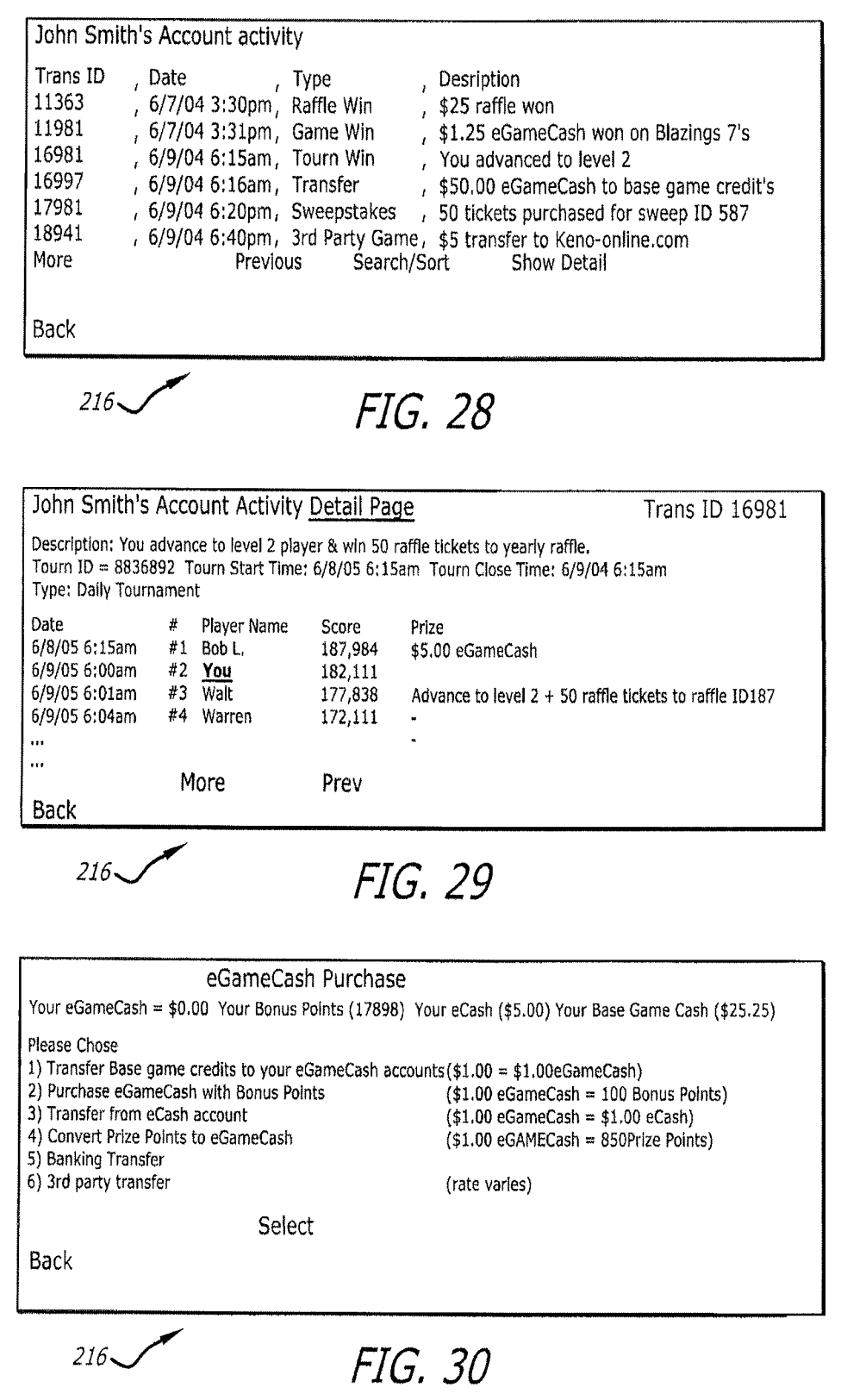

John Smith's Account activity

| Trans ID | Date | Type | Desription |
|---|---|---|---|
| 11363 | , 6/7/04 3:30pm, | Raffle Win | , $25 raffle won |
| 11981 | , 6/7/04 3:31pm, | Game Win | , $1.25 eGameCash won on Blazings 7's |
| 16981 | , 6/9/04 6:15am, | Tourn Win | , You advanced to level 2 |
| 16997 | , 6/9/04 6:16am, | Transfer | , $50.00 eGameCash to base game credit's |
| 17981 | , 6/9/04 6:20pm, | Sweepstakes | , 50 tickets purchased for sweep ID 587 |
| 18941 | , 6/9/04 6:40pm, | 3rd Party Game, | $5 transfer to Keno-online.com |

More Previous Search/Sort Show Detail

Back

216

FIG. 28

John Smith's Account Activity Detail Page Trans ID 16981

Description: You advance to level 2 player & win 50 raffle tickets to yearly raffle.
Tourn ID = 8836892 Tourn Start Time: 6/8/05 6:15am Tourn Close Time: 6/9/04 6:15am
Type: Daily Tournament

| Date | # | Player Name | Score | Prize |
|---|---|---|---|---|
| 6/8/05 6:15am | #1 | Bob L. | 187,984 | $5.00 eGameCash |
| 6/9/05 6:00am | #2 | **You** | 182,111 | |
| 6/9/05 6:01am | #3 | Walt | 177,838 | Advance to level 2 + 50 raffle tickets to raffle ID187 |
| 6/9/05 6:04am | #4 | Warren | 172,111 | - |
| ... | | | | - |
| ... | | | | |

More Prev

Back

216

FIG. 29 eGameCash Purchase

Your eGameCash = $0.00 Your Bonus Points (17898) Your eCash ($5.00) Your Base Game Cash ($25.25)

Please Chose

1) Transfer Base game credits to your eGameCash accounts ($1.00 = $1.00eGameCash)
2) Purchase eGameCash with Bonus Points ($1.00 eGameCash = 100 Bonus Points)
3) Transfer from eCash account ($1.00 eGameCash = $1.00 eCash)
4) Convert Prize Points to eGameCash ($1.00 eGAMECash = 850Prize Points)
5) Banking Transfer
6) 3rd party transfer (rate varies)

Select

Back

216

FIG. 30

John Smith's Account - Preferences Page

| | | |
|---|---|---|
| Credits | ($2.50 for $.25 denom) | 10 |
| Restricted Credits | ($5.00 for $.25 denom) | 20 |
| Points | | 23,768 |
| Restricted Points | | 15,123 |

Please choose one:
- Convert Points to Credits (200 pts = 1 credit)
- Cashout Credits - (AFT to base game)
- Play with Credits first
- Play Points first
- Setup Your Desired Games and Modes of Play
- Setup Your Bonusing Preferrences
- Other Options Done

216

FIG. 34

FIG. 35

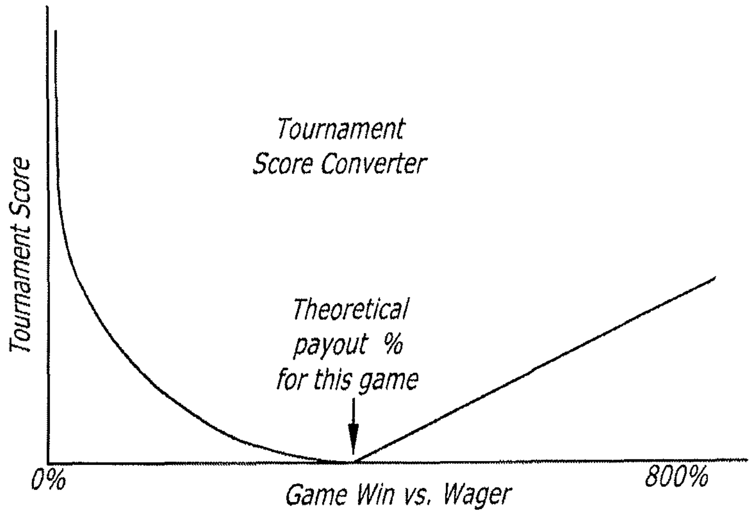

Exit

Take Score

Prize 50 raffle tickets

Rules

Limited Entry Tournament
Last Play contrib. + (1500)

| # | Name | Score | Done |
|---|---|---|---|
| 1 | Frank | 82,758 | |
| 2 | Jill | 81,551 | |
| 3 | Ted | 79,347 | * |
| 4 | Holly | 52,291 | |
| 5 | Jeff | 50,016 | |
| 6 | Earl | 14,206 | |
| 7 | Jane | 14,004 | * |
| 8 | Lucy | 10,144 | |
| 9 | **You** | 8,155 | |

Time Until Your Score Is Posted 1 min 25sec

Time left 30:26 Daily
Current Prize $1,182.24 Tourn

| # | Name | Score |
|---|---|---|
| 1 | Jill | 976,552 |
| 2 | Sue | 963,070 |
| 3 | George | 954,323 |
| 4 | Mark | 942,601 |
| 5 | Frank | 923,218 |
| 6 | Mike | 920,321 |
| 7 | Jane | 881,342 |
| 8 | Bryan | 871,496 |
| 9 | Gennady | 777,183 |

Your Best: 665,134

FIG. 36

500

SYSTEM GAMING

RELATED APPLICATIONS

This application is a divisional of U.S. patent application Ser. No. 11/470,606, filed Sep. 6, 2006, entitled SYSTEM GAMING, which is a continuation-in-part of U.S. patent application Ser. No. 11/225,770 filed Sep. 12, 2005, now abandoned, entitled SYSTEM AND METHOD FOR GAMING-CONTENT CONFIGURATION AND MANAGEMENT SYSTEM, which is hereby incorporated herein by reference. This application also claims the benefit of U.S. provisional patent application No. 60/714,754, filed Sep. 7, 2005, entitled SYSTEM GAMING APPARATUS AND METHOD, which is hereby incorporated by reference in its entirety. This application is also related to co-pending U.S. patent application Ser. No. 11/470,605, filed Sep. 6, 2006.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system, and more particularly, to a player tracking system and system gaming apparatus.

BACKGROUND OF THE INVENTION

Casinos have long sought new ways to induce play on the gaming devices. They try to increase player time on gaming devices, average wager amount, and speed of play. Various techniques have been used in attempts to gain higher casino profits. One such technique in the casino gaming industry is the use of secondary bonus rounds or bonus games. This usually takes the form of a second level inside a base game of a gaming device embodied in software or an add-on top box bonus game. Newer game titles can be created with these secondary levels of play providing a player additional chances of winning even larger prize rewards. Older game titles do not have these newer secondary games or bonus rounds due to game software and hardware upgrade costs, and/or lack of interest of game manufacturers to re-code or configure legacy software, which is often a very difficult task. Also, game resubmission to regulatory agencies is prohibitive in relation to cost, time, and resources. The game manufacturer would rather focus on creating these new features on new software titles under development using a more modern hardware/software platform. As such, it is difficult to provide players of these older gaming devices a secondary "win" opportunity.

In the last decade, player tracking systems have emerged, wherein a player registers for a player-tracking card at a registration desk. The player is typically given a plastic magnetic strip player card for use while playing gaming devices on the casino floor or at the card tables. Each player card has a number on it that associates it with a player record in a casino marketing promotion server.

More recent additions to the casino player tracking systems provide bonus prizes or prize pools that are periodically given to carded players on a random basis to give the player the more instantaneous and larger rewards verses the slow accrual of Bonus Points. This is done for several reasons: to help induce play on the gaming device, to encourage players to become carded players; to create player loyalty for the casino; and to provide bonus prizes without modifying the base gaming device software.

While these bonusing techniques are a significant improvement over non-bonusing systems they, as of yet, do not allow the player to choose the system bonus game they want to play. These systems do give the player an ability to win additional bonus awards on top of the base gaming device, but the player is not in control of the bonus game process in any way. They have no choice as to which prize game or prize pool for which they want to play. It is automatically determined for them by the system.

BRIEF SUMMARY OF THE INVENTION

Briefly, and in general terms, the claimed invention resolves the above and other problems by providing a system for enabling a gaming system having a secondary gaming device. In one preferred embodiment, the system includes at least one gaming device having a base game. A secondary device has a display and processor operatively associated with the gaming device. The secondary device enables a player with an opportunity to play a secondary bonus game, wherein the rate of play of the base game at least partially controls the rate of play of the secondary game.

In another preferred embodiment, a casino gaming system has at least one gaming device including a base game. A secondary device has a display and processor operatively associated with the gaming device. The secondary device provides a player with an opportunity to play a secondary bonus game. The secondary bonus game includes a plurality of play elements, wherein activation of each successive play element is controlled by the amount wagered in each play of the base game, or alternatively, the total amount wagered in the base game.

In another preferred embodiment, the secondary device provides a player with an opportunity to play a secondary bonus game that includes a plurality of play segments, wherein activation of each successive play segment is controlled by the amount wagered in the base game.

In another preferred embodiment, a casino gaming system includes at least one gaming device having a base game. A secondary display device has a secondary bonus game and a credit meter displayed thereon. A credit accrual engine is responsive to the amount wagered in each play of the base game, wherein the engine accrues credits in response to base game activity, and wherein the accrued credits can be used to activate the play of the secondary bonus game.

In another preferred embodiment, a casino gaming system comprises at least one gaming device having a base game. A secondary display device displays a secondary bonus game. A promotional credit accrual engine is responsive to the amount wagered in each play of the base game, wherein the engine accrues credits in response to base game activity, and wherein the accrued credits activate the play of the secondary bonus game.

In another preferred embodiment, a casino gaming system comprises at least one gaming device having a base game. A secondary display device includes a secondary bonus game displayed thereon. A promotional credit accrual engine accrues promotional credits in response to the amount wagered in each play of the base game, wherein the play of the secondary bonus game can be activated using the accrued promotional credits.

In another preferred embodiment, a gaming system includes a gaming machine capable of playing a first game. A player tracking user interface is operatively coupled to the gaming machine, wherein the player tracking user interface is capable of playing a second game, and wherein the gaming system enables a player to activate the second game displayed on the player tracking user interface. The activation is funded using player funds or promotional funds.

Another preferred embodiment includes a gaming system including a gaming machine capable of playing a first game. A player tracking user interface is operatively coupled to the gaming machine, wherein the player tracking user interface is capable of playing a second game. The gaming system enables a player to activate the second game displayed on the player tracking user interface, wherein the activation is funded using player funds and promotional funds.

In another preferred embodiment, a player tracking user interface includes a user interface that includes a list of player-selectable game titles. The user interface is operatively associated with gaming device that is enabled to display a base game. A player is able to select a game title from the list of player-selectable game titles to be played on the game device.

Another preferred embodiment includes a system for enabling casino tournament gaming. A plurality of gaming machines each enable play of a base game, wherein a first base game has a first set of parameters and a second base game has a second set of parameters, and wherein the first set of parameters differs from the second set of parameters. A plurality of game monitoring units associated with the plurality of gaming machines each game monitor corresponding base game play data. A plurality of player tracking display devices is each associated with a corresponding gaming machine. A tournament controller in communication with the gaming machines, and a communication link connects the plurality of gaming machines. Scores from base games, including scores from base games having differing sets of parameters, are normalized to substantially equalize differences resulting from the base games that have differing sets of parameters to produce a normalized tournament score for each base game. The normalized tournament scores are calculated from the base game play data of each base game ranked.

In another preferred embodiment, a system enables dynamic-grouped competitive gaming. A plurality of gaming machines each enable play of a base game. A first base game has a first set of parameters and a second base game has a second set of parameters, wherein the first set of parameters differs from the second set of parameters. A plurality of game monitoring units is associated with the plurality of gaming machines. Each game monitoring unit monitors corresponding base game play data. A plurality of player tracking display devices is included. Each player tracking display device is associated with a corresponding gaming machine. A dynamic-grouping game controller communicates with the gaming machine and connects the plurality of gaming machines. Scores from base games having differing sets of parameters are normalized to substantially equalize differences resulting from the base games that have differing sets of parameters and produce a normalized tournament score for each base game. The normalized tournament scores are calculated from the base game play data of each base game. The normalized dynamic-grouped game scores are ranked.

In another preferred embodiment the system enables a tournament on demand. The system includes a plurality of gaming machines with a communication link connecting the plurality of gaming machines. Each gaming machine is capable of participating in a tournament, on demand, wherein the system enables an eligible player to join the tournament on demand at any time. The tournament on demand is accessible to eligible players throughout the life of the tournament.

Another aspect of the system provides for entry into multiple tournaments. A plurality of gaming machines is connected through a communication link wherein each gaming machine is capable of participating in a tournament. The system enables each eligible player to participate in more than one of the multiple tournaments simultaneously. In one embodiment, the tournaments overlap. In another embodiment, the player is enabled for participation in at least two tournaments for which the player is eligible.

In another preferred embodiment, a gaming system enables players playing different base games to be eligible for the same tournament. A plurality of gaming machines each have a base game. A communication link connects the plurality of gaming machines. At least a first gaming machine comprises a first base game and at least a second gaming machine comprises a second base game. The second base game has parameter differences from the first base game. A tournament controller connected to the network is configured to enable tournament play in the same tournament for the first and second gaming machines by normalizing the parameter differences (in the score data) between the first base game and the second base game after the games have been played.

In another preferred embodiment, a system pulls accrual scores from multiple locations for a tournament. A plurality of gaming machines is connected by a communication link. Each gaming machine posts scoring information to and from multiple tournaments.

In another preferred embodiment, a display interface is provided for real-time ranking of players in a tournament. A plurality of gaming machines is connected by a communication link. A tournament controller is connected to the communication link. The tournament controller generates and pushes real-time tournament scores and rankings to at least one gaming machine for presentation on a display.

In another preferred embodiment, a system provides a multi-level pyramid gaming tournament. A plurality of gaming machines is connected by a communication link. A tournament controller is connected to the communication link. Each of the plurality of gaming machines is capable of participating in a tournament between two or more of the plurality of gaming machines. The tournament controller is capable of demoting any gaming machine to a lower level that fails to achieve a first threshold score, and promoting any gaming machine to a higher level that achieves a second threshold score.

In another preferred embodiment, a system provides an instant-close tournament such that an actual player is always the last player to enter the tournament. A plurality of gaming machines is connected by a communication link. The instant-close tournament has a number of player spots. A tournament controller is connected to the communication link. The tournament controller is configured to execute the tournament. A tournament history table stores previous tournament information for a plurality of previous players in the tournament. The previous tournament information is selected by the tournament controller to configure one or more simulated players in the tournament to fill each player spot, except for a final player spot that is filled by the actual player, thereby ensuring that the actual player is the last player to enter and join the tournament.

In another preferred embodiment, a system displays real-time pushed data of tournament scores. In a plurality of gaming machines, at least the first and second of the gaming machines each have a display. A chat server is connected to the network, wherein the chat sever pushes real-time tournament data to the first and second gaming machines for presenting tournament data on the display to facilitate competition between the first and second gaming machines.

In another preferred embodiment, a tournament gaming system provides a tournament score converter. A plurality of gaming machines has a theoretical payout and a player. Each player has a score in the tournament determined by a calculation. A communication link connects the plurality of gaming machines. A tournament controller is connected to the communication link. The tournament controller executes the tournament, and processes the calculation of the score for each player. The calculation for each player is at least partially based on the actual payout verses the theoretical payout.

In another preferred embodiment, a gaming system uses a tournament score accrual engine to enable a player to benefit from multiple machine play. A plurality of gaming machines each has a score for the tournament. A communication link connects the plurality of gaming machines. A tournament controller connects to the communication link, and the tournament controller is configured to execute the tournament. At least the first and second of the gaming machines are configurable to combine their scores into one player in the tournament.

In another preferred embodiment, a system provides tournament score weighting factors. A plurality of gaming machines each has a player. Each player has a score in the tournament determined by calculation. A communication link connects the plurality of gaming machines. A tournament controller is connected to the communication link. The tournament controller is configured to execute the tournament and process the calculation of the score for each player. The calculation for each player is at least partially determined based upon a weighting factor determined by a game skill and a play history for the player.

In another preferred embodiment, a gaming system incorporates an elimination tournament. A plurality of gaming machines is connected by a communication link. A tournament controller is connected to the communication link, wherein the controller terminates participation of the gaming machine that has the lowest score in the tournament.

In another embodiment the system is dynamically playing a tournament game. A plurality of gaming machines is connected by a communication link. Each gaming machine has a base game. The base game includes a tournament eligibility trigger. Upon activation of the tournament eligibility trigger, the base game provides the player with the opportunity to play the tournament game.

In another preferred embodiment, a tournament gaming system includes one or more gaming machines. A communication link connects the one or more gaming machines to enable each gaming machine to participate in a first tournament. A player's score from a base game or a second tournament game is posted to at least the first tournament game to enable the player to win one or more tournament prizes.

In another preferred embodiment, the gaming system includes one or more gaming machines. Each gaming machine provides availability of both skill-based and non-skill-based games to a player. The system enables a player to select which of the skill-based or non-skill-based games the player chooses to play.

In another preferred embodiment, an embedded additional user interface is incorporated into a gaming machine. The gaming machine includes a gaming presentation of a base game and a gaming processor for controlling the base game. The embedded additional user interface includes a display screen, wherein the display screen presents information to a user, which includes information relating to a system game. The embedded additional user interface further includes an embedded processor that employs an internal operating system and communicates with the gaming processor, wherein the embedded processor reads incoming data and maps the information to the display screen, wherein the incoming data includes pay table information for the system game.

In another preferred embodiment, a display interface is incorporated into a gaming machine. The gaming machine includes a gaming presentation of a base game, and a gaming processor controls the base game. The display interface includes a display screen, wherein the display screen presents incoming data to a user relating to a system game. The incoming data relates to a system game that includes multi-game data, multi-prize data, multi-denomination data, multi-credit data, and multi-payline data.

In another preferred embodiment, a gaming platform includes a display interface. The display interface presents game information to a user. The gaming platform incorporates both skilled and non-skilled games. The player selects the game in which to participate.

In another preferred embodiment, a display interface is incorporated into a gaming machine; the display interface includes a display screen, wherein the display screen presents information to a user. The display screen presents information regarding cashable and non-cashable credits.

In another preferred embodiment, a display interface is incorporated into a gaming machine. The display interface includes a display screen. The display screen presents information to a user. The display screen provides dynamically updating awards information to non-club members and non-involved club members to tempt the non-club members and non-involved club members with dynamically updating awards information that is associated with current game play.

In another preferred embodiment, a gaming system comprises a plurality of gaming machines. Each gaming machine includes a display screen. Each display screen presents information and incorporates the use of frames. The frames are controlled by a frame management system that assigns priorities and rules to the frames.

In another preferred embodiment, an embedded additional user interface is incorporated into a gaming machine. The gaming machine includes a gaming presentation and a gaming processor. The embedded additional user interface includes a display screen, wherein the display screen presents information to a user via the display screen. The embedded additional user interface includes an embedded processor that employs an internal operating system and communicates with the gaming processor. The embedded processor reads incoming data and maps the data to the display screen. A game state recovery system provides protection against losses due to power failures and other outages.

In another preferred embodiment, a gaming system includes one or more gaming machines, wherein each gaming machine includes a display screen, which presents information to a user. A gaming luck meter, or beneficial statistical deviation meter, is presented on the display screen, and it monitors and displays recent statistical deviations for that gaming machine.

In another preferred embodiment, a gaming system includes one or more gaming machines. Each gaming machine includes a display screen that presents information to a user. A player skill meter is associated with each gaming machine, wherein each skill meter presents information that rates the skillfulness of recent game play on the associated gaming machine.

In another preferred embodiment, a system gaming platform includes one or more gaming machines, wherein each gaming machine includes a display screen that presents information to a user. Each gaming machine enables a carded player to save game meter accounts for later use by the player on any gaming machine within the system gaming platform.

BRIEF DESCRIPTION OF THE DRAWINGS

FIG. 28 is a screen shot of a sample account history screen presented in one embodiment;

FIG. 29 is a screen shot of a detailed transaction page screen for the player presented in one embodiment;

FIG. 30 is a screen shot of a sample promotional cash purchase screen presented in one embodiment;

FIG. 34 is a screen shot of a notification screen informing a player of a hand payout presented in one embodiment;

FIG. 35 is an example of a non-linear curve used in one embodiment to map or normalize a theoretical to actual win ratio in a tournament;

FIG. 36 is an example of a display screen for tournament play presented according to one embodiment;

DETAILED DESCRIPTION OF THE PREFERRED EMBODIMENTS

A preferred embodiment of a network gaming system, constructed in accordance with the claimed invention, is directed towards a player tracking system and system gaming apparatus for playing non-base games by funding the credit side of a gaming cycle, rather than funding the award side of the game cycle. The games played over such an organizational arrangement are referred to herein as "system games," and are playable in a casino, arcade, or web-based environment. In one embodiment, these "system games" utilize a system gaming apparatus and provide players with additional choice with respect to non-base game selection and non-base game parameter selection, additional ways to win a prize (e.g., through concurrent play of multiple games on the same gaming device), and additional competitive incentives.

Figure 1:
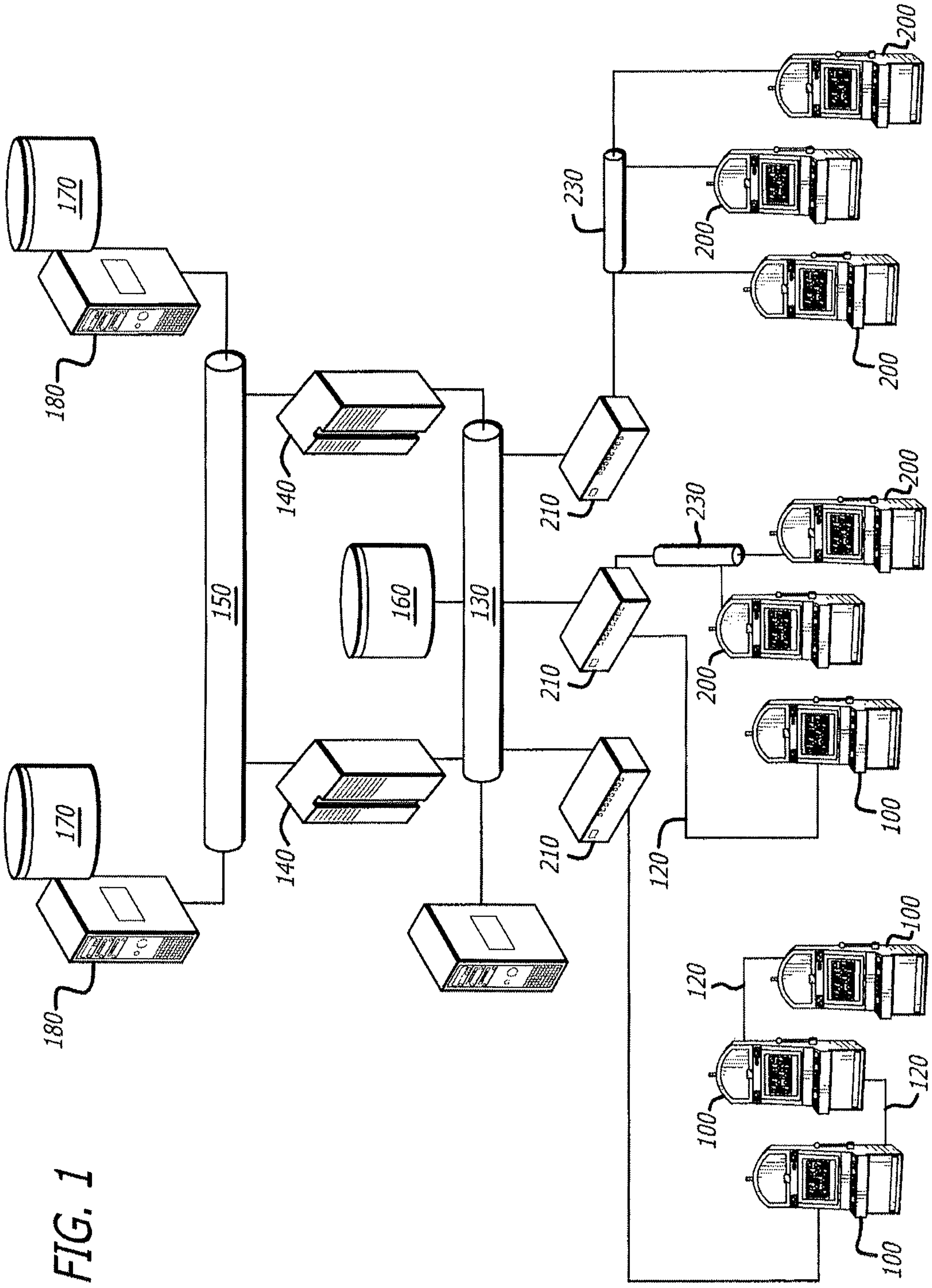
FIG. 1 illustrates components of a preferred embodiment network used for a system gaming apparatus.
Figure 62:
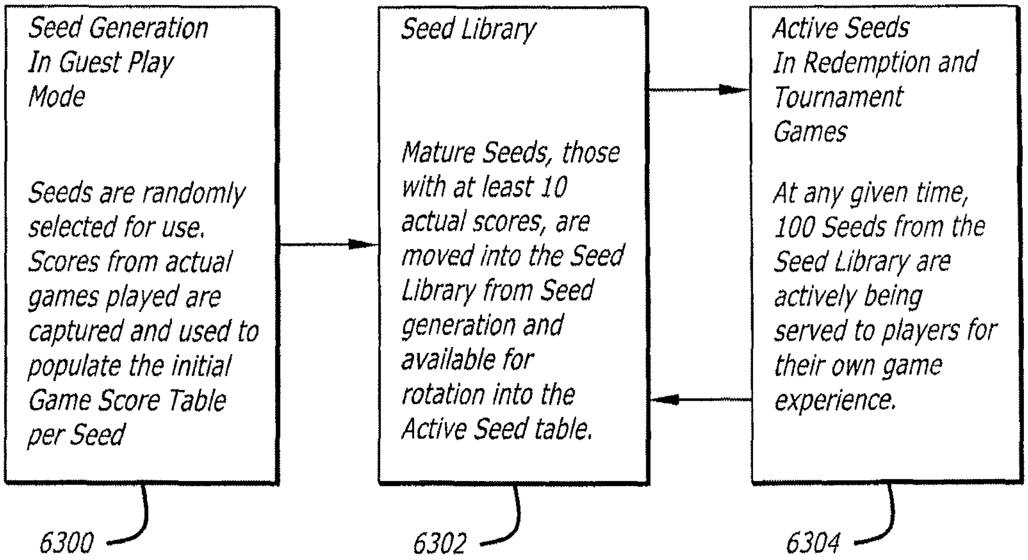
FIG. 62 is a flow diagram illustrating steps performed for game seed creation and use.

Referring now to the drawings, wherein like reference numerals denote like or corresponding parts throughout the drawings, and more particularly, to FIGS. 1-62, there is shown a preferred embodiment of a system gaming apparatus. With reference specifically to FIG. 1, a preferred embodiment network used for a system gaming apparatus is shown. System gaming is a new technology that provides player choice as to the selection of a non-base game from among a plurality of non-base games. Concurrent with the play of a base game, players can choose which system game and/or tournament to play. Moreover, players can choose when to play the tournament and/or system game. In other words, non-base game play is now "on-demand." Once the player determines what to play and how such play is to occur (choice), the System Game is presented to the player via a display. Generally, the system game and/or tournament will be provided to the player using a player tracking user interface having its own separate processor and display. Alternatively, the display is the primary game display, a secondary game display, a player-tracking unit, or any other type of display system. Still further, any game on a casino floor can now have multiple bonus games for a player to choose from without requiring any modification of the base game whatsoever. As such, even older, mechanical reel spinners and other legacy devices can now provide modern multimedia bonus games to the players.

Generally, system gaming funds the credit side of a gaming cycle (i.e., funding the right to play a game) rather than funding the award side of the game cycle (i.e., funding the prize itself), as was done in prior community gaming environments. In this way, system gaming provides the casino with the ability to determine the "right" of a player to play for a prize. In particular, promotional or other non-wagered monies may be used to fund the opportunity to play the game. Still further, the casino can determine the parameters it uses to set up the right to play the game. Since system games are funded using non-wagered monies, casinos have a significantly greater amount of flexibility to control the types of games played, the parameters of such games, and the types of prizes that can be generated and provided to game patrons. In short, therefore, system gaming provides enhanced functionality, excitement, and flexibility in game design and in game play.

Preferably, but not necessarily, the gaming machines 200 are broadband-capable in that the gaming machines 200 (or components inside them) accept higher speed, full-duplex, packetized messages. In one preferred embodiment, gaming networking bridges 210 communicate with the gaming machines 200. The gaming network bridge 210 provides communication with and couples the gaming machines 200 to the network. Backend devices, such as slot data and system game servers 140, 160, 170, and 180 are connected to the gaming network through the bridge 210. In one embodiment, backend network structures 130 and 150 connect the data and system game servers 140, 160, 170, and 180 from various locations outside and inside a casino or location of the tournament. For example, and not by way of limitation, in one embodiment, the backend network structures 130 and 150 include a local area network 130 system, and a wide area network system 150. Further, software applications executing in devices 140, the common database 160, and slot or player management and marketing servers 180, with their respective databases 170, function collectively or individually as game controllers.

In some embodiments, one or more protocols are used to communicate in the network. For example, and not by way of limitation, the network uses high-speed broadband communication and packetized protocol to communicate tournament data in the network. The protocol many comprise, for example, and not by way of limitation, Ethernet, TCP/IP and XML based GSA BOB available from the Gaming System Association of Las Vegas, Nev. Further, in one embodiment, for consistency in protocol, messages from gaming devices 200 are routed through broadband communication pipes 230 to the bridges 210.

Figure 2:
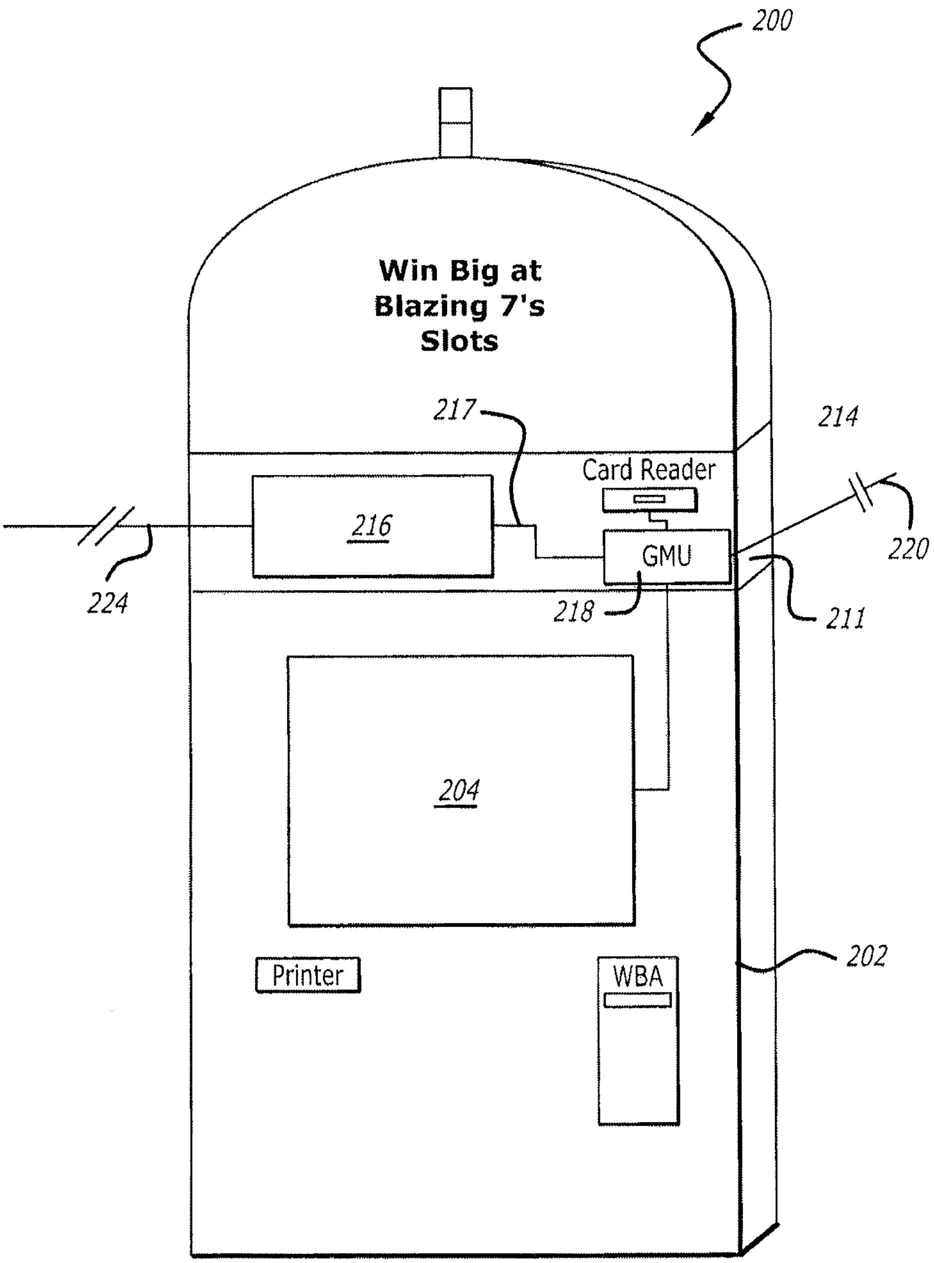
FIG. 2 is a block diagram illustrating a gaming device according to one embodiment.

With reference to FIG. 2, a block diagram illustrates a gaming device 200 according to one embodiment. A base game cabinet 202 is included that provides for regular game play on the gaming machine 200. A base game display 204 displays regular base game play. The base game play may include, for example, and not by way of limitation, poker games, slot games, keno, and the like. In one embodiment of the gaming machine 200, a selection list is shown on the display 204 to list a plurality of base games that can be played on the base game cabinet 204.

A player tracking cabinet module 211 provides a card reader 212, game management unit (GMU) 218, and an additional user interface 216. In one embodiment, the additional user interface is an IVIEW interface 216 (available from Bally Gaming, Inc. of Las Vegas Nev.), which serves as an additional user interface for playing system games off of system game servers 140. In some embodiments, an additional user interface is referred to herein as a player tracking user interface. However, in other preferred embodiments, system games are not played off of system game servers 140, but rather utilize a distributed processing environment, software-based processing components, a "stand-alone" processing system, or combinations thereof.

In one embodiment, the GMU 218 monitors game play and provides as one line of communication 220, a network connection to slot management and player marketing servers 180.

In another aspect of a preferred embodiment, the IVIEW interface 216 includes a web content capable display screen and an embedded processor. Preferably, in addition to displaying system gaming related information, the display screen is also capable of presenting mark-up or web compatible information to a user via the display screen. The embedded processor preferably utilizes an internal operating system and communicates with a gaming processor of the base game 202. The additional user interface further provides broadband network connection 224 to the gaming network as described with respect to FIG. 1.

In some embodiments, any one or more of the components of the gaming machine 200 can be embodied in software services and merged into another component without a network connection between them. For example, and not by way of limitation, the card reader 212 can be internet protocol (IP) based, or hardwired to a specific component, such as the GMU 218, through a serial, USB or connection.

In one embodiment, a system gaming server (e.g. 140) automatically communicates with a plurality of the gaming machines 200 to offer to the current or potential player of each gaming machine 200 the opportunity to play in system games without leaving the gaming machine 200 being played, and without having to discontinue regular play of that gaming machine 200. Thus, the offer leads to dual income and/or reward potential from a gaming machine 200 for a given period of time. The player plays their base game 202, and if the player so chooses, can play a system game at the same time while competing head-to-head with other players anywhere in the facility in which they are playing, or in competition with players in any other facility around the world if configured to do so through, for example a wide area network 150.

Figure 3:
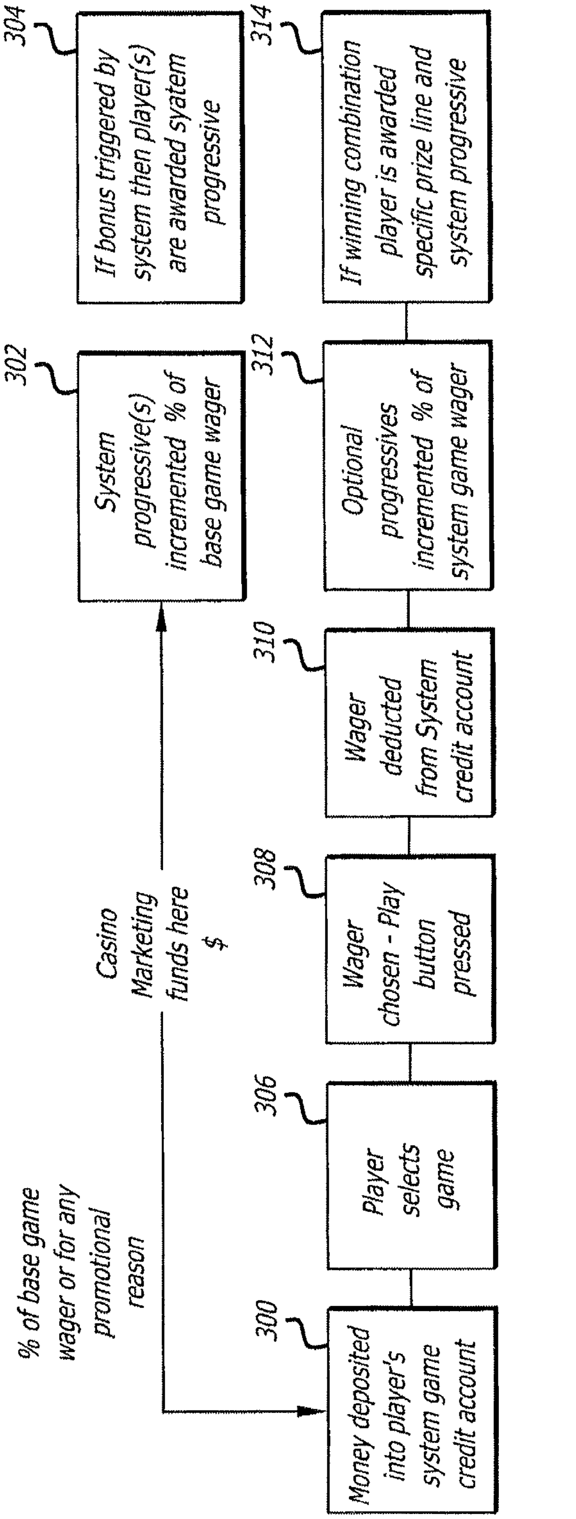
FIG. 3 is a data flow diagram that illustrates steps performed in a method to implement user accounts according to one embodiment.

With reference to FIG. 3, the steps preformed in a method to implement user accounts is shown according to one embodiment. In this embodiment, a new player account or variable associated with a carded player is created. This account is called an eGameCash account. It is used by the player to start the player's desired system game playable on IVIEW interface 216 of the player-tracking module 210. FIG. 3 illustrates the interaction of the eGameCash account with previous bonusing methods. In step 300, money is deposited into their account by the player, or from promotional funds, advertising, or other sources. In one aspect, while playing a base game 202, a percentage of the game wager, along with casino marketing funds, are added to a progressive game selected by the casino, step 302. If a bonus is triggered by the system, then the player is awarded by the progressive game, step 304. However, in another aspect of a preferred embodiment, the player selects the bonus game (system game) they wish to play, step 306. The player wagers money on either the base game, or the system game, step 308. The wager is detected from their eGameCash account, step 310. Optionally, a progressive game is incremented by a percentage of the wager, step 312. If a winning combination is achieved. the player is awarded a specific prize by the progressive or the system game, or both, step 314.

Figure 4:
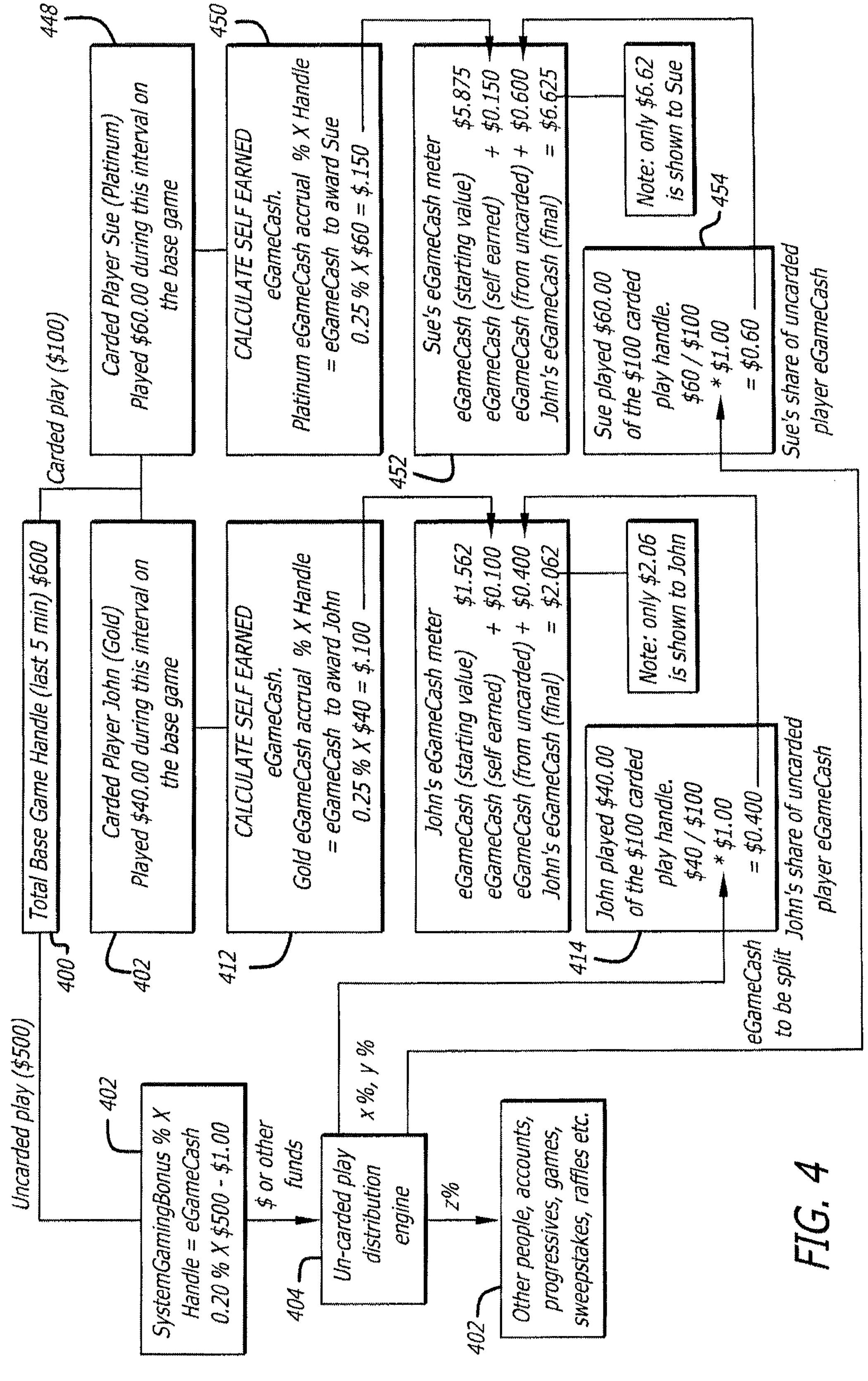
FIG. 4 is a data flow diagram illustrating data flow between various modules and data entities in an accrual engine of one embodiment.

With reference to FIG. 4, a data flow datagram illustrates data flow between various modules and data entities in an accrual engine according to one embodiment. A player plays base games 202, step 400. In one embodiment, the carded player's base game 202 play is monitored by the GMU 218, or a system game server 140, 180, step 408 for player "John", step 448 for player "Sue", and a predetermined percentage of this amount is given back as a marketing promotion to the player in the form of eGameCash, steps 410, 450. This function is achieved by an automatic software engine that is called the eGameCash award or accrual engine, which includes, in one embodiment, software executing on one or more of the system game servers 140, and/or the additional user interface 200 of the player tracking module. The eGameCash engine keeps track of, and updates an eGameCash meter for the player, steps 412, 452.

In one embodiment, the predetermined percentage is dynamically modified for a player based upon casino-configured rules. In this embodiment, each type of player accrues eGameCash at a different percentage. Further, in one embodiment, different types of base games 202 accrue differently. For example, and not by way of limitation, skill video poker games can accrue at 15% whereas slot machines can accrue at 25%. In another embodiment, different groups of base games can accrue eGameCash differently. Any base game 202 monitored variable or meters are used individually or in combination with others to accrue eGameCash. In an alternative embodiment, the accrual is weighted or calculated by using the base game 202 theoretical or actual win.

In one embodiment, a percentage of game play from uncarded players, step 402, contributes to carded players' accounts, step 404, and is weighted to the carded players' handle-pull (play) per unit time, steps 414, 454. This process is called the uncarded play distribution engine, which in one embodiment includes software executing on the system gaming servers 140, 180. This amount is given freely by the casino as a marketing promotion. This function is included in the eGameCash award engine. In one embodiment, in steps 404 and 406, eGameCash accrued from uncarded play is given to specific types of players, specific players playing specific base games, or alternatively, to uncarded players that have a temporary account on the system. In another embodiment, this uncarded eGameCash alternatively funds progressive prize pools or sweepstakes prizes obtainable by winning a System Game played by a carded player.

In another embodiment, a player purchases eGameCash with money transferred from the base gaming device 200 they are playing into the player's eGameCash account, where jurisdictions and casinos allow. In one embodiment, there is a dollar-to-dollar equivalent conversion, but, in an alternative embodiment, a conversion formula is used. Other transfers to and from another account or monetary institution is used, according to another embodiment. Players purchase eGameCash with, by way of example, and not by way of limitation, an ATM card, a debit card, a check, a credit card, a transfer from a banking institution, and other cash or point accounts from other authorized sites. In one aspect of a preferred embodiment, a player is allowed to convert bonus points to and from eGameCash. In another aspect, a player is allowed to convert promotional eCash (bonus cash offered as a promotion) to and from eGameCash, either dollar for dollar, or at a conversion rate. In another aspect, a player is allowed to convert any of their accounts (for example, a hotel complementary account) to and from eGameCash.

In one embodiment, a casino has a marketing promotion engine executing on the servers 140, 180 that manually or automatically increments or decrements eGameCash to a specific player or group of players or players playing at a cluster of gaming devices 200 (e.g., player may get double eGameCash accrual on their birthday or anniversary). In another example, the first 100 players playing on a day receive $50 each of eGameCash.

In one embodiment, players lose un-played eGameCash based upon casino-defined rules. For example, and not by way of limitation, a player loses eGameCash if the player has not played or visited a casino for a year. In this embodiment, preferably, only an uncashable portion of the eGameCash is exposed to these decrement rules. Player-funded or eGameCash won by players remains and is independent of the decrement rules.

In another embodiment, a player can elect to cash out cashable eGameCash, and the money is transferred onto a base gaming device 202 credit meter.

In one embodiment, eGameCash has cashable, uncashable, and player funded portions that are presented to the player as a single variable. In this embodiment, uncashable amounts need to be played on system games or base games 202. This allows a casino to give uncashable amounts at registration time, or any other time, for any promotional means. In this embodiment, the player cannot just go to the gaming device and take his money out without that uncashable money first being played through a gaming cycle.

In one embodiment, winnings from the system games are put into the cashable portion of the eGameCash account. A player can cash out these winnings by transferring them to the base game 202 and pressing a “cash out” button on the gaming device 200.

In another embodiment, there is an option for the casino to allow only a certain amount of System Game winnings to be cashable per unit time. For example, and not by way of limitation, a $50 maximum can be set for a day. This forces players to revisit the casino on other days to collect their winnings. In one embodiment, a dual-port printer can allow the system game platform, or GMU 218, to directly print a cash voucher to the printer without having to communicate with the base game 202 to do so directly. Once this cash out occurs, the player can then walk to the cashier for the cash value on their cash voucher.

In other embodiments, other ways of taking eGameCash out of the account can be used by the player, including, but not limited to, wire transfers. In another aspect, the player-funded portion of the eGameCash meter can be converted back to any other player account that the player chooses, for example, a conversion factor. In another aspect, the player may return credits back to a base game 202 on which he is playing.

As stated above, in one embodiment, player-funded portions usually come from credits or monies transferred into the player’s eGameCash account from a base game 202. These funds can be readily converted between eGameCash and base game credits at the player’s discretion. In some embodiments, these conversions from one type of currency to another are either allowed or disallowed, or conditionally allowed by casino rules or jurisdictional requirements. In one embodiment, the eGameCash account is created so as not to convey to the player that the player must use his bonus points or eCash as the only way of crediting the system games. The player already uses the eCash and bonus points’ accounts, and in one embodiment, the system should not force the player to decrement these accounts to enjoy a system game. In one embodiment, eGameCash is shown to the player as a cash value or a number of credits for a specific system game denomination chosen by the player. For example, a conversion of $100.00 or 100 credits amounts to $1 each credit. In one embodiment, uncashable, eGameCash is played first, then cashable eGameCash, then player-funded eGameCash to authorize play on a system game.

In one embodiment, a player is required to match the uncashable eGameCash with player-funded amounts in order to make the uncashable portion become cashable. Alternatively, in another embodiment, every player funded amount or cashable amount of eGameCash needs to be spent first, and then uncashable amounts become cashable. In yet another embodiment, the uncashable portion increases a player’s wager. Thus, as an example, and not by way of limitation, 1 credit of paid eGameCash played results in 2 credits of wager for that particular game, because the other credit was authorized to come from the player’s uncashable portion of his eGameCash account. In effect this allows a player’s cashable amount to become playable if the player first funds a game. A player can achieve larger wins in this embodiment, because the player did not have to fund all of the credits to play a specific game.

In one embodiment, some of credits come from marketing funds. In one aspect of this embodiment, each eGameCash portion is shown individually to the player, or combined. If combined, then other visible indications are given to let the user know that all the cash in their account is not cashable. Indicators are given showing the progress towards accrual to an eGameCash credit. Examples of indicators include, not by way of limitation, a power bar or a digital eGameCash meter with several decimal places.

In one embodiment, the aforementioned eGameCash award engine is used to give carded players promotional game credits, or cash, that is expendable on system games or other casino or third-party services. These credits go into the uncashable portion of the eGameCash account assigned to a player. The engine has many casino configurable fields or variables, such as, by way of example, and not by way of limitation, an accrual rate for uncarded players, a rate for each type of carded players, a game theme played, a skill game rate, a chance game rate, a denomination played, rates if a max bet is base game is played, frequency of doing the accrual from uncarded to carded player accounts, and which data fields sent from the player tracking module 211 are to be used for the accrual equation (usually the total handle or wager amount in dollars).

In one embodiment, a carded player accrues eGameCash in real-time to the player’s account as the player plays a base game 202 or a paid system game. If, for example, and not by way of limitation, the accrual rate for a specific player type is set to 25% of his base game handle or wager, then for every $4 in a handle pull wager, the player accrues $0.01 of eGameCash. Thus, in one embodiment, the IVIEW user interface 216 of the system tracking module 211 buffers the base game handle pull until such a time that approximately one-half of the $4 is played (or $2) before sending the data to the eGameCash award engine. In another embodiment, this data is sent to the GMU 220, or from the GMU, to backend slot management servers 140 and casino marketplace servers 180 without first going to the IVIEW. Thus, in this embodiment, if the player is only playing $0.25 per game on the base game, the system only sends a server message every 8 base games played to update the cash award. This cuts down on network traffic significantly still allowing every penny of the eGameCash to be shown to the player as it accrues.

In one embodiment, the player’s personal accrual is not immediate, but is performed at optimal times or levels decided by the casino. For example, and not by way of limitation, the eGameCash accrual rate can be tied to a base game 202 theoretical payout percentage rate and wager amount, whether a maximum bet is played or not, and/or any combination of both. In one example, and not by way of limitation, the system does not provide much eGameCash to players winning much over the expected amount of win. The players who are not winning much on the base game 202 may be given more opportunities to play system games.

In one embodiment, all uncarded play handle pull wagers would be accrued into a separate account or accounts until such a time that it is disbursed to carded players. This accrued play account from uncarded players is multiplied by a casino-configured percentage and is given to carded players based upon each specific carded player's handle pull verses all carded players' handle pull per unit time. In one embodiment, the distribution occurs at fixed time intervals, for example, every 5 minutes, or once the uncarded play account accrues to a certain size.

In some embodiments, other rules that create a compelling product for the casino and its customers are used for distributing uncarded account accrues. For example, and not by way of limitation, a casino configures the system such that a player only receives uncarded or carded play accrual on his next visit to the casino as a means to drive the player back to the facility. In another embodiment, a disbursement means is to take the uncarded account and give it in different percentages to different types of carded players, and not just evenly across all players. For example, and not by way of limitation, only "Platinum" club card members get eGameCash accrued to their account from uncarded players.

In one embodiment, only carded or club players get free eGameCash to play system games. However, if configured to do so, uncarded players can get their own eGameCash back to play system games in this or other embodiments. This cash is assigned to a unique IVIEW device ID, which is an identifier that identifies an IVIEW device 216, or GMU ID, which is an identifier that identifies a GMU 218 on the gaming device 200 that the player is playing. As an example, and not by way of limitation, 1 cent of eGameCash is earned by an uncarded player. The player can play it currently before the player leaves the base game machine 202, or risk losing it or giving it to the next player that plays the gaming device 200.

In one embodiment, the types of system games that uncarded (or non-club) players can choose from are limited, because some games complete at a later time, and the players might not be playing the gaming device 200 to collect the win at that later time. Since there is no account for the uncarded player, funds that the payer wins cannot be placed in an account. An example of a system game that cannot be played by an uncarded player is a weekly tournament (described below), or a raffle.

In one embodiment, in order to solve this problem with uncarded players, a temporary account is created for the uncarded player, and the player is asked to enter a username and a PIN number to access this account at a later date. In another embodiment, a special code is used to access the account at another more capable terminal or registration area or kiosk. In another embodiment, a receipt is printed out of the gaming device 200 with the temporary account information to allow later access to the account if the uncarded player wins a system game.

Nevertheless, in embodiments where uncarded play accrual is distributed to carded players it encourages players to become carded if they want to get the benefits of this transfer of marketing funds from other types of players. In one embodiment, this transfer of uncarded play promotional money to carded players is weighted to the handle pull of each specific carded player, or there is no weighting formula used whatsoever. In another embodiment, different eGameCash accrual rates are used for calculations of eGameCash accrual rates, which vary based upon, by way of example, and not by way of limitation: the card status of a player, the type of player, a cluster of games, denominations of played games, the player value to the casino, the win rate/loss rate for casino or player, location on the floor a gaming device 200, a site identifier for a casino (site ID), a specific web portal address used to access the system game servers by a player, the geo-location of a player, the biometrics, the types of games played by a player, the various promotions running, the self-tuning of gaming devices 200 to optimize for activity on the gaming floor during any period, or any accounting variable or combination of variables used in tracking gaming activity. In one embodiment, the eGameCash distribution from uncarded players to carded players is dynamically tuned to create an optimal marketing effect for the carded players. In one embodiment, by way of example, and not by way of limitation, the distribution occurs every 5 minutes, once $500 is accrued, on middle of the week days only, during another promotional event, or when there is a winning outcome in a specific system game.

In another embodiment, alternatively a percentage of a carded players' system game wagers go to other players or groups of players instead of, or in addition to, funding the prizes for the system game those players are playing.

In another embodiment, eGameCash accrual is at a different percentage based upon theoretical payout percentage for each pay line in a game. In one embodiment, the eGameCash award engine does not track individual player activity, but rather, the play of an independent or a player ID (which is a player identifier that identifies a player). In this embodiment, the system awards back eGameCash for any reason to specific player IDs. This allows the base game play to contribute to progressive pools directly. Upon the player's choosing, a system game is played using this eGameCash, giving the player the opportunity to win a progressive pool contributed to directly from a percentage of base game 202 play. In one embodiment, this providing of eGameCash is accomplished by monitoring play from the day before, or profitability at the casino, and inserting funds on the current day into the player's eGameCash account. This way, if system games provide too much money in a recent time period, then the eGameCash award engine can be tuned back to limit plays of system games going until, at a later time, it is manually or automatically tuned back to the default level. In another embodiment, prize pools or system game credits are incremented on what has not been won by players vs. what was expected to be won in a game session.

In one embodiment, random insertion of eGameCash into the account of a carded player, or group of carded players, occurs. This provides a surprise capability or smooth distribution effect. By way of example, and not by way of limitation, the player receives $0.50 of eGameCash in his account even though the player normally would have received none or very little due to the rate of his play on the base game 202.

In another embodiment, eGameCash distribution to players is in real-time as the player plays the base game 202, or once per a time period. In another embodiment, the distribution is after a specific amount of handle pull or loss by the player.

In another embodiment, the system dynamically applies eGameCash to the player based upon the player's win/loss rate. This allows for self-tuning of the casino's marketing outlay based upon what is going on in the base games 202 or for their entire business. This allows for a tight integration with the yield analysis software, for example.

In one embodiment, eGameCash accrual is based upon the theoretical payback percentage of the base game. For example, and not by way of limitation, for 85% theoretical payout base games 202, the player accrues 0.24% of handle pull, for 95% theoretical payout base games 202, the player accrues 0.22% of his base game handle pull.

In another embodiment, the eGameCash accrual engine uses a lookup table verses a straight percentage of base game wagers, wins, or rate of loss. An example lookup table is shown in Table 1.

TABLE 1

Sample Accrual Engine Lookup Table

| Session wagers | eGameCash given |
|---|---|
| <$1 | $0 |
| $1-$5 | $ .05 |
| $5-$10 | $ .25 |
| $10-$15 | $1.25 |
| over $15 | $3.00 |

The advantage of using a table is that a non-linear scale can be used verses a direct percentage. A non-linear scale, for example, and not by way of limitation, can be weighted to give more eGameCash to players who play more base game cash or wagers. In another embodiment, the table is weighted to give more eGameCash to players who loose the most on the base game 202, in either absolute dollar amount or worst payback percentage verses expected base theoretical payback percentage. Further, in one embodiment, different percentages are used for different levels of a player's monitored activity. An example table for this embodiment is show in Table 2.

TABLE 2

Sample Accrual Engine Lookup Table

| Monitored activity (e.g., handle pull) | eGameCash Rate |
|---|---|
| <$1 | 0% |
| $1-$5 | .15% |
| $5-$50 | .16% |
| $50-$1000 | .25% |
| * * * | |

In another embodiment, eGameCash accrual occurs exclusively on the IVIEW device 216, GMU 218, base game device 202 or other gaming client-side device, and not on a server 140, 180. Accrual parameters are sent from the system game server 140 to the gaming machine 200 for computing purposes. The parameters include field's values, such as an accrual rate for each type of carded player or uncarded player, player specific accrual rates, variables for use in monitoring accrual, and variables to use for tournament score calculations, and the like.

In one embodiment, a player has a choice of how to receive promotional funds from the casino. By way of example, and not by way of limitation, these choices include a choice at a player's registration time as to how the player wants to accrue his promotional dollars. In this example, a player can elect to not get eGameCash, but rather fund an IRA, college fund, Ebay® points, Amazon.com® credits, Pay Pal® Preferred Awards®, airline points, hotel points, car rental points, eScript® points for educational or charity funds, frequent renter programs, credit card cash back programs, incentive points programs for grocery stores, and the like, other third party points systems, mutual funds, and stocks. The player can chose that the awards are provided in a player's name, or in another person's name, such as a child. In this embodiment, the player may elect to get eGameCash and bonus points, bonus points only, or eGameCash only, with or without any other prizes. In one embodiment, a player is allowed to decide, by way of example, and not by way of limitation, that the player's casino promotional funds are allocated as follows: 25% in airline points, 25% in eGameCash, 25% in Bonus Points, and 25% in rental car points. Further, in this embodiment, this allocation can be performed at registration time and can be modified later on the IVIEW device 216, or any kiosk, web portal, or casino help desk. Depending on the player's desired choices, extra registration data is collected, such as a frequent flyer number, to allow for fulfillment of these rewards.

In another embodiment, an alternative to creating a new eGameCash account for a player is to use any existing account that the player already has in the player tracking servers, or casino marketing servers, or other servers (collectively show in FIG. 1 as 140 and 180) where the user has an account established. In one example, and not by way of limitation, 10 player bonus points allows a player to play a system game on the additional interface 216 of the player-tracking device 211. Since players already accrue bonus points to their account, the system provides another way for them to spend the points rather than just at various casino venues or restaurants. A player that accrues some bonus points, but not enough to ever use in a restaurant, may never get the benefit of the points. The player can choose to use all of his points on a system game involving a raffle, for example, for a chance to win big, or loose all of his points that the player would not otherwise use. This helps to reduce accrued liability on a casino's financial accounts.

In one embodiment, higher denomination games and larger wagers use more bonus points, making a player eligible for certain system games. In one embodiment, bonus points are decremented at the start of the system game. In another embodiment, bonus points, and other player accounts are automatically converted into an account that gets used to credit a system game. A player selects a specific game to play from the system game server 140, and then the game executes on the IVIEW display 216. Configuration tools allow the casino to decide which player's specific account is used to enable system game play as a primary game, and which games are used for secondary play enabled by play of the primary game, and the like. For example, and not by way of limitation, a casino can decide to allow the player to use his eGameCash as the first source of monies required to play a system game, and if there was not enough money in this account, then other accounts can make up the difference, or be used instead. Thus, it is to be understood that a player may use any of their accounts to authorize play if the casino allows such transactions to take place. The player selects the desired priority of which account he wants to use first, then which other accounts to use once the primary account runs out of funds.

In one embodiment, the system does not allow eGameCash accrual if a card is not in a gaming device for a certain period of time, for example, for 2 minutes. At that time any games that have not concluded are terminated. A new game cannot begin without the card unless configured to do so. If a player account is disabled, then no eGameCash accrual for that player occurs, and/or no system games are allowed to be played.

There are many micro-payment or micro-currency online businesses in the world that allow set-up of an account by depositing a certain amount of funds into a user specific account. The account holder can spend this money in micro amounts, for example, as they use the Internet to purchase small items such as music clips, web pictures, and other electronic media. These accounts at third parties can be used as a means to credit a system game, or a player's eGameCash account. Funding in this way can occur game by game, as the games are played, with or without a player using an eGameCash account. In one embodiment, all payments and credits between the third party and the casino are at the end of the day, week, month, or real-time. One such service that can be used with this embodiment is located on the Internet at www.bitpass.com. However, there are many micro-payment systems that can be used in this embodiment.

Promotional Funds

A casino has a marketing promotion budget, which, like most businesses, is a function of how much revenue the business does. In one embodiment, a simple controlled means for a casino to automatically determine how much eGameCash will give out is to tie it to a percentage of the player's handle or money spent. This way, players that spend more money get more eGameCash. Overall, casino promoters recognize that the casino is typically going to give out a fixed percentage of its daily revenue to carded players, for example 0.25% all handle pull. With a casino floor having 2,000 gaming devices 200, and a $2,000 average handle per day per gaming device 200, this equals $10,000.00, which the casino desires to be given back to the players in the form of promotional dollars. A casino can thus calculate how much it wants to give away to its players based upon their profitability as a company, as a whole, or what their budget will justify. In one embodiment, the percentage of handle pull can be calculated and entered into the system, and then from there on, an even disbursement of eGameCash is given to carded players.

In one embodiment, the system games have a theoretical payout percentage of less than 100%, or more typically 60% to 95%, depending on the game. Thus, statistically if $10,000 of eGameCash is given to carded players in one day, and if all of this amount is played on system games then statistically, between 60% to 95% of it will be given back in system game awards over time. In one embodiment, this becomes cashable by the player, and this amount can leave the casino with carded players.

If any system has an outcome with a very large winning combination, it too becomes cashable by the player, and the casino gives much more than $10,000 in eGameCash awarded that single day. This is exactly what happens on the base casino games today, but over a time period, the games will give out the theoretical payout percentage. This is the case with the system game platform. In one embodiment, all system game outcomes are funded by casino bank funds just as if they are played on the base game 202. Current systems in the market only give the pre-determined percentage of the handle to a prize pool. Thus, this is all that is ever given out. System games, according to one embodiment, have the ability to have a pay table that can pay much more than the pre-determined percentage of the handle pull. The system can also provide progressive awards for specific system games or groups of specific games. Accurate tax and financial database transactions are kept for this purpose in a data store 160, 170. To offset promotional payouts to players in one embodiment, the system games increase play and handle pulls to ensure casino profits are not lowered.

Types of Games

In one embodiment, the system game implements one or more "games of chance," or alternatively other games that do not rely primarily on the skill of the player can be offered as a style or genre of game. For example, and not by way of limitation, such games as slot machines, substantially random card games, roulette, and the like, in one embodiment, offer a player a chance to win cash or prize credits, or other physical prizes, without requiring a high degree of skill. These games typically rely upon a random number generator to determine outcomes of the games. In some embodiments, other mathematical formulas or calculations are used to create the effect of randomness to the player and regulators.

In another embodiment, the system implements one or more "games of skill," wherein a predetermined goal, task, or objective for a game should be accomplished in a skillful manner, such that an outcome of the game is determined primarily by the amount of skill of the player. The greater the player's skill, the closer or more easily a desired goal in the game can be reached by the player. In one embodiment, points associated with the predetermined goals or objectives are added to a game score such that a higher game score, on average, indicates a greater amount of skill by the player. In some embodiments, skill predominant, or 100% skill games are implemented. Games that rely on player knowledge generally are regarded as games of skill.

In one embodiment, not all games will require decrementing of eGameCash to authorize play. Surprise, extra, or free games are provided for the player.

In one embodiment, many game types are available for play on the IVIEW device 216. They include, for example, and not by way of limitation: class II games, class III games, central determination games, bingo, keno, video reel spinning games, video poker games, various card games, solitaire games, skill-based video games, chance-based video games, skill-based slot machines, games of mixed skill and chance, roulette, spinning wheel games, lottery style games, raffles, tournaments, find the prize style games, mystery bonus games, sweepstakes, wide-area progressive games, multi-player real-time competition games, turn-based games where players exchange moves or turns, elimination tournaments, fixed number of player tournaments, time-based tournaments, pyramid style tournaments, sprint to a score tournaments, elimination tournaments, team play games and tournaments, prize merchandise or service games, games that award cash, games that award nothing other than entertainment value, games that award prize credits redeemable for merchandise, games that award raffle tickets, games that award a combination of cash and prize credits or raffle tickets or combination thereof, games that award sweepstakes tickets, games that award multiple pay lines, single-denomination games, multi-denomination games, single pay line games, games that allow single or multiple credits to be spent on a single game event, tournaments using base-game activity, tournaments using base-game activity to determine a tournament score, system game tournaments where scores are determined by wager and outcome on the game played on the player tracking video display interface 216, golf-style games, shooting-style games, games that include player handicapping, dice-style games, board style games, baccarat, puzzle-style games, action games, word games, jig-saw style games, crossword games, hangman, color or pattern matching games, massively parallel games, chat-based games, treasure hunting style games, craps, games that allow continued play if more money is spent, games that qualify you for other types of games, hearts, arcade-style games, checkers, backgammon, dominos, chess, system games where the outcome is determined by the base gaming device, system games that advance based upon activity or results on the base gaming device, flying games, driving games, games that require player input to play, games that auto complete without user interaction, games that can auto-play from one game to the next, system games that have their own systems games as bonuses, extra System Games, advertising sponsored games, and games that allow players to compete with others on different gaming platforms such as: personal computers and at home-wireless devices and cell phones.

Other types of games that can be used in this embodiment include, by way of example, and not by limitation: sports book betting, games played at third party online game services, mahjong, reverse, bridge, blackjack, spades, pool, bowling games, pay per view movies or events, spectator sports, Pai Gow, games where the system game is a bonus round for a base game, games where the system game is a part of a paid or free part of the base game, games that include side bet features, games where you can only play if you achieve something in a base game, eight-liners, games where server side finite poolprize awards are reverse-mapped into a winning combination on the client gaming device, 6 or 7 card draw poker, stud poker, games where the player selects the desired difficulty of the game for specific rewards, Texas hold'em poker style games, promotional progressive games (PPE), wide-area progressive games (WAPs), collapse-style games such as Bejeweled, Popit, Cubix, and other web-based games.

Types of Awards

In some embodiments, the most common type of award that could be given from a system game is cash or cash equivalent value. According to one embodiment, a typical game has a pay table that has one or more types of winning outcomes that can award cash, prize points, specific merchandise or service-related prizes, souvenirs, free games, raffle tickets, sweepstakes tickets, promotional coupons, vouchers, hotel comps, show tickets, discounts at stores or other venues, bonus points, eCash, base game credits or cash, or free system game plays. Any game winning combination, event, or outcome can award any one of these types of prizes or a combination of them.

In one example, and not by way of limitation, 3 Cherries on a video reel spinning game line pays $5.00 eGameCash and 5 raffle entries into the yearly raffle drawing. The award does not have to be determined at the outcome of the game, but can be awarded for just entering the game, or awarded in the middle of the game. In one embodiment, the games are for entertainment only. In another embodiment, system games themselves have their own progressives. These progressives could be additions or multiples of the types of awards mentioned above. In one embodiment, the system game multiplies, adds to, subtracts from, or substitutes an award from the base game 202. Other types of awards include electronic viewing or listening to data files, such as audio files, cell phone ring tones, movies, pictures, or other forms of multimedia.

In one embodiment, systems games themselves have bonus rounds and wide area, local area, individual, or personal progressives. Awards in this embodiment are special features, settings, or levels for the game, or future games of the same or different game title. In one embodiment, all awards are given and assigned to a player-specific database record in the database 160, or to a group of players to be collected later. Otherwise, in another embodiment, awards are taken by the player instantly at the gaming device in the form of cash to his base game device, account, paper ticket, or a physical prize dispenser on the gaming device 200. Typically, cash won is added directly to the cashable portion of the eGameCash account associated with the player. A player may have an account associated with points toward prizes ("PrizePoint" account) that is associated with his account for wins on games that award PrizePoints. These PrizePoints can be used for merchandise, services, or e-Commerce related shopping. Pay to play system games can accrue to Bonus Points bucket and eGameCash accounts simultaneously, if desired by the casino.

In one embodiment, an amount of paid play on base game or paid system game play can allow transfer from an uncashable account to a cashable eGameCash account. In one embodiment, the allowed transfer amount matches the amount spent to play the game. This is called "match play." The system also has access to various prize output devices. They include, by way of example, and not by way of limitation, smart card writers, printers, hoppers, prize dispensers, ticket dispensers, electronic ports for download of electronically-delivered prizes such as mp3's, chips, currency dispensers, and prize servers. In one embodiment, these devices are physically contained in the same cabinet where the player is playing, or at remote locations for the player to collect the prize.

The term, "prize," as used herein, generically refers to any merchandise, souvenir, food item, or other physical goods or services that can be offered to players for redemption for games, and that have value other than as a medium of exchange for use in the gaming environment. A can of soda, a slice of pizza, a radio, a stuffed animal, a certificate, cash, and free games to be played on a game units are all non-limiting examples of "prizes." Another non-limiting example of a prize includes a promotional coupon that encourages players to return to the current gaming environment or location more quickly in the future. For example, in one embodiment, a promotional coupon is dispensed as a specific prize ticket that offers a player a free pitcher of beer if the player returns and redeems the coupon within one week (or whatever time frame and free item the operator desires). In one embodiment, redemption tickets or specific prize tickets are not considered "prizes" since these tickets can be used in the gaming environment (such as an arcade or casino) to redeem other types of prizes. In gaming environments, each prize typically has a cost or value associated with it, specified as an amount of universal redemption tickets (or prize credits). The more valuable the prize, the greater number of tickets is typically required to redeem that prize. Free Show tickets or hotel rooms are also prizes. Additional value to an eGameCash account can be directly awarded by a base game 202 or system game if it is configured to do so.

Other examples of prizes include: savings bonds, funding of IRA's, college 529 type funds, stocks assigned to the winning player or people associated with the player, such as a player's children. In one embodiment, these types of prizes are automatically ordered for the amount of win in the name of the desired person and delivered later to a desired residence. Other examples of prizes include: Ebay® points, Amazon.com® credits, Pay Pal® Preferred Awards®, airline points, hotel points, car rental points, eScript® points for educational or charity funds, frequent renter programs, credit card cash back programs, incentive points programs for grocery stores and the like, other third party points systems, mutual funds and stocks, and retail gift cards.

A "specific prize" or "instant prize," as referred to herein, is a particular prize or type of prize whereby a player can be directly and immediately awarded, and in most cases, can immediately receive due to a particular winning result in a game. Preferably, the player redeems the specific prize by paying an appropriate specific prize ticket to an operator, vending machine, or the like. In one embodiment, the player receives such a prize ticket from a printer based on a particular winning result on the game device 200. A "specific prize ticket", "specific prize coupon" or "specific prize voucher", as referred to herein, is a ticket, coupon, or other physical or electronic voucher that can be exchanged for the specific prize only, or can be exchanged for other types of prizes, or accumulated to purchase several types of prizes. For example, and not by way of limitation, specific prizes include, paper or cardboard tickets, special metal, plastic, or cardboard coins or tokens, smart cards and the like, any or all of which can be used as "specific prize tickets," and dispensed or output from a specific prize ticket dispenser. Other prizes include: a wild card as a prize, another draw in a video poker game, or another spin in a reel spinner. In one embodiment, a coupon code is given to players in the mail to give them a "power up," or bonus, in a specific game or a game of their choosing. In one aspect of this embodiment, these codes can be assigned to specific players.

Prize Award Distribution Engine (PADE)

In one embodiment, a prize distribution award engine (PADE) includes a software schema and business logic engine that provides for a set of prizes to be assigned to an event identifier (event ID). In this embodiment, an event ID can be assigned to any system event including, but not limited to: an end game (ending of a game), a begin game (beginning of a game), user login, tournament win, raffle win, sweepstakes win, and the like. Any single or combination of prizes, each identified by a prize identifier (prize ID) to be won can be given to a player, or routed anywhere for any event that occurs on the system. Any game can award anything for any reason, for any type of prize, and direct it anywhere, for any winning combination on a pay table for a game or event achieved in the middle of the game, or just for playing the game. In one embodiment, a game has one or many event IDs attached to every win for every denomination for every credit level. In one embodiment, an event ID has an unlimited number of prizes of any type associated with it. In one embodiment, a single prize ID, such as $10.00 of eGameCash, can be the prize most of the time. Each different winning combination in a game's pay table can award different types of prizes or awards. This architecture gives unprecedented flexibility for a game designer to award anything for any reason at any time for a game. Further, a casino has the ability to change the awards for a specific game with out changing the probability math in the game. As long as the prize ID's are of the same value, they can be of a different kind, and the monetary impact to the player and casino is nothing.

In one event, an event ID can award another event ID in combination with real specific prizes that are delivered. For example, and not by way of limitation, a royal flush awards $500 of eGameCash right away, and 50 raffle tickets for a $1,000,000 raffle drawn at the end of the year.

In another embodiment, the award is directed to a specific destination. Normally, the destination of the award value is the player's specific account or credit meter. In this embodiment, prizes are able to be directed to a raffle or group of raffles, a progressive pot or group of progressive pots, a group of players, players of a specified type, third party servers, a banking institution, a printed coupon, a shopping cart, a player's bonus point account, base game 202 credits, and any medium capable of containing data representative of the award. This ability to change the destination of the award further allows one player's win award to another player or players to provide a cooperative play aspect. If anyone in the group wins then the whole group may provide each other with the benefit.

In another example, a specific winning combination achieved on a game's pay table increments a progressive value on another winning combination on the same game, or another game. If, for example, a triple 7 on a 5 reel slot machine is hit, its win could increment a progressive for a five 7 (77777) winning combination. In one embodiment, a win could trigger another extra game with the same game, identified by a game identifier (GameID) or a different GameID.

The PADE engine allows the casino administrators to freely substitute different prize ID's in pay tables of games dynamically. This can be done without affecting the games theoretical payout percentage as long as the substituted prize has the same dollar value, quelling the need for regulatory approvals for a casino to change their prizes at will. This creates unique marketing capabilities. For example, if a specific combination of symbols in a system game is typically $50 cash, the system can replace this prize with 2 each of $25 show tickets. This can be done until all show tickets are awarded, and then the prize can revert back to the original $50 cash payout. In one embodiment, a player is given a choice of prizes to choose from at win time to take the original prize or the current prize. Thus, in this way the PADE can be directly tied to various casino marketing promotion servers to effect changes dynamically and tune the system to various casino or other related events.

Tables residing in the database 160 are used by the PADE to control prize awards. Table 3 illustrates examples of the tables and example entries in those tables.

TABLE 3

Sample PADE Database Tables

| Prize Award Distribution Engine (PADE) | | | | | |
|---|---|---|---|---|---|
| PRIZE DESCRIPTION TABLE Prize ID | TYPE | Cash Value | Qty | Destination | Description |
| 1 | EgameCash | $ 1.00 | 1 | Player eGameCash account | |
| 2 | PrizePoints | $500.00 | 1000pp | Player Prize Point account | |
| 3 | Raffle Ticket | $ 2.00 | 100 | Raffle ID | |
| 4 | Merchandise | $200.00 | 1 | Player shopping basket | Apple IPOD |
| 5 | Player Status | $ 0.00 | 1 | Player rating boost in CMP | |
| 6 | Progressive | $ 0.01 | 1 | Progressive ID (personal or WAP) | |
| 7 | Bonus Points | $ 50.00 | 50,000 | Players Bonus Points account | |

TABLE 3-continued

Sample PADE Database Tables

| | | | | | |
|---|---|---|---|---|---|
| 8 | Cash Coupon | $100.00 | 1 | Printer at cabinet | |
| 9 | eBay Points | $ 50.00 | 500 | eBay servers | |
| 10 | Amazon Book | $ 24.00 | 1 | send Amazon purchase code to | |
| . . . | . . . | . . . | . . . | players email account or shopping cart, or coupon | . . . |

| GAME SPECIFIC AWARD TABLE GameID | Denom ID | Credits Played | Pay Table Combination | Description | Award Event ID |
|---|---|---|---|---|---|
| 1 | $0.25 | 1 | #1 | Royal Flush | 1 |
| 1 | $0.25 | 1 | #2 | Straight Flush | 2 |
| 1 | $0.25 | 1 | #3 | 4 of a kind | 6 |
| 1 | $0.50 | 2 | #1 | Royal Flush | 20 |
| 1 | $0.50 | 2 | #2 | Straight Flush | 21 |
| 1 | $0.50 | 1 | . . . | . . . | . . . |
| 1 | $0.50 | 1 | . . . | . . . | . . . |
| . . . | . . . | . . . | . . . | . . . | . . . |

| EVENT ID TABLE Award Event ID | List of Prize ID's | Event IDs given as well |
|---|---|---|
| 1 | 1, 8, 4, 3 | |
| 2 | 2, 1 | |
| 3 | 1 | |
| 4 | 10, 1 | |
| 5 | 16 | 3 |
| 6 | . | |
| . . . | | |

Currency Converters

In one embodiment, a player is able to convert eGameCash at any time to other forms of currency or prize types, if allowed to do so by a casino. Optionally, the system can be configured such that any prize type can be converted from one type to another if the casino, or third party operator allows the conversion.

In one embodiment, most of these conversions occur using a conversion formula set up by the casino or third party operator. In one non-limiting example of this embodiment, $3.00 of eGameCash can be converted to 3000 Bonus Points. Conversion formulas can differ based upon the direction of conversion. In another non-limiting example, 3000 Bonus Points can only be converted back to $2.50 of eGameCash. Certain types of player behavior are encouraged by this type of conversion scheme. In one embodiment, conversions are controlled using the IVIEW device 216, or on any other device that can access the player's account. In one embodiment, a player is able to perform redemption in a virtual video merchandise store on the IVIEW device 216. For example, and not by way of limitation, 20,000 prize points can be redeemed for a DVD. The player is able to use any currency to complete the redemption transaction. In this embodiment, redemption can occur off the casino property at a retail establishment, or at a user's home computer or wireless device. In this embodiment, any location, device, kiosk, or web site where a player can access the player's account allows conversion of one type of award to another type of currency or award or player account. This includes prize redemption. Third party providers may also allow conversion to or from their currency at agreed to conversion rates. For example, points or winnings can be converted to eBay points or airline points. These points can further be used as a means to authorize system gaming play. For example, and not by limitation, 50 airline frequent flyer miles can be used to authorize one five-cent system game or base game play. In one embodiment, conversion capability for any account can be dynamically turned on or off at selected dates and times for specific groups, types, of players or gaming devices 200.

In one embodiment, dynamic yield analysis allows automatic tuning of the currency converter rates, or which conversions are available at any given time to maximize casino revenue. Days of the week, time of day, gaming device numbers, player types, or specific players can have certain converters blocked or rates changed. In some embodiments, certain types of conversions take longer periods of time, or cost the casino more money in third party fees than others. Further, on peak traffic periods can be blocked, or conversions rates changed, to ensure best casino profits. At slower times, the casino can re-enable these features.

In one embodiment, currency conversion takes place automatically from eGameCash cashable winnings to bonus points without user intervention at any time, including card removal time or user inactivity time. This ensures that the winnings are safely stored in a server side player account for a carded player, especially if the base game is unable to do any electronic fund transfers.

Figure 5:
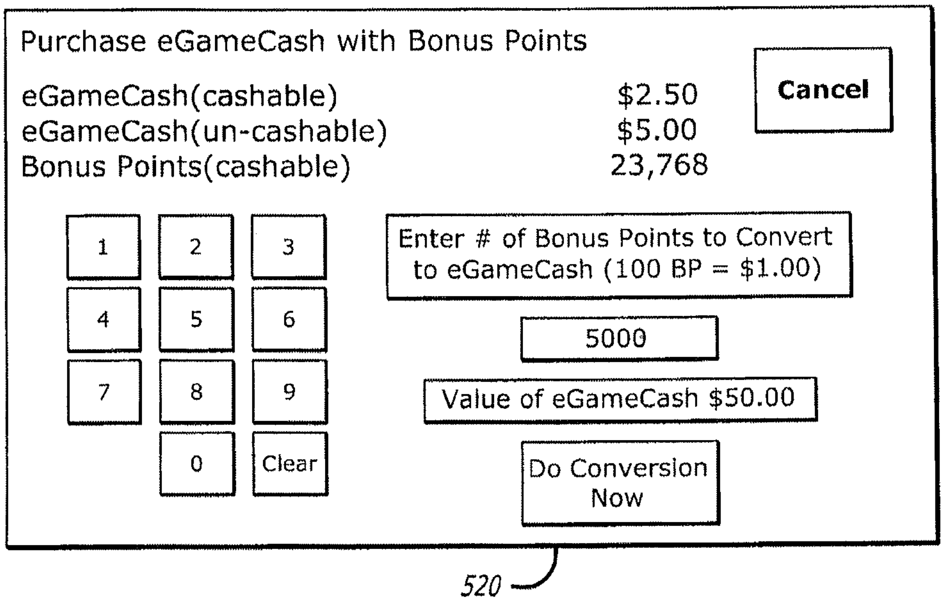
FIG. 5 is an example of a screen presented for allowing a player to perform currency and points conversions in one embodiment.

In one embodiment, the system provides limited cash out capabilities to the cashable eGameCash account. In one example, a player may have won $500 playing a System Game today but can only cash out $100 per day. The player is required in this embodiment to come back four more times to cash out the rest of the $500. This helps encourage repeat visits to the casino. In one embodiment, a yield analysis engine dynamically tuned cash out rules per player to maximize revenue for the casino. With reference to FIG. 5, an example of a screen 520 presented on the IVIEW device 216 for allowing a player to perform the conversions is shown. The IVIEW presents touch-screen image with on-screen buttons for controlling bonus and eGameCash conversions. In one embodiment, the screen 520 provides the ability to convert system and base game 202 winnings or credits, eGameCash, prize points, or bonus points to third party point systems using Points.com® as an intermediary, which is an entity that provides exchange currency into other third party currencies.

In one non-limiting example, 500 prize points are converted to 300 airline points. In another non-limiting example, 200 hotel points can be converted into system game credits or eGameCash. In one embodiment, the third party points can be converted back to any of the Casino points systems, including, but not limited to: eGameCash, base game credits, prize points, bonus points, eCash, or the like. Other third party point conversion companies are used in other embodiments. In another embodiment, the casino creates relationships with airlines, hotels, and other companies to remove the third party transactions costs.

Figure 6:
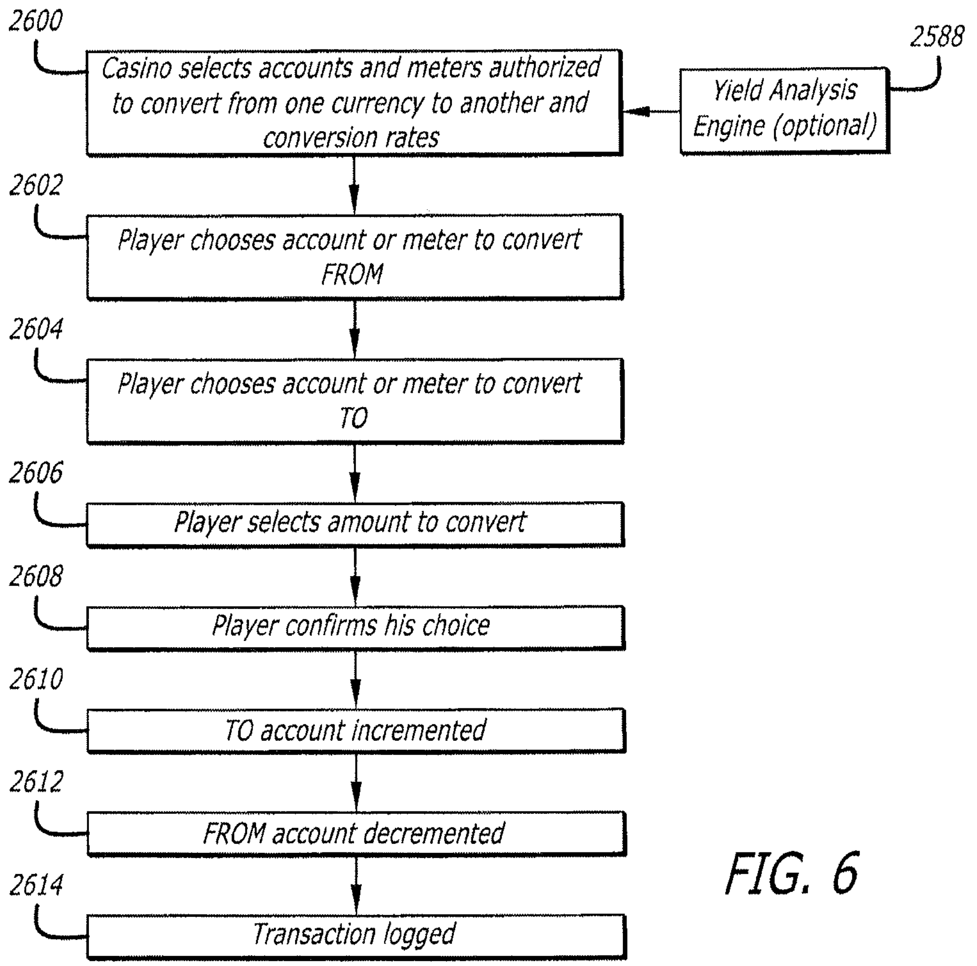
FIG. 6 is a flow chart that illustrates steps performed for conversion of currency in one embodiment.

With reference to FIG. 6, a flow chart illustrates steps performed by the PADE for conversion of currency. In step 2600, the casino selects accounts and meters authorized to convert from one currency to another, and conversion rates, and generally sets up parameters for allowing conversion by players. By way of example, and not by way of limitation, according to one embodiment, Table 4 illustrates a sample of the currency conversion parameters that can be set by the casino.

TABLE 4

Sample Casino Conversion Parameters

| | |
|---|---|
| eGameCash to bonus points conversion | (0 = off, $.01 eGameCash = XXX.XXX Bonus points) |
| eGameCash to eCash conversion | (0 = off, $.01 eGameCash = XXX.XXX eCash) |
| Bonus points to eGameCash | (0 = off, 1 Bonus Point = XXX.XXX eGameCash) |
| eCash to eGameCash | (0 = off, $.01eCash = XXX.XXX eGameCash) |
| Base game cash to eGameCash | (0 = off, rate) |
| Play with eGameCash only | True/false |
| Play 1st with eGameCash then bonus points | True/false |
| Play 1st with points then eGameCash | True/false |
| Play 1st with eCash then bonus points | True/false |
| Play with bonus points only | True/false |
| Allow player to choose auto-conversion | True/false |
| Auto tune converter rates | Yes/No |
| Allow inter-player/group transfers | Yes/No |

Setup auto-tune (dates, times, floor activity, maximize profitability, player types, per player, specific machines based on yield analysis)
The system will be able to transfer your money or buckets to another player in a group or family members In one embodiment, the parameters of Table 4 features can be configured per level or type of player. A player's choices are maintained in the database 160 for quick setup for a play session. Optionally, this step is added by the aforementioned yield analysis engine, step 2588. In step 2602, through the IVIEW 216 (screen 520 in FIG. 5), a player selects an account or meter to convert from. In step 2604, the player selects an account or meter to convert to. In step 2606, selects an amount to convert. In step 2608, the player confirms the selections. Once confirmed, the account selected for the destination is incremented by the selected amount, step 2610. The account from which the conversion was made is decremented by the selected amount, step 2612. The transaction is logged into the database 160, step 2614.

Base Game Monitoring

In one embodiment, the base game 202 of the gaming machine 200 is monitored by the GMU 218. The monitoring logic in the GMU is a hardware module in one embodiment, and a software module in another embodiment. In another embodiment, the logic is a software service running on any computing device in the system. In yet another embodiment, the monitoring logic is a software module executing base game 202 hardware or software.

In one embodiment, when a player inserts his/her card into the card reader 212, the GMU 218 sends the card number to the player tracking servers 140 to start a session for bonus point accrual. A player plays the base game 202 and gaming wagers and outcomes are sent to the GMU 218 over, for example, in one embodiment, a standard serial port using standard protocols such as SAS-Super SAS (available from IGT of Las Vegas Nev.), and BOB (Best of Breed) from the GSA Gaming Standards Association, or S2S+, SDT. The GMU 218 sends this data to the player tracking system of the player-tracking server 140 for points accrual. Various other embodiments use different transport mechanisms and protocols to accomplish this data transfer. In one embodiment, the data transfer from the base game 202 to the player-tracking server 140 is accomplished over slower, older, or legacy cables using RS485 communication protocol.

Once the base game data is in the player-tracking server 140, the points accrual takes place. For example, and not by way of limitation, in one embodiment, each $10 of play on the base game 2020 gives 1 point into the player's account.

In another embodiment, the system uses the data from the base game 202 to accrue eGameCash into the players account to generate base game tournament scores in a tournament.

In another embodiment, the collected data is used to tightly integrate system games played on the IVIEW interface 216 and the base game devices 202. In this embodiment, the collected data is used to gather statistics and to implement win/lose data to trigger events or wins in system games played on the IVIEW interface 216.

To enable system gaming on the IVIEW interface 216, software of GMU 218 supports real time monitoring of base game 202 play, whether a carded player or an uncarded player is playing. In one embodiment, this data is forwarded to the IVIEW interface 216 over a serial port called an EPI (217 in FIG. 2) for processing and/or forwarding to the system game servers 140 as needed. In one embodiment, the IVIEW interface 216 communicates over an Ethernet IP network through the network connection 224 to the system game servers 140.

Table 5 illustrates messages from the GMU 216 to the IVIEW interface 218 to support system gaming according to one embodiment.

TABLE 5

Sample Set of Messages Sent Between GMU and IVIEW Interface:

| Name | Purpose | Direction | Command Tag | Fields |
|---|---|---|---|---|
| Registration | The following data is sent to the IVIEW so it the device with which it is communicating. This data is tracked in the network gaming servers for many reasons. After every power-up of the GMU or game com restored this information is sent to the IVIEW. | GMU to IVIEW | 0x30 | Casino ID; Game Serial #; Game ID; Pay Table ID; Base %; GMU Time; GMU ID; SAS Version; Enabled Features; GameType; Enable; Denomination |
| | Allows the IVIEW to enable or disable System Game Epi messages. If Enable is '1' the GMU will respond to this with a Registration message. The GMU will power up with System game disabled. | IVIEW to GMU | | Enable |
| Game Selected Event | This message is sent to the IVIEW on the player changing the game being played. A successful registration process tells the GMU to start sending these events to IVIEW. This message is sent on the GMU receiving a Game Selected exception code from the game (SAS6.0, exception code 8C). It is also sent on power up and game com restored to get the initial game information. | GMU to IVIEW | 0x31 | Game Number; Game ID; Denomination; Pay Table ID; Base %; Max Bet |
| Game Start Event | This message is sent to the IVIEW on the beginning of each base game cycle. A successful registration process tells the GMU to start sending these events to IVIEW. | GMU to IVIEW | 0x32 | Amount Bet; Total Coin In; Max Bet Played |
| Player Change Event | This message is sent to the IVIEW on a player card being inserted or removed. This will be separately queued to a depth of N events to allow for possible disconnects of IVIEW. Player card out will be delayed for N seconds to allow for Total Coin Out to accrue. | GMU to IVIEW | 0x33 | Player ID; Card Type; Total Coin In; Total Coin Out; |
| Bonus Pay Request | This message is sent to the GMU when bonus game credits are to be awarded from the NOC to the game or an error has ended the transaction. | IVIEW to GMU | 0x34 | Transaction ID; RAwrdAmnt(optional); CAwrdAmnt(optional); Partial Pay OK; Handpay |
| Bonus Paid Response | This message is sent to the IVIEW when bonus game credits have been awarded from the backend systems to the game. | GMU to IVIEW | | Error Code; Transaction ID; RAwrdAmnt(optional); CawrdAmnt(optional); RAcptd(optional); Cacptd(optional); MaxXfr (optional); SplmntlErr (optional) Handpay |
| Cash out Complete Event | This message will be sent when a player cashes out of the base game. This IS used to terminate a game in progress because the player has left the machine. | GMU to IVIEW | 0x35 | None |
| Game Play Event | This message is sent to the IVIEW on the completion of each base game cycle. A successful registration process tells the GMU to start sending these events to IVIEW. This message is sent on the GMU receiving a Game End exception code from the game (SAS6.0, exception code 7F). | GMU to IVIEW | 0x36 | Amount Won; Total Coin Out; |
| EchoRequest | For Testing purposes Please repeat back what I Send you | Either way | 0x2E | X |
| EchoResponse | Here's what you sent me | Either way | 0x2F | X |

Message Construction

In one embodiment, all messages are session messages. Session messages have a one byte command tag followed the tagged fields. In this embodiment, since all fields are tagged, their order need not be specified.

Data Field Construction

In one embodiment, each field has a one byte of tag, followed by one byte indicating length, followed by bytes of ASCII encoded data. In this embodiment, it is possible to create a 0-length data field, which is generally construed to mean that the data for the field is unavailable. Table 6 illustrates a sample field listing according to one embodiment.

TABLE 6

Sample Field Listing

| Name | Purpose | Tag | Range |
|---|---|---|---|
| Casino ID | Unique for each casino | 0x80 | 0-3 decimal digits |
| Game Serial # | Serial number of cabinet | 0x81 | 0-40 characters |
| Game ID | Manufacturer Type | 0x82 | 0-5 characters |
| Pay Table ID | Unique pay table ID | 0x83 | 0-6 characters |
| Base % | Theoretical payback | 0x84 | 4 decimal digits implied decimal xx.xx |
| GMU Time | Time GMU believes it to be | 0x85 | 0 or 6 digits HHMMSS |
| Max Bet | Max bet for game | 0x86 | 0-12 decimal digits in pennies |
| GMU ID | GMU network address | 0x87 | 0-32 characters (if 2chars it's the network ID) |
| Protocol Version | Version number of protocol | 0x88 | 0-16 characters |
| Game Number | ID for game in the cabinet | 0x89 | 0-4 decimal digits |
| Denomination | # of pennies in credit for game played | 0x8A | 0-12 decimal digits in pennies |
| Amount Bet | pennies s wagered for the play | 0x8B | 0-12 decimal digits in pennies |
| Amount Won | Amount won for the play | 0x8C | 0-12 decimal digits in pennies |
| Total Coin In | Coin in game meter in pennies | 0x8D | 0-12 decimal digits in pennies |
| Total Coin Out | Coin out game meter but in pennies | 0x8E | 0-12 decimal digits in pennies |
| Max Bet Played | Indication that max bet was played | 0x8F | 1 digit 0 = FALSE, 1 = TRUE |
| Player ID | ID of Player | 0x90 | 0 to 10 characters |
| Card Type | Type of card | 0x91 | 0 = no card, 1 = player, 2 = employee, 3 = Abandoned Card |
| Transaction ID | Identification of EFT transaction | 0x92 | Value ranges from 0 to 255 |
| Partial Pay OK | Flag allowing Partial Pay | 0x93 | "0" = no partial pay allowed; "1" = partial pay allowed |
| Error Code | Error code of EFT transaction (see EFT error code table) | 0x94 | 0-3 decimal digits |
| MaxXfer | Max Credit Game can accept | 0x95 | 0-12 decimal digits in pennies |

Table 7 illustrates error electronic fund transfer error codes that are used as values a field of a message according to one embodiment.

TABLE 7

EFT Error Code Field Values

| Error Code | Error Description | End State | Comments |
|---|---|---|---|
| 0 | WorkedFine | Xfer Good | No Worries |
| 1 | EFTBusy | No Xfer | Retry later, some other eft xact in progress |
| 2 | GameRejects | No Xfer | Game rejects amount for its own reasons. (Supplementary error code may explain why.) |
| 3 | GameComDownErr | No Xfer | GMU can't connect with game |
| 4 | GameBusy | No Xfer | Game is busy, Retry later |
| 5 | NoGameAck | Uncertain | Game never (GMU timed out waiting) responded to xfer command. Not known if money went to the game. |
| 6 | UnpleasantXactID | No Xfer | Adjust Xact Id and retry. |
| 7 | PlayerCardOutError | No Xfer | Player Card was out when Request was made. |
| 8 | SDSLineDown | No Xfer | Wait for line to be up and retry |
| 128 | PartialPay | Partial payment | Less money than requested was xfred |
| 129 | NoGameStatus | No Xfer | Game has not provided status yet. May have status later. |
| 130 | NoGameEFTNow | No Xfer | Game claims no ecash ability. This has sometimes been temporary. |
| 131 | GameFull | No Xfer | Game claims it has not enough room for the amount to be xfered (if |

TABLE 7-continued

EFT Error Code Field Values

| Error Code | Error Description | End State | Comments |
|---|---|---|---|
| | | | partial credit is allowed will happen only if no room available) |
| 132 | FractionalCredit | No Xfer | Pennies request not a multiple of the denomination |
| 133 | SysGameDisabled | No Xfer | IVIEW never enabled the game |
| 134 | PwrDwnB4Xfr | No Xfer | GMU did a power down after the IVIEW requested an xfr but before the GMU either sent funds to the game or sent a jackpot to the system. Supplemental Error code field will have any error code present before the power down. |
| 135 | PwrDwnB4Confirm | Uncertain | GMU did a power down before either the game confirmed the xfer or the system asked the jackpot. Supplemental Error code field will have any error code present before the power down. |
| 136 | PwrDwnB4IVIEWRspns | Uncertain | GMU did a power down before it could send a response to the IVIEW. Supplemental Error code field will have any error code present before the power down. |
| 137 | HandpayXCNack | Uncertain | Network Nacked the Jackpot exception code |
| 138 | HandpayXCAckTimeout | Uncertain | Network never acked the handpay exception code before before a timeout |
| 139 | HandpayXCNetFail | Uncertain | GMU detected a network line down during handpay xc. |

Table 8 illustrates field values that are used for cash type in EFT transaction messages.

TABLE 8

EFT Cash Type Field Values.

| Type Code | Type Description |
|---|---|
| 0 | No ecash Transactions |
| 1 | No Deposit |
| 2 | No Restricted Deposit |
| 3 | All eGameCash ok |

Table 9 illustrations field values for power down fault entries according to one embodiment.

TABLE 9

Power Down Fault Field Values

| Error Code | End State | Type Description |
|---|---|---|
| 0 | No Xfer | Reset before Xfer Request made to game. |
| 1 | Uncertain | Reset before Xfer Response received from game |
| 2 | No Xfer | Reset after Xfer response received. Game Rejected |

In one embodiment, once all of the base game play data is received by the IVIEW interface 216, the IVIEW interface 216 sends the game play data immediately to the server 140, or to a buffer to accrue until such a time that the game play data is required to be transmitted to the server 140 based on a server side request, or client IVIEW interface 216 side transmit rules. In one embodiment, eGameCash data accrues on the IVIEW interface 216, and not on the server 140. If in another embodiment, eGameCash data accrues on the server, then network traffic is minimized with this data. Any data that can be mined from the base game can be transmitted to the GMU 218, and then forwarded to the IVIEW interface 216, or gaming servers 140. In some embodiments, other messages and data are sent from the base game 202 and/or GMU 218 to fully support system games on running on the IVIEW interface 216. Any SAS, Super SAS, S2S+, or BOB query can receive results from the base game 202 so this data is forwarded to the system game servers 140 as necessary.

In one embodiment, base game data is sent to older, or legacy, protocol servers first, and then to the system gaming servers 140. In this embodiment, data does not have to go to the IVIEW interface 216 before being sent to a system gaming server 140. In this embodiment, for example, any data fields that are not directly accessible from the base game 202 can be gathered by the system gaming servers by querying the a slot management server (SMS) to receive detail gaming device 200 cabinet configurations. SMS servers, and in one embodiment, casino player tracking and promotion (CMP) servers collect regular floor and player activity, and this data is mined by the system gaming servers to accrue eGameCash, calculate tournament scores, advance system games, or other system game functionalities.

In one embodiment, base game to system game messages alternatively come from other devices or servers, or direct from the base game 202 itself, depending upon the deployment. In this embodiment, system game servers can be utilized with any partner server on any web site gaming platform, or base game 202 platform. A third party game provider need only send its game play data to a system game server engine on the client, or to the server 140, and system games can be provided to third party devices too.

Figure 7:
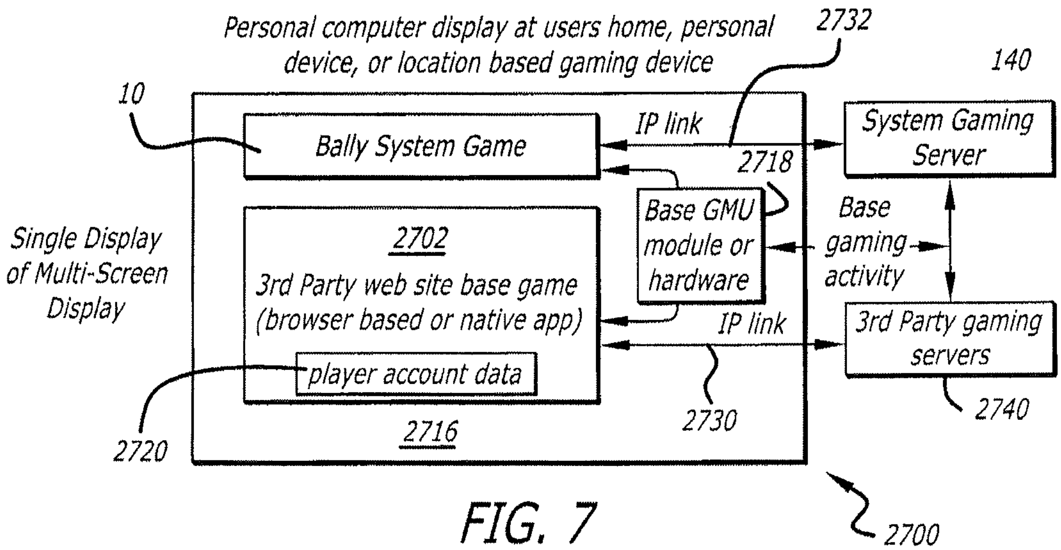
FIG. 7 is a block diagram that illustrates components of a third party system that can be used to play a system game.

With reference to FIG. 7, a block diagram illustrates a third party system that can be used to play a system game. In this embodiment a single or multi-screen personal computer 2700 is connected to the Internet. A base game 2702 executes in a window on a display 2716. Personal account data 2720 is displayed in a sub-window. The system game 10 executes in a separate window. The personal computer 2700 executes a GMU software module 2718 to perform the same base game monitoring and transmission functions as the GMU 218 of FIG. 2 described above. A secure IP socket connection 2730 provides an Internet connection from the base game 2716 to the third party server 2740, which is liked to the system gaming server. In one embodiment, a direct secure IP socket link 2732 is provided from the system game 10 executing on the personal computer 2700 to the system gaming server 140.

Yield Analysis Engine

As described above, in one embodiment, the eGameCash award engine performs casino gaming machine 200 and player yield analysis to calculate how much eGameCash to award to whom, and when to create operational efficiencies and optimal promotional effects. An eGameCash award engine, which in one embodiment operates as a sub-process of the eGameCash award engine, has active and staging accumulators. If real-time credit insertion into a player's account is provided too slowly for a time period, when compared to a number of players on the gaming floor, then an extra eGameCash pot is used to "smooth out," or make more volatile, the awarding system to create the desired and exciting effect for the players.

For example, and not by way of limitation, the yield analysis engine can inform the system to award eGameCash to players who are losing the most, playing the most, coming to the casino more frequently and playing, or based on other factors. Each day a player visits the casino, the player, for example, receives $5.00 of uncashable eGameCash to play system games on the IVIEW interface 216 if the player matches with $5.00 of play on the base game 202. The yield analysis engines allow the system to collect all player history of play and other casino activity to be used to calculate how much eGameCash to give to players. This is a dynamic eGameCash award engine for carded and uncarded players.

The yield analysis engine is used in other areas of the system other than just the promotional eGameCash accrual engine. For example, and not by way of limitation, the denominations, speed of play, minimum wagers, games available, system game configurations, advertisements seen, and third party services available, can be altered at will by the system at different times of the day, week, or for any other reason to maximize revenue for the casino as determined by the yield analysis engine.

In another example, and not by way of limitation, on busy Saturday nights, the yield analysis engine removes penny denomination system games from play on the IVIEW interfaces 216 of gaming machines, or the yield analysis engine only allows pay to play system games on those busy nights. In one embodiment, casino-funded promotional eGameCash is not playable at all times.

In one embodiment, individual players or groups of players, and game configurations are stored in a central database 160 of the system game server 140. This information can quickly be modified by the yield analysis engine to create maximum casino revenue. Thus, the entire casino site, or just a game device 200, can be modified by the yield analysis engine.

In one embodiment, the yield analysis engine analyzes a player's system game 10 and base game 202 activity. For example, and not by way of limitation, the site dynamically changes which tournaments are available based upon gaming floor analysis, player yield, or group yield. Tournaments can change based upon the number of players at the casino, and which type of players are present. In one embodiment, the yield analysis engine changes tournament prize award or speed of play or length of game data for a tournament. A dynamic reconfiguration of the tournament engine at the casino site is achieved by the yield analysis engine. Other engines, services, or games are modified accordingly. The process preformed by the yield analysis engine is called dynamic yield analysis (DNA).

In one embodiment, simulated players for tournaments, raffles, or other types of simulated players are generated by the yield analysis engine to create a system that is tuned to the activity on the floor in real time. For example, and not by way of limitation, if there are only five players on the casino floor at the time then simulated players can be used to fill out tournaments played using the IVIEW interface 216. The system creates virtual players to compete against in tournaments to maintain the excitation level of the player. In one embodiment, community-based game dynamic tuning is used for games with virtual players. This is performed by taking scores and names from games played at earlier times and using them for games being played on the casino floor. The use of virtual or simulated players in this way is called the instant-close tournament and is described in more detail below.

In one embodiment, a system game can be automatically tuned by the DNA engine. Based upon casino revenue and traffic patterns, available system games, tournaments, raffles, sweepstakes, pay tables of games, costs for games, maximum credit allowed, which games are available at different floor locations or groups of machines can be changed. Further, the prize award event ID can be changed for any event associated with a game. For example, and not by way of limitation, longer play or lower fee system games are turned off at certain times of the day to maximize revenue during peak traffic hours. The settings determined by the DNA engine for each game are stored in the system game database 169. The client device, e.g., IVIEW interface 216, retrieves these settings at each load of a system game application, or loading occurs after periodic queries to the server. A web page containing the list of games available for play is dynamically rebuilt by the system game servers 140 using the database where the settings are stored. Further, other casino services can be modified or removed to increase throughput or limit browsing time on the IVIEW interface 216. Different instant-prizes or the win frequency is set by the DNA engine.

In one embodiment, extensive interfacing to direct marketing or customer relationship Marketing (CRM) servers (e.g., 180) to the system game server 140 helps tune the site to specific players or groups of players visiting a casino. For example, and not by way of limitation, if an airline or a tour bus company exposes their database to the casino, the system can use their database to target information directly to the players that match in their database with the people in the third party database. The casino can direct market, instant message, email or otherwise contact the matching players even though the player has not arrived at the casino. A message can be sent informing the player that the casino knows they are coming to town, and the casino has $50 for the player's account available for the next three days if the player would like to come by, book a room, or purchase show tickets.

Other variables that can be modified dynamically by the DNA engine include, for example, and not by way of limitation, a game's odds table, the number of reel symbols, the number of cards in a card game, the number of wild cards, the number of bonus rounds, the length of a bonus round, selection of a bonus round, the turning on or off of progressives, the number rounds in a game, skill-based games initial playfields, the number of advertisements or interstitials shown, the length of advertisements, the number of denominations available, the number of reel lines playable, match play rules, the number of bonus points accrued per money played, and the personal progressive state or growth rate, eGameCash purchase options (more or fewer), a wide area progressive probability of win for a time period, and a bonus wide-area progressive accrual rate (tuned to floor activity, or the number of carded players playing on the floor, day of week, or time).

In one embodiment, teasing of uncarded players occurs, wherein they are shown that they are giving their promotional money to the carded players, as described above. The system optionally shows a player what the player's tournament score would have been if the player had eGameCash in their account if they were carded. The system shows big winners on the IVIEW interface 216 to tease the uncarded player into becoming a carded player. In one embodiment, uncarded players are able to play a system game, but they cannot win, because they do not have an account in the system. In one embodiment, the system tracks the number of "free" uncarded system games played, and can stop allowing free play after a few games, or an amount of time.

Gaming Environment

Normally, in some embodiments, the IVIEW interface 216 is used as the system gaming unit, or "gaming environment," in which system games are played by a player. However, as used herein, the term "gaming environment" is intended to refer to any location, public or private, in which system games can be played. For example, and not by way of limitation, public gaming environments include such places as arcades, stores, restaurants, bars, pubs, casinos, bowling alleys, stations, hotels, airports, airplanes, cruise ships, gymnasiums, health clubs, or other public places that can offer an interface for use by players, and which can provide prizes and awards to players of the system games. A gaming environment need not ordinarily provide games to the public. In other embodiments, a gaming environment can be a private place such as a player's home or personal residence, office or other place of employment, private club, and the like. Other gaming environments include: pubs, bars, Bingo halls, Internet cafes, family entertainment centers, movie theaters, laundry mats, restaurants, malls, private businesses, individual homes, apartments, town-homes, and condos. A system game on a wireless-enabled, handheld device at a hotel casino pool is also considered a gaming environment. A hotel room with a gaming interface of Internet access is also a gaming environment.

Client Side System Game Interface

Figure 8:
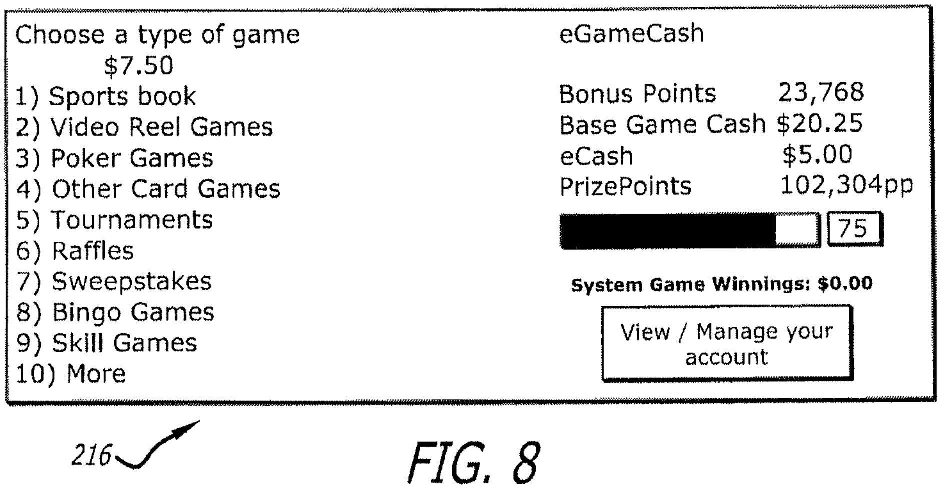
FIG. 8 is a main game category selection screen that is presented in one embodiment.

As stated above, in one embodiment, the IVIEW interface 216 server as an additional user interface for playing system games off of the system game server 140. As further stated above, the gaming environment can include other interfaces into the system, including, but not limited to, personal computers (2716 in FIG. 7) connected to the Internet, and it is understood that when an IVIEW interface 216 is referred to herein, it is interchangeable with any device capable of playing system games. In any case, screens are presented to players of the system games during play. With reference to FIG. 8, a main game category selection screen that is presented on the IVIEW interface 216 (or any gaming environment) is shown. The screen of FIG. 8 is modifiable according to, for example, and not by way of limitation, which accessing device (e.g., IVIEW interface 216 or home personal computer) is being used for system gaming, or which player is accessing system games. In one embodiment, game costs are shown in system game credits (e.g., 1 or $1.00) or as eGameCash ($1.00). In another embodiment, system games are automatically selected by the system or device used as the gaming environment, if the player has not chosen a game in a certain period of time. System game credits can decrement to automatically by playing system games.

Figure 9:
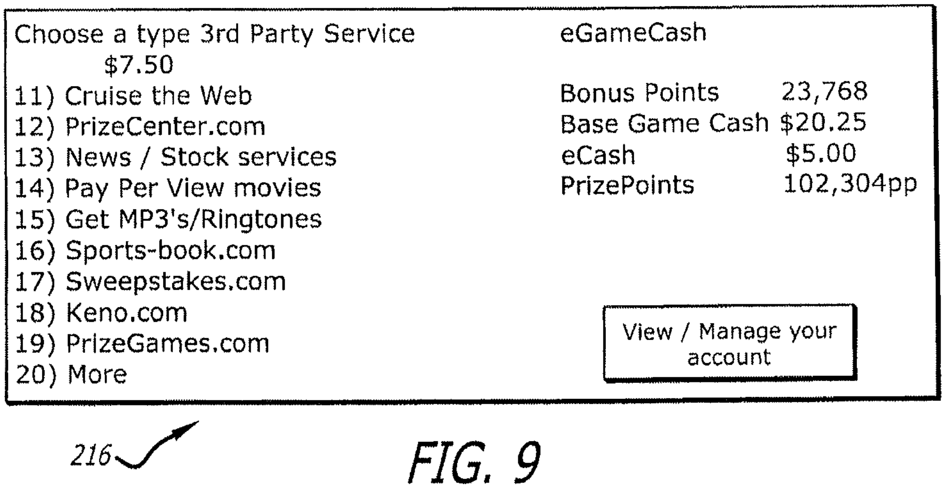
FIG. 9 is a third party services screen presented in one embodiment.

With reference to FIG. 9, a third party services screen presented on the IVIEW interface 216 is shown according to one embodiment. On this screen, players can access services such as, for example, and not by way of limitation: purchasing of tickers, checking plane reservations, checking traffic conditions, viewing stock tickers, and the like. Some of these services are free, and some charge a flat fee per unit time or per unique transaction. In another example, Sportsbook.com® lets a casino discard their sports book section in their casino, because each IVIEW interface 216 is able to access their server. Keno.com® allows the casino to discard the labor cost of Keno games for their facility by outsourcing their Keno games. The IVIEW interface 216 allows manual registration and login to third party web sites, or automatic registration and login can occur using player information from the database 160 with automatic field fill-in on the Internet.

Figure 10:
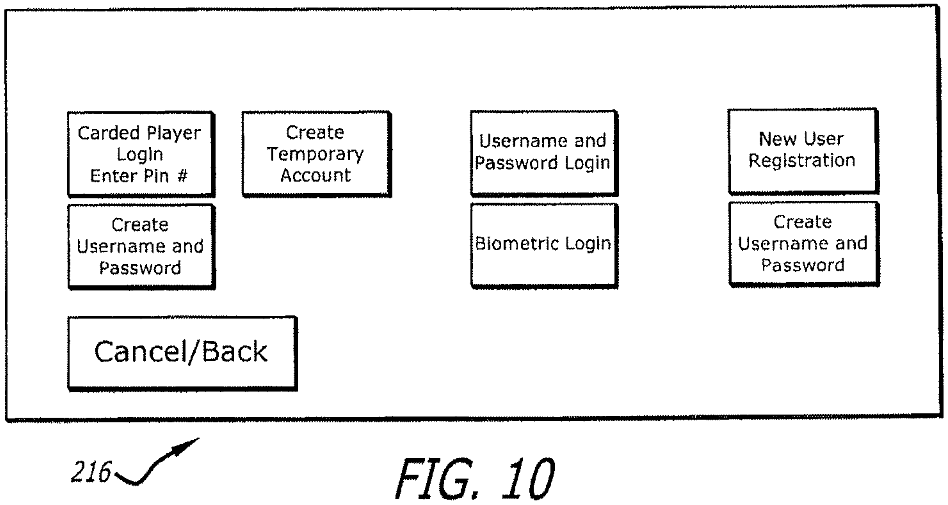
FIG. 10 is a screen shot of a player login screen presented in one embodiment.
Figure 11:
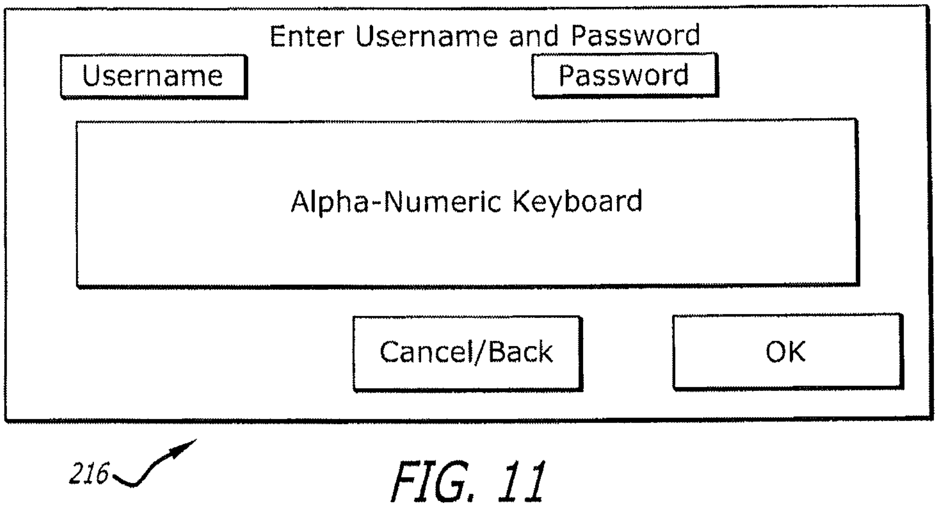
FIG. 11 is a the secondary login screen to which players are taken according to one embodiment.

With reference to FIG. 10, a player login screen used for carded players, uncarded players, new player registrants, players that use biometric login (e.g., fingerprints), according to one embodiment, is shown. With reference to FIG. 11, a secondary login screen to which players are taken on the IVIEW interface 216 after the screen of FIG. 10, according to one embodiment, is shown. The screen of FIG. 11 is used for uncarded players, or in addition to cards inserted into the card reader 212 of the gaming device 200, or in addition to a biometric login check.

Figure 12:
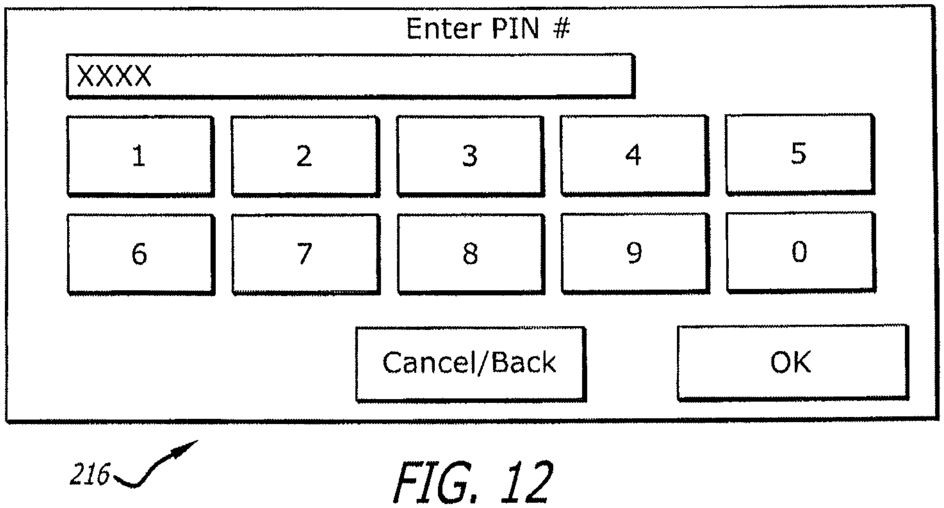
FIG. 12 is a screen shot of a personal identification number (PIN) entry screen that is presented according to one embodiment.

With reference to FIG. 12, a personal identification number (PIN) entry screen that is presented on the IVIEW interface 216 can be used in combination with card insertion or biometric entry, according to one embodiment, is shown.

Figure 13:
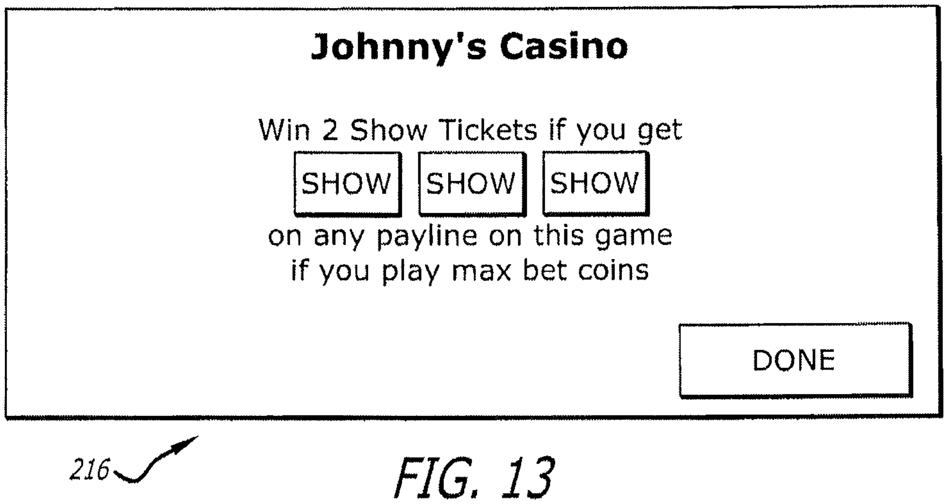
FIG. 13 is a screen shot of a sample "attract-mode" screen designed to attract players that is presented in one embodiment.
Figure 14:
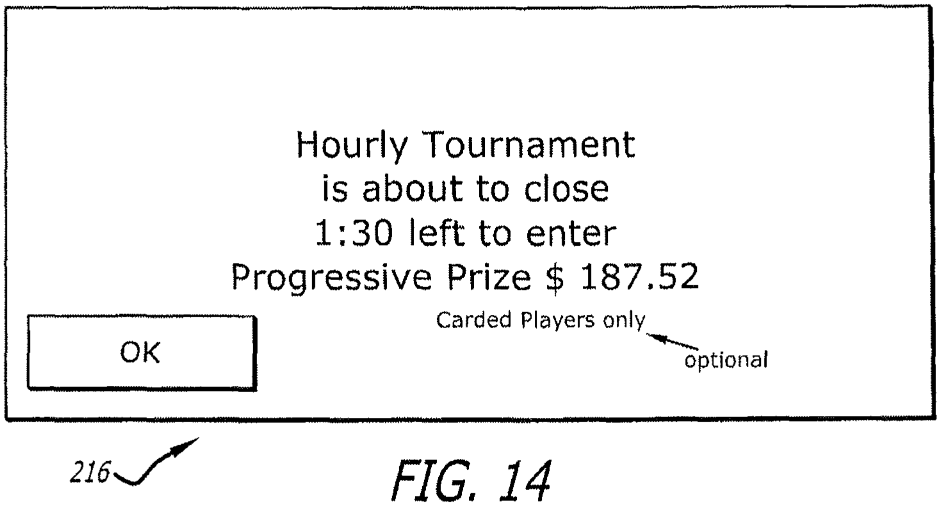
FIG. 14 is a screen shot of another sample attract-mode screen presented in one embodiment.
Figure 15:
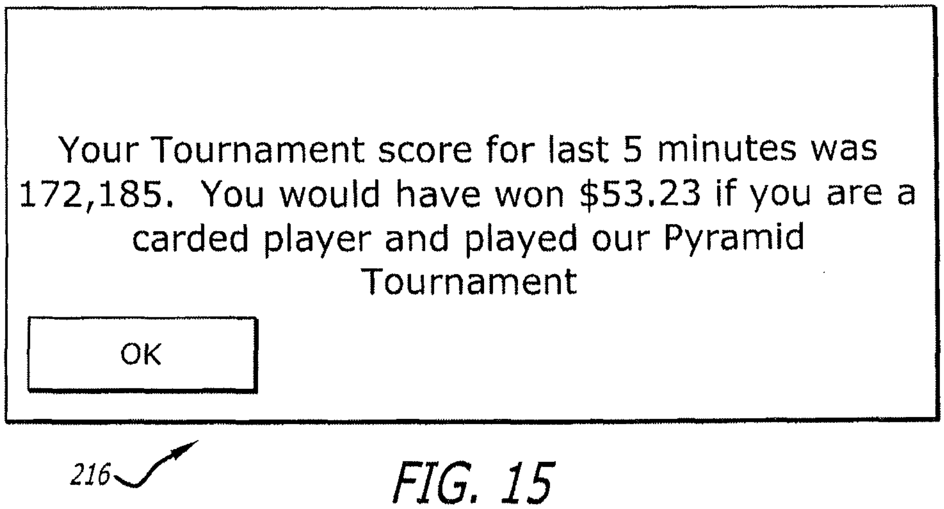
FIG. 15 is a screen shot of an attract-mode tease screen to encourage uncarded players to register as carded players presented in one embodiment.

With reference to FIG. 13, a sample screen designed to attract players that is presented on the IVIEW interface 216 when the IVIEW interface 216 is set to the attracted mode, according to one embodiment as shown. Similarly, FIG. 14 illustrates another attract-mode screen or interstitial advertisement that can be shown between system games, during system games, or during player inactivity, according to one embodiment. Further, FIG. 15 illustrates an attract-mode tease screen to encourage uncarded players to register as carded players.

Figure 16:
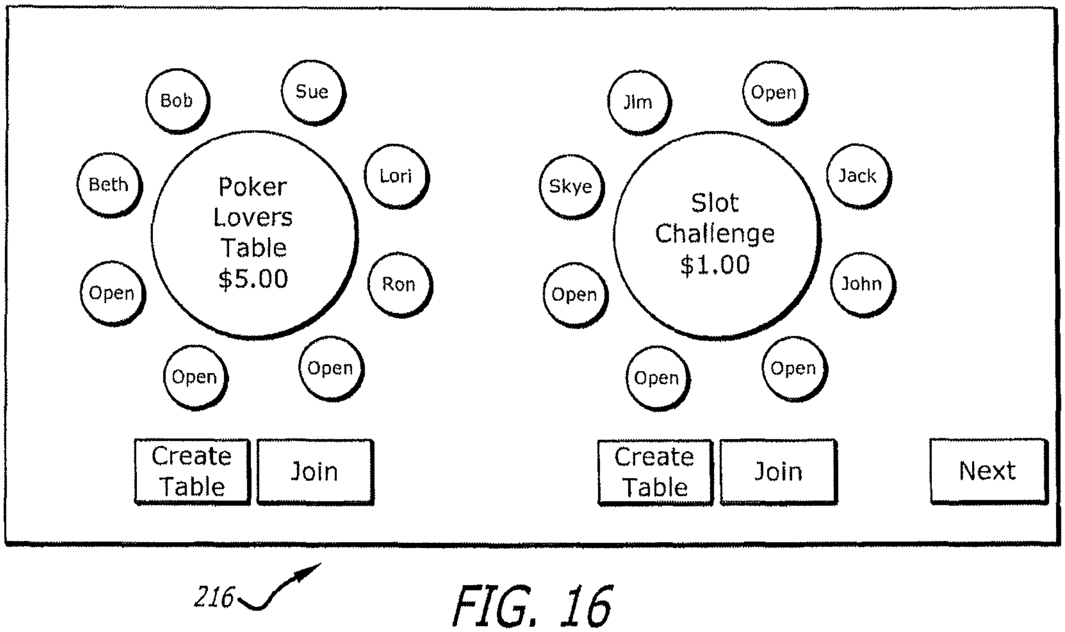
FIG. 16 is a sample group play room screen presented in one embodiment.

With reference to FIG. 16, a sample group play room screen presented on the IVIEW interface 216, according to one embodiment, is shown. In this embodiment, a specific group of players can play against another group, or each player can pick a virtual table and play against other players at table. A player can enter a specific group of people they want to play with, and can optionally block unauthorized players from entering this table or group by using a password, card number, or the like.

Figure 17:
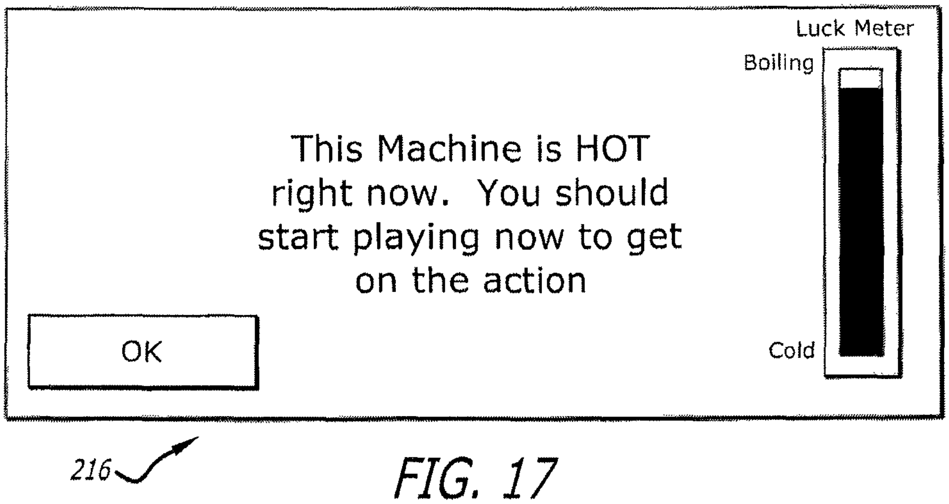
FIG. 17 is a screen illustrating a "luck meter tease" presented in one embodiment.

With reference to FIG. 17, a screen illustrating a "luck meter tease" presented on the IVIEW interface 216, according to one embodiment, is shown. By monitoring the wagers and wins verses the theoretical payout percentage, the IVIEW interface 216 can display how "hot," or prone to provide a win the gaming device 200 is, which can be instructive to players. In another embodiment, the system can display the phrase "This machine has been cold for a while. Maybe it is going to turn HOT again." This display can further show information about the base game 2002, particular system games, or all system games played on the IVIEW interface 216.

Figure 18:
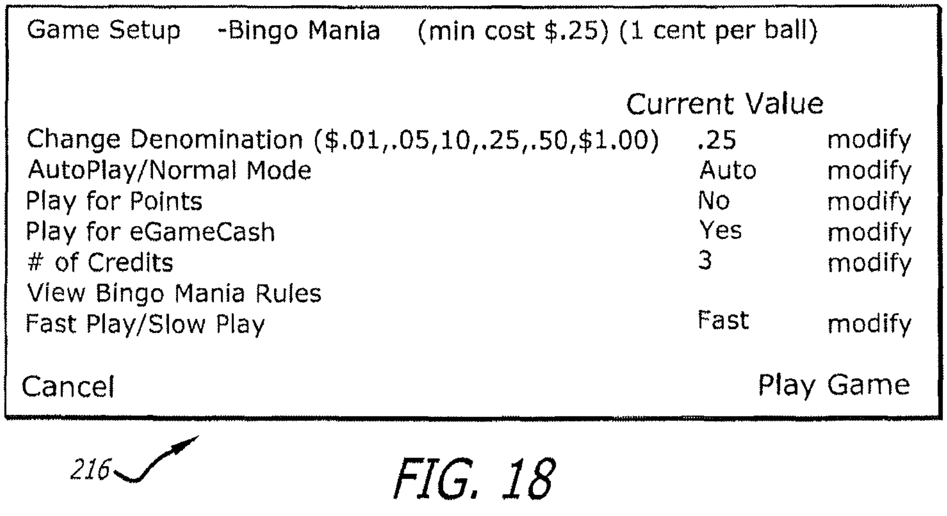
FIG. 18 is a screen shot of a bingo game configuration screen that is presented in one embodiment.

With reference to FIG. 18, a bingo game configuration screen is presented on the IVIEW interface 216, according to one embodiment is shown. Similar features are provided for each game or group of games. The auto play feature shown on the screen allows the next "begin game" to occur automatically without user interaction if the player selects this option.

Figure 19:
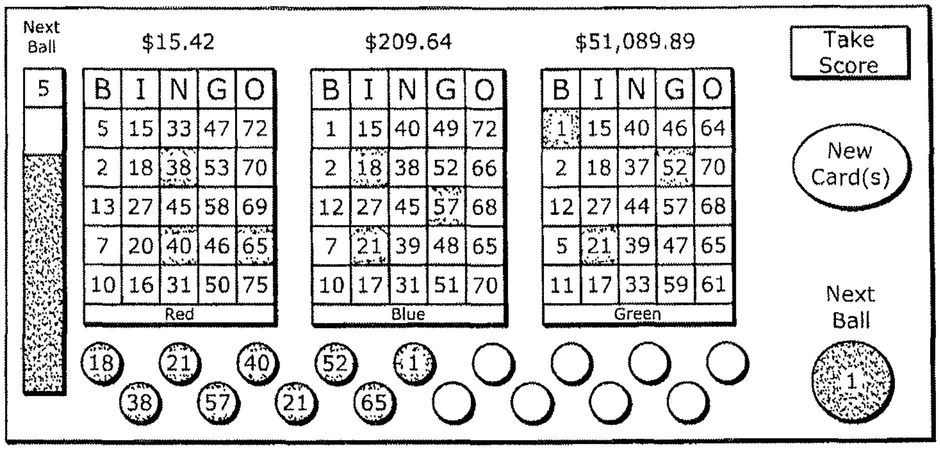
FIG. 19 is a screen shot of a screen presented during a triple progressive bingo game in one embodiment.

With reference to FIG. 19, a screen presented on the IVIEW interface 216 during a triple progressive bingo game, according to one embodiment, is shown. The game in this embodiment can automatically advance upon base game 202 activity. For example, and not by way of limitation, each ball is drawn for every maximum bet play of the base game 202, or for a specific amount of handle pull or win. This encourages players to perform maximum bet plays to advance the system game, in this case the bingo game, or to bet more money. A win on a specific card wins a progressive for that card (site wide, inter-site, cluster of games, and/or player type progressives). Cards or balls gradually appear from transparent to full color as the base game is played. This encourages a player to play more money on the base game 202 to advance the game, and it provides a tease for the player. In one embodiment, the numbers on the ball or cards can be drawn until full color has been achieved. In one embodiment, there is a maximum play rate of approximately 1 ball per second even if a player is playing a base game very fast with large wagers and accruing lots of eGameCash.

eGameCash accrual is used to control the frequency of opportunity of play for the system games. The Bingo game of this embodiment can automatically end itself if no more moves or winning combinations are possible. In another embodiment, the last few bingo balls are given for "free" all at once to ensure that, at any time, a winning combination can be formed. For example, and not by way of limitation, the first 10 balls cost 1 cent each, and the remaining ten balls are given after the tenth ball is paid for. In one embodiment, receiving the last free balls requires a wager on the base game. In another embodiment, various patterns on the cards may be highlighted. If a pattern is completely filled, then the card is won and the award is paid. Prizes can be progressives or fixed prizes, such as $10, $100, or $1000 for each card respectively.

The power bar on the left side of the bingo game display is a closeness indicator that shows the closeness to getting the next game element, which in this case is a bingo ball. The power bar provides an indication to the player that the player must keep playing the base game to advance his system game, and approximately how much more the player must play to get the next play element and/or system game credit. The number system used for the game advance indicator can be different for each game. In a non-limiting example, bingo costs 1 cent per ball or 20 cents to get all 20 balls, and poker costs 2 cents per card used, or 14 cents per game if 7 cards are used. In one embodiment, if a player chooses the base game very fast with large wagers, the player accrues so much eGameCash that many balls can auto play even after the player stops playing the base game. The indicator can be linear or non-linear in nature, and it can include a digital number to indicate specifically how many play elements the player has left before the game stops.

Figure 20:
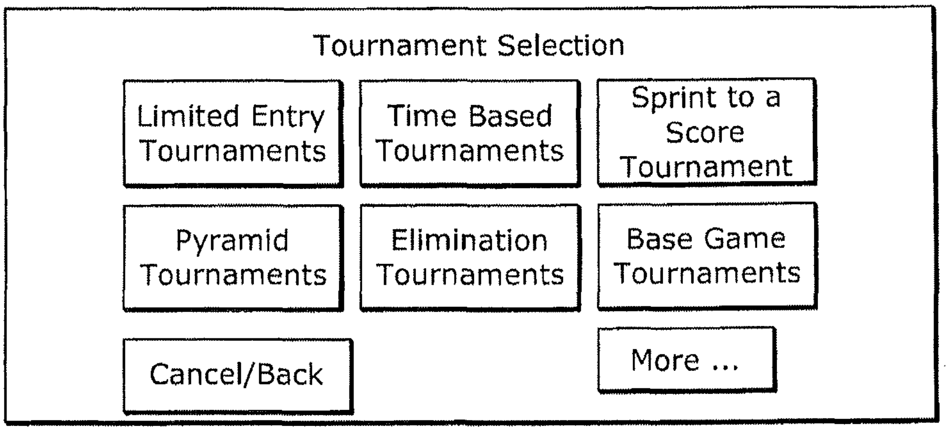
FIG. 20 is a screen shot of a tournament selection screen presented in one embodiment.
Figure 21:
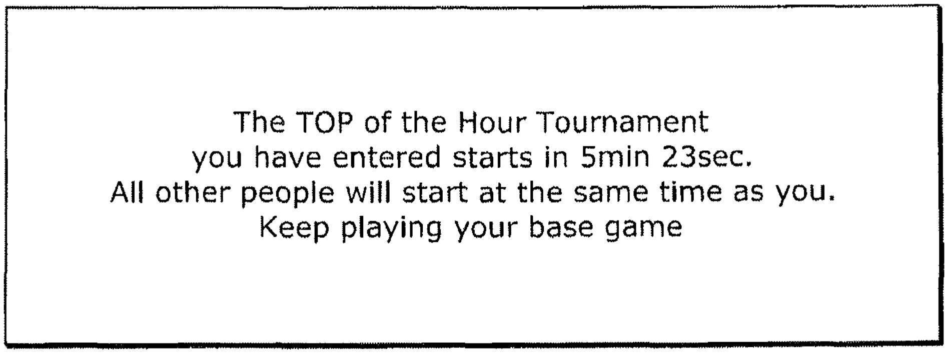
FIG. 21 is a screen shot of a tournament countdown screen presented in one embodiment.

With reference to FIG. 20, a tournament selection screen presented on the IVIEW interface 216, according to one embodiment, is shown. In this embodiment, all types of tournaments are shown on this screen. An embodiment of a tournament countdown screen presented on the IVIEW interface 216 is shown in FIG. 21. In this embodiment, all players in this type of tournament start at the same time and end at the same time. Their tournament score is reset at the start time. A player can play the player's base game 202 even though the tournament hasn't actually begun, as explained in more detail below.

Figure 22:
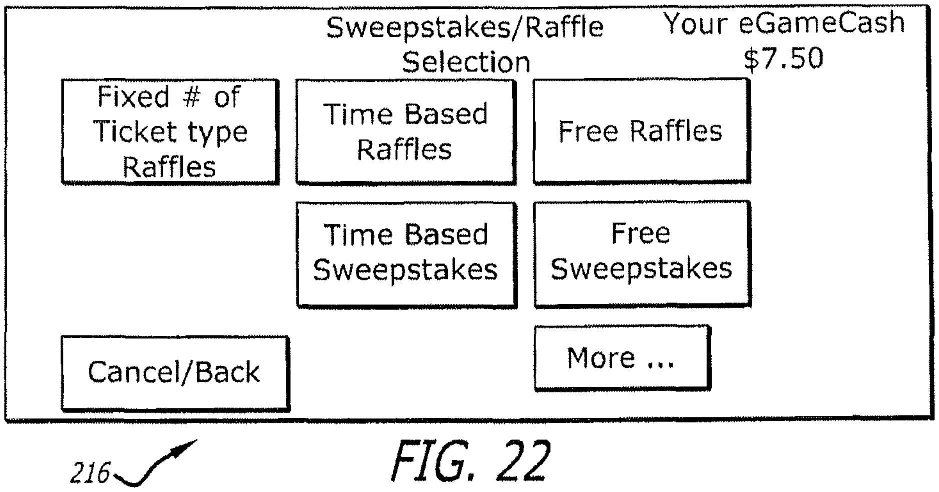
FIG. 22 is a screen shot of a raffle selection screen presented in one embodiment.
Figure 23:
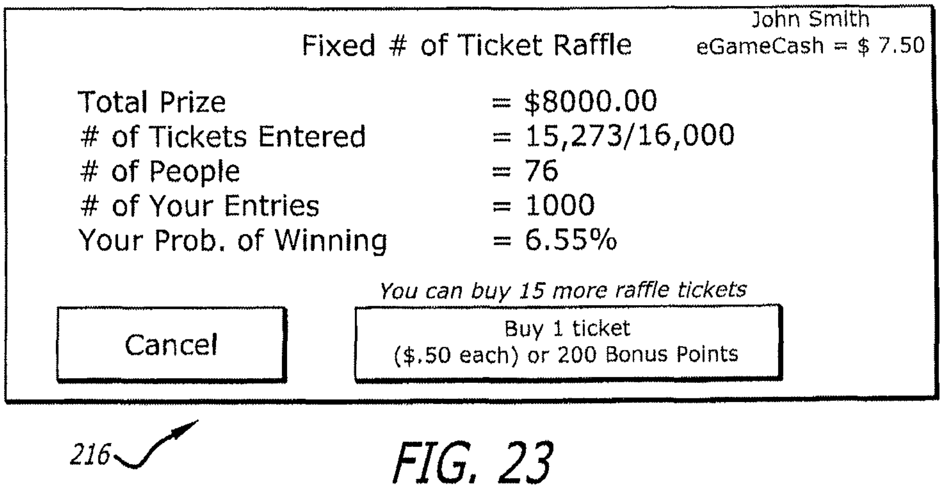
FIG. 23 is a screen shot of a screen used to purchase raffle tickets presented in one embodiment.
Figure 24:
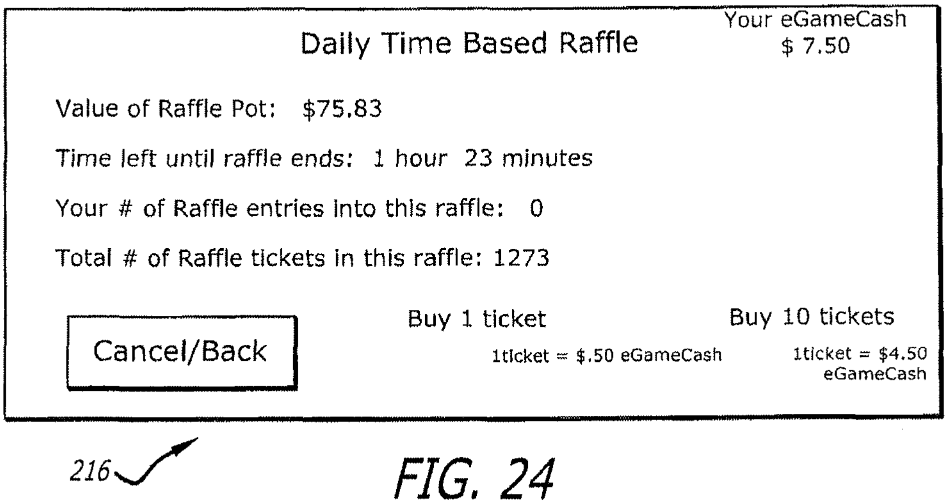
FIG. 24 is a screen shot of another screen used to purchase raffle tickets presented in one embodiment.

With reference to FIG. 22, a raffle selection screen presented on the IVIEW interface 216, according to one embodiment, is shown. In this embodiment, all raffle types are shown on this screen. In FIG. 23, a screen used to purchase raffle tickets presented on the IVIEW interface 216 for this embodiment is shown. The screen of FIG. 23 is for a fixed number of ticket-type raffle (e.g., 16,000 tickets purchased will force a raffle to be drawn). A ticket is drawn from a fixed number of tickets so there is guaranteed a winner or winners, if more than one ticket is drawn. In FIG. 24, another screen used to purchase raffle tickets presented on the IVIEW interface 216 is shown for this embodiment. The screen of FIG. 24 is for a specific time based raffle (e.g., a daily raffle) in which there is a time period for the raffle.

Figure 25:
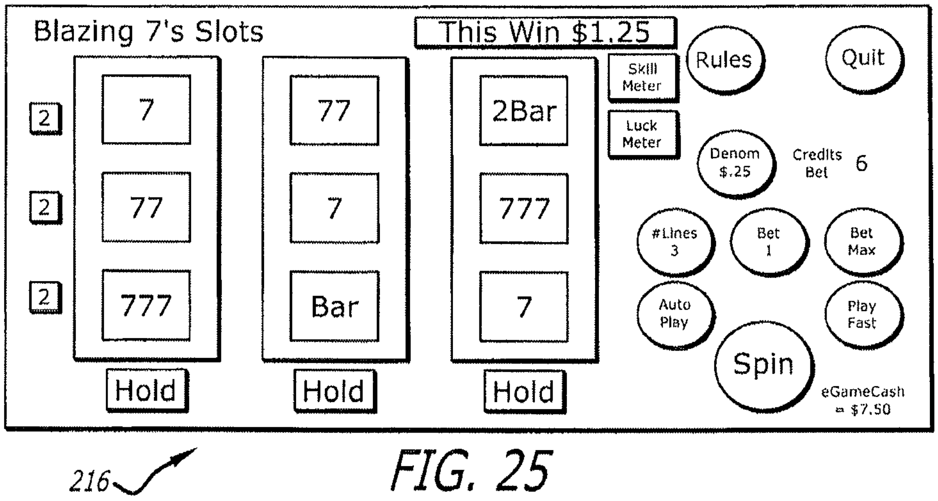
FIG. 25 is a screen shot of a sample screen from a video slot system game presented in one embodiment.

With reference to FIG. 25, a sample screen from a video slot system game played on the IVIEW interface 216, according to one embodiment, is shown. In the embodiment of FIG. 25, the system game is a multi-denomination, multi-line, multi-credit reel spinner game. Each reel or symbol can fade in from transparent to full color as the base game 202 is played. Once fully visible, then the symbols spin, and the player is able to achieve a winning combination to win in the system game. An optional progress indicator indicates progress for the player until the player earns a spin as they play the base game 202. In one embodiment, this game also allows holds and re-spins of specific reels, or nudges by the players to give them the ability to improve their hand. In one embodiment, the system game played in the IVIEW interface 216 is pay to play, or free play. In one embodiment, game winnings are re-playable if jurisdictional or casino rules allow it.

Figure 26:
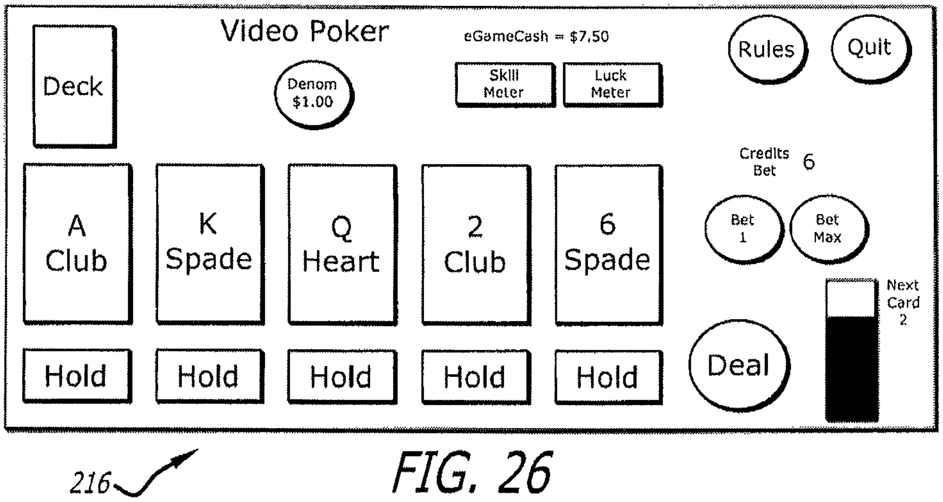
FIG. 26 is a screen shot of a sample screen from a video poker system game presented in one embodiment.

With reference to FIG. 26, a sample screen from a video poker system game played on the IVIEW interface 216, according to one embodiment, is shown. In one embodiment, a player receives all cards at the beginning of the video poker game, or in another embodiment, each card is given as the player spending money on the base game. In one embodiment, the cards may fade in from transparent to full color as the base game 202 is played. The more base game 202 play by the player, the faster the cards fade in or are dealt. Once all five cards are dealt or fade in, then the player can hold and draw new cards. In one embodiment, the system game auto plays by automatically holding the best possible hold for what is dealt, and drawing new cards for unheld cards. No user interaction is required in this mode. In another embodiment, a normal skill-based player interaction is required. If the player must earn cards (either the original five and/or each draw card), then a progress indicator is used to show the closeness to achieving the next card, which in one embodiment is achieved by letting the player earn eGameCash by playing the base game 202. In one embodiment, the poker system game is a five, six, seven, eight, nine, or 10 card stud game with no user interaction. The best of the cards are used to calculate the final score.

Figure 27:
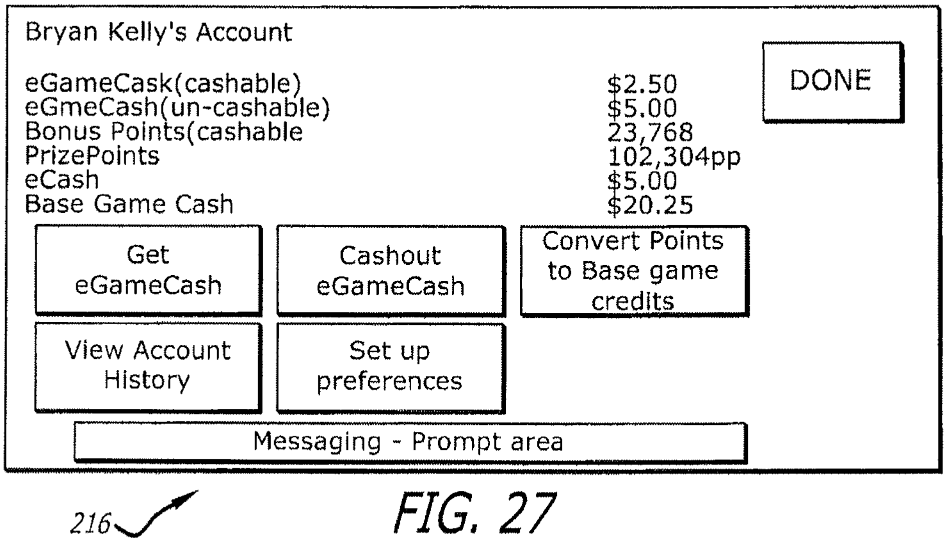
FIG. 27 is a screen shot of a sample player account control screen presented in one embodiment.

With reference to FIG. 27, a sample player account control screen presented on the IVIEW interface 216 is shown. The player has the option to fund their eGameCash account, cash-out eGameCash, convert eGameCash to or from other currencies, including base game credits, view account history, set up player preferences, or view messages. With reference to FIG. 28, a sample account history screen presented on the IVIEW interface 216, according to this embodiment, is shown. The screen of FIG. 28 is displayed after selection of the account history option from the screen in FIG. 27. The player's recent activity is displayed in the screen of FIG. 28.

With reference to FIG. 29, a detailed transaction page screen for the player whose information is shown in the screen of FIG. 28. The screen in FIG. 29 is shown after the player selects "Show Detail" from the screen of FIG. 28. The screen of FIG. 29 lets the player view specifics of a win or loss, other account activity, or current state of a game in progress. A specific tournament result page is shown in the example of FIG. 29.

With reference to FIG. 30, a sample eGameCash purchase screen presented on the IVIEW interface 216 after selection of the "Get eGameCash" button on the screen of FIG. 27. An interface for the player to put eGameCash into the player's system gaming account is provided in this screen according to one embodiment. In one embodiment, micro-payment withdrawal from another banking institution is further allowed as each system game or base game is played.

Figure 31:
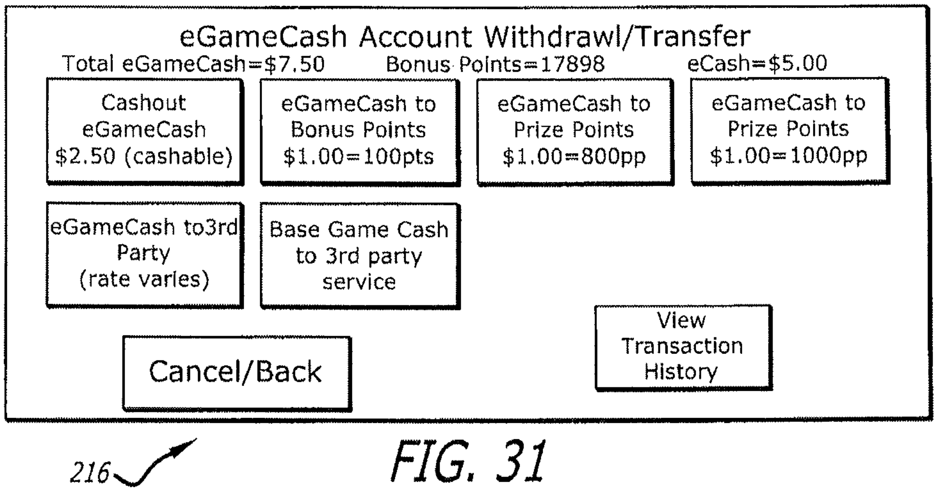
FIG. 31 is a screen shot of a promotional cash account withdrawal screen presented in one embodiment.

With reference to FIG. 31, an eGameCash account withdrawal screen presented on the IVIEW screen after selection of the "cashout" option on the screen of FIG. 27 is shown. In this screen the player is provided with the option to perform a cashout or conversion of eGameCash, as previous discussed and allowed by the casino.

Figure 32:
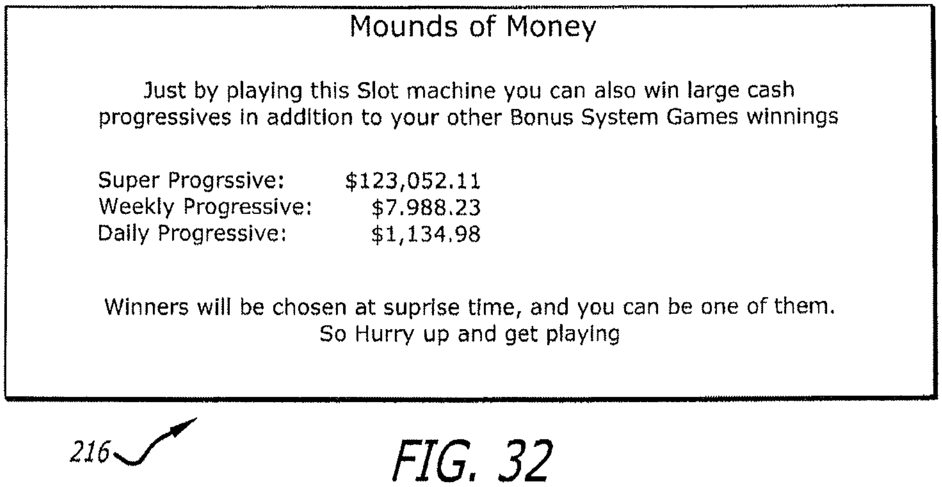
FIG. 32 is a screen shot of a promotional screen for a progressive game that is presented in one embodiment.
Figure 33:
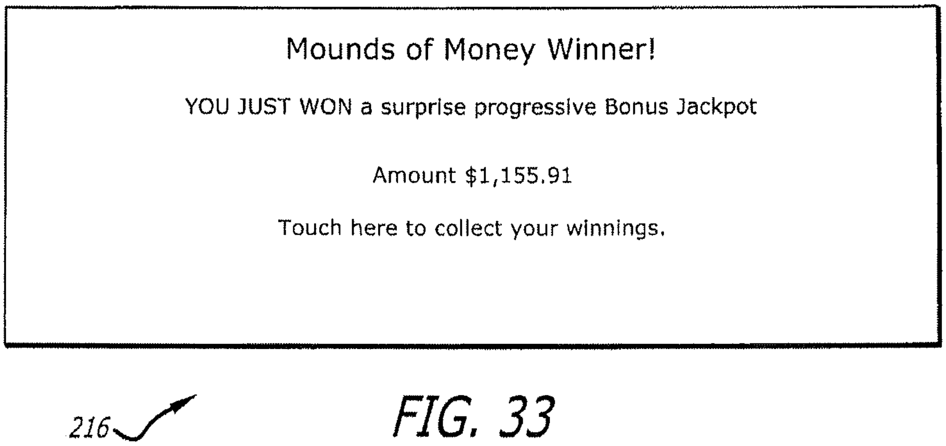
FIG. 33 is a screen shot of a sample award announcement screen presented in one embodiment.

With reference to FIG. 32, a promotional screen is shown for a progressive game that is presented on the IVIEW interface 216 during attract mode periods, according to one embodiment. In another embodiment, casino site-wide progressive awards are given out to various players based upon the promo progressive engine, which determines at various intervals or due to various casino or player conditions, to provide surprise progressive prize awards. A sample announcement of such an award is shown in FIG. 33, according to one embodiment.

With reference to FIG. 34, a notification of a hand payout screen presented on the IVIEW interface 216, according to one embodiment, is shown. If the base game 202 is unable to process a funds transfer (EFT/AFT) request, then, in one embodiment, the IVIEW interface 216 initiates a hand payout request from the casino. The request is made by a player request or automatically, after several normal cashout attempts are made by the player. For the employee providing the hand payout, an employee card number, a date/time, and the amount provided to the player is logged in the system for audit purposes.

In addition to the above, the IVIEW interface 216 has many additional display screens that can be presented. By way of example, and not by way of limitation, in one embodiment, the following services further present screens on the IVIEW interface 216:

1) Casino player marketing servers;
2) System gaming server (also referred to as the "system gaming engine";
3) Download services;
4) Third party services;
5) Attendant screens;
6) A slot accounting system or slot system server;
7) Advertisement servers; and
8) Chat engines.

With reference to FIG. 34, a sample player account preferences page presented on the IVIEW interface 216, according to one embodiment, is shown. The screen of FIG. 34 is presented for changed player preferences if the "Setup Preferences" button is selected on the screen of FIG. 27.

A partial list of player configurable features, by way of example, and not by way of limitation, include the following:

1) Setup desired credit value or denomination (a penny, nickel, quarter, dollar and the like). This helps determine the rate that the games will play using promotional credits.
2) Setup desired types of games and game modes. This helps the player set up preferences of system games. For example, only play poker games or tournament games, and no other style of games, or the player wants only progressive prize games, or floorwide progressives, or the like.
3) Setup auto-play settings. This sets up whether the player wants to auto play system games when the player has enough credits, and which games the player wants to autoplay and not autoplay.
4) Cashout preferences. The player's desired cashout procedures are set, for example: send cashout money to a player account, to a bank account, credit card account, other financial account, or third party game or web site account,
5) Setup buddies list. This sets up who is on a player buddy list. As other players play, the player can receive and send information to them, or chat, or exchange game play activity.
6) Advertisement preferences. This determines what type of ads or promotions the player wants to see from a master list of promotions, and which type of ads to block.
7) Setup email/mail/instant message/phone call preferences:
   a) tell the player when they are knocked out of a tournament or high score leader board;
   b) tell the player when new games are available;
   c) tell the player when buddies win;
   d) tell the player when new promotional opportunities are available (i.e., opt in/opt out);
   e) tell the player when buddies are gaming; and
   f) eGameCash or other account expiration notification rules.
8) Setup video preferences. When a camera is on the gaming device, the system can broadcast player images to others.
9) Configure automatic credit purchase options. This gives the player options to setup automatic credit purchase. As an example, and not by way of limitation, when a player's system credits go to zero, then the system automatically takes out $20 from their checking account or credit card account.
10) Setup desired game site theme. In one embodiment, the game site has multiple themes available for the player to choose from. For example, and not by way of limitation, the player can choose a special IVIEW interface 216 theme, web site theme for play at home, or the like.
11) Audio preferences. This sets up sounds and volumes to use.
12) Setup alias names for presentation to others.
13) Setup bonusing preferences. This sets up what types of bonus program is desired. For example, and not by way of limitation, a player can select to receive bonus points only, or system game credits only, or 25% to their bonus account and 75% to their eGameCash account.
14) Setup default number of credits. This sets up default wager to play.

15) Setup chat group preferences.

16) Setup default currency for playing. For example, the player may play their bonus points first, then eGame-Cash, and then eCash.

17) Privacy settings. This sets up how much of a player's private information can be given out to others in the casino, or at the web site, or on various wireless gaming devices.

Frame Manager

In another aspect of a preferred embodiment, the frame manager screens are rendered in multiple web browser interfaces. Since many simultaneous Internet Explorer frames are capable of being requested to be shown at the same time, a frame manager is designed to coordinate these requests to achieve proper focus on the display screen. In one embodiment, the frame manager uses XML template files that contain the business rules to ensure the priority of the displayed screens. For example, it would be undesirable to have a third party send messages to the topmost visible frame of the Internet Explorer if a player was in the middle of cashing out of the machine or in the middle of the game. These messages have to be either buffered or relayed to a second non-visible frame.

The frame manager business rule engine then decides when is the optimal time for presenting the information or frame to the player. Each type of service or message event is given a priority level in the XML file. The client side code or server side code ensures the rules are not violated. Additionally, extensive user inactivity rules are used with this business rule engine to authorize certain features and services to be presented, like the advertisement engine. For example, critical system level messages can force a display to come into focus over third party services. In such a situation, the player may be warned with a dialog or alert box giving the player time to finish what he is in the middle of doing, prior to this re-focusing to a different frame or reloading of the currently visible frame. Alternately, the high priority frame may just come into focus automatically without user notice or interaction.

The frame manager technology disclosed here contains controlling means of multiple requesting services to focus on the IVIEW and/or the system game platform. The system has the capability to know the state of transactions in process and prevents other transactions from beginning or new frames from being brought into focus until such a time as is appropriate. Conversely, floating frames or split screen displays may be used and be driven by different services. For example, a message bar shown during a system game can be driven by the hotel marketing system even while the system game is being played.

Download Technology

The term "downloadable" as used herein refers to the ability to change game configurations or game content from a central computer. Additionally, download implementation is described herein as a three-phase approach to introducing downloadable gaming technology into traditional gaming environment. These three phases are referred to as DL1, DL2, and DL3.

DL1

Accordingly, in a preferred embodiment, Download 1 (DL1) is the first phase of a comprehensive download implementation strategy. In such an embodiment, DL1 is the delivery of promotional and system game content through an IVIEW player tracking display. The promotions and games are designed to enhance and prolong the player's gaming experience.

In one specific, non-limiting embodiment, the DL1 configuration initially includes simple gaming devices such as bingo, keno, tournament, and progressive games on IVIEW device. Additional games can be included later using updating procedures. These initial System Games described above, are easy to understand and will enhance the players experience and encourage longer and more active play. In this same manner, marketing content can be downloaded to an IVIEW device as well.

DL2

Continuing, the DL2 phase is the first step in what is referred to herein as configuration management. In a preferred embodiment, configuration management is the ability to download software to gaming machines in order to update peripherals such as bill validators, ticket printers, coin mechanisms, and game configuration options. In one specific, non-limiting example, configuration management enables a casino to change the denominations options of a gaming machine depending on the day of the week or the time of day. By utilizing a configuration management controller, operators can make simple but important changes without the time and labor currently needed to manually work on every machine.

DL3

In a preferred embodiment, the final phase of the download implementation strategy is the ability to change specific game titles on demand. When utilizing download-supported, multi-game gaming machines, a player is given a menu that presents dozens of selectable titles that can be downloaded from a game server. Accordingly, a download-supported, multi-game gaming system offers a truly dynamic gaming floor with "entertainment on demand."

Device Management Client

In another aspect of a preferred embodiment, the Device Management Client is the component shipped with CE that communicates with SMS 2003 and the Device Management Feature Pack. This client uses XML, HTTP and other protocols to exchange data and software with the IVIEW device and the backend systems. Because of significant problems with a client that ships with CE 4.2, the client that ships with CE 5.0 must be used. The device management client calls the IVIEW logger component object as it is installing files to keep the log files consistent and homogeneous.

Delivery of Code

In another aspect of a preferred embodiment, a second block of software components downloaded from the device is a set of servers that perform the delivery. This set of software resides on a portable laptop in a first embodiment, and in a second embodiment is moved to a server that is dual homed on both the casino floor network that hosts all the IVIEW devices and the network that hosts all the backend servers. Packages that are to be published to the IVIEW devices are created on the backend servers and are eventually staged where it is delivered to each IVIEW device. In the first embodiment, the laptop is temporarily connected to the backend network, which may happen to be a network of one computer if all the software resides on the laptop. The laptop is carried from IVIEW to IVIEW, and the package is delivered to each device one by one.

An alternative to using the "single laptop connected to the single IVIEW device" technique, is to ensure that the gaming network configuration supports connecting a set of IVIEW devices to the laptop through a hub or switch. This configuration is close to a third ("fully networked") embodiment that makes the deployment of packages to IVIEW devices much more efficient for casinos that install the cables and hubs.

The workflow diagram below in Table 9A shows a process that can be followed to successfully distribute new content or a new operating system to a single IVIEW device.

TABLE 9A

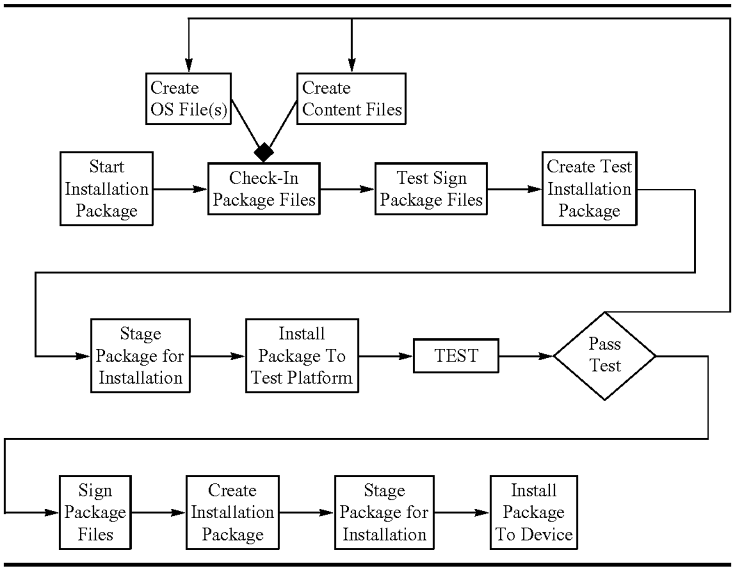

In a preferred embodiment, some of the exact mechanisms of the process shown in Table 9A depend on the exact business processes adopted. This exemplary, non-limiting process depiction is generic enough that it could occur completely or partially on the casino property and/or partially on the manufacturer's property. Initial content decisions originate from the casino. Code (NK.BIN) preferably originates from the manufacturer's development. Once content or code (which physically is a set of one or more files) is created, it is checked into the repository. The files must pass from one process step to another as a complete group, or logical package, though individual files may be modified and added at each step.

Once the content or code has reached its initial completion step, it is test signed. This adds the files necessary to the package to make it appear to be signed but without using the real secret private keys. The process can be described as follows:

a) The next process block packages the files together for delivery to the IVIEW device but delivery is intended for a test device or test network.
b) The test package is next staged for delivery to the test platform. This staging is dependent on the configuration of the process. It may take a number of forms that could include simply copying the package to a directory, emailing the package to a recipient or calling an API on a SMS server installed on a test network of IVIEW devices.
c) Next the package is installed on the test IVIEW devices using the specified installation process.
d) The package is tested for conformance to requirements and returned to the content or code creation steps if it does not meet requirements. If it does meet requirements, the files that made up the original package are used to generate the files to digitally sign the files with the real key.
e) Next the production installation package is created using the new digital signatures. This new package is staged for delivery. This staging process may be different from the test staging process. At least, the delivery endpoint is different.
f) Finally, the package is delivered to the production IVIEW devices.

In a Phase II embodiment, it is possible (but not necessary) for all of the above steps (except perhaps the final signing) to occur on a single portable computer (or computing device).

Solution Design

In one preferred embodiment, FIG. 34A illustrates selected system software, as well as indicating where each of the software components preferably resides. In one such embodiment, this configuration is used to implement the above process. Blocks group the software that preferably remains together in order to facilitate the software operating correctly. In addition, FIG. 34A indicates where the software resides when the system migrates to the Phase III configuration. FIG. 34A illustrates several levels (client, workflow, delivery, and device) at which level various components are located in Phase II (DL2) and in Phase III (DL3) of the system configuration. Each of the following four sections refers to the horizontal cross-sections in FIG. 34A.

Device

Referring again to FIG. 34A, the top level consists of the GMU and the IVIEW. The IVIEW device is isolated from other connections in a Phase II embodiment but has an Ethernet connection and TCP/IP capabilities for an intermittent connection. This connection is identified by the IVIEW device as soon as possible, and it causes the device to poll the server for updates. In a Phase III embodiment, the connection is continuous and the polling should happen on a schedule. The GMU is modified to send its text strings with additional information as well as any additional strings to provide more state information to the IVIEW. The specification for the BoB (Best of Bread) logical interface is preferably used as a guide.

Additionally, the standard IVIEW dictionary is replaced with a new enhanced IVIEW dictionary that knows how to interpret the new data being sent from the IVIEW. The advantage of the additional information is that the dictionary is able to tell immediately what the intent of the string is instead of needing to traverse an entire list to make sure it does not happen to match anything in the list. More precise state information can be communicated rather than inferred, as in the standard IVIEW dictionary. To keep the IVIEW backwards compatible and flexible some minor code changes to the shell enable the dictionary to be selectable at runtime.

In another aspect of a preferred embodiment, the watchdog component is important for production stability. If the IVIEW device faults or fails, it may not be apparent from a distance or even close up until a player inserts a player card and the device fails to respond. Further, partial failures are also possible due to a single thread having died. In this regard, a well-designed watchdog will maintain the up time on the IVIEW device. Additionally, a well-designed watchdog will also not be noticed by the user unless absolutely necessary. Preferably, the IVIEW watchdog is designed to watch individual threads in the system and quietly restart them if they die. If the IVIEW process freezes, it will also be restarted. Finally, there is a hardware watchdog that restarts the entire system if the Kernel watchdog fails.

In still another aspect of a preferred embodiment, the Device Management Client is the component shipped with CE that communicates with SMS 2003 and the Device Management Feature Pack. This client uses XML, HTTP, and other protocols to exchange data and software with the IVIEW device and the backend systems. Preferably, the client that ships with CE 5.0 is used. The device management client calls the IVIEW logger component object as it is installing files to keep the log files consistent and homogeneous.

In a preferred embodiment, the Systems Management Server 2003 (SMS) is the server package that is able to manage thousands of individual devices at once. The Systems Management Server is capable of multiple types of inventory, file collection, and software updates. The SMS utilizes the Windows Server 2000 or Window Server 2003, configured as an Active Directory (LDAP) based Domain Controller and SQL server. In a Phase II embodiment of the download implementation, this software is on the delivery laptop computer. In a Phase III embodiment of the download implementation, the software and licenses can be transferred to more traditional servers.

In another aspect of a preferred embodiment, a Device Management Feature Pack (DMFP) is added on to the SMS. This Feature Pack provides the SMS with the ability to manage devices that have the Device Management client installed. In such an embodiment, the SMS and the DMFP can be used to retrieve the log files from the device if the casino believes it has a use for them.

Workflow

In a preferred embodiment, the storage consists of the management of the files and the software to manage the workflow that must follow. The software at this level can reside either on the portable laptop or on a server for either phase. In either case, the software needs to have access to the SMS server so that the packages produced can be submitted to the SMS for delivery, and the other applications need to have access to this server to submit files for inclusion in packages. This level contains most of the custom software that is used to create, manage, and deploy packages.

In another aspect of a preferred embodiment, Windows Sharepoint Services (WSS) is utilized in conjunction with the Windows Server. The Windows Sharepoint Services provides group communications and file collaboration support. It also provides an extremely rich and highly customizable, pre-built Web based user interface that can support the new IVIEW workflow concepts and functions. The Windows Sharepoint Services interfaces naturally with .Net assemblies, which enables these new functions to be constructed using .Net. In this regard, security and user roles are built in.

Using WSS enables the above-selected options to be used easily. WSS implements everything in a Web interface. Files are located in a server base store. WSS enables InfoPath forms (see the client section) to be installed into the site where they are always available to the user. Furthermore, digital signatures enable regulators to track the source of content and code to the issuers of the signatures. Additionally, WSS has the ability to further refine the source of content down to individuals by maintaining a history of changes to files that can be traced back to users.

Client

In a preferred embodiment, the client level is the starting point for all packages. The Application Development function is the process that produces the operating system files. Delivery of this file to the device is in the form of a package that includes a signature so it will pass through this process to be delivered, however, the initial files are created elsewhere. Content is handled in a similar manner. The client level is also the point where the process is controlled.

Also included in this level is the InfoPath client form used to create the various XML configuration files. These files include the following XML files: the main configuration file, the Phase I Display Manager dictionary file, the Phase II Display Manager dictionary file, and the Phase I/II Keypad Manager dictionary file. The InfoPath form validates the regular expressions entered and allows sample strings to be tested for the Display dictionaries. An additional feature to consider would be importing an XML file produced by the CMS into the InfoPath form to help start the creation of the configuration files.

System Game Download

In one embodiment, system games are stored on a data store of a download or system gaming server 140 accessible by the IVIEW interface 216. The games are downloaded upon player selection and installed and executed on the IVIEW interface 216. If the game is already installed on the IVIEW interface 216, its version is checked against the version on the system gaming server 140 data store 160, or other server where the system game is stored, to ensure the player gets the latest version available to play. If the software is out of date, then the latest software is downloaded to the IVIEW interface 218. In another embodiment, the systems games are downloaded as a background or foreground process without user interaction. Server side push or client side pull of game content and game settings work in various embodiments and per jurisdictional requirements. Through a socket connection, the server instructs an IVIEW interface 216 to perform a content update, either through the same socket or through a web service call to a Microsoft Internet Information® server running a download server application. The games are digitally signed with a public key. The IVIEW interface 216 has a digital certificate that allows it to authenticate that a game code and its assets have not been tampered with either on the IVIEW interface 216 or on the server 140. Also, the hypertext transfer protocol service (HTTPS) is used to ensure that only valid servers authenticated by the certificate authorities can send system games. In one embodiment, no download server spoofing is allowed. HTTPS also ensures secure cryptographic transport of the download package to the requesting IVIEW interface 216. Standard versioning control techniques are used to ensure proper versioning and an audit trail.

In one embodiment, download servers 140 are local to the casino. In another embodiment, the download servers 180 are situated at remote sites. In another embodiment, a multi-tiered download server system provides faster downloads to specific IVIEW interfaces 216, but still ensures that each middle tier download server has the latest approved content from the master download servers. Microsoft's dot-Net® technology and Java® Applet, ASP, ASPX, HTML, and Java® Script technology allows any application to be loaded from local media, such as compact flash or a hard drive, or from the remote media download servers. In one embodiment, Internet Explorer® caches the games in a temporary Internet files directory. Each game is validated by checking the date of the same files on the download server 140. If they differ, the server-based version downloaded to the IVIEW interface 216 replaces the version in the temporary Internet file system folder. Private encryption of the application-executable file and/or media, in one embodiment, is performed in addition to code signing authentication. In one embodiment, bit-by-bit or file-by-file checksum verification of the content is performed at boot time of the IVIEW interface 216, or at any time determined by the IVIEW interface 216 or initiated by a server 140, 180. Public Key Infrastructure (PKI) allows for the public/private key exchange and code signing, and server authentication against third party certificate authorities, such as Verisign®. Microsoft System Management Server (SMS) deployment technology is used in one embodiment to update to the latest operating system, latest games, latest boot application, public keys, digital certificates, and the like. In this embodiment, this SMS technology is used to ensure that each IVIEW interface has exactly what is required by the server 140. The IVIEW interface can request a download or “pull the content” using a SMS client.

In another embodiment, the server pushes system game content to the IVIEW interface 216 at a selected time. The physical download occurs while play is occurring. However, the installation of the download occurs instantly, or in another embodiment, it occurs when certain business rules are achieved, such as no player actively for a certain number of minutes. In another embodiment, an install sequence for the gaming software occurs in the middle of the night.

In one embodiment, a software code is authenticated prior to installation and just after download completes. If a download failure occurs, then a complete new download is initiated, or once a reconnection to a download server 140 occurs. The remaining portion of the system game download is downloaded, or the entire package is retransmitted.

In some embodiments, the list of system games available for play can exist on the web page or be shown by a dedicated software application. In one embodiment, the list is player specific, and updated after a player has been uniquely identified. Different systems have different games available for play for jurisdictional, regulatory and business reasons. In one embodiment, only those games available for play are authorized for download to the IVIEW interface 216. The system game server 140 is dynamically built for the player or the IVIEW interface 216. This way, the system game server 140 can test and run games in various locations in the casino and/or for various players in the casino. The assignment of system games to specific IVIEW interfaces 216 or players is fully configurable by the operator at the system game server 140.

In one embodiment, some games only include a multimedia presentation of a game that is executing on the server 140. If network speed is sufficient, then each frame shown to the player is first rendered on the system game servers 140, and downloaded to an IVIEW interface 216 in real-time. In one embodiment, server-side IP address verification is used to ensure that only authentic client devices are capable of downloading code or communicating to server 140. A unique system gaming device ID is entered into the system gaming servers at setup time to also ensure that only authentic client devices are capable of downloading code or communicating with the servers. In one embodiment, the download is carried over an IP pipe in an Ethernet network. Secure HTTP and/or private encryption is used to ensure privacy of the network traffic during download and server communication. Various attract mode media are also downloaded to the IVIEW interfaces 216 for presentation to the user.

In one embodiment, authenticating IVIEW interfaces 216 as client gaming devices and authorizing them for play, involves authenticating players with some form of login security. This way our system gaming server 140 can be used with any client device that accesses the system gaming server 140. Users are pre-registered prior to playing system games, and all wagers, wins, and other gaming activity is tracked for players inside the system gaming servers. Player specific meters or accounts are kept in the system gaming server 140, so security of these meters is ensured because of the system gaming server 140 secure Network Operations Center (NOC) in which they operate. In one embodiment, the client gaming devices are merely game presentation devices and all actual gaming activity occurs on the system gaming server. This way, if the client device is hacked or tampered with in any way, there is no effect on the outcome of game play.

In one embodiment, the player can only request to play a game for a certain amount of dollars or system game credits, and if the system authorizes play for this player and amount under jurisdictional rules, then the game starts on the server 140, or the outcome is sent from the server 140 to the client for presentation. Games that require user interaction, such as video poker have the player’s user interaction sent to the server 140 for processing. Appropriate results are sent back to the client for the next stage in the game.

In one embodiment, when a player selects a system game, the game is downloaded from the server 140, or launched from the local client (IVIEW interface 216) storage device. The game or the other client side application fetches from the server 140 game specific settings for this embodiment. An XML string is sent to the client with name-value pairs of variables that allows a single application to run in several different modes of play without changing the main application code. For example, and not by way of limitation, a game of solitaire can be played in normal mode for cash or in tournament mode for prize points. The game executable (EXE or DLL) is the same, but when the game loads, it asks for game settings, and the server 140 returns the appropriate game settings for the game chosen by the player.

In another example, if a tournament mode is chosen for a poker game, then examples of name value pairs are shown in Table 10.

TABLE 10

Name Value Pair Parameters For Tournament Poker Game Client

| | |
|---|---|
| VarName = TOURNAMENT_MODE | Value = ”ON” |
| VarName = TOURNSCORE_FORMULA | Value = ”WAGER/WIN * 10,000 * Theoretical (AVE 10 GAMES)” |
| VarName = TournID | Value = “83241-3242429” |
| VarName = GAME COST | Value = “5 Credits” |
| VarName = Max Credits | Value = “10” |
| VarName = Number of Rounds | Value = 2 |
| VarName = Denomination | Value = $1.00 |
| VarName = #Wild Cards | Value = 2 |
| VarName = Royal Flush - Pays | Value = 800 credits |
| VarName = Straight Flush - Pays | Value = 200 credits |

If a regular (non-tournament) mode is selected for a poker game, then in one embodiment, by way of example and not by way of limitation, some of the name value pairs of parameters include those shown in Table 11.

TABLE 11

| Name Value Pair Parameters For Non-Tournament Poker Game Client | |
|---|---|
| VarName = TOURNAMENT_MODE | Value = "OFF" |
| VarName = TOURNSCORE_FORMULA | Value = "N/A" |
| VarName = GAME COST | Value = "1 Credits" |
| VarName = Max Credits | Value = "1" |
| VarName = Number of Rounds | Value = 1 |
| VarName = Denomination | Value = $.50 |
| VarName = #Wild Cards | Value = 0 |
| VarName = Royal Flush - Pays | Value = 8000 Prize points |
| VarName = Straight Flush - Pays | Value = 1000 Prize points |

In one embodiment, registered children are only authorized to play in modes that are authorized by the jurisdiction in which they are playing. For example, and not by way of limitation, children may only be able to play games that are free and award prize points and no cash. A "jurisdictional gaming engine" in the gaming server 140 ensures that only proper games, game modes, prizes, game settings, and the like, are given to the proper players.

Tournaments

Tournaments are often arranged at a casino to create an exciting activity to drive attendance and revenue for the casino. A tournament is a group function wherein several players pay a set amount of money to join a tournament. These entry fees are usually manually collected from the players and typically are used to fund a prize pool that is paid out to one or more tournament winners. The casino will usually retain a percentage of the entry fees running the tournament. The gaming devices used for the tournament are those normally used on the casino floor, but those which have been re-configured so that upon the issuance of a "start" command, the devices allow the players to play as fast as they can without requiring any funds to be deposited during tournament play. Percentage options in the re-configured gaming machines are standardized before play of the tournament. Most players start with the same amount of credits. The wins, or "points," are accumulated, held and displayed by each machine. At the end of a specific period of time, a "stop" command is sent to all of the gaming machines participating in the tournament. The gaming machines then become disabled. The winner is usually a person having the highest accumulated score of win points obtained during the tournament session. In most tournaments the winner takes the entire pot.

Currently, tournaments must be run on the aforementioned specially-configured gaming machines, which are required to be located in a special area in a casino floor or a separate room. At least one person is required as a tournament administrator, and/or persons who monitor and run the tournament. The tournament setup is configured, tested, and certified as being equal in every respect on each gaming machine so that all players have an equal chance to win. The gaming machines used for the tournaments are carefully selected from the gaming machines normally used in the casino. The selected gaming machines are then enabled for tournament players to play at a defined "start" time, and they are disabled at a tournament "end" time. A tournament administrator is responsible for acquiring the score from each gaming machine. A winner is orally announced or otherwise shown on a display device.

Thus, in current tournaments, there is a requirement to collect tournament fees manually, dedicate a portion or room in the casino for the tournament location, and select and specially configure gaming machines for re-location to the tournament location. Further, there is a specific start and end time for the tournament, during which all tournament play is required to start and complete. Finally, the tournament scores are fetched manually. All of these requirements limit the opportunity of the general public to access the tournament. Further, they make the tournament costly to conduct on the part of the gaming establishment as it must provide tournament hosts or administrators, dedicate certain machines to tournament use, and provide a suitable casino area or room in order to conduct of the tournament.

Some prior art systems purportedly make tournament play more available, and purportedly simplify the host establishment's monitoring requirements to reduce overhead expense. However, those systems still require participating gaming machines to all be a similar type and have the same win percentage (i.e., have standardized parameters before tournament play). All gaming machines participate in the tournament for the same period of time and must to be dedicated to the tournament during the duration of the tournament.

Further, the tournament close rate, the turnover rate, or the tournament velocity rate are all terms describing a problematic area in tournament design. This is a constant issue that needs to be considered by the tournament game administrators. Tournament operators must carefully choose the number and size of tournaments available for a player so as create what is called tournament velocity or turnover rate. If there are too many tournaments for the player community available, then the tournament velocity is too little, and player dissatisfaction occurs. If there are too few tournaments for the players, then a player may post a score in all his desired ones and may not have a place to spend any more tournament entry fees until the tournaments close. An advantage of closing tournaments quickly is that it gives the winning players more money to play even more tournaments or other types of games.

Thus, it would be desirable to provide a tournament system and method without the need to dedicate a separate part of a casino floor, limit the duration of the tournament, specifically configure gaming machines of the same type and move them to the tournament area, and provide the amount of personnel typically needed to conduct a tournament. Accordingly, in light of the discussion above, those skilled in the art would recognize the need for a system that is capable of providing on-going tournament play over a broad area and over a broad spectrum of gaming machine types.

A preferred embodiment of a tournament system, constructed in accordance with the claimed invention, is directed towards a system and method that allows competition between players of dissimilar gaming machines for potentially varying periods of time while such players are concurrently playing their gaming machines in a normal fashion or normal mode. In one aspect, the tournaments use gaming machines with non-modified base games located anywhere in the casino, or two or more casinos, while the players of those gaming machines continue to participate in normal play on the plurality of gaming machines.

In one embodiment, a gaming server (140 in FIG. 1) performs as a tournament server that automatically communicates with the plurality of the gaming machines 200 to offer the current or potential player of each gaming machine 200 the opportunity to play in a tournament without leaving the gaming machine 200 being played and without having to discontinue regular play of that gaming machine 200. Thus, the offer leads to dual income and/or reward potential from a gaming machine 200 for a given period of time. The player plays his base game 202, and if the player chooses, he can enter a tournament at the same time and compete head to head with other players anywhere in the facility in which they are playing. Or, he can play in competition with players, in any other facility around the world, if the system is configured to do so through, e.g., a wide-area network 150. The players do not have to all start at the same time. Each player plays his base game 202 for a specific amount of time, the amount of money played, or the money won, or combinations thereof in order to generate a tournament score. The tournament servers 140 will group these factors dynamically against other players to create competition for prizes or merely entertainment. The tournaments can be provided for free using promotional funds or pay to play, which provides incremental income per unit time per square foot of the casino floor.

In one embodiment, a preferred method for letting players know that they can play a base game tournament is by use of the IVIEW interface 216. Alternate display devices can be used including, but not limited to, a second top box monitor on a gaming machine or a second window or frame in the base game display (204 in FIG. 1). The player is enticed to join a tournament using a gaming account by which the player is identified by insertion of a card into the card reader 212. Alternatively, other types of accounts or factors authorize play in a tournament. If the player chooses to enter a tournament by selecting a "begin tournament game" button on the IVIEW interface 216, then the player merely continues to play the base game 202 on the gaming machine 200 normally.

In one embodiment, a fee, if any, for the tournament game is deducted from the player's account. In one aspect of this embodiment, the fee to play a tournament game funds the tournament prize or other prizes as configured by the casino running the tournament. In one embodiment, a percentage of the wager amount is given back to the winners of the tournament, and a portion is kept by the casino as an operational management fee. In one embodiment, a player's tournament score is set to zero after the player begins the tournament.

In one embodiment, the tournament server 140 groups the player with other players automatically. In another embodiment, the player chooses which groups of players against whom to compete by selecting specific tournaments via a selection screen presented on the IVIEW interface 216.

In one embodiment, there is no sectioning off of the casino floor for tournament-enabled gaming machines 200 and non-tournament enabled gaming machines 200. On each gaming machine, a player plays the base game 202, as the player normally plays, by inserting enough money into the gaming machine 200 to begin play of the base game 202. A base game 202 is played, and each win per wager amount is accounted for by the tournament server 104 and/or the IVIEW interface 216 on the gaming machine 200.

In one embodiment, this data is processed into a tournament score by comparing what the player won verses what was expected to win for the machine on which the player was playing. In one example, and not by way of limitation, a base game 202 tournament score is normalized in the calculation that follows:

$1.00 wager on the base game

95% theoretical payout percentage for the base game.

Expected win amount: $0.95

Actual win amount: $1.65

$1.65/$0.95*Scaling factor=Tournament score for this last game.

In one embodiment, multiple scores are combined to a tournament score and relayed to other players in the tournament using a tournament score chat server 142. In one embodiment, the tournament score is relayed to the other participants of the tournament in real-time, or periodically updated to create the competitive environment for the players. Each player's tournament score is posted at the end of his tournament time (for example: five minutes of base game play). At the completion of the tournament, the players are notified on their IVIEW interface 216 as to what their ranking is for the tournament and what any potential win may be. Consolation prizes may go to any number of players of the tournaments.

In one embodiment, no base game 202 reconfiguration is needed for a gaming machine 200 to participate in a tournament. There is no requirement that gaming machines 200 are dedicated to tournament use or have special high-return tournament-only pay schedules. In one embodiment, any gaming machine 200 in the casino can be used. In one embodiment, all the gaming machines 200 on the floor are capable of being played in tournament mode, even against other base games 202 with different parameters. These differences in parameters include, by way of example, and not by way of limitation, different theme games with different payout percentages, available denominations, different wager amounts, different pay tables, different volatilities, different bonus rounds, and the like. In one embodiment, the different parameters are normalized for the tournament by the scaling or waiting factor applied to each score described above.

In one embodiment, a player can perpetually play multiple tournament games and continue to post scores under one tournament identifier, which identifies a player in one or more tournaments. Play in multiple tournament games tends to improve upon the player's standing in what in effect is longer running tournament for the player. Alternatively, in one embodiment, a player has the option to post tournament scores using two or more completely different tournament identifiers to play as multiple players in multiple tournaments. In some embodiments, all or certain tournaments limit a player to a specific number of score posts specific tournaments.

In one embodiment, as an alternative to tournament play starting at the players choosing, players choose to enter a tournament and when a specific number of players have also entered the tournament, then the tournament begins. In this embodiment, the players wait until the tournament actually begins to play. However, while the players are waiting, they continue to play their base game 202 on their gaming machine 200 as normal. In one aspect of the embodiment, the tournament server 140 notifies all players automatically once the tournament start criteria (e.g., number of players entered) have been reached. All players then start at the same time. In other embodiments, other criteria for starting a tournament are time based (e.g., a specific start time) verses a fixed number of players.

In one embodiment, all players who have committed to spending money from their player card account for a specific tournament are considered eligible and thereby allowed to play in a tournament that starts at a specific date and time. An announcement is provided that a tournament is to begin at a particular time to those eligible to play on the additional user interface on the game machine 200 that they are playing (e.g., "Fifteen minutes until a new tournament begins"). In one embodiment, the tournament completes at a specific time. However, in another embodiment, the tournament finishes once a player achieves a specific score in what is called a "sprint" tournament.

In other embodiments there are other criteria for ending a tournament. For example, in one embodiment, only a specific amount of money can be played on the base game 202 or other platform, including the IVIEW interface 216, to create a tournament score. As such, in this embodiment, devices force a cash out of all base game 202 credits over a specific amount approved for the specific tournament play. In another embodiment, only a specific amount of credits or dollars can be spent on the base game 202 during a tournament period of time. This way, all players can only spend a specific amount of credits for a specific system tournament game verses an unlimited amount as in the preferred embodiment.

In some embodiments, lower ranking or lower scoring players are automatically eliminated from the tournament, freeing them to join another tournament. In another embodiment, a player is dropped from the tournament if he fails to achieve an intermediate tournament goal or score in a specific amount of time, because the chance that the player can win is negligible because of the tournament design.

In another embodiment, a player drops out of a tournament at the player's choice at any time. The player's points are optionally removed from the rankings entirely at that point or are frozen and retained in the rankings until the tournament period expires and final scores are tabulated. In one embodiment, the player loses his tournament entry fee in this scenario. In one embodiment, there is an optional short transition period at the beginning of the tournament where a player is allowed to leave the tournament without losing money.

In another embodiment, the tournaments are played around the clock with no casino staffing required. Even if a player is the only player, a tournament score accrual engine of the tournament controller server 140 creates a tournament score for the player and posts it to the proper tournament identifier in a table of scores in the database 160. Once a tournament time completes and a threshold number of tournament players is achieved, or other tournament concluding criteria are met, this score is judged against the others for the tournament prize. In one embodiment, using the wide-area network 150, a single player in one casino can compete head-to-head with other players in other casinos to create the sense of a tournament player community.

In one embodiment, tournament winnings will are added to a winning player's account to allow replay of the winnings, cashing out, or redeeming for a prize at a later time. In one embodiment, a prize award may be automatically or manually paid by casino personnel who are notified of the win.

In one embodiment, a tournament begins as a "one-time" event. In another embodiment, the tournament is perpetually executed, depending on casino preferences. In one embodiment, tournament completion rate display indicators are provided to the players on the IVIEW interface 216 to project an expected tournament completion time. This is helpful for players in deciding if it is worth waiting for a tournament to close, or whether to return at a later time for tournament play. Players who want completion quickly should choose tournaments that have a short completion time.

In one embodiment, player-specific or group-specific messaging is provided to each player on the IVIEW interface 216, informing the player, for example and not by limitation, that the tournament is a daily tournament, and the player should keep trying to post more tournament scores to improve his chances of winning the tournament.

In one embodiment, hidden tournaments are executed by a tournament controller server 140. The player is offered, or up-sold, to post his score in a tournament he is playing to a hidden or non-hidden tournament after his current one is finished. A single tournament entry fee can allow this tournament score to be posted into several potential tournaments, each with their own prizes associated therewith. For example, a player scores 9,893 for the tournament the player enters. In this particular tournament, it is not a very good score, and the player does not win. In one embodiment, the tournament server 140 also enters the player into a tournament competing for the lowest score of the day tournament. The player could potentially win this tournament if his score is bad enough.

In one embodiment, on the additional user interface, a player is shown a player velocity meter and given a velocity bonus for a tournament score. If the player plays the base game 202 or a game executing on the tournament server 140 at a certain velocity, then a bonus is added. In one embodiment, the velocity is calculated for example, and not by way of limitation as follows: the games per unit time, money per unit time, or maximum bets per unit time.

In one embodiment, a player only wins a prize if the player is in the top few players at the end of the tournament. In another embodiment, the system awards other prizes for any number of players in the tournament. Examples are, and not by way of limitation: raffle and sweepstakes tickets. In another embodiment, a player wins prizes in the middle or at the end of the tournament for reaching certain tournament score thresholds. In an aspect of this embodiment, a tournament score-to-prize award lookup table in the database 160 is used for a different prize for each tournament score achieved. Partial sample records from the score-to-price lookup table is shown in table 12 below.

TABLE 12

Tournament Score to Event ID table: Event ID's will award a list of Prize ID's

| Tournament Score | Prize Award Event ID |
|---|---|
| >1,000 | 186 |
| 800 | 5 |
| 700 | 1 |
| 600 | — |
| . . . | |

In one embodiment, in order for a gaming machine 200 to be eligible for base game tournaments, it needs a player either playing or waiting to play the base game 202. In one aspect of this embodiment, credits are required on the base game 202 of the gaming machine 200. In one embodiment, a base game 202 on a gaming machine 200 is classified as idle based upon several rules, for example, and not by way of limitation: if no player is actively playing a game, if no credits are on the machine, if the gaming machine 200 is presently in "attract" mode providing lights and sounds, for example, in order to attract a player for a threshold number of minutes, and no player has played the base game 202, or of no player card is inserted. In contrast, in one aspect of this embodiment, a player is identified as eligible for the tournament according to rules that suggest a player is either playing or available at the gaming machine 200. For example, and not by way of limitation, the gaming machine 200 is checked for whether credits have been inserted. An announcement of an upcoming tournament is often sent to the gaming machine 200 if found eligible to entice the player to enter the tournament. Optionally, in one embodiment, if a gaming machine 200 is found to be sitting idle, the tournament controller server 140 sends an advertisement that a tournament is about to start to the idle gaming machine 200 in hopes of attracting a new player.

In one embodiment, players that do not have a play card for insertion into the card reader 214 or that do not otherwise have an account with the system (collectively "uncarded" players), are still allowed to play tournaments that will close in a short time, or that the rate of closure is fast enough to make it possible to reward the player at the gaming terminal if that player wins an award. This is because, for a player without an account with the system, his wins cannot be put into an account. In one embodiment, carded players and uncarded players (players who do have an account) are allowed to play free tournaments with or without a tournament prize. This helps encourage or "tease" the player to become a carded player to play for the tournament prizes.

In another embodiment, the casino floor is broken up into groups that can only compete with other groups or base games 202 identically or closely configured. In one aspect of this embodiment and for certain types of tournaments, it is required that in order to join the certain base game tournament, the players should be playing a certain base game 202 with a 94% hold percentage. In another embodiment, all game types that pay 96% or greater can join this tournament. In yet another embodiment, only skill base, games 202 (such as, without limitation, "video poker") can join a tournament. In another embodiment, any way of breaking the gaming floor down into denominations, themes, groups of games, types of players, wager amounts, types of games, configurations of games, theoretical win percentages, volatility, and the like, is used to enable or disable different base games from joining a specific tournament. While the breaking down of the floor into smaller groups is not necessarily a preferred embodiment in all cases, however, in some causes, it is preferable to create trust in the player that he is competing on an even playing field with other players who are playing similar base games 202. Also, in one embodiment, casino-run promotions are used to advertise theme tournaments, for example, and not by way of limitation, a "Video Poker" tournament where any video poker game can join a tournament. In one embodiment, enabled machines are physically grouped on the casino floor for marketing and promotional reasons. The tournament servers 140 manage all of the tournaments and which gaming machines 200 and players are eligible to play against which other gaming machines 200 and players, removing the burden from the casino management, except at tournament configuration setup time.

In one embodiment. a player is allowed to buy more tournament time in some tournaments to improve the player's tournament score. By way of example, and not by way of limitation, after a five-minute tournament is completed, the player is provided with the option to purchase one more minute for $1.00 through their account. In one embodiment, maximum up-charges are able to be set for these types of tournaments.

Simulated Tournament Players

In one embodiment, the system simulates a number of players to meet the minimum gaming machine 200 requirement for a tournament. Simulation programs for players of games are known to those skilled in the art. For example, SIM-Earth® by Electronic Arts of Redwood City, Calif. and other popular games, including casino-based games, have used computer logic to simulate humans or game play. In one embodiment, the simulated players of the tournament play on behalf of the house, and should one of the simulated players win the tournament, the winnings are retained by the casino, or, for example, distributed to the top human player, or other distribution rules are used to distribute the winnings. In one embodiment, the simulated players and their scores are based on players who have played at previous times. This is implemented by an "instant close" tournament engine. The simulated players are used to tease a human player to create real time interaction even when the casino floor is very light and no one else in playing tournaments. Simulated players win and lose tournaments to create any desired competitive effect.

Tournament Score Formula Calculation

In one embodiment, each tournament has its own tournament score accrual formula. Also, each player has his own tournament score equation for each tournament he plays. In one embodiment, this formula is downloaded to the gaming machine, or calculated on the gaming server 140. For example, in one tournament, a two-player, ten-minute tournament base game 202 may use a different tournament score calculation than a five-minute, pyramid-style tournament (described below). Alternatively, in another embodiment, the tournament score is calculated based upon different types of players ("gold" and "silver" player club levels, and the like). In one embodiment, this dynamic modification of a tournament score formula occurs in the middle of a running tournament or an individual game in a tournament. The gaming systems auto-tune a tournament score calculation to get the desired entertainment effect. The change is effected between games, during individual games, or after a tournament concludes prior to a tournament of the same type beginning again. In one embodiment, the same game modifications, tournament score formulas, and game variables are given to all players in a specific tournament. In another embodiment, players use different sets of these parameters.

In one embodiment, any variable or meter that can be read from the base game can be used to construct a tournament score. In one embodiment, averages of multiple base game plays are used to smooth out the highs and the lows in a scoring methodology. The higher and lower base game plays are thrown out in order to normalize any statistical effect. In one embodiment, the tournament score formulas are designed to grow only upward to help encourage players to keep playing the base game if they want their tournament score to grow. In another embodiment, a tournament score formula is constructed such that the further the player is away from an expected payout for the player's wager amount and the theoretical win for this wager amount for the gaming machine 200, the larger the tournament score will be. For example, and not by way of limitation; if a player plays 100 base games in a row with no wins whatsoever on a 95% theoretical payout machine, then a tournament score could be very large even as compared to a player that has won more often on the same type of game machine with a 400% actual payout win over the tournament duration. A non-linear curve is shown as a non-limiting example in FIG. 35 that is used in one embodiment to map or normalize a theoretical to actual win ratio to a tournament score.

In other embodiments, other calculation techniques are used. In one example, and not by way of limitation, the player with the highest standard deviation from the expected return is given the highest tournament score. In another example, the score is calculated to give a player the best rate of change (acceleration) of actual vs. theoretical outcome of a higher score. In another embodiment, the tournament score calculation is a simple addition of the win from each game from one base game to the next, with or without a comparison to the expected return.

For some tournaments, the tournament scores are positive or negative for one individual in a group of players. Tournament scores are calculated based upon how a player is doing compared to another player or group of players. The player that does the best at the end of the tournament period of time wins the prize. Any combination of the above-described scoring techniques can be used.

Preferably tournament scores are calculated to maximize the play activity, the wager amount, the time on the machine, the entertainment effect, and to bring new monies into the casino. In one embodiment, the tournament score calculation normalizes the variations in the base game design including, without limitation: the denomination, the wager, the theoretical payout percentage, the game theme, the game win/lose volatility, the skill games vs. the chance games, the pay table variations, the bonus round variations, the wide-area progressive wins, the size of the wide-area progressive wins, and the like. This feature reduces or eliminates the need to section off the game floor to tournaments by the casino with same-type games. Any eligible player can play any base game 202 at anytime, and if the player selects and begins a base game tournament, the player can immediately play a tournament. The player selection to enter a tournament can occur on any display device, for example, the base game display 204. In one embodiment, selection is provided on the IVIEW interface 216 due to its touch screen capabilities.

In another embodiment, players are provided with a tournament score handicap, such as that in the game of golf. This helps to make a fair playing field especially with skill-based games or for low denomination verses high denomination players, since pay tables and theoretically payout percentage are typically higher for the latter of the two. In some embodiments, the handicaps are game, tournament, or player-specific to help create a fair tournament experience.

In one embodiment, a dynamic yield analysis engine in the tournament server 100 finds base games, games that execute on the IVIEW interface 216, or players that should be grouped into new available tournaments to create the optimal player excitement and revenue potential for the casino. In one embodiment, the grouping occurs automatically with no player interactions.

In another embodiment, each gaming machine 200 has a separate tournament point table maintained in the tournament server 140, an IVIEW interfaced 216, by which it evaluates each normal gaming machine wager and win and appropriately calculates tournament points for reporting to the tournament server 140 in a manner that provides an equal opportunity to accumulate tournament points to all tournament participants. In one embodiment, there is a game point to tournament score lookup table associated with each base game 140, so no real-time calculation of the tournament score needs to occur. In one embodiment, different tables are used for different games, themes, denominations, wager amounts, and the like.

In another embodiment, tournaments are formed in the backend server networks with player session data and/or gaming terminal data that is collected in a day in the casino as part of its player promotional processes and slot management processes, executing on the server 140, 180. This data collected is not necessarily real-time data. In one embodiment, it is collected nightly or at some other interval period of time. Players' base game 202 activity on gaming machines 200 is used to create tournament scores that are grouped in the tournament server 140 for competition.

In one embodiment, a tournament consists of a player's best five minute moving window in his entire play session. For example, if a player played for an hour and had a very low payout for most of the hour, but had one good five-minute window where payouts were high, then this slice of time is used for his tournament score post. This embodiment encourages players who just won big to replay much of their money back into the base game to "top off" their tournament score in order to help ensure that no one else can beat him in the tournament. In the player's mind, the player believes the player is playing with the casino's money so the more willing he is to spend a sizeable portion of the recent win to try to win big again.

As stated above, in one embodiment, different types of games, themes of games, denominations, game volatility, skill, chance, pay tables, optionally, each has their own tournaments. So for, in this embodiment, only Poker games compete head-to-head against other poker games due to the skill nature of the game. The negative side of this embodiment is that the size of the group of players shrinks as gaming machines 200 are subdivided into smaller groups. Thus, there is less chance that players compete against each other due to the smaller number of machines allowed to play in each group. Therefore, the tournament in many cases takes longer to complete or close. Accordingly, in one embodiment, it is preferred to have tournaments of fewer quantity, shorter duration, and smaller numbers of players to create a quick turnover.

In another embodiment, simultaneous tournaments execute on the same client or for the same player. For example, and not by way of limitation, in one embodiment, a player posts one base game score to multiple different tournaments at the same time. One option is to provide a player the choice to play in multiple tournaments or to do so without the player's choice. For example, a player plays a limited entry tournament against a small number of players in which the player can win a prize for that tournament. In addition the player has the same tournament score posted to a daily tournament in an attempt to win another prize. As described above, one form of this embodiment involves entering a player into a tournament to achieve the highest win rate over an expected win rate, and to also enter the player into a tournament in which prizes are awarded to a player with the lowest actual win rate of return verses an expected rate of return. This way, even if the player loses the highest payout rate tournament, the player can still win in the other tournament. The player can pay for both with different wagers, or pay just once to play both tournaments. Alternately, one or more tournaments are paid for, and one or more tournaments are free.

In one embodiment, a tournament score for a period of time is calculated using all or a smaller group of individual wager/outcomes from each base game play. A single base game contribution to an overall tournament score is calculated in this embodiment as follows.

10000*(LastGameCashWON/LastGameCashWAGERED/PaytablePayoutPercent);

wherein "LastGameCashWON" is an amount won in the last game for cash that the player won, the "LastGameCashWAGERED" is the amount wagered in the last cash game, and "PaytablePayoutPercent" is the payout percentage for the player. In one example, with a base game 202 configuration, the following parameters apply:

$0.50 Denomination Machine

92% Theoretical win amount

The expected win can be calculated as follows:

$0.50 play*92%=$0.46 expected win

An example Sequence of base game plays on this base game configuration during a tournament is as follows:

First base game played on this base game configuration $1 wager, 2 credits played $0.50 win The single game tournament score contribution would be:

10,000*($0.50 win/$1 wager/92% theoretical win for this wager=5,385 tournament points.

Second base game played on this base game configuration:

$1 wager, 2 credits played $2.50 win

The single game tournament score contribution would be 10,000*($2.50 win/$1 wager/92% theoretical win for this wager=27,173 tournament points.

In one embodiment, the single game contributions are added to a score of the scores stored in the database 160 throughout the entire tournament time. Table 13 illustrates an example of a part record listing of the score table.

TABLE 13

| Base Game # and Tournament Score contribution table. | |
|---|---|
| Base game # during tourn. | Single game contribution |
| 1 | 5,385 |
| 2 | 27,173 |
| 3 | 0 |
| . . . | . . . |

In one embodiment, the score table is ranked by sorting from highest score to lowest score. An alternative to storage in the database 160, is that the score table may be stored in the additional user interface 216. In another embodiment, the table is concatenated to a specific number of elements after ranking. For example, and not by limitation, only the top 10 individual scores are summed to build the tournament score shown to the player. In this embodiment, a score can range from 0 to approximately 1,000,000. The score is averaged for all 10 games and stored in the score table. This embodiment has the effect that one good game does not guarantee a top tournament score. A player needs to play many base game plays in order to ensure that the player is able to get 10 good individual base game contributions to the tournament score. In one embodiment, a player's score never goes down and can only improve as the player plays and achieves better wins on the base game 202. A skill-based game 202, such as a video poker game, in one embodiment changes a player's play technique depending upon what the player has achieved so far in the tournament. For example, the player will most likely not hold a pair of jacks if it is not going to improve the player's tournament score. In one embodiment, the tournament score formula is shown to the user in a "help" screen on the additional user interface 216 to help the player determine how to achieve the best possible tournament score.

In another embodiment, the tournament score formula is:

Tournament score=Weighting factor*(totalwager*theoretical hold %)+abs(totalwin−(totalwager*win %))

Wherein the "Weighting factor" is determined based on the skill required to play a base game; the "totalwager" is the total wager placed by a player; the "theoretical hold %" is the theoretical percentage of the player's wagers that should be retained by the house or casino during game play of the base game 202; "totalwin" is the total amount won by the player; and win percentage is the actual percentage won by the player.

In another embodiment, the highest instantaneous tournament score wins the tournament if the tournament score goes up and down throughout the tournament period or game play. The tournament server 140 records the peak tournament score in the score table that was achieved by a player in the tournament period, and this number is used for the competition. Also the player with the most single game tournament contributions over a certain score threshold wins the tournament prize. In another embodiment, the player with the highest sustained average of single game contributions over time wins the tournament.

In one embodiment, maximum threshold values are used in the tournament score calculation for the last base game played. For example, and not by way of limitation, in one embodiment, 100,000 points is the maximum amount of an individual single base game contribution to an overall tournament score. Even if a player had a huge win on a base game 202, it would not guarantee a tournament score that would win at the tournament conclusion time.

Tournament Score Weighting Factors

In some embodiments, other variables are combined with the tournament score calculation. Those other factors include, by way of example, and not by way of limitation, a skill game weighting factor; a number of games played weighting factor; a denomination weighting factor; a maximum bet weighting factor; a wager weighting factor; a player-type weighting factor; a tournament-type weighting factor; a pay table weighting factor; a game volatility weighting factor; the actual lifetime wager/win weighting factors; the progressive win weighting factors; the date/time weighting factors; the game theme weighting factors; a theoretical payout percentage weighting factor; a game location weighting factor; and the like. In one aspect of this embodiment, one or more of these weighting factors are added at any time for any specific tournament to create the fairest playing field as possible for the different types of players playing at different types of base games 202. In some embodiments, these weighting factors are fixed numbers, lookup tables, or formula based, in order to normalize or accentuate any type of gaming activity that the casino desires. For example, and not by way of limitation, a casino can have a tournament that gives a player more points if the player bets a maximum wager than if the player did not. The formulation above tends to normalize the denomination played by a player.

In one embodiment, the casino encourages the player to play $0.25 denomination machines or higher to get the best score. The casino gives a 10% advantage to players that play on those gaming machines 200. In another embodiment, games that have an element of skill use a weighting factor that is specific to the skill game played due to the nature of the skill and the difficulty of generating a fair tournament score against players playing on 100% random chance machines. The weighting factors are inserted into the final tournament score formulation mathematics at several times or locations. For example, and not by way of limitation, the weighting factors are inserted after each base game is played, or after a group of base games have been played, or after all base games have been played in the tournament. In one embodiment, these weighting factors are player specific; base game 202 specific; location specific; device specific; gaming machine 200 configuration specific; and in one embodiment, specific to a game played on the IVIEW interface 216.

In one embodiment, the tournament scores are inserted in real time with each single game contribution or with the combined tournament score calculations. These weighting factors can be added at the conclusion of the player's play or at the conclusion of the entire tournament.

In one embodiment, weighting factors may turn on or off at various times throughout the tournament period or when particular scoring thresholds have been achieved or not achieved. The weighting factors in one embodiment are of fixed value, linearly derived, or non-linear derived formulas or tables.

In one embodiment, the theoretical win percentage is for a maximum bet game only, or it is for each type of win in a pay table for each wager amount and for each denomination. In one embodiment, base games 202 are configured to only give the theoretical win for a maximum bet on a game play. More modern games or server side games can give the GMU 218 the detail required to calculate more accurate and fair tournament scores.

In some embodiments, different tournament calculation techniques include taking individual base game 202 contributions and calculating using different averaging techniques with prior wagers and wins, different summation techniques using probability mathematics, standard deviation/variance mathematics, or remapping them through a tournament score converter engine or look up table. In one embodiment, best and worst individual contributions are thrown out, or best or worst moving cluster if individual base game contributions are thrown out.

In one embodiment, individual base game contributions are not used at all. Alternatively, the entire cumulative wager/win for the entire tournament period is used instead. A goal of the tournament score formulation is to provide many possible scores in a range of for example, and not by way of limitation, 0-10,000,000. This gives fidelity of the number system to ensure everyone has a chance of beating the leader even if only by one point.

In another embodiment, tournament scores are calculated in real-time as the player plays, or after the player finishes playing in a background-processing job done on the server or client. In yet another embodiment, tournament scores are pre-calculated prior to playing the actual game by using data collected on previous dates, times, or games played. Tournament scores are generated by combining several individual tournament scores or game scores into one final score for the tournament. Tournament scores from different types of tournaments or games are combined to form tournament scores, such as the Olympic decathlon event.

In another embodiment, each game has its own tournament score calculation formula to normalize it against the others it is playing against in this specific tournament. Alternatively, in another embodiment, each player has their own tournament score calculation for a specific tournament identifier in order to provide a fair playing field for players. For example:

Player #1 or Base game config #1=Use tournament score accrual method #1

Player #2 or Base game config #2=Use tournament score accrual method #2

Player #3 or Base game config #3=Use tournament score accrual method #3

In one embodiment, tournament scores calculation formulas are sent down to the gaming machine 200 for each base game 202 prior to the playing in the tournament or during or after play in the tournament. The formula may either reside in the IVIEW interface 216 or the base game 202.

The advantage of base game tournaments is that the base game code is already certified by regulators and approved for use on the casino floor. By actively monitoring several variables on the base game by the tournament server 140, the system derives a tournament score through mathematical manipulation of these base game wagers and wins. In one embodiment, no random generator is used to calculate the tournament score other than the already certified base game software. Thus, the gaming machine 200 is easier to approve in regulated markets, because there is no chance element in the calculation of the tournament score that is grouped with other tournament scores to determine a tournament winner. Thus, quicker regulatory approval in these jurisdictions can take place. In other embodiments, other game types are designed to calculate a winner using data collected from the base games.

In one embodiment, plasma screens throughout the casino show the current tournament leaders on them for the local facility and inter-site leader boards.

Players on the IVIEW interface 216 are teased with the pending tournament closings to encourage players to currently play in the remaining time of a tournament, the remaining entries, or prior to any other tournament end criteria.

In one embodiment, an alternative method of creating a tournament score for a base game 202 is performed wherein scores are created by a ranked list of recent five minute wagers/wins for that specific gaming machine, or identically configured games. For example, and not by way of limitation, the tournament server 140 keeps the last wins for each five-minute window of play, and sorts them in a ranked list. The score to be inserted has found a position in the ranking list, and the system calculates how far above and below the entry points are to the closest entries. The ratio of the distance between the two scores calculates the "ones" digit of the instantaneous tournament score. The first insertion point generates the rank used in the tournament score calculation. In one embodiment, the system uses a first-in-first-out method to remove old players on the ranked list.

Tournament Rooms

In one embodiment, different tournament rooms, tournament tables, or tournament identifiers are available to allow players to get together and play against a group of their friends if they so choose. In one example, a player sends messages or calls friends to go to the "Solitaire Babes" room so they can compete against each other even though they are not required to sit next to each other on the casino floor. This communal gaming creates a bond between the players, their friends, and the system. In one embodiment, players are able to create their own rooms and even make them access restricted in order to prevent unauthorized players from entering the room. In another embodiment, the casino has restricted rooms set up for specific players, groups of players, or types of players, in order to create a special gaming arena for special players. These rooms or tables for the players are provided for non-tournament games too. Typically the rooms or tables are setup and are game and mode specific. Players are given options for configuring the players that are allowed in their specific tournament rooms.

Types of Tournaments—Dynamic Grouping

As discussed above, several types of grouping takes place for tournaments according to one embodiment. The following list of tournaments and grouping types are used by this embodiment:

- Synchronized Tournament. Waits for five people to join, and then the tournament begins. Top scores win the pots.
- Team Based Tournaments. Team A with five players plays against Team B with five players. The best, combined team score splits the pot. Teams with different numbers of players are allowed to compete for prizes. The tournament score calculation normalizes out the extra players scores.
- Co-Op tournament. Five people combine their gaming to one tournament score. This score is a house generated score, or the current top Co-Op score
- Conquest Tournament. Five vs. five players. The lowest players score after a round is eliminated. Then it is five vs. four players. Rounds continue until a team is eliminated. The last team standing collects the pot.
- Elimination. 10 players start. At the end of a round, the lowest score is eliminated. Then nine players are playing. The last player collects the pot.
- Time-based tournaments. There are an unlimited number of players for a fixed amount of time. Prizes are fixed or progressive, based upon a percentage of cost to play.
- Limited Entry tournaments. A fixed number of players post scores. Top players win prizes.
- Sprint Tournament. The first player(s) to achieve a specific tournament score wins. Merchandise tournaments—Merchandise or service types of prizes are used verses cash.

Other types of tournaments and player groupings include:

The largest posted tournament score for a time period wins;

- Most money won or lost by any player in a time period wins;
- Most money played in a time period wins;
- Most or least tournaments won/lost in a day or other time period wins;
- Best cumulative tournament scores or average for a period or number of tournaments wins;
- Largest number of tournament scores of the day wins;
- Largest 10 or lowest 100 individual game tournament score contributions wins;
- Personal best tournament or personal worst tournament wins;
- Groups of players compete against each other for tournament prizes;
- Best number of minutes played in a tournament of the day wins; and
- If players are losing at a certain rate then they are grouped into a tournament automatically.
- Visiting tour group tournaments. A specific trade show group can all compete for a fixed list of prizes. The system monitors their play and performs statistical analysis for them to decide winners in a group.
- Players who play longer are grouped. For example, all players whose session time is over an hour in length are grouped.
- Highest winner of the hour or other time period. This is either the absolute dollar amount, the largest amount over an expected win amount, or the best tournament score achieved in the last hour.
- Players that play maximum bets on their base game 202 for a certain percentage of time are grouped.
- Players that play a specific denomination or average wager size are grouped into tournaments.
- Players that play at a specific rate of play are grouped. For example, fast poker players are grouped, because they are very skilled.
- Grouping players who play specific games titles.
- Grouping players who play certain clusters of games.
- Players who belong to a certain TYPE of group. For example, gold, silver, or platinum players. In one embodiment, this is calculated by player interval or game session ratings.
- Grouping players by skill level, or rank level per game.
- Grouping players automatically by time.
- Grouping players by demographic information provided by players or third parties about players. (e.g., age, race, sex, birthday, spouse name, anniversary date, and the like)
- Grouping players by what services the player likes or use.
- Grouping players by theoretical or actual payout percentage of the machines on which they are playing.
- Grouping by casinos.
- Grouping by types of players.
- Grouping players with the most number of tournament score posts over a defined tournament score threshold.
- Grouping players by their handicap level.

In one embodiment, a player can use the game play from multiple gaming machines 202 simultaneously contributing to a tournament score. For example, and not by way of limitation, a husband and wife can combine their play into a combined tournament score, or a player can play two or more base game 202 at the same time. The player identifier allows this linking of the two machines into one tournament score. If same card or account number is used on both gaming devices, or a player logs onto both gaming devices, then the player's combined gaming activity is monitored into a single tournament score.

In one embodiment, players are notified in the mail of a promotion for different types of players stating that when the players come to the casino next, they are going to be grouped and presented some type of game mode or tournament unique to them. These groups of players use special game features or different games because of the group to which they belong.

In one embodiment, a multiple overlapping tournament gaming system allows a player to post a score in one tournament, move on and play another, prior to the first one concluding. This way a player has many pending results at one time. The system automatically or manually configures the available tournaments to ensure that the right amount and types of tournaments are available in order to provide a player enough places to play and post a score. If there are too many, the tournament finish rate will not be fast enough. If too few, then there is a risk of a player not playing more if he has scores posted in all available types of tournaments that he likes. Dynamic Yield Analysis (DYA) helps auto-tune this capability in order to provide an optimal tournament velocity, turnover, and money spent playing.

In one embodiment, the tournament relay 140 relays in real-time tournament scores to various players in a particular tournament without burdening a separate system game server 140 with all of the transactions. As a player's score changes, the additional user interface 216 sends to the tournament score server the payer's score, the player's time left to play, the player's status, and other fields for identification and statistics on the player. The tournament score server forwards this information to only the players that are playing against each other, and/or any overhead displays in the casino for presentation to players. This is done by establishing a socket-based connection with each particular IVIEW interface 216 in the specific tournament.

In some embodiments, other messaging technologies are used to communicate to the additional user interface and overhead displays, including XML messages, over web services. Periodically, each client sends this tournament data to the database server 140 at end the end of the player's specific game. After the tournament concludes the server 140 judges all of the posted scores and calculates the winners. This same engine can be used for chat and high score leader board capabilities as well as on the client devices.

In one embodiment, a "Chance or Luck Meter" is shown on the additional user interface 216 to indicate that a player can play in tournaments of varying types (e.g., gold players, a large number of players, a small number of players, time-based players, and the like). In one embodiment, a player is eliminated from the tournament and chooses to participate in a different upcoming tournament, wherein the player believes the chances are better. This chance meter provides the player an idea of how lucky the gaming machine 200 currently is. One advantage of this is that when the meter is low, the player can determine that the base game 202 is ready to go "hot," and to keep playing. If the meter is very high, the player cam believes the gaming machine 200 is "hot," and he should keep playing. In some embodiments, this meter can take the form of a digital number, a linear gauge, a radial analogue "speedometer," a gauge or other gage that easily conveys the "luckiness" of the gaming machine 200 currently or averaged over several games.

The data used to calculate the Luck Meter is provided by the base game play, or a system game (run off the tournament server 140) played on the IVIEW interface 216. In one embodiment, the data used is the wager amount, the win amount, and the theoretical payout percentage for the entire pay table or each winning combination on a game. This data was collected by the GMU 218 from the base game through standardized protocols (discussed above) supported by gaming machines 200 on the casino floor. Alternatively, this data is collected by the back-end tournament or gaming server 140, accounting servers (shown as 180 in FIG. 1), and player tracking (casino marketing servers shown as 140 in FIG. 1), and calculated in the back end tournament servers 140 for presentation to the IVIEW interfaces 216 of the gaming machines 200.

Further, in one embodiment, a "Win Meter" is shown to the player to denote the player's frequency of winning tournaments.

With reference to FIG. 36, an example display screen 500 for tournament play is shown according to one embodiment. In one embodiment, the display screen 500 is shown to the player on the IVIEW interface 216. In the embodiment of FIG. 5, play in a "pyramid tournament" is shown on the display. The tournament includes a five-minute base game tournament played against eight other players.

The overall goal of the pyramid tournament system is to encourage players to maintain the tournament level so they can play for increasingly larger prizes. The players want to have competition for a more immediate reward and at the same time post this same tournament score to a longer running tournament for a bigger prize. This technique will force players to keep coming back again if they want to keep moving up the pyramid.

In one embodiment of the pyramid-type tournament, the player has a level associated with their account. For simplification only, and by way of example, and not by way of limitation, in one embodiment, the levels include hourly, daily, weekly, and monthly tournament levels. A new player starts as an hourly tournament player. The overall goal of the pyramid tournament system is to encourage players to maintain their tournament level so they can play for increasingly larger prizes.

In one embodiment, players try to win a spot in the top 10 list of players for an hour's tournament. In order to post a score in the hourly tournament, players enter a five-minute limited mini-tournament. Players do so at any time and instantly begin playing. When a player selects the pyramid tournament game button to join, they are grouped with other players that are also trying to post scores for the multiple levels of tournament prizes. In one embodiment, all of the other scores displayed are players that recently finished their play (making a new player always the last entry or nearly the last player into the tournament). This is called an instant-close tournament engine run by the tournament server.

In another embodiment, 10 spots of a mini-tournament are populated with players as they start in real time, which could leave some tournaments undecided until the needed number of players have entered. In one embodiment, this mini-tournament will have five to ten entrants, and the winner will receive a small award for his play. This prize is, by way of example only, and not by limitation, raffle tickets, cash card reimbursements for further game play, or other prizes. In one embodiment, there is no prize awarded apart from a satisfaction by the player that he is a winner. In addition, in one embodiment, all players entering the mini-tournament have the opportunity to have their score posted into their player level specific tournament leader board. Any player's score that is high enough to make the top ten list for his individual level has his score added to that list.

Once a new player that has been playing for the hourly tournament is in the top 10 when the tournament ends, he is advanced to the next level daily. The players with the highest score win the hourly progressive pot. In one embodiment, this pot is distributed amongst multiple players in the top 10 or given entirely to the highest player only. Once a player has advanced to the daily level he is now able to participate in the daily tournaments, and all of his scores post there and optionally (casino configurable) down to lower levels. In one embodiment, a player remains a daily level player for as long as he continues to post scores in daily tournaments at least once every 365 days (casino configurable). In one embodiment, the player need not win a daily tournament in that time frame. He just has to play a mini-tournament and post a score. Even a losing score would renew the 365-day expiration time limit. If he fails to do this, he would drop back one or more levels and have to win at the lower level again before playing in daily tournaments.

In one embodiment, there are multiple levels for the player to climb through to reach the monthly level. The winners of the monthly level tournaments are invited back for a special yearly tournament with a large grand prize. Players may advance or fall back tournament levels for any marketing or mathematical reason the casino desires.

In one embodiment, a player has the player's five-minute tournament score posted to the current level the player is at as well as any of the levels lower than the current level. This way, a player has a chance to still win the hourly, daily, weekly, and monthly prizes if the player is a yearly level player. In other words, a specific tournament score can post downward as well. In this embodiment, if a player wins a lower level tournament prize even though the player is a higher level player, the player does not advance levels. Other players in the lower level advance however. For example, and not by way of limitation; a level four player with a tournament score of 123,321 posts this score to level one, two and three, as well as level four (the current player level). If the player wins the level one (hourly) then the player can win the level one prize, but the player doesn't advance from level four to level five because the player did not post a level four tournament score high enough to advance yet, or the level four tournament has not concluded yet.

In one embodiment, when players advance from one level to the next, they do not pass their score into that new level. This forces the player to come back again to post a score at that level generating a repeat visit. This prevents a great tournament score in one lower level from winning all levels up from the player's current level.

In one embodiment, a player plays with an alias, for example BK1832 verses the player's username assigned to the player card or account. In one embodiment, this name is randomly chosen. Also, a city, state and casino name are shown on the tournament standings board to create an inter-location or state rivalry. From home, in one embodiment, players create a username/password/pin/alias to access account data including tournament information as well as play from home where allowed by law.

In one embodiment, funding for prizes of the hourly, daily, weekly, and monthly tournaments come from the games played on the additional user interface. A portion of each $0.01 played by a player on a system is distributed to the different prize pots or pools. In one embodiment, other casino promotional funding of the progressive pots occur.

In one embodiment, the casino is provided with several tools for configuring the pyramid tournament system. The casino is able to set up different levels of play, percentage of tournament entry fees that fund differing levels of tournaments; duration the player stays at a particular level before dropping down; the number of players that advance to the next level; the progressive increment rates for each level's progressive pots and contribution events; the length of time for the tournament; the minimum level of activity by the player; the minimum tournament score achieved at specific times to continue; and whether or not tournament scores post downward as well as to the player's current level.

Figure 37:
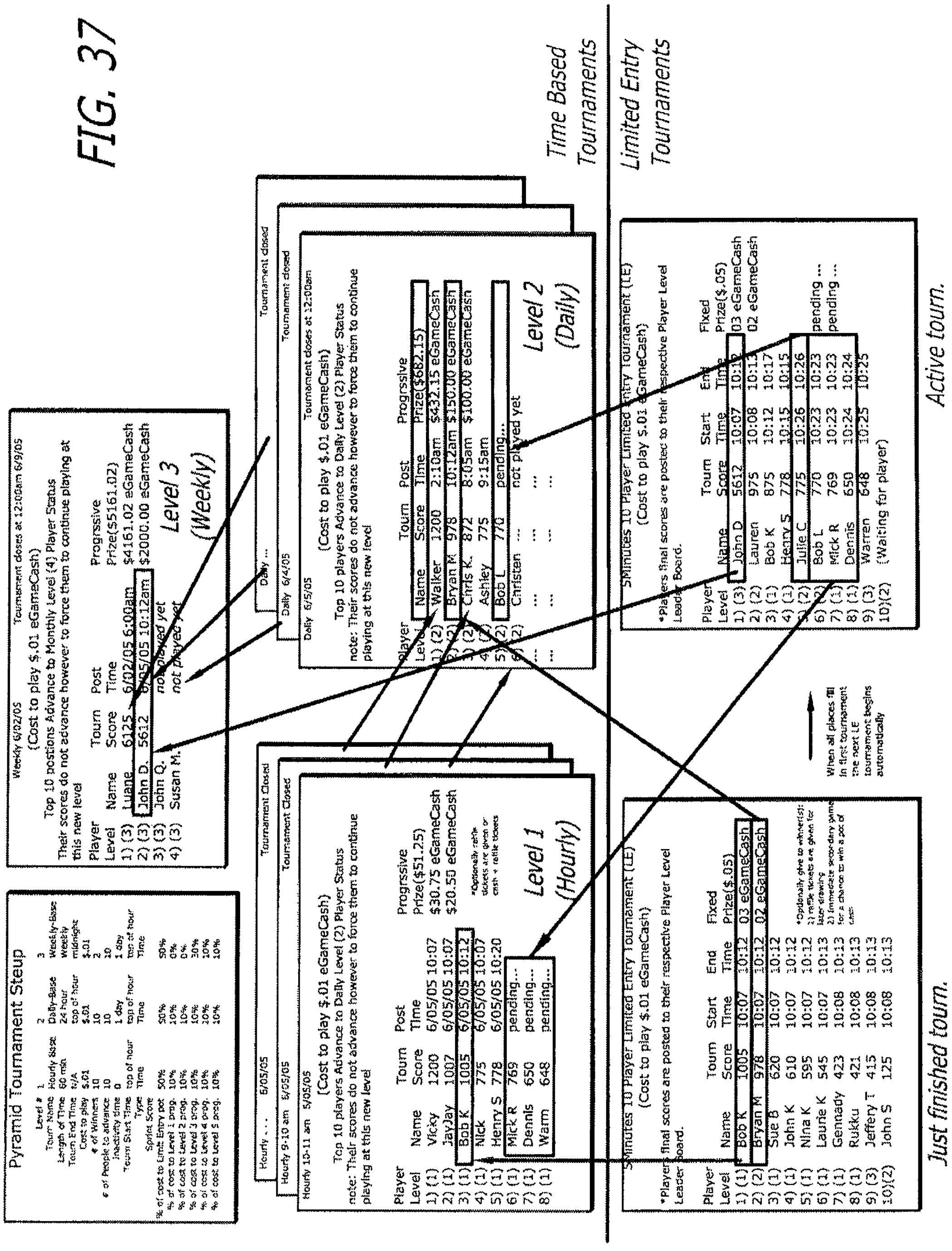
FIG. 37 is a block diagram illustrating a server side player level advancement process according to one embodiment.

With reference to FIG. 37, a block diagram illustrates a server 140 side player level advancement process. In one embodiment, players of different levels compete in limited entry five-minute base games tournaments for a prize. Each player's tournament score is posted to the level of progressive games that he is playing at the time for a chance to win at that prize level.

Figure 38A:
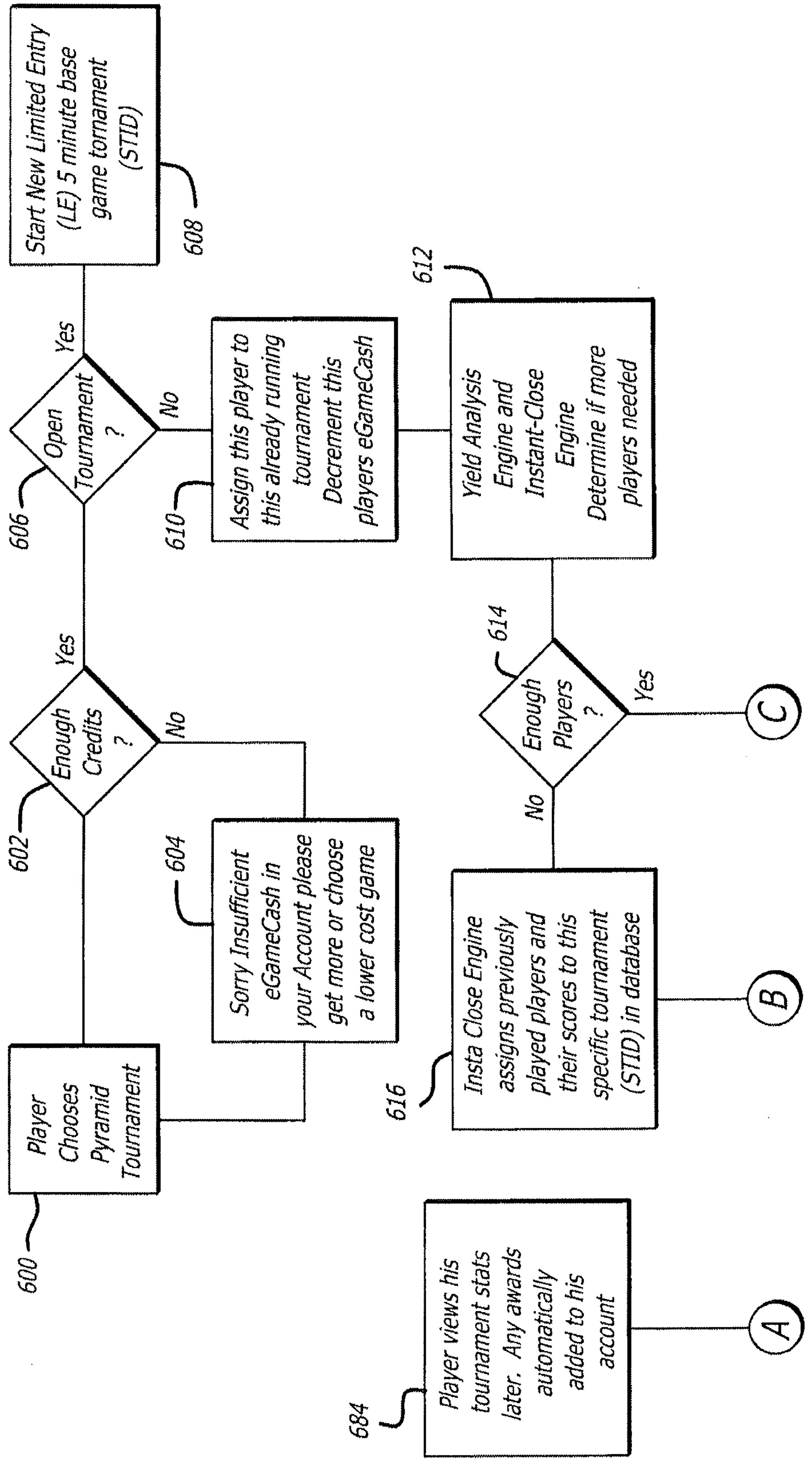
FIG. 38 is a flow diagram that illustrates the steps performed in the system to conduct a pyramid tournament according to one embodiment.
Figure 38B:
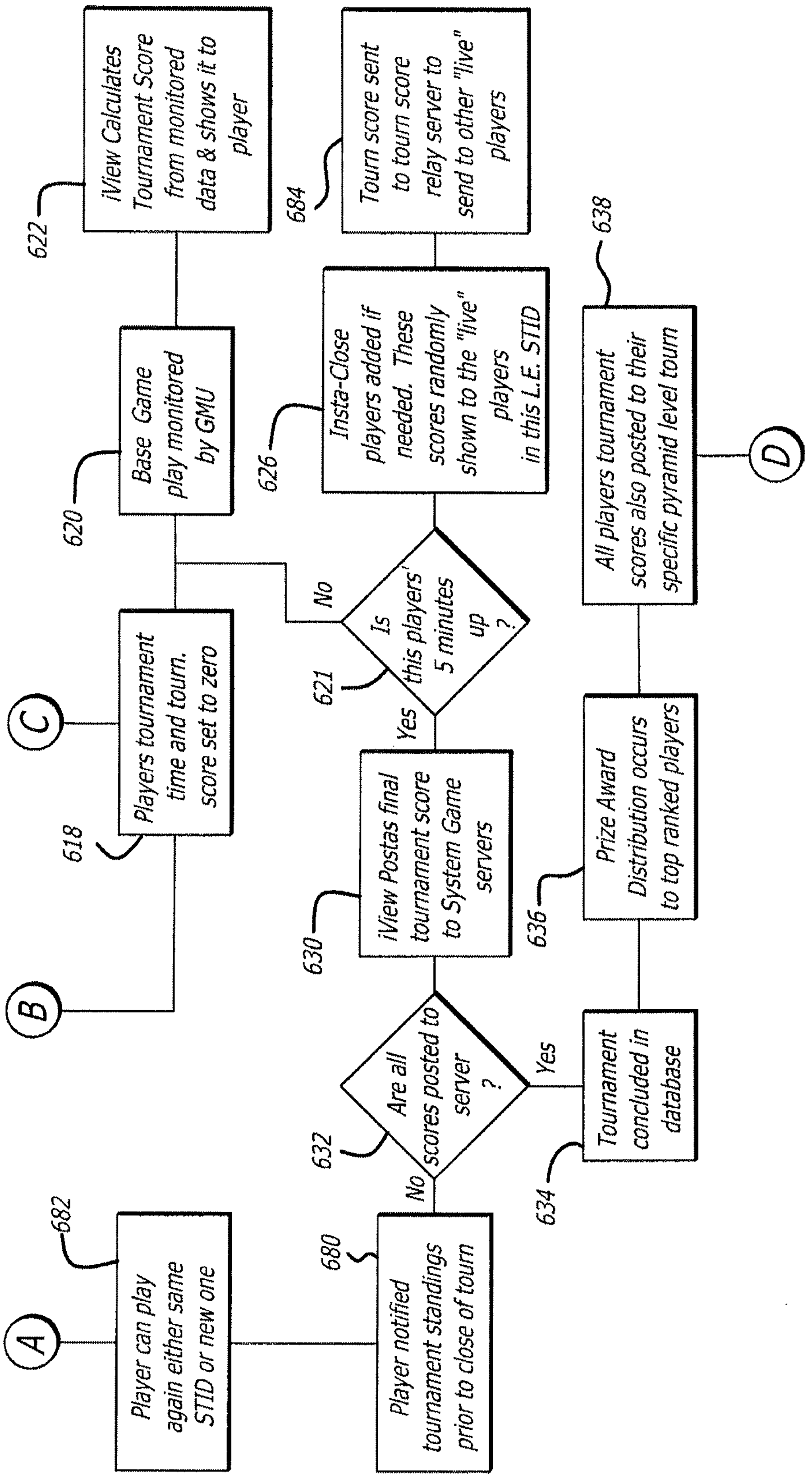
Figure 38C:
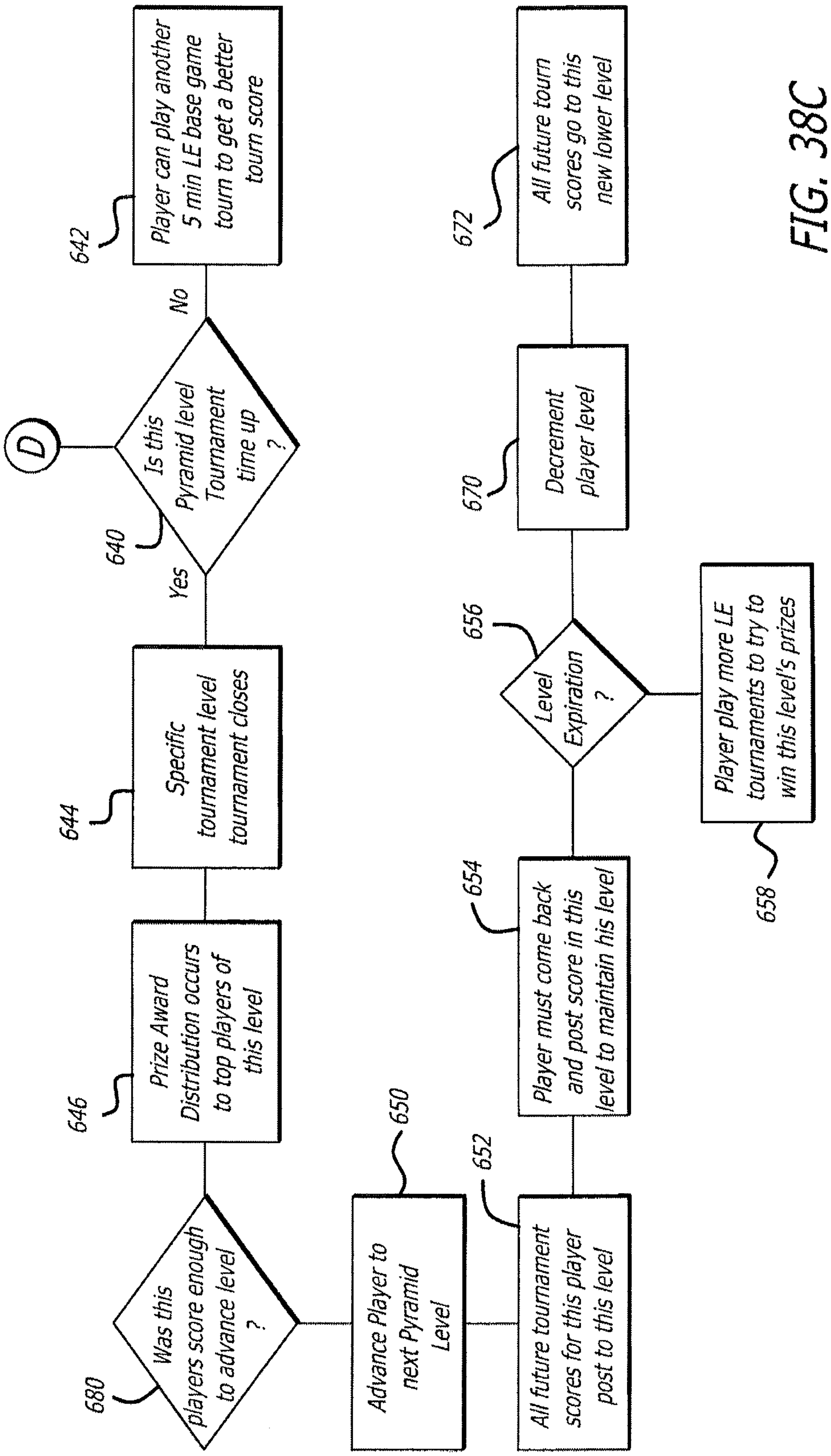

With reference to FIG. 38, a flow diagram illustrates the steps performed in the system to conduct the pyramid tournament according to one embodiment. At step 600, a player chooses to play a pyramid tournament. At step 602, the tournament server checks for whether the player has enough credits to play. If not, an "insufficient funds" message is displayed at step 604. Otherwise, in step 606, the player is provided the opportunity to open a new tournament. If the player chooses to do so, then a new limited entry tournament is opened, step 608. Otherwise, the player is assigned to a tournament that is already running, and his account is decremented, step 610. The tournament server determines if more players are needed for the tournament, step 612. If there are not enough players, step 614, then an instant-close-engine in the tournament server assigns simulated players to the tournament, as described below, step 616. The player's time in the tournament and score are set to 0, step 618. Base game play is monitored, step 620, and the score is calculated, step 622. The tournament score is sent to the relay server 142 for forwarding to other players, step 624. If needed, more simulated players are added, step 626, whose scores are shown to all the players along with the human players.

The system checks for whether the player's time in the tournament is up, step 628. If not, the play continues at step 620. If his time is up, the additional user interface posts his final score, step 630. The system checks for whether all scores have been posted, step 632. If so, then the tournament is concluded in the database 160, step 634. A prize award occurs to the top ranked players, step 636. All of the players' tournament scores are posted to their specific pyramid level, step 638.

The system next checks for whether the pyramid tournament time is up for the player's specific tournament level, step 640. If not, then the player can play another 5 minutes to attempt to achieve a better score, step 642. Otherwise, if the time for the specific tournament level is up, then the specific tournament level closes, step 644. A prize award distribution for the specific level occurs, step 646.

Next, in step 648, it is determined whether a player's score was good enough to advance the player to a new level in the pyramid. If so, the player is advanced to the next pyramid level, step 650, and all future scores for the player post at the new level, step 652. In one embodiment, the player is required to return and play at the new level periodically in order to maintain the level, step 654. The system checks for whether the level has expired for that player, step 656. If not, then the player continues to play at the new level, step 658. Otherwise, if the level did expire for the player due to the player's failure to periodically play the tournament, then the player is decremented a level, step 670.

With reference back to step 632, of all of the scores were not posted to the server for the tournament played by the player, the player is notified of tournament standings, step 680, and given the opportunity to play in the same or another tournament, step 682. Later, the player can again view his standings or statistics for the tournament, and any prizes are automatically awarded to the player's account after the tournament ends.

Instant Close Tournaments

In one embodiment, an instant close tournament engine (ICTE) allows for an immediate or near immediate conclusion of a tournament game for a specific player. In one embodiment, this embodiment is used with a limited entry tournament having a fixed number of players playing for a prize, but it can alternatively work on other types of tournaments. Normally when a player starts a limited entry tournament, the player can be anywhere from the first through last player to play up to the maximum allowed number of players for the specific tournament. The player does not necessarily know what number of player he is prior to starting the tournament. For example, when a player is joining a ten-player tournament, he is the first to ninth player to play, then the player normally must wait for the last player to post a score in this specific tournament. The time to complete a tournament is unknown by the first through ninth players. No one else may chose to play this specific tournament for another minute, an hour, a day or longer. This uncertainty to the conclusion of the tournament creates player dissatisfaction.

Figure 39:
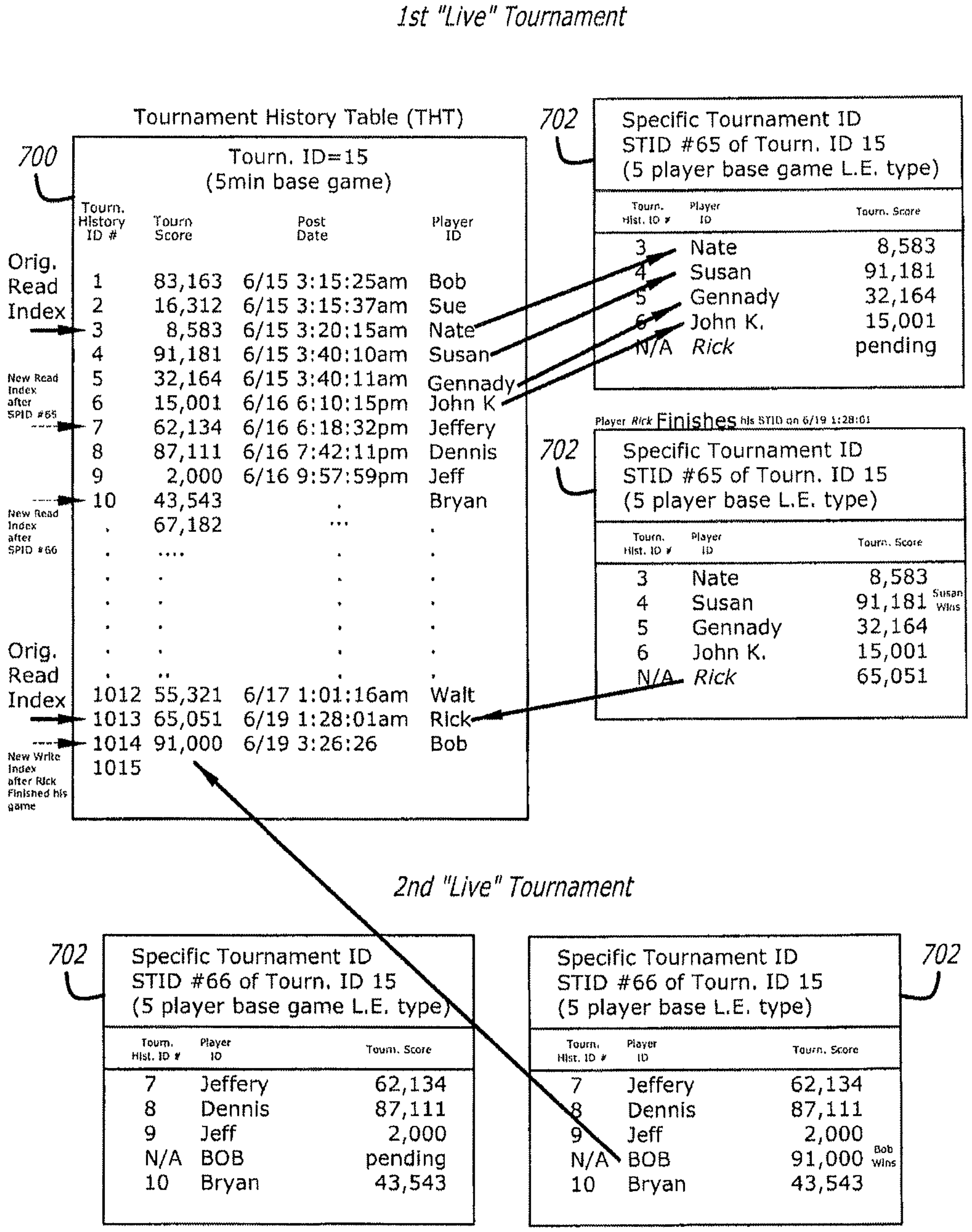
FIG. 39 is a block diagram that illustrates data flow in a method for providing an instant close tournament according to one embodiment.

With reference to FIG. 39, a block diagram illustrates data flow in a method for providing an instant close tournament according to one embodiment. The ICTE executes in the tournament server (140 in FIG. 1) and uses tournament scores posted by other tournament players at an earlier time to more quickly conclude the currently running tournament. In the ten-person limited entry example tournament discussed above, if the player is the tenth player, then the player's score is grouped by the tournament server 140 against nine other players who played previously. The tournament server dynamically groups the player's tournament score against others who are playing identical tournaments. The ICTE keeps track of all tournament scores posted for all tournament games 702 for each specific type of tournament ordered by date played in a tournament history table 700 in the database (160 of FIG. 1). These are the scores that are used by the ICTE to "fill out" the specific tournament to help end the tournament for the player who just started.

This filling out process can take many forms. In one embodiment, the ICTE pre-fills all tournament positions prior to the player seeing his score on the ranked list of tournament scores. This way, the player is always the last one to enter the limited entry tournament 702. Alternatively, in another embodiment, the ICTE fills out the specific tournament 702 randomly or in some order fashion to emulate many players simultaneously playing the specific tournament 702.

There is a scenario where there are so many limited entry tournaments 702 that are started that there are not enough prior tournament scores in the ICTE tournament history database table 700 to complete the newly started L.E. tournament. In one embodiment, the ICTE loops back around in the tournament history table 700 using an index pointer to keep track of tournament scores that are delivered from the ICTE engine to the next specific tournament 702.

In one example according to one embodiment, a player "Rick" starts a new tournament on the date 6/19 at 1:23:01. The casino floor is very light, and very few people are playing tournaments, so the tournament servers 140 or tournament engine pulls names from the tournament history table 700 to help "fill-out" Rick's tournament. The tournament engine uses a current read index associated with the tournament history table 700 and begins drawing names and scores out of the tournament history table 700 in order to assign them to the tournament 702 that Rick had started, as shown by the arrows in FIG. 7. Rick now has players to compare against his score. If during this time a “real” player chooses to play the same tournament as Rick, there will be one less “simulated” player and score to fully fill the tournament.

In one embodiment, the ICTE allows the player to design his own tournament 702. By way of example, and not by way of limitation, options for the player are: How many players he wants to compete against, how much the tournament costs, game specific settings, type of prizes, and the like. Game specific options, include, by way of example, and not by way of limitation, individual base game tournament time or the number of levels or rounds of the game.

In one embodiment, a player’s tournament score is grouped and ranked against other players that created similar tournaments 702. When a player who paid for the specific tournament 702 finishes the tournament 702, the score, time, and the player’s player identifier are inserted into the tournament history table 700. The player’s tournament score is also posted to his specific tournament record in the table 700. If the player wins his tournament, then the player is awarded any associated award. In one embodiment, players from which the ICTE drew scores from the tournament history table 700 do not win a prize even if their scores win the current tournament 702.

In one embodiment, the ICTE alternatively executes in the IVIEW interface 216. A list of recent scores and player names stored in the IVIEW interface 216 is used. In one embodiment, the names of players used by the ICTE are blocked and/or replaced with alternate names drawn from a list of names, or randomly chosen names. This is to prevent players from seeing the name of a friend or family member during the tournament. Scores and locations are used in one embodiment instead of names and scores.

In one embodiment, a player is shown an indicator on the IVIEW interface 216 that tells the approximate time left until the tournament concludes. In one embodiment, the display is calculated by the tournament servers 140 by analyzing the current closure rate of the tournaments 702. Various other data from a yield analysis or player marketing databases is used to approximate the time until each tournament 702 will close. This gives the player some guidance as to whether or not to wait to see the close of the tournament 702 or return at a later time. Also, the player can use this information to decide whether this is a tournament 702 the player would like to enter now or choose another that may close sooner. In one embodiment, each tournament 702 has an associated tournament velocity indicator to let the player choose an appropriate one for him.

Plasma Sign Messaging for Tournament Leaders

In one embodiment, there are at least four messages that are sent to a plasma display controller for a casino plasma display for a tournament. These messages allow the plasma signs to show tournament leaders, and prizes for the tournaments. Message protocols for display controllers or other servers are used as necessary for the particular casino’s requirements. The messages used in this embodiment are:

1) TournamentWinStartNoStopNeeded.xml;
2) TournamentWinStop.xml;
3) TournamentLeaderboardUpdate.xml; and
4) TournamentWinStart.xml.

In one embodiment, the TournamentWinStartNoStopNeeded.xml message has the following structure:

```
<?xml version=“1.0” encoding=“UTF-8”?>
<Signage xmlns:xsi=“http://www.w3.org/2001/XMLSchema-instance” xsi:noNamespaceSchemaLocation=“BGSSignMessage.xsd”
Checksum=“0000”>
  <Envelope>
    <Source MessageID=“151” Name=“Tournament Win” LocationID=“TOURN100”/>
    <TimeStamp SourceTimeUTC=“2005-04-21T16:18:00Z”/>
    <Delivery DeliveryReceipt=“false” SecureLog=“true”/>
  </Envelope>
  <Payload>
    <Target Name=“TOURN001WIN” Type=“OneShotTrigger”/>
    <Command Name=“Start” DataAction=“Overwrite”/>
    <Records FieldCount=“8”>
      <FieldDefs Name=“TournamentID” KeyField=“false” Type=“Text” MaxLen=“10” />
      <FieldDefs Name=“TournamentName” KeyField=“false” Type=“Text” MaxLen=“50”/>
      <FieldDefs Name=“CurrentPot” KeyField=“false” Type=“Text” MaxLen=“20”/>
      <FieldDefs Name=“TournamentClosingDateTime” KeyField=“false” Type=“Text” MaxLen=“20”/>
      <FieldDefs Name=“EntryNumber” KeyField=“true” Type=“Number” MaxLen=“4” DefaultVal=“0”/>
      <FieldDefs Name=“Name” KeyField=“false” Type=“Text” MaxLen=“10”/>
      <FieldDefs Name=“Score” KeyField=“false” Type=“Number” MaxLen=“9”/>
      <FieldDefs Name=“Win” KeyField=“false” Type=“Text” MaxLen=“20”/>
      <Record>
        <Field Name=“TournamentID” Value=“100”/>
        <Field Name=“TournamentName” Value=“Hourly Pyramid Tournament”/>
        <Field Name=“CurrentPot” Value=“150.50”/>
        <Field Name=“TournamentClosingDateTime” Value=“2005-09-21T16:00:00Z”/>
        <Field Name=“EntryNumber” Value=“1”/>
        <Field Name=“Name” Value=“Player1”/>
        <Field Name=“Score” Value=“235000”/>
        <Field Name=“Win” Value=“10,000”/>
      </Record>
    </Records>
  </Payload>
</Signage>
```

In one embodiment, the TournamentWinStop.xml message has the following structure:

```
<?xml version="1.0" encoding="UTF-8"?>
<Signage xmlns:xsi="http://www.w3.org/2001/XMLSchema-instance"
xsi:noNamespaceSchemaLocation="BGSSignMessage.xsd"
Checksum="0000">
  <Envelope>
    <Source MessageID="151" Name="Tournament Win"
    LocationID="TOURN100"/>
```

-continued

```
    <TimeStamp SourceTimeUTC="2005-04-21T16:18:00Z"/>
    <Delivery DeliveryReceipt="false" SecureLog="true"/>
  </Envelope>
  <Payload>
    <Target Name="TOURN001WWIN" Type="RecurringTrigger"/>
    <Command Name="Stop" DataAction="Overwrite"/>
  </Payload>
</Signage>
```

In one embodiment, the TournamentLeaderboardUpdate.xml message has the following structure:

```
<?xml version="1.0" encoding="UTF-8"?>
  <!-- edited with XMLSpy v2005 rel. 3 U (http://www.altova.com) by Ian P Finnimore
  (Bally Gaming + Systems) -->
  <Signage xmlns:xsi="http://www.w3.org/2001/XMLSchema-instance" xsi:noNamespaceSchemaLocation=
  "BGSSignMessage.xsd"
  Checksum="0000">
    <Envelope>
      <Source MessageID="150" Name="Tournament Leader Board Update" LocationID="TOURN100"/>
      <TimeStamp SourceTimeUTC="2005-04-21T16:18:00Z"/>
      <Delivery DeliveryReceipt="false" SecureLog="true"/>
    </Envelope>
    <Payload>
      <Target Name="TOURN001LEADER" Type="DataTable"/>
      <Command Name="Update" DataAction="Overwrite"/>
      <Records FieldCount="7">
        <FieldDefs Name="TournamentID" KeyField="false" Type="Text" MaxLen="10"/>
        <FieldDefs Name="TournamentName" KeyField="false" Type="Text" MaxLen="50"/>
        <FieldDefs Name="CurrentPot" KeyField="false" Type="Text" MaxLen="20"/>
        <FieldDefs Name="TournamentClosingDateTime" KeyField="false" Type="Text" MaxLen="20"/>
        <FieldDefs Name="EntryNumber" KeyField="true" Type="Number" MaxLen="4" DefaultVal="0"/>
        <FieldDefs Name="Name" KeyField="false" Type="Text" MaxLen="10"/>
        <FieldDefs Name="Score" KeyField="false" Type="Number" MaxLen="9"/>
        <Record>
          <Field Name="TournamentID" Value="100"/>
          <Field Name="TournamentName" Value="Hourly Pyramid Tournament"/>
          <Field Name="CurrentPot" Value="150.50"/>
          <Field Name="TournamentClosingDateTime" Value="2005-09-21T16:00:00Z"/>
          <Field Name="EntryNumber" Value="1"/>
          <Field Name="Name" Value="Player1">
          <Field Name="Score" Value="235000"/>
        </Record>
        <Record>
          <Field Name="TournamentID" Value="100"/>
          <Field Name="TournamentName" Value="Hourly Pyramid Tournament"/>
          <Field Name="CurrentPot" Value="150.50"/>
          <Field Name="TournamentClosingDateTime" Value="2005-09-21T16:00:00Z"/>
          <Field Name="EntryNumber" Value="2"/>
          <Field Name="Name" Value="Player2"/>
          <Field Name="Score" Value="205000"/>
        </Record>
        <Record>
          <Field Name="TournamentID" Value="100"/>
          <Field Name="TournamentName" Value="Hourly Pyramid Tournament"/>
          <Field Name="CurrentPot" Value="150.50"/>
          <Field Name="TournamentClosingDateTime" Value="2005-09-21T16:00:00Z"/>
          <Field Name="EntryNumber" Value="3"/>
          <Field Name="Name" Value="Player3"/>
          <Field Name="Score" Value="185000"/>
        </Record>
        <Record>
          <Field Name="TournamentID" Value="100"/>
          <Field Name="TournamentName" Value="Hourly Pyramid Tournament"/>
          <Field Name="CurrentPot" Value="150.50"/>
          <Field Name="TournamentClosingDateTime" Value="2005-09-21T16:00:00Z"/>
          <Field Name="EntryNumber" Value="4"/>
          <Field Name="Name" Value="Player4"/>
          <Field Name="Score" Value="125000"/>
        </Record>
        <Record>
          <Field Name="TournamentID" Value="100"/>
          <Field Name="TournamentName" Value="Hourly Pyramid Tournament"/>
          <Field Name="CurrentPot" Value="150.50"/>
          <Field Name="TournamentClosingDateTime" Value="2005-09-21T16:00:00Z"/>
          <Field Name="EntryNumber" Value="5"/>
          <Field Name="Name" Value="Player5"/>
```

-continued

```
      <Field Name="Score" Value="108000"/>
    </Record>
  </Records>
 </Payload>
</Signage>
```

In one embodiment, the TournamentWinStart.xml message has the following structure:

```
<?xml version="1.0" encoding="UTF-8"?>
<Signage xmlns:xsi="http://www.w3.org/2001/XMLSchema-instance"
xsi:noNamespaceSchemaLocation="BGSSignMessage.xsd"
Checksum="0000">
 <Envelope>
  <Source MessageID="151" Name="Tournament Win"
  LocationID="TOURN100"/>
  <TimeStamp SourceTimeUTC="2005-04-21T16:18:00Z"/>
  <Delivery DeliveryReceipt="false" SecureLog="true"/>
 </Envelope>
 <Payload>
  <Target Name="TOURN001WWIN" Type="RecurringTrigger"/>
  <Command Name="Start" DataAction="Overwrite"/>
  <Records FieldCount="8">
   <FieldDefs Name="TournamentID" KeyField="false"
   Type="Text" MaxLen="10" />
   <FieldDefs Name="TournamentName" KeyField="false"
   Type="Text" MaxLen="50"/>
   <FieldDefs Name="CurrentPot" KeyField="false"
   Type="Text" MaxLen="20"/>
   <FieldDefs Name="TournamentClosingDateTime"
   KeyField="false"
   Type="Text" MaxLen="20"/>
   <FieldDefs Name="EntryNumber" KeyField="true"
   Type="Number" MaxLen="4" DefaultVal="0"/>
   <FieldDefs Name="Name" KeyField="false" Type="Text"
   MaxLen="10"/>
   <FieldDefs Name="Score" KeyField="false" Type="Number"
   MaxLen="9"/>
   <FieldDefs Name="Win" KeyField="false" Type="Text"
   MaxLen="20"/>
   <Record>
    <Field Name="TournamentID" Value="100"/>
    <Field Name="TournamentName" Value="Hourly Pyramid
    Tournament"/>
    <Field Name="CurrentPot" Value="150.50"/>
    <Field Name="TournamentClosingDateTime"
    Value="2005-09-21T16:00:00Z"/>
    <Field Name="EntryNumber" Value="1"/>
    <Field Name="Name" Value="Player1"/>
    <Field Name="Score" Value="235000"/>
    <Field Name="Win" Value="10,000"/>
   </Record>
  </Records>
 </Payload>
</Signage>
```

Raffle Games

In a preferred embodiment, eGameCash is used to purchase Raffle tickets, and for the specific implementation of picking a winner without using a random number generator. Notably, there are several different Raffle types, non-limiting examples of which are described below. First, in a Limited Entry Raffle, only a set number of raffle tickets are "sold." Once all of the tickets are sold, the raffle is begun. In this scenario, there can be a single winner or multiple winners. Advantages of the Limited Entry Raffle include the ability to have huge prizes with no risk on the part of the casino. Additionally, the Limited Entry Raffle enables the ability to have many levels of raffles (e.g., smaller pots that would end quicker). This would allow players to play some games, earn eGames or eGameCash, enter raffles, and view the results in a single day or even in several hours.

Next, in a Progressive Timed Raffle, the raffle is seeded with a small to medium amount of money and some additional money is added for each ticket purchased. At a set time, the raffle is held and a winner(s) are decided. The advantage of a Progressive Timed Raffle is that the progressive pots can get very big and cause a frenzy of play. Raffles can have multiple different progressives running so that some end hourly, daily, weekly, and the like. This enables players to have at least some of the raffles end during their trip.

A Limited Entry Prize Raffle uses the same mechanism as a Limited Entry Raffle except a prize, or prizes, are awarded instead of cash. The prizes can range from small values ($50-$100) to very large. Yet another type of raffle is a Progressive Timed Prize Raffle. An example of a Progressive Timed Prize Raffle is progressive poker. The players enter the timed raffle and as more players enter, the prize gets bigger and possibly more prizes are added.

Finally, yet another type of raffle included herein is a Progressive Raffle with a Guaranteed Payout Amount. This type of raffle has a known upper limit. In one non-limiting example, the raffle drawing starts sometime after a lower limit and before it reaches the maximum value (e.g., a maximum value of $150,000 and a minimum value (not disclosed to players) of $100,000). The actual value that the drawing would occur at would be pre-selected and when enough tickets are bought to push the progressive past that point the drawing would be held. The drawing value could be preset by human or pre-selected in a non-random way by the server, and thus, hidden from human knowledge.

Notably, one overall advantage of raffles is that the number of tickets does not matter. If the tickets cost one unit of eGameCash each, then there can be a tournament with 10 players that awards 15 tickets instead of 10 tickets, but only increases the progressive as if 10 tickets had been purchased.

Acquiring Raffle tickets

For each raffle, there are several different ways that a player can purchase raffle tickets. After the player selects the raffle they want to enter they can choose from the possible ways to get tickets. These include a Straight Purchase or a Ticket Tourney. In a straight purchase, players select home tickets they want to buy and exchange eGameCash for the tickets. In a ticket tourney, the players pay the cost of one ticket for the raffle they want to enter. The players then play a base game tournament. The winner (or alternatively the first and second winners) wins all of the raffle tickets and possibly more than the 10 deposited by the players.

Determining a Winner

In another aspect of a preferred embodiment, Raffle tickets are coded to include identifying information. Specifically, as players purchase or win Raffle tickets, the tickets are added to a table for the specific raffle. In one non-limiting example, each ticket has two pieces of information associated with it: a raffle ticket number and a player identifier for the player that owns this ticket. The raffle ticket numbers need not be unique. In one embodiment, the raffle ticket number is a timestamp based on the time the player purchased or won the ticket.

In one preferred embodiment, a winner of a raffle is identified without a random number generator. One non-limiting example of a systematic method for determining a winner of a raffle without using a random number generator is shown below. This technique is likely to limit the need to have software certified by regulatory agencies because the winner is chosen by certifiable code that is already in the casinos, namely the base game software.

1) Provide a list of raffle tickets (e.g., 1000)
2) At a point when the raffle is ready to be awarded, a timestamp is taken from the server and the number of raffle tickets are modified (e.g., add one so it is a number between one and the number of tickets). This provides a starting point in the list of tickets.
3) Utilize an array of steps. In one non-limiting example, the mathematical constant pi is used (i.e., 3.1415962 . . . ). Preferably, the array would have fifty or sixty numbers in it. In one embodiment, the starting place in this array is selected using the same method as is used to select the starting place in the ticket list.
4) From the starting point in the list of tickets, step down (looping to the top when we reach the bottom of the list) by the first number in the STEPARRAY. That ticket is now declared a losing ticket. Next, step down by the second number in the STEPARRAY and declare that ticket a losing ticket. When stepping, only count tickets that are still winning tickets. Tickets that are losing tickets already do not count as steps. Each time a ticket is marked as a losing ticket, a count is kept until the count equals the list length (i.e., the total winning positions available).
5) When the end of the STEPARRAY is reached, loop back to the beginning and continue.
6) When there are the same number of winning positions remaining in the list as there are winning prizes, continue at that same point but begin to award the prizes to the remaining tickets from littlest prizes to grand prize.

Alternate formulae may be used to determine a Raffle winner using the base game monitored variables combined in various ways. Similar math techniques like those used with the base game tournaments can also be used to calculate a winner.

In still another preferred embodiment, a winner of a raffle is identified with a random number generator. Specifically, in this winner selection technique, the winner is selected by having the database system randomly pull one or more raffle ticket numbers from the specific raffle and then award the prize to the specific player(s) mentioned on the ticket.

Raffle tickets can be purchased by groups of players as well. In one example, a player decides which group to enter when purchasing tickets, or the player may automatically be assigned a group by the casino. If a winning ticket(s) is drawn from one group then the entire group would split the prize either evenly or weighted to the amount of tickets each person had in the raffle at the ticket draw time. If there are a finite number of prizes, (e.g., show tickets) then the prizes are given to the people who entered the most tickets in the group that won. If the raffle prize is evenly divisible (i.e., cash) then the prize is split between the players using whatever split rules the casino desires.

IVIEW Interface System Gaming Platform

Figure 40:
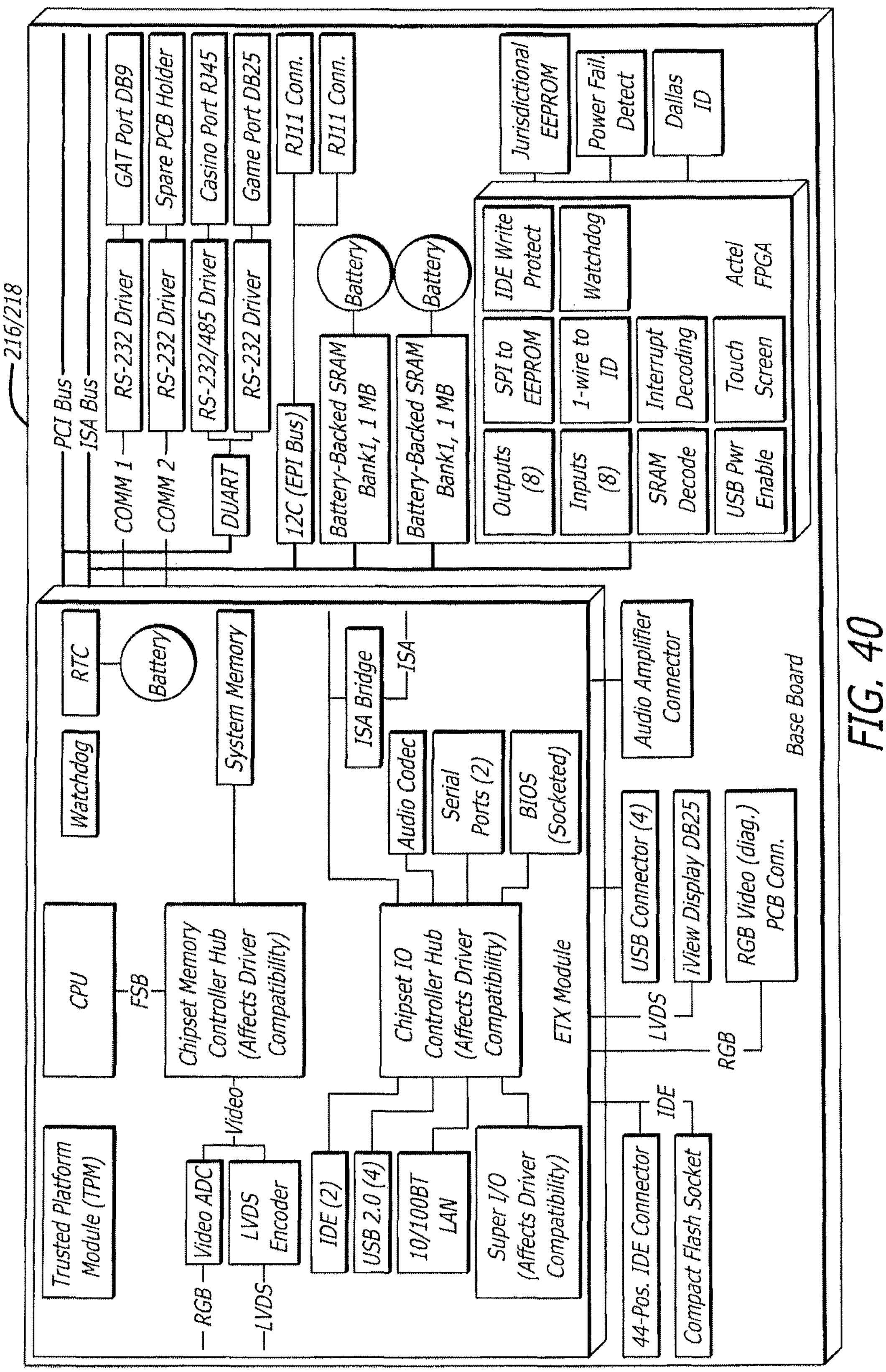
FIG. 40 is a block diagram illustrating components of a circuit board containing a unified additional user interface and game monitoring unit for a gaming machine according to one embodiment.

With reference to FIG. 40, a block diagram illustrating components of a circuit board containing a unified IVIEW interface 216 and GMU (or player tracking user interface), according to one embodiment, is shown. The board of this embodiment has all of the hardware features to function as an electronic gaming device. In one embodiment, an external pointer/navigation device and/or pin pad is used in lieu of a touch screen input device.

In one embodiment, a trusted platform module (TPM) 4002 is used as an extra security chip based on industry standards, which enables users to store digital signatures, passwords, software authentications and encryption data in one secure repository. Endorsed by the Trusted Computing Group standards organization, the TPM 4002 provides businesses with protection for sensitive information. The TPM 4002 ensures that the gaming software has not been tampered with. An advantage of this is that gaming outcomes can be determined on IVIEW interface 216, or other client device using a TPM 4002, to reduce the load on system gaming servers 140. This means a random number generator (RNG) can reside on the IVIEW interface 216 verses the servers.

Figure 41:
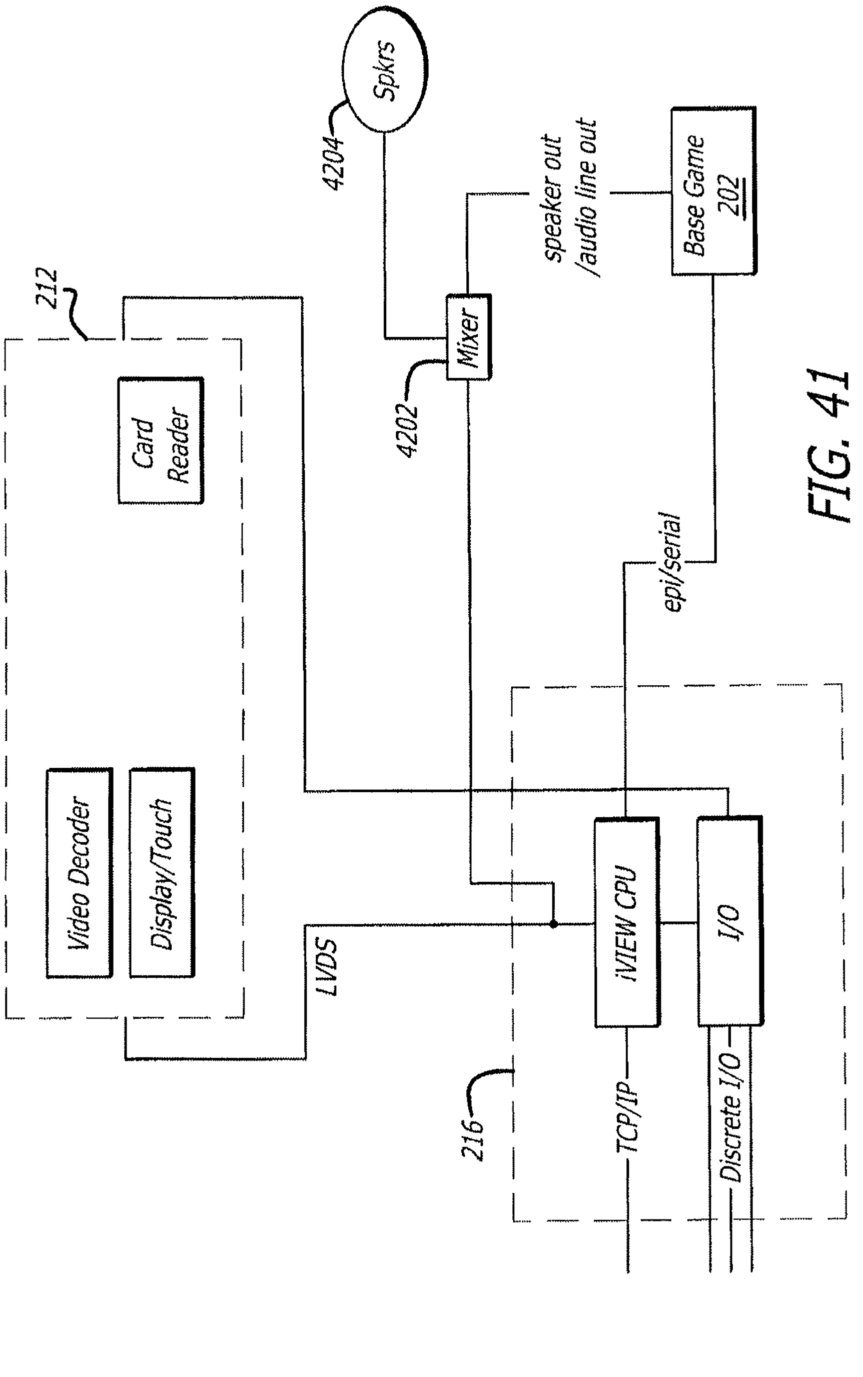
FIG. 41 is a block diagram that illustrates components of one embodiment of an additional user interface with game management unit functions merged into the additional user interface.

With reference to FIG. 41, a block diagram illustrates components of one embodiment of an IVIEW interface 216 with GMU functions merged into IVIEW interface 216, thereby obviating the need for a separate GMU 218. In one embodiment, Ethernet-IP based card reader 212 can be used in lieu of serial or USB card reader 212. In one embodiment, the card reader 212 can be a magnetic strip or smart card type. In one embodiment, a sound mixer 4202 is included to mix sound signals from both the IVIEW interface 216 and the base game 202 for a set of speakers 4204. In an alternative embodiment, the sound mixer 4202 is not needed if the IVIEW interface 216 has its own speakers.

Figure 42:
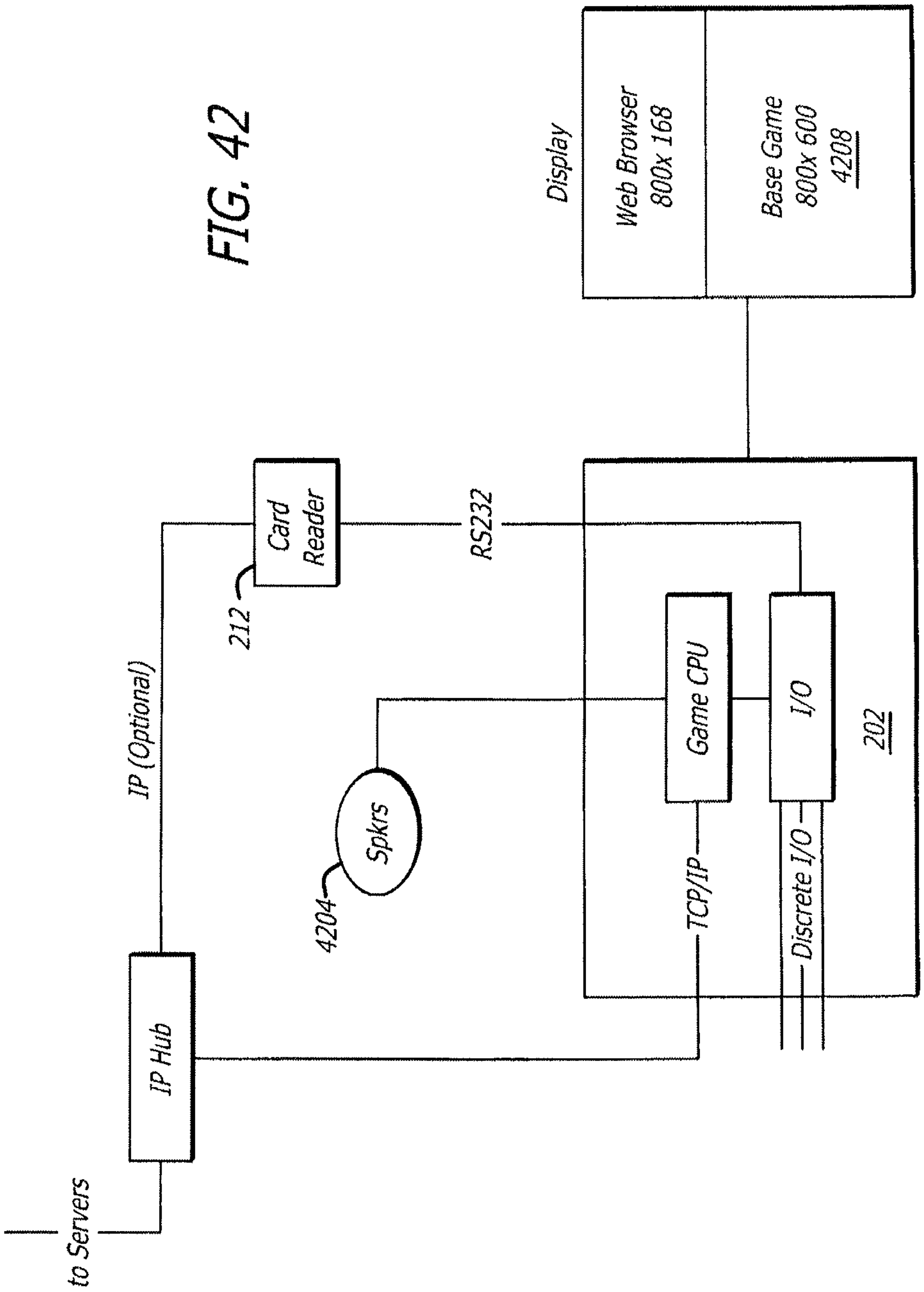
FIG. 42 is a block diagram that illustrates components of a base game according to one embodiment.

With reference to FIG. 42, a block diagram illustrates components of a base game 202 according to another embodiment in which the base game 202 includes functionality of both the IVIEW interface 216 and the GMU 218, thereby obviating the need for a separate IVIEW interface 216 and GMU 218. A combination base game display and web protocol browser 4208 is included in order to display both base game 202 play, and system game play (in the browser portion).

Figure 43:
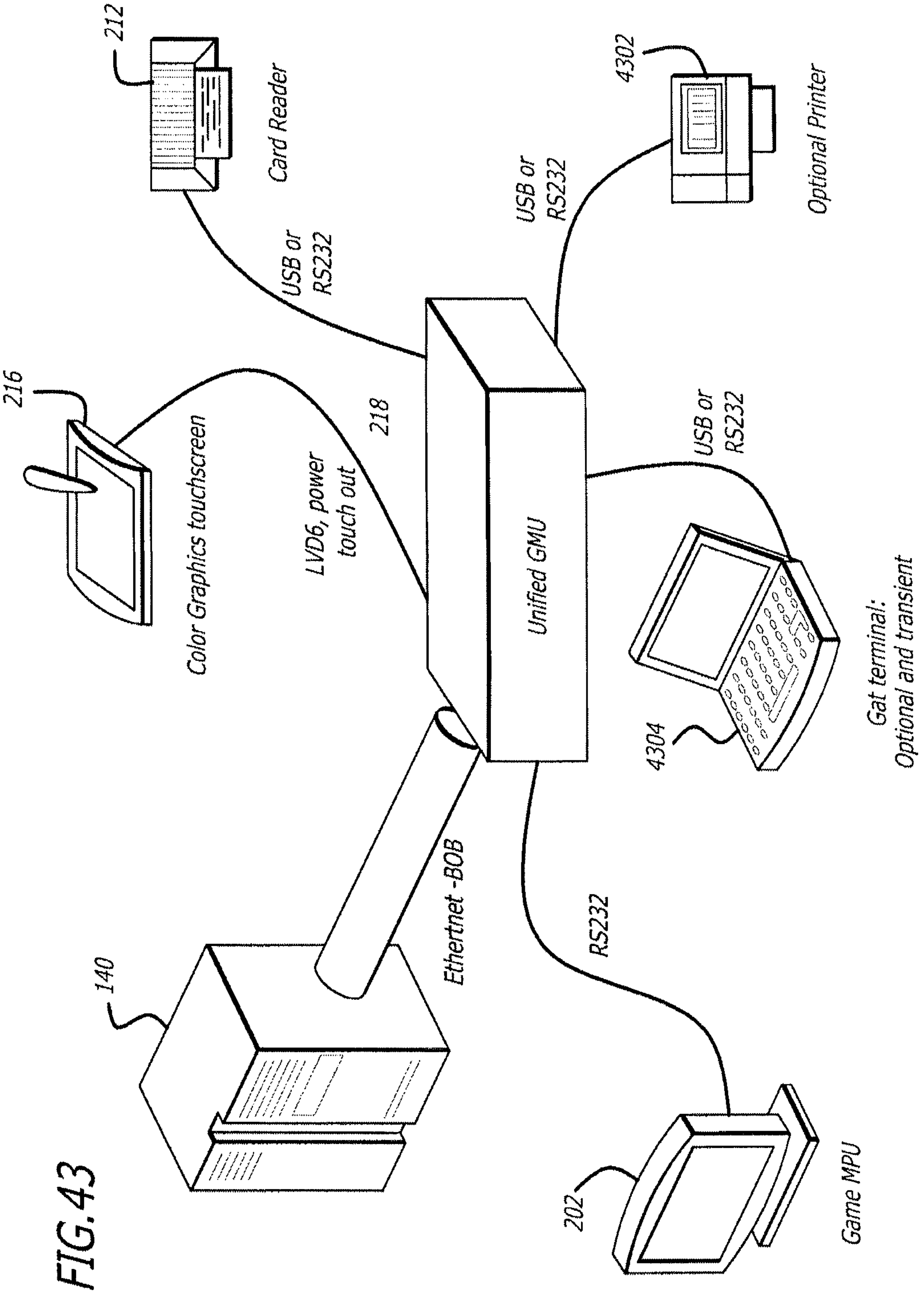
FIG. 43 is a block diagram that illustrates components of a client gaming system according to one embodiment.

With reference to FIG. 43, a block diagram illustrates components of a client system that is GMU 218 based. All functions of the client system are centered around the GMU 218 which functions as a hub for the components of the client system. The base game 202, IVIEW interface 216, card reader 212, and the like, are controlled by the GMU 218 to which these components connect directly. An Ethernet connection connects directly to the system gaming server 140. A printer 4302 is further included to print tickets, vouchers, and the like. Further, in one embodiment, a game administration computer or terminal 4304 is directly connectable to the GMU 218, by way of example, and not by way of limitation, a serial or USB connection.

Table 13, by way of example, and not by way of limitation, lists some messages that are exchanged between the IVIEW interface 216 and system gaming server 140 according to one embodiment.

TABLE 13

Sample Messages Exchanged Between The IVIEW Interface And System Gaming Servers

| Ver | Name | Purpose | Parameters | Return |
|---|---|---|---|---|
| 1.0<br>2.0 | SGS_PlayerCardInserted | Checks to see if player has won any tournaments and has any eGameCash. Returns Player Id, | PlayerCardId | HasCash<br>PlayerNickname<br>Pid |

TABLE 13-continued

Sample Messages Exchanged Between The IVIEW Interface And System Gaming Servers

| Ver | Name | Purpose | Parameters | Return |
|---|---|---|---|---|
| | | Level Id, Tournament Id, Scheduled Tournament Id. EGameCredits are moved to the IVIEW. | | LevelId<br>Tid<br>STId<br>eGameCredits<br>Status Code |
| 1.0<br>2.0 | SGS_PlayerCardRemoved | EGameCredits are added back to the player account | PlayerCardId<br>EGameCredits | Status Code |
| XX | SGS_GameOver | Returns player score and amount of eGameCash played. Tournaments are funded from eGameCash played. | PlayerCardId<br>GameId<br>PlayerScore<br>Amount Played | HasCash<br>Status Code |
| 1.0 | SGS_eGameCashOut | Allow player to cashout his eGameCash. EGameCash will be transferred to the Base Game. Note, only the eGameCash won from tournaments will be sent. EGameCash on the IVIEW will remain. | PlayerCardId | Server Amount |
| 1.0<br>2.0 | SGS_Init | Casino Console should try to connect to the Game Server on startup and returns initialization settings | | Status Code |
| 2.0 | SGS_RegisterGMU | Once a connection is established with the GMU, GMU registration data is sent to the Game Server | Casino Id<br>Game Serial #<br>Game Id<br>Pay Table Id<br>Base %<br>GMU Time<br>GMU Id | Site Id<br>Status Code |
| 2.0 | SGS_PlayerLogin | Player Tracking card is inserted. Returns player specific settings. Url to show the player his available games to play. Url to show player his results. | Player Card Number | Player Id<br>Player Status<br>eGameCredits<br>Game Results url<br>Games url |
| 2.0 | SGS_PlayerAuthentication | Player keys in his pin number. The player needs to authorize to play a System Game. | Player Id<br>Player Pin number | Status Code |
| 2.0 | SGS_LoadGame | Game to load, get its settings, pay table, denoms available. | Site Id<br>Game Id<br>Player Id | Pay Table<br>Denom Table<br>Max Bet Table<br>Game Settings |
| 2.0 | SGS_BaseGmAmountPlayed | Once the Base Game Handle breaks the threshold, handle amount is sent. Player eGameCash is returned. | Player Id<br>Amount played | Player<br>eGameCash<br>Status Code |
| 1.0<br>2.0 | SGS_BeginGame | System Game is to begin. | Site Id<br>Game Id<br>Player Id<br>Tournament Id<br>Tournament Type Id<br>eGameCredits<br>Played<br>Denom Played<br>STId | History Id<br>eGameCredits<br>Used<br>STId |
| 1.0<br>2.0 | SGS_EndGame | Game has finished so report score. | Score<br>HistoryId<br>Site Id<br>Game Id<br>Player Id<br>Scheduled Tourn Id<br>?Amount Won? | url for show results<br>Player buckets |
| 2.0 | SGS_XFromEGameCredits | Convert eGameCredits to eCash or cash. | | |
| 2.0 | SGS_XToEGameCredits | Convert eCash or cash to eGameCredits. | | |
| 2.0 | SGS_GetGameSettings | This method allows any game played to get specific configuration data from the server prior or during play. | Site Id<br>IVIEWID,<br>Game Id,<br>Mode Id,<br>Player Id | XML string of all game specific configuration data for the particular chosen game. |
| 1.0 | CM_SaveGameState | Allows game to save state | Any string | |
| 1.0 | CM_RestoreGameState | Allows game to restore a saved game state | GameID | Saved string |

TABLE 13-continued

| Sample Messages Exchanged Between The IVIEW Interface And System Gaming Servers | | | | |
|---|---|---|---|---|
| Ver | Name | Purpose | Parameters | Return |
| 1.0 | CM_Message | Message Event<br>CMGDKGameMessages:<br>(messages from game)<br>GetSystemSettings,<br>GetGameSettings,<br>GetPayTable,<br>GameBegin,<br>GameEnd,<br>ShowResults,<br>MenuPressed<br>GetGameOutcome ( );<br>GetRandom ( )<br>CMGDKSystemMessages<br>(messages to Game)<br>PrimaryGameStart,<br>PrimaryGameEnd,<br>GameBeginResponse,<br>GameEndResponse,<br>BalanceUpdate,<br>TakeScore,<br>Load,<br>Show,<br>Hide,<br>Exit,<br>Pause,<br>GetGameSettingsResponse,<br>GetSystemSettingsResponse,<br>GetPayTableResponse, | | |
| 1.0 | CM_MessageHandler | Message delegate. | | |
| 1.0 | CM_GetProperty | Retrieves a property | String property tag | |
| 2.0 | | | | |

Player Login

In one embodiment, complete user registration occurs at the IVIEW interface 216, a web portal, kiosk, casino registration desk, electronic transfer from third party authorized sites. The PIN and/or username and password are created at this time to authorize transactions to the player's account. In one embodiment, player demographic information is collected at registration time to help target the player with advertisements, mailings, game recommendations, promotions, and the like.

As discussed above, playing system games can be for registered or unregistered players (carded and uncarded, or players with or without usernames/passwords). In one embodiment, uncarded or unregistered players have fewer features available to them. For example, and not by way of limitation, the player is able to accrue eGameCash on the IVIEW interface 218, but is not able to save the earned eGameCash to an account for later access unless an account is created at the IVIEW interface 218 device. In another embodiment, a ticket can be printed with temporary account information to allow the uncarded player to save earned eGameCash, cash winnings, and a game state regarding a game the player was playing. In one embodiment, any account meters for uncarded players are able to play subsequent players whether carded or not. In yet another embodiment, the uncarded player's account meters are automatically decremented to zero after a period of time of inactivity by a user, or base game cash out. In another embodiment, the uncarded player's account meters can be given to carded players in the form of eGameCash as described herein with respect to the eGameCash accrual engine.

A player can login into the system gaming server 140 in several ways. In one embodiment, access is prohibited to certain activities unless the proper player can be authenticated so the player's gaming activity can be tracked. In one embodiment, the login process requires something the player has in his possession and something he knows. In one embodiment, the player is able to browse the games and rules without a player card inserted as an inducement to become a carded player by seeing the exciting gaming products available. Some system games are playable by registered players, but games that award their prizes at a later date are blocked for unregistered players according to one embodiment (e.g., tournaments, raffles, and sweepstakes). This is because winnings in this embodiment are awarded to a specific player or player's accounts, and these accounts do not exist for unregistered players.

In one embodiment, when a carded or registered player wants to play, the player is asked to insert their magnetic card or smart card into the card reader 212. After successful PIN entry, or biometric entry, the player is authorized against casino market place and system gaming servers 140 and 180, and if the account is valid, the player is authorized to begin playing at the system gaming site. Inactive accounts are terminated by the casino after some period of time in one embodiment. In one embodiment, accounts are put on hold until the user consults with an attendant or customer service agent as an aide in getting players attention and action regarding some issue. Players can also enter a username or alias and password by which to gain access without the magnetic card or smart card. In one embodiment, biometric devices are used in combination with a username and/or password to gain access to a player account at an IVIEW interface 216 or other system gaming client devices, or web portals.

In one embodiment, temporary cards are freely given to uncarded players for the player to accrue eGameCash and bonus points, even though the player has not gone through the registration process at a web portal or registration desk. In one embodiment, a player is asked to enter a PIN or password at card insertion time, or prior to system game play. In one embodiment, the unregistered players are not able to cash out any system game winnings until a full registration takes place. This rule is casino configurable. These temporary accounts accrue eGameCash to play system games. In one embodiment, a player is able to cash-out their winnings with temporary cards if the system allows. Cash-outs can transfer credits to the base game and/or special tickets can be printed describing the cash or prize ticket. In one embodiment, the printing of tickets is supported by system printers attached to the GMU 218, or printers attached to the base game 202. The SAS 6.0 or BOB Protocol support printing cash vouchers to enable print outs that do not originate from the base game 202 themselves.

In one embodiment, temporary accounts can be given to a player by the use of a ticket that is printed with a code number that references a specific unnamed account in the system gaming server 140. This ticket is reinserted into bill acceptors on the gaming devices 200, scanned with an optical scanner at gaming device 200, or manually entered into the IVIEW interface 218 to gain access to this account.

Several different methods can be used to allow an uncarded casino player account-based access to system gaming features. Current systems typically require each player to have an account on the system for players to take advantage of club membership. This account is used for individual identification and accrual of points, awards, or other incentive or loyalty program items.

There is difficulty in offering these programs to players who have not been registered or enrolled in these programs prior to their playing slots. In one embodiment, the system detects the uncarded player who has been given a temporary account, identification number, and instrument for notifying the system of their presence at a game machine 200.

In one embodiment, the uncarded player is asked by the IVIEW 216 if they would like to play these system games and if they are willing to have a temporary account created for them. Upon acceptance, the system uses a ticket printer to print a bar-coded ticket having an identifier denoting the ticket as a player ID ticket (and not a ticket redeemable for cash), along with the player's newly generated ID number.

The player can then identify themselves by inserting this ID ticket into a slot's bar-code enabled bill acceptor which will notify the slot system of the player being present at the game (via the player ID on the ticket bar-code). At this point, the system may reject the ticket from the bill acceptor for the player to reuse at another gaming machine 200. In this case, the player's session is closed based on either a lack of play on the gaming machine 200 for a predetermined period, or, the player can close the session by pressing a button on the IVIEW interface 218.

In one embodiment, the ticket is stacked in the bill acceptor stacker and a copy is printed by a game ticket printer at the time the player wishes to leave the game (as signaled by their pressing a button on the IVIEW interface 218). One additional feature in this embodiment is that a message is sent to an employee notification system (i.e., slot host pager), telling the host to retrieve the automatically printed magnetic strip card (magcard) from the promotions booth to give to the player at the requested slot for a more convenient identification method. In this embodiment, the player may still use their printed ticket while waiting. Alternatively, the player is instructed on where to pick-up their automatically generated magcard. In one embodiment, the player is also given a password or PIN for use at a kiosk used for printing magcards.

Figure 44:
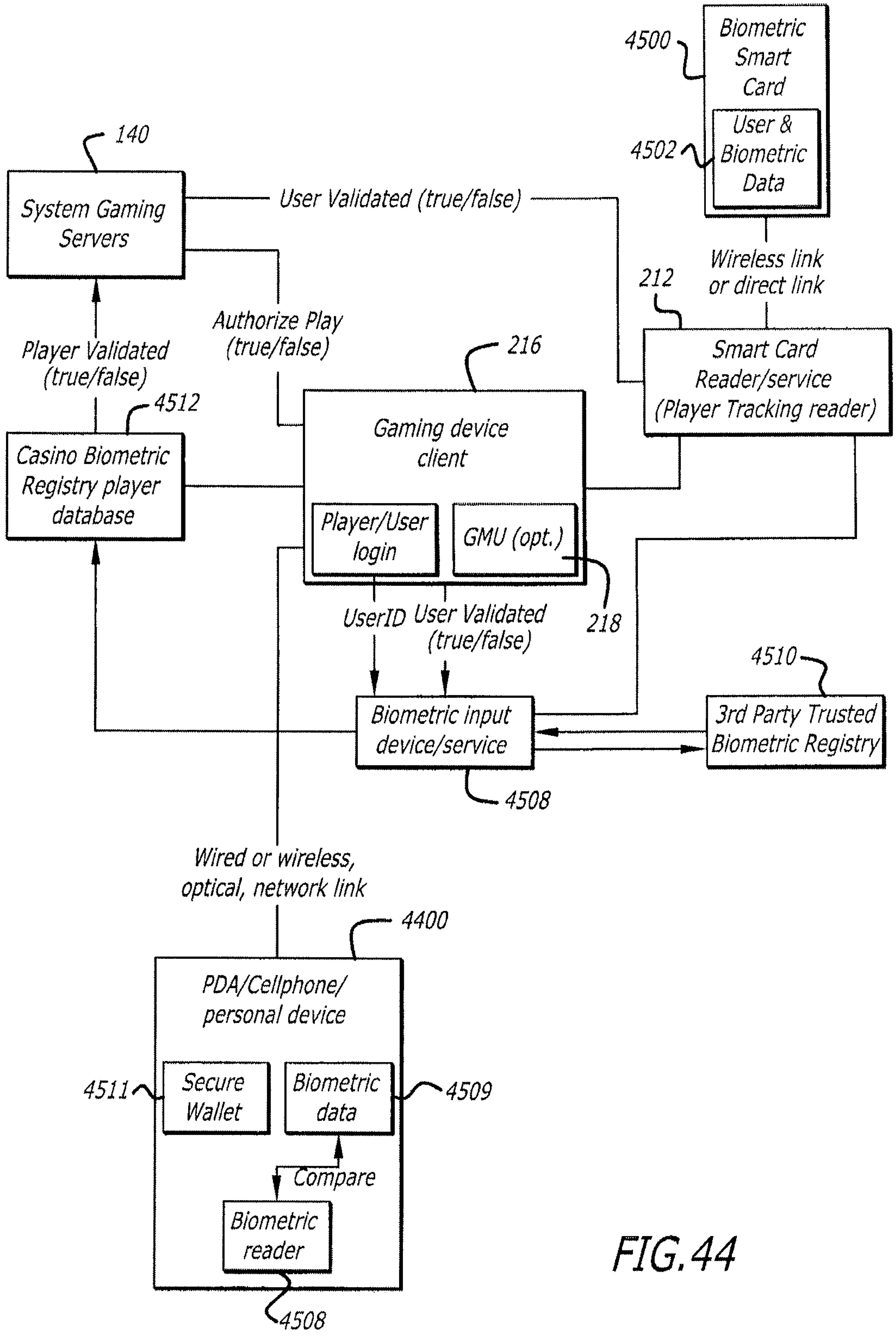
FIG. 44 is a component and data flow diagram that illustrates data flow in a system for biometric authentication of a player according to one embodiment.

With reference to FIG. 44, a component and data flow diagram illustrates the data flow in the system for biometric authentication of a player. In one embodiment, biometric devices are used in addition to, or in lieu of, any tangible item that the player has or is given to uniquely identify that person. Biometric devices include, by way of example, and not by way of limitation, fingerprint devices, handprint devices, voice recognition, hand writing analysis, facial recognition, retinal scan, DNA scan, thermal scans, and the like. In the embodiment, of FIG. 44, a smart card 4500 also has the biometric input device included with the card. Biometric data 4502 stored in the card itself is compared with the input from the biometric input device when inserted or connected wirelessly to the card reader 212 for the gaming device client 4400.

In another embodiment, the biometric input device (e.g., fingerprint, eye, or image scanner) is part of, or connected to the gaming device (which in some embodiments comprises an IVIEW interface 216), player-tracking unit 212, or separate device 4508. In one embodiment, the biometric data to which the biometric input is compared is a remote third party trusted biometric registry, such as Verisign®, a bank, or the U.S. Government, 4510. The input is sent to the trusted registry 4510, along with a user ID, and for example, a password, and the trusted registry sends back an answer as to whether the biometric data matches. Biometric is digitally encrypted with a public/private key cryptographic process prior to sending to any remote server. In one embodiment, the biometric data is sent as hash or other encrypted data that uniquely identifies the raw biometric data. In another embodiment, instead of using a third party trusted registry 4510, the casino has its own biometric database 4512.

In another embodiment, a personal computing device 4400 includes the biometric reader 4508 that compares biometric input against a local biometric database 4509, or a remote biometric registry 4510 to approve gaming activity. Further, one embodiment, electronic funds are transferred into the gaming device 4400 or gaming server 140 using a secure wallet 4511 to allow game wagers or credit purchases to occur.

Biometrics are helpful at remote gaming locations and with wireless devices to help with the age and person identification of the player for regulated gaming markets and products. Periodic biometric scans are required in some embodiments during play of a game to ensure the authorized person is actually playing, and not another substituted person. At registration time a biometric scan take places for an individual, and the data representative of the biometric scan is to be stored in a secure database associated with the player account. User age or birth date is entered into the database so as to create a jurisdictionally compliant gaming system per player and per access point to the system gaming server 140. In one embodiment, this registration takes place at any casino or government approved registration location. Casino personnel or government-approved personnel take the registration data from the player and authenticate the player's various forms of identification. Age and/or biometrics are checked for whether they are associated to the one person. In one embodiment, registration kiosks are used in combination with or alone without extra personnel required in the process.

In one embodiment, a temporary carded player is allowed to accrue eGameCash and play. A cash-out by these players is not allowed until full registration is performed by the player. These cards are freely handed out on the casino floor for players allowing them to play anonymously until they want to cash-out. The goal is to tease the player into becoming a carded player.

Simultaneous play by family or group members using the same card number or player account is allowed by the casino in one embodiment. These accounts all accrue eGameCash to the same account, and these players can play as a group against other groups.

Figure 45:
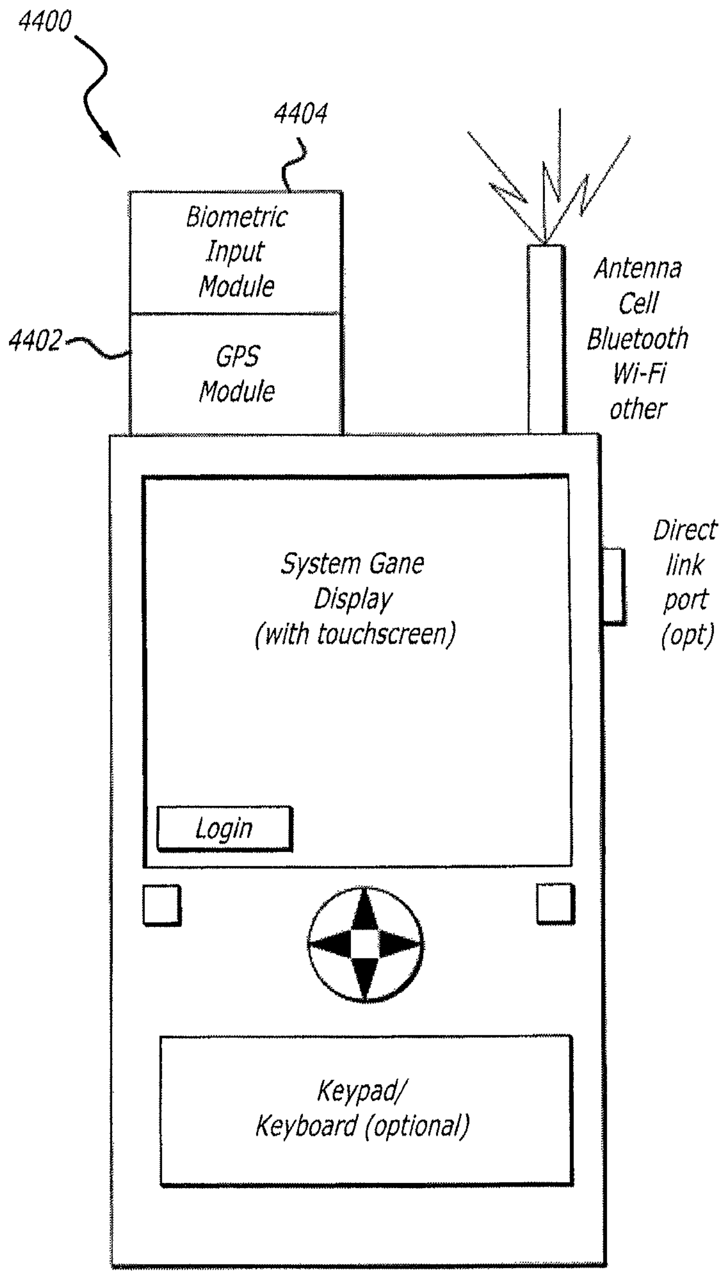
FIG. 45 is a block diagram that illustrates components of one embodiment of a client gaming device.
Figure 46A:
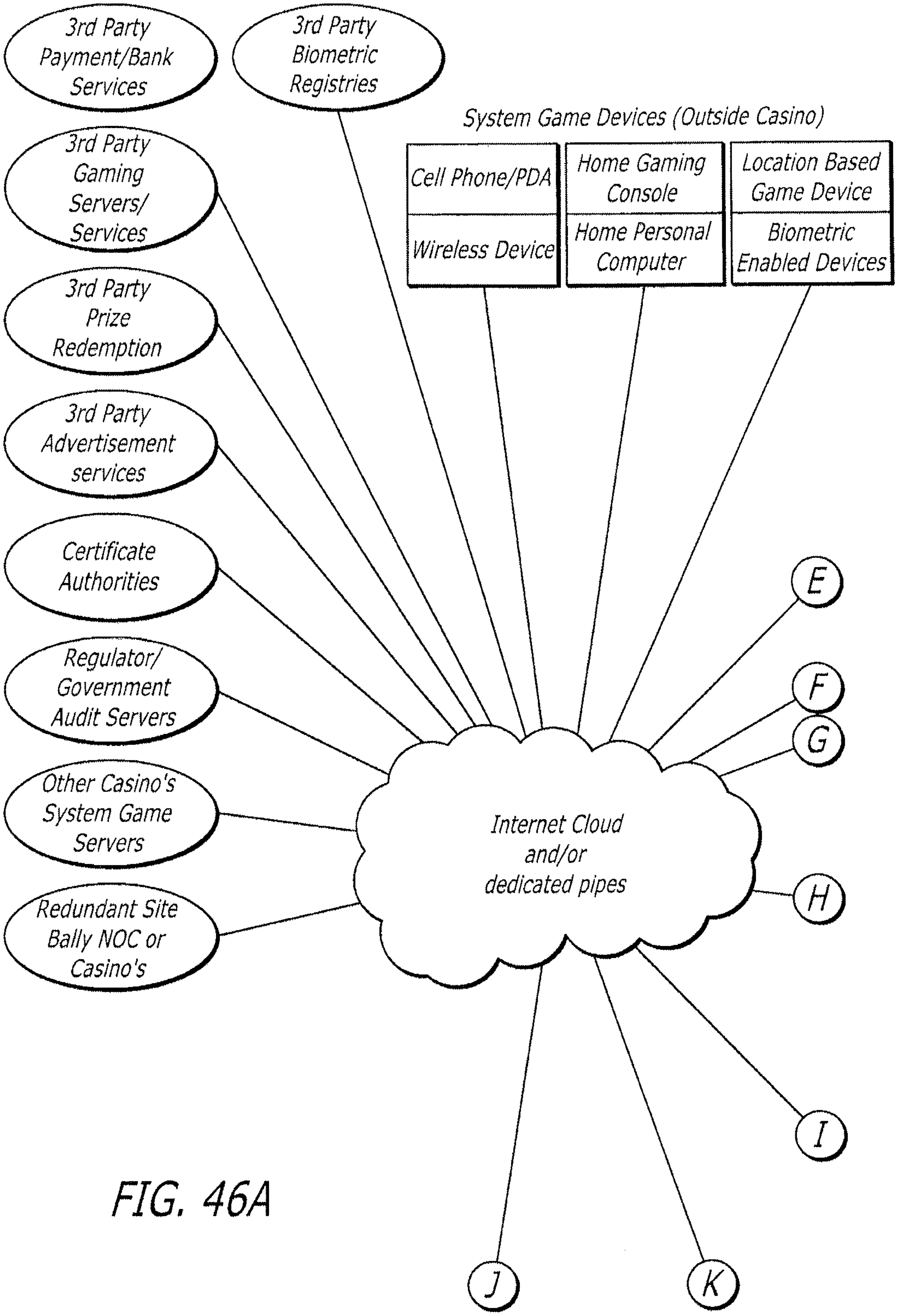
FIG. 46 is a block diagram illustrating components of one embodiment of a system game network.
Figure 46B:
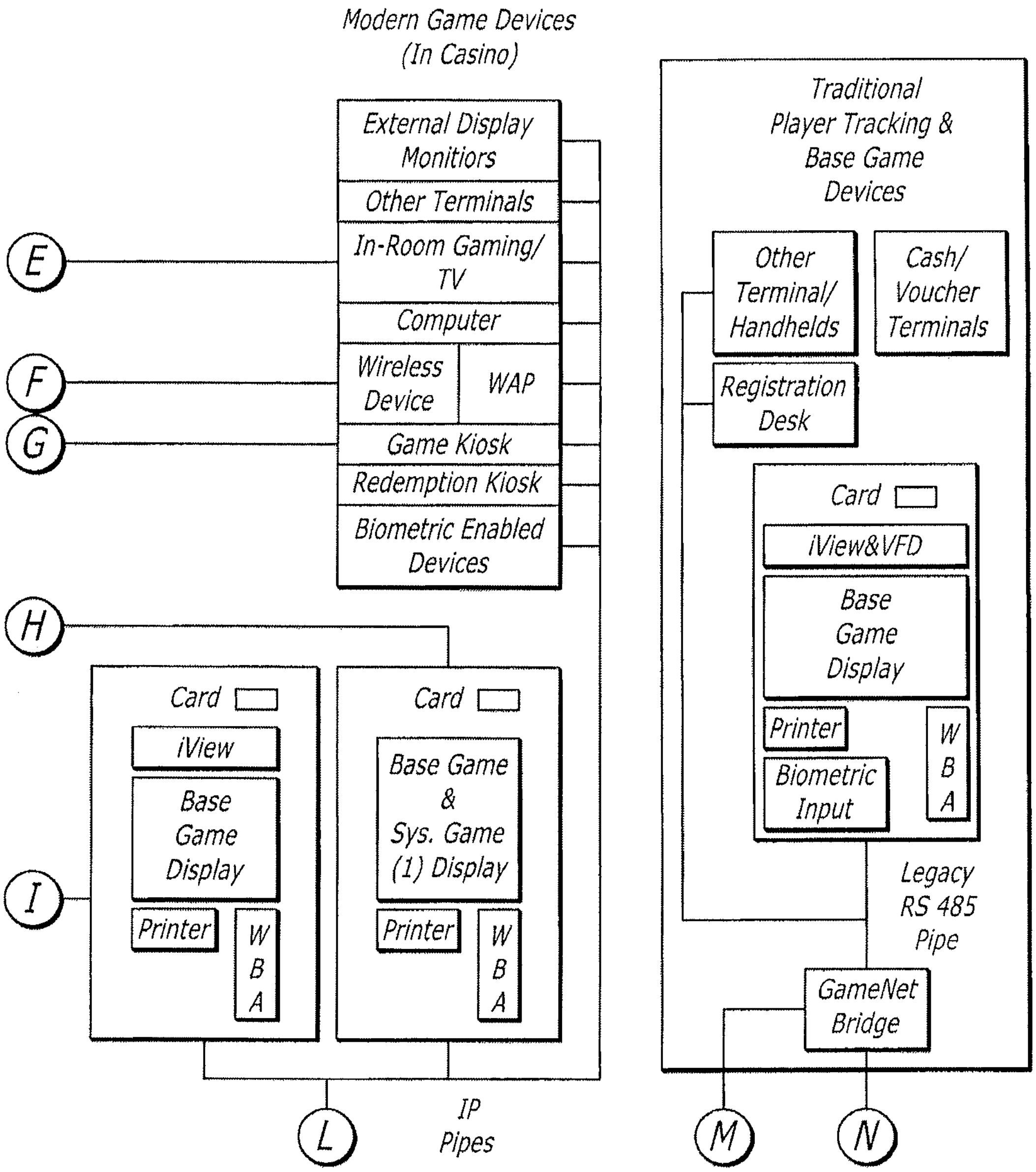
Figure 46C:
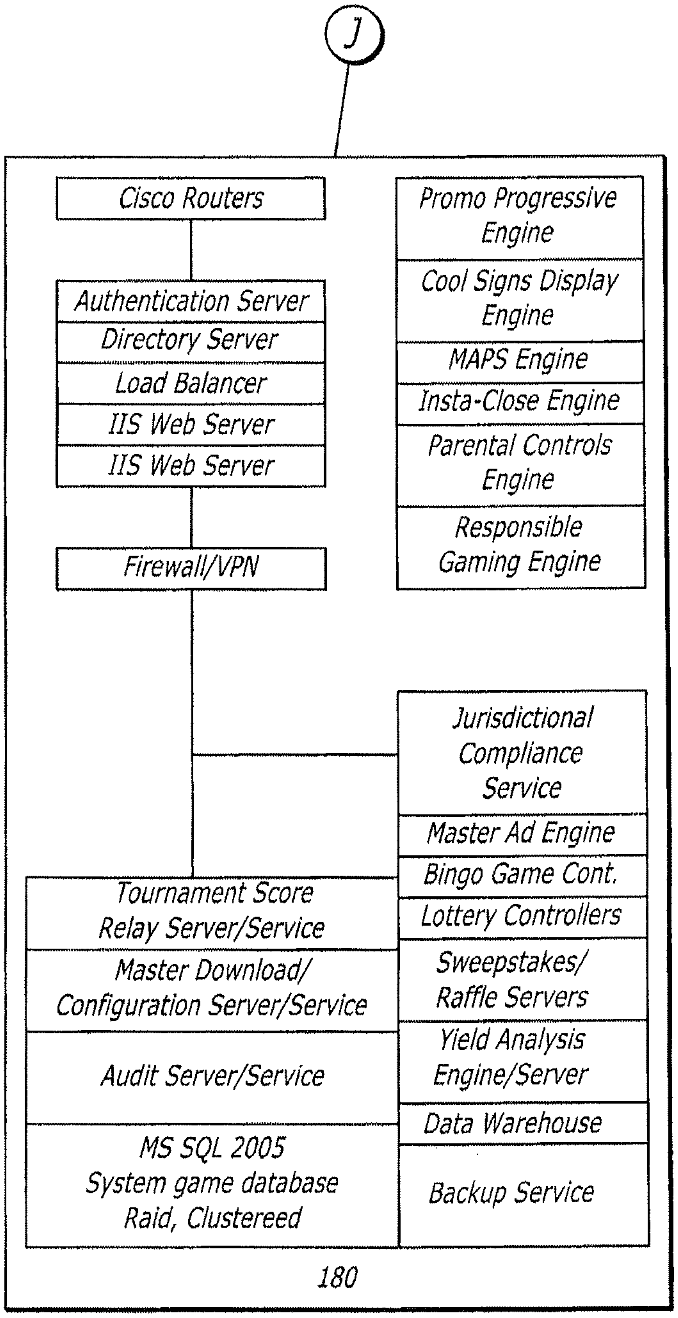
Figure 46D:
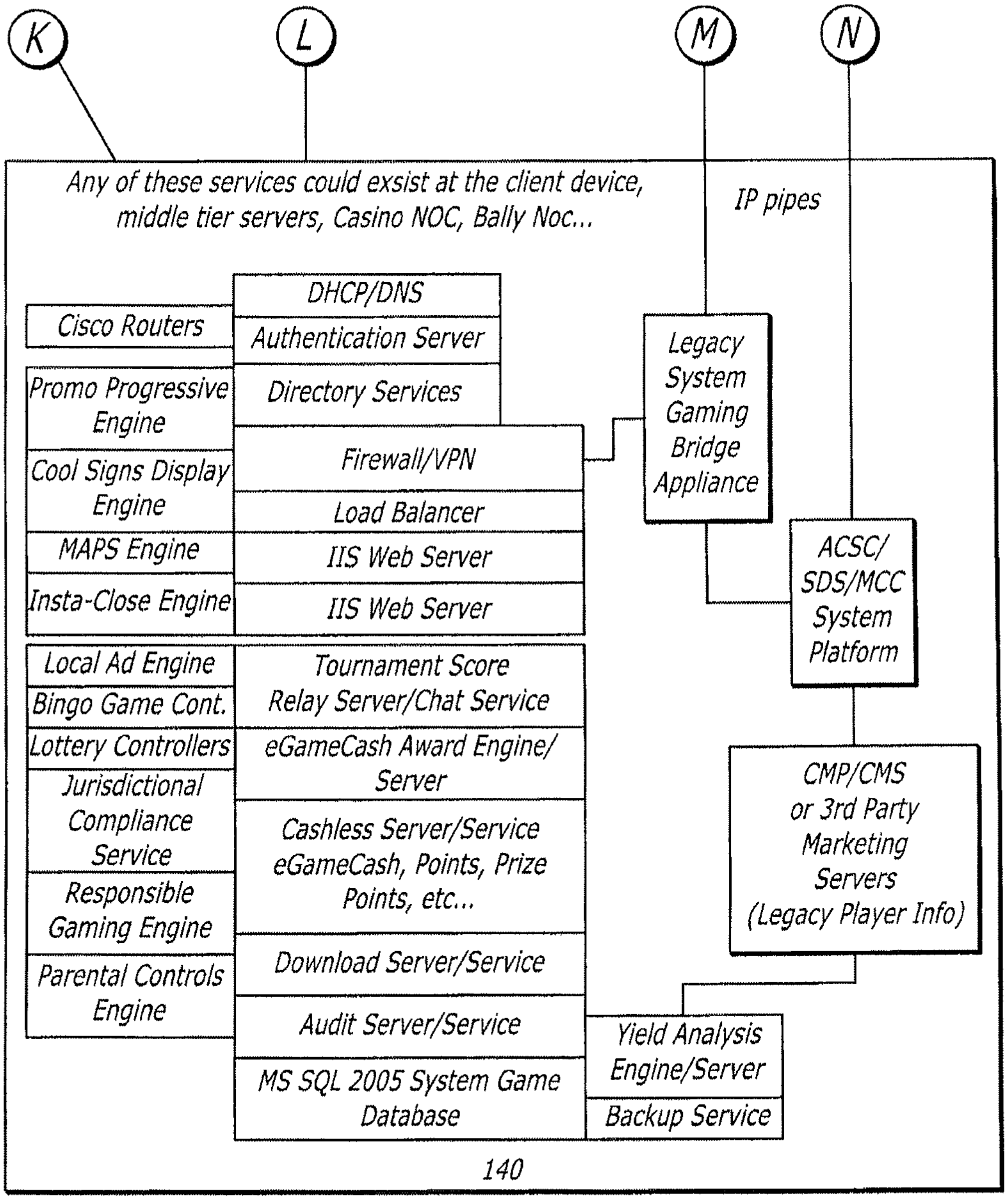

With reference to FIG. 45, a block diagram illustrates components of an alternative embodiment for a client gaming device 4400 to play system games. In this embodiment, a geo-location device 4402 is used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server 180 accessed. In one embodiment, GPS 4402 and biometric 4404 devices are built within a player's client device 4400, which in one embodiment, comprises a player's own personal computing device 4400, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device 4400 with these devices built in, such as a tablet type computing device, PDA, cell phone or other type of computing device capable of playing system games.

In one embodiment, different features of the system game system are enabled or disabled depending on the jurisdiction and/or the identity of the player who is accessing the system. For example, skill games only may be played in some jurisdictions for any person. Or skill predominate games are available for minor players in other jurisdictions.

Other jurisdictions limit the types of prizes that can be won. For example, a jurisdiction does not allow gift certificates. The system game servers have the capability to prevent these types of awards and provide alternate awards that are compliant with local, state, federal, and international law.

Other jurisdictions require prizes not to be shipped into their jurisdiction. The system game server prevents prizes from being mailed into these jurisdictions. Further, various wager/payout restrictions are enforced in specific jurisdictions, such as Texas, where the player can only play for prizes and cannot win in excess of $5 or 10 times the wager amount whichever is less. Some jurisdictions limit the size of wager for a game. Other jurisdictions limit the amount of win per game or payline. The system game server 140 manages this regulatory compliance, including by using the above-mentioned geo-location techniques to determine the location and identity of a player.

New wagers or game plays, are blocked by the system game server 140 under certain circumstances according to one embodiment. By way of example, and not by way of limitation, an individual game will not provide the option for the player to bet more than the maximum number of credits or cash allowed. In another embodiment, a maximum wager is set for a player per gaming session, or for a specific time period. In another embodiment, the list of available games is modified. In another embodiment, credit purchases are blocked at certain times, or after certain limits have been reached. In another embodiment, the number of games played in a time period is controlled. In another embodiment, the player is stopped after reaching a threshold for losses in a period of time. Player demographics, such as age, sex, and player group can block new credit wagers. Further, parental or master account restrictions on a child or sub-account can block wagers.

Further, in one embodiment, the system gaming server 140 automatically reconfigures for a certain player in a certain jurisdiction on a specific type of gaming device. Content and game server 140 modifications can include, by way of example, and not by way of limitation, modifications are made to currency converters, currency purchase options, game selection options, game configurations, skill or chance game options, denominations of play, size of wins allowed per jurisdiction, maximum credits allowed, minimum cost to play, cost of credits, advertisements seen, third party services available, third party gaming sites available, speed of play for games, bonus rounds available, bonus games available, progressives available, available promotions, available prizes, and prize types.

In one embodiment, player registration occurs at a web site or a physical site or registration terminal (username, password, PIN, player card, and the like, and other player or group specific information created at this time). In one embodiment, this registration occurs at a casino's player club registration desk, but can occur using any gaming or non-gaming device capable of collecting registration data with or without operator assistance.

In one embodiment, responsible gaming limits setup is performed during registration. (A player and/or casino associates one or more of the above-discussed responsible gaming limits with this registered account.)

In one embodiment, parental controls are entered for the account. If the account is for a child, child account limits are setup. In one embodiment, by way of example, and not by way of limitation, these rules limit the types of games, amount of money spent playing games, amount of purchases, time spent playing or doing other activities in a system game, what services are available for the player, and which currency conversions are available by the player. Parental controls can be entered at any time during or after registration.

In one embodiment, if player desires to play regulated games on non-regulated gaming devices, in non-monitored locations, and/or at Internet accessible web portals, then the player provides biometric data at a government or casino approved biometric registration site that requires the player to be physically present. Identity of the player is checked by approved personnel with one or more photo identifications proving age, name, and address of the player. The player's biometric identity is maintained in the database 160 associated with the player's birthday, name, and other demographic or address information. If registration is performed at a casino, then this biometric data can be directly associated against the unique player identifier that includes, for example, username or player club card number, and the like. If the biometric registration occurs at a third party registration site, the data is associated with a unique user identifier (user ID). In one embodiment, a biometrically registered user is provided a new government issued or approved card, or a casino approved smart card ID capable of storing all types of data including biometric data in secure memory within the card. Other smart cards can be used as long as they contain biometric data, or authorize secure access to a recognized database containing biometric data. In another embodiment, the IVIEW interface 216, or other client gaming device, has a secure biometric repository contained within it, such that, at any time the gaming software executing therein can authenticate the player against this local biometric repository. For example, in one embodiment, a cell phone carrier registers and manages the biometric data, either in a remote database or in the cell phone's secure memory. In one embodiment, the smart card used is the national Biometric ID smart card authorized by the U.S. Congress in 2005.

In another embodiment, a player accesses an approved gaming portal on an approved or non-approved gaming device. For example, and not by way of limitation, an example of an improved gaming portal is www.games.harrahs.com.

In one embodiment, the system logs the IP address and other geo-location specific data for client gaming devices. As discussed with respect to FIG. 44, geo-location is accomplished in one embodiment by a GPS device 4402 that is provided to the player by the casino, or by a third party regulatory agency. In another embodiment, the GPS device 4402 is embedded in the gaming client device 4400 as provided by the manufacturer. In one embodiment, geo-location is gathered by detecting the cell phone tower used by a wireless-type gaming device client 4400. The system gaming server 140, or third party cellular location service, uses the cellular tower location being used by the wireless device to determine the location of the device 4400. In one embodiment, geo-location of the gaming device client 4400 can also be accomplished by detecting for known wireless access points (WAPs) being used, or if a wireless device uses a certain wireless protocol and frequency then the system can determine the location of the player due to the limited range of certain types of wireless protocols at certain locations. For example, a Bluetooth connection has a 30-foot range from client device being used by the wireless client 4400, or, 802.1A/B/G networks have approximately a 300-foot range. In one embodiment, the geo-location method uses the dialup access number and a caller ID reader to determine the area code and phone number from which a player is playing. This area code can provide the graphic location of the gaming device. The geo-location data is associated with the specific player for the specific gaming session on the specific gaming device 4400 for a determination of options, or whether the player is allowed to play a system game at all.

In one embodiment, gaming content and configurations are dynamically modified depending upon the web portal, wireless access point, and/or device used, to gain access to the system gaming server 140. Modifications include, for example, not by way of limitation, the different games available. In one embodiment, non-approved gaming device 4400 require gaming outcomes to be determined on the server 140 for chance based games, while approved secure devices allow gaming outcomes to be determined on the client device 4400.

In another embodiment, skill-based game outcomes can be determined on the client device 4400. These game outcomes are securely sent to the system gaming server 140 using HTTP protocol. Digital Certificate authentication by third party certificate authorities, for example, and not by way of limitation, Verisign®, or local casino-based certificate authorities, can ensure the client device is communicating to the proper system gaming server 140. In another embodiment, the gaming content is automatically localized for the appropriate language used after used the above described geo-location techniques.

In another embodiment, game parameters are modified based upon player specific attributes, which include, by way of example, and not by way of limitation, the player's demographic information, player club level, or other player specific or group specific data. In another embodiment, data collected by the yield analysis engine is used. Game server site parameter modifications include actual reconfiguration of the system gaming servers. For example, and not by way of limitation, in one embodiment, the player is pointed to a different web location managed by the system gaming server 140, and/or reconfiguration data is moved to the client gaming device 4400 so that reconfiguration occurs in the client-by-client side software.

Figure 47:
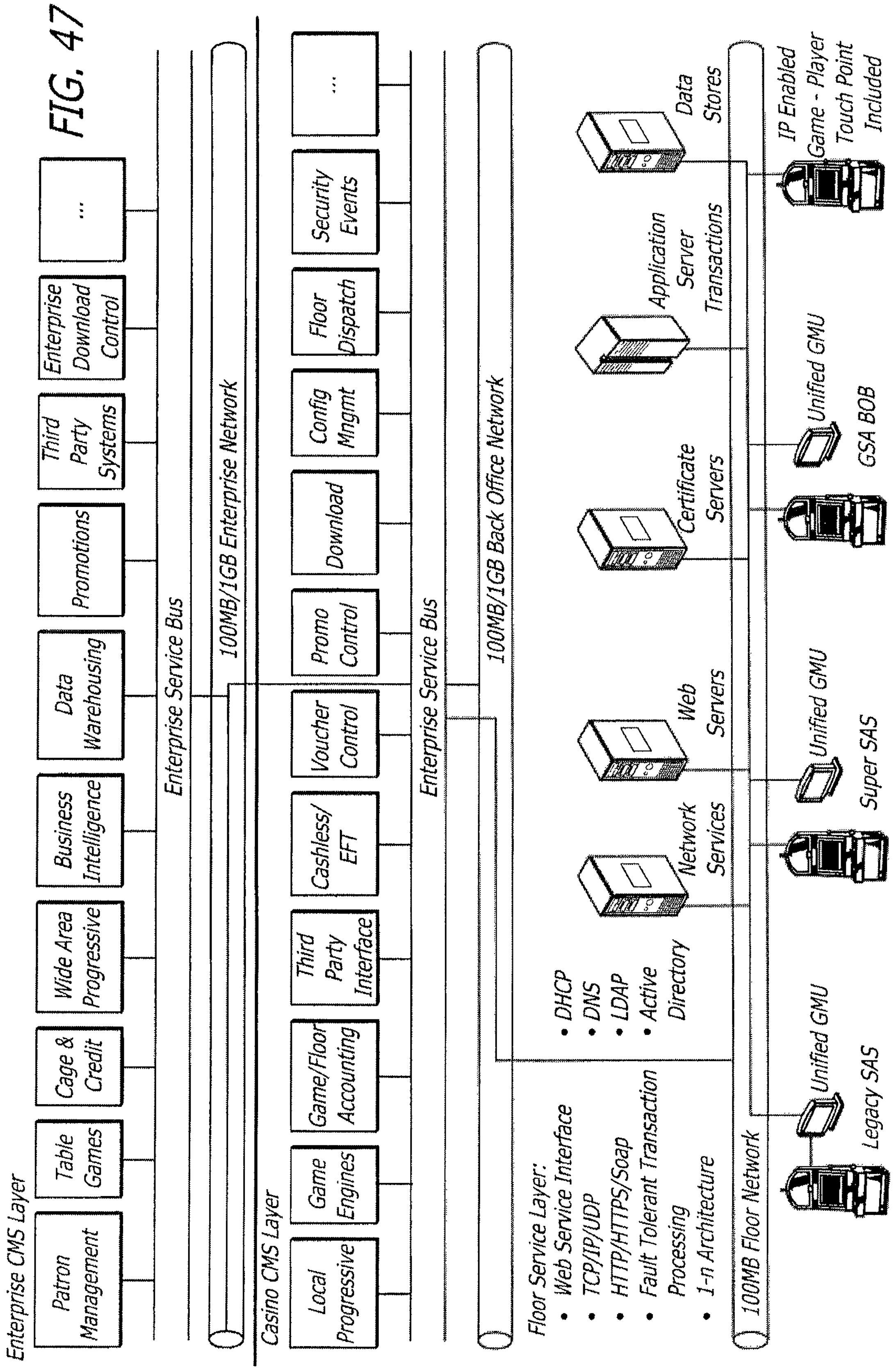
FIG. 47 is a block diagram illustrating components of an embodiment of a multi-layer system game network.

With reference to FIG. 46, in one embodiment, a network diagram illustrating components of the system game network illustrates in which system game servers 140 and 180, have multi-site with multi-sub-site capability. In one embodiment, each site is assigned a specific currency. With reference to FIG. 47, in one embodiment, the casino system gaming network is a multi-level casino network design, with the bottom layer including casino floor gaming machines, and the middle level including a casino service layer, and a top layer including an enterprise server layer.

IVIEW Interface Software and Hardware

Figure 48A:
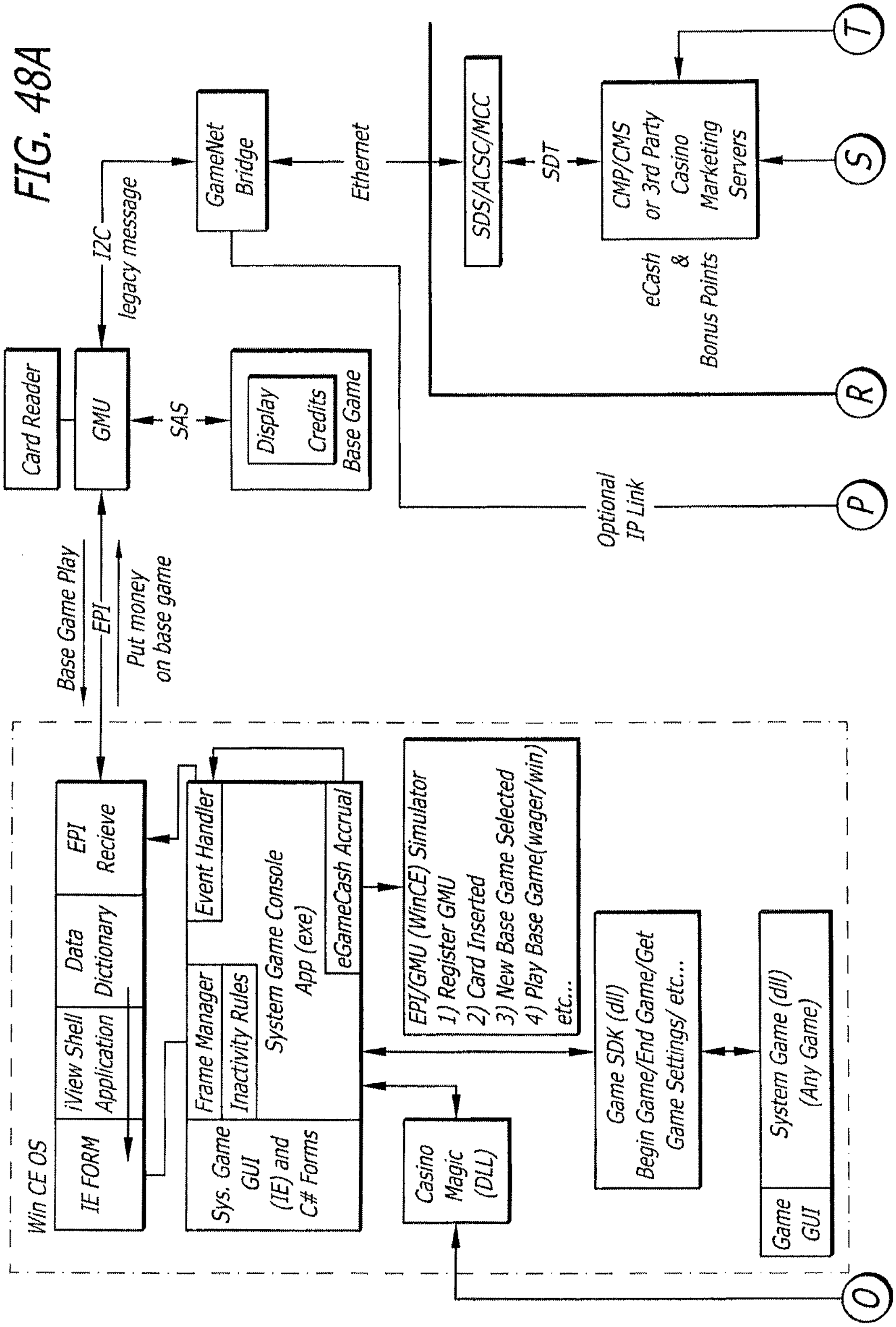
FIG. 48 is a block diagram that illustrates the relationship between client hardware and software and system gaming servers according to one embodiment.
Figure 48B:
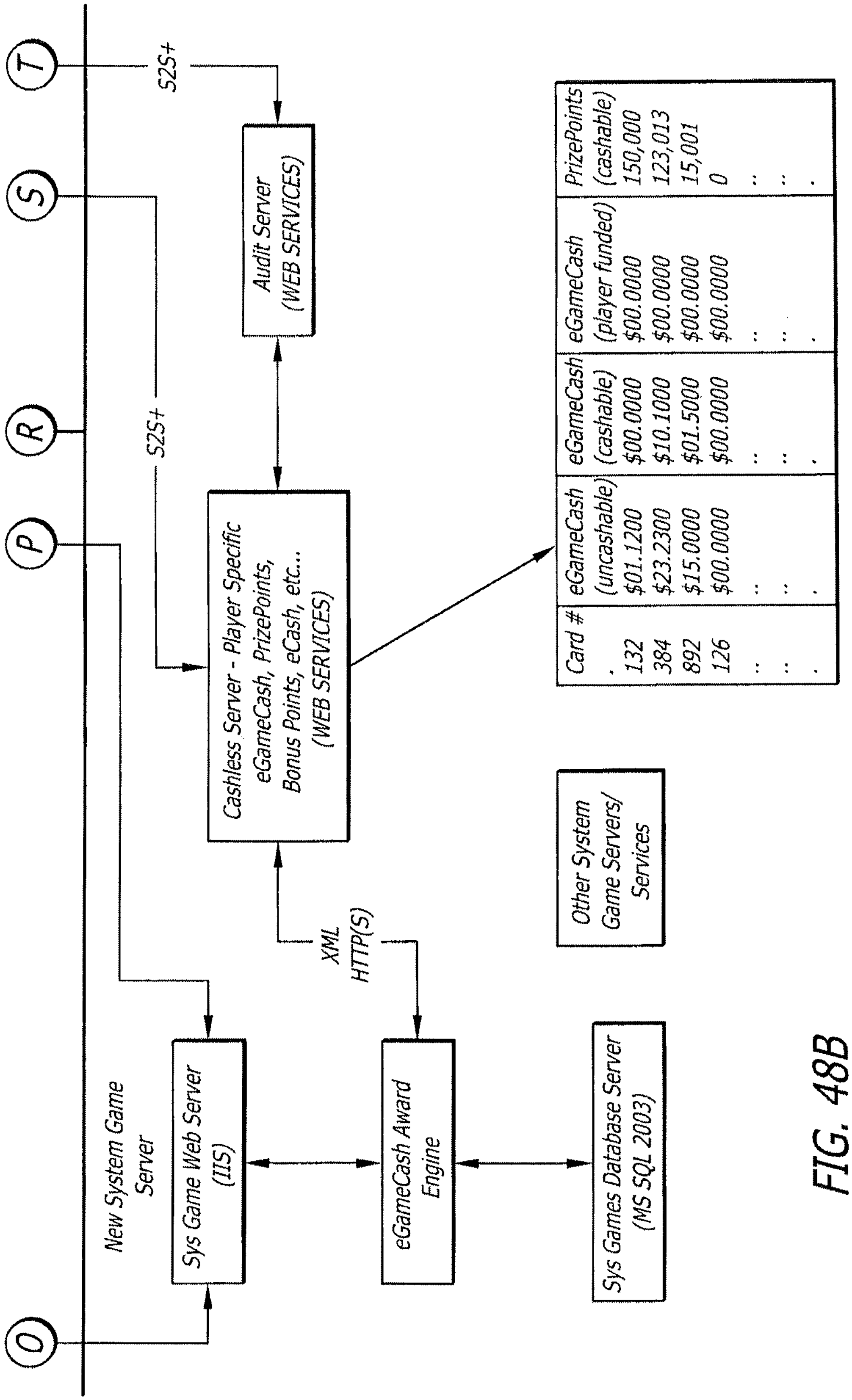
Figure 49A:
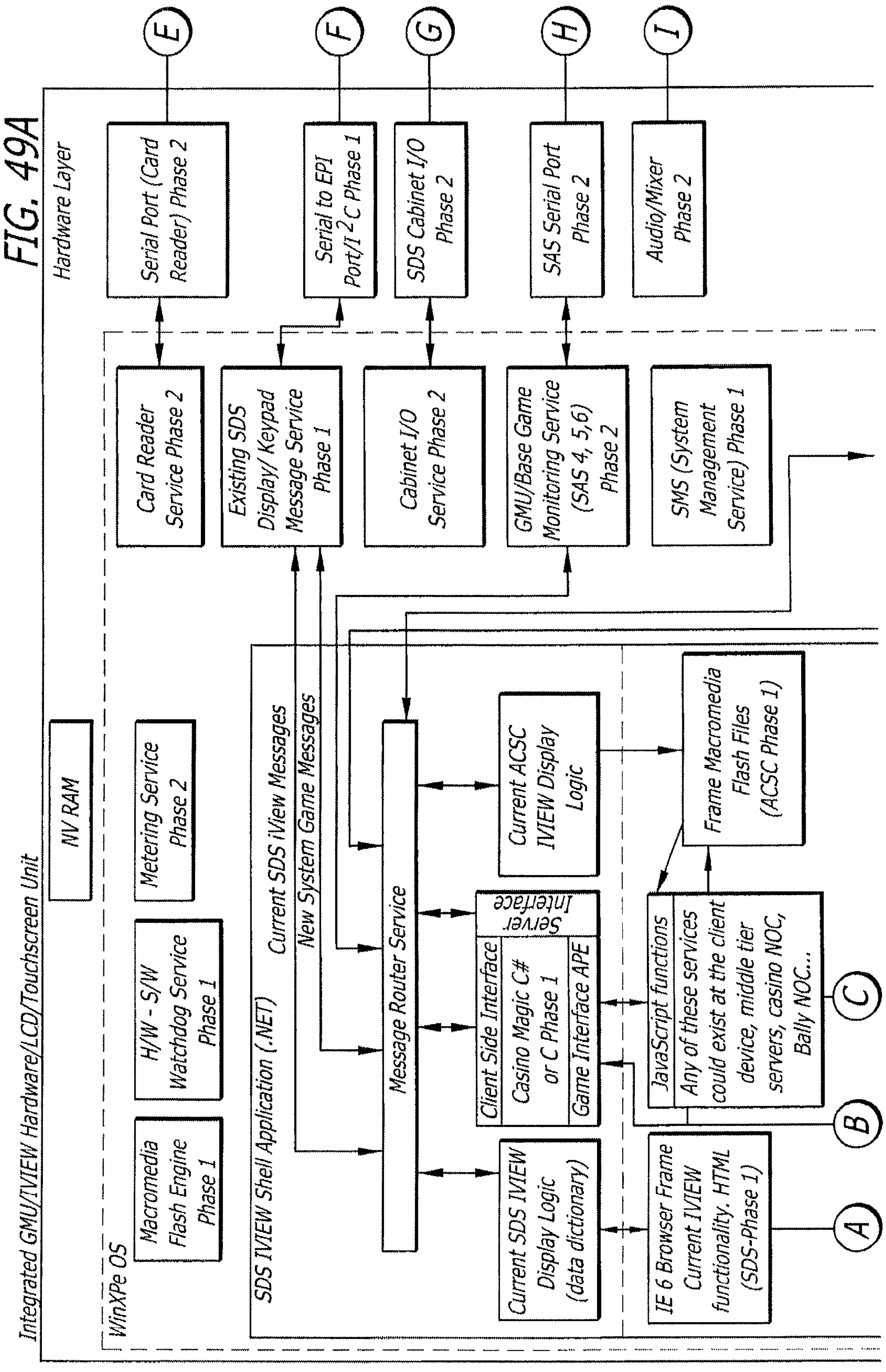
FIG. 49 is a block diagram illustrating components of a unified additional user interface and game monitoring unit board and software according to one embodiment.
Figure 49B:
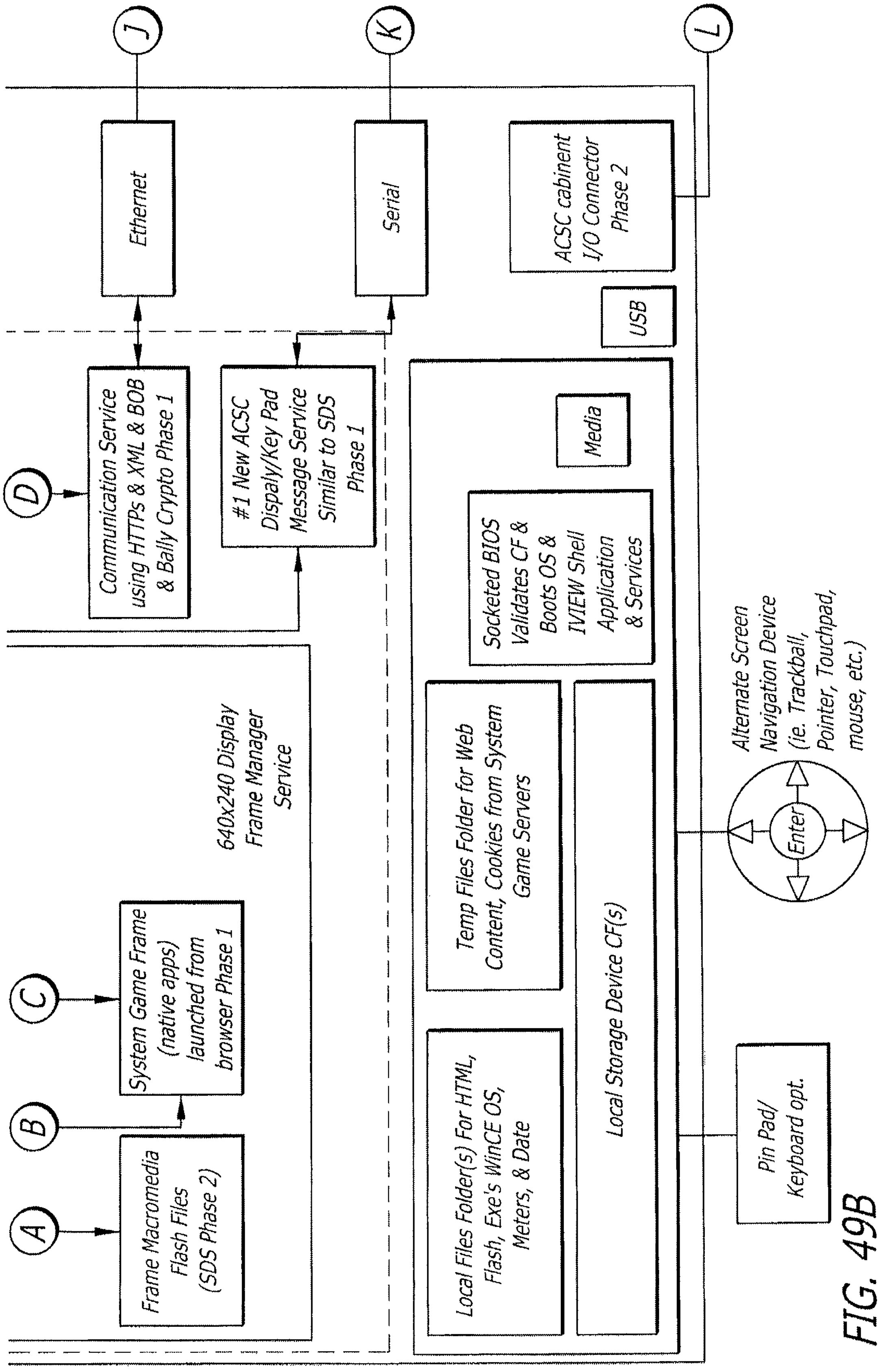
Figure 49C:
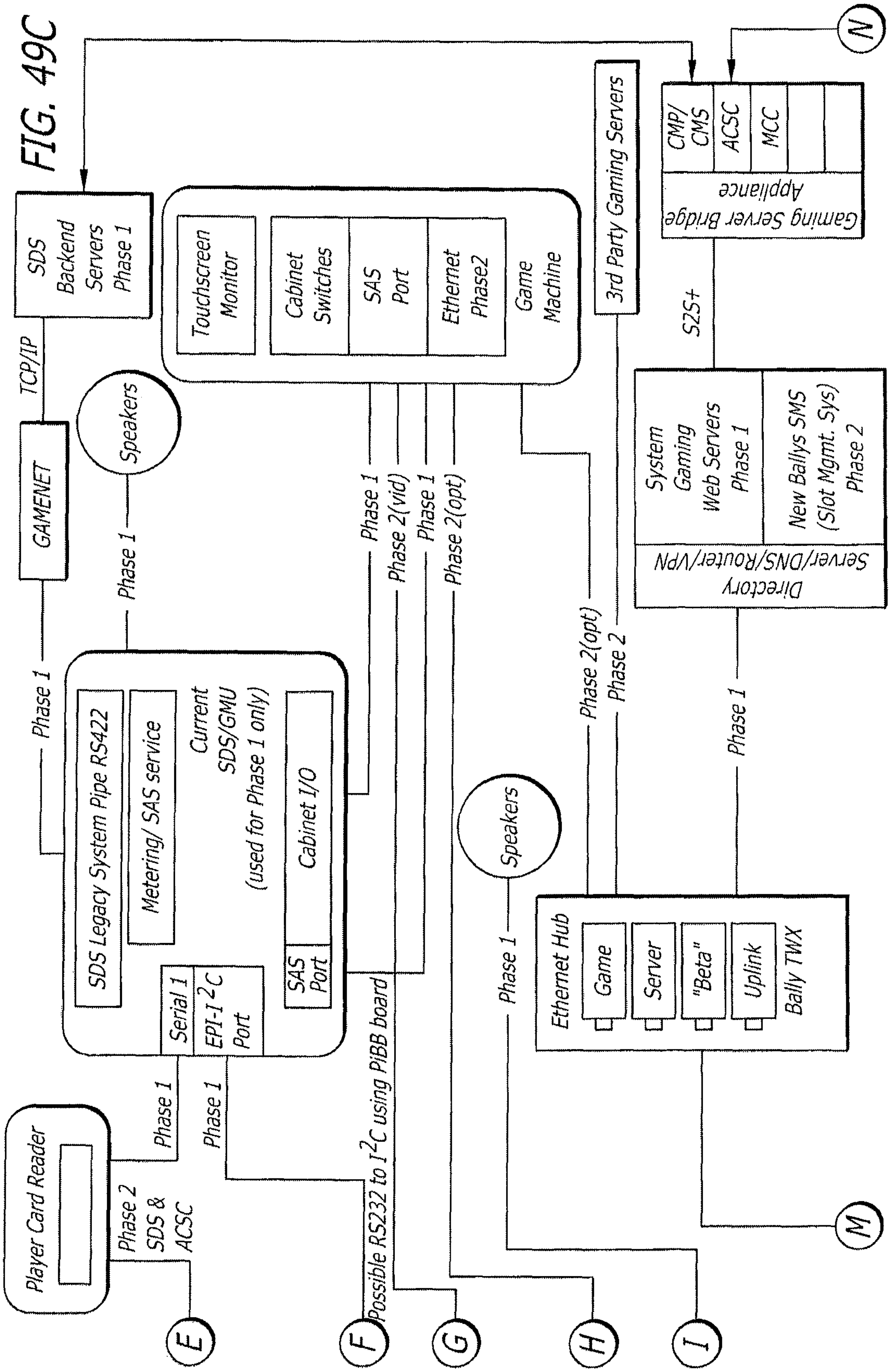
Figure 49D:
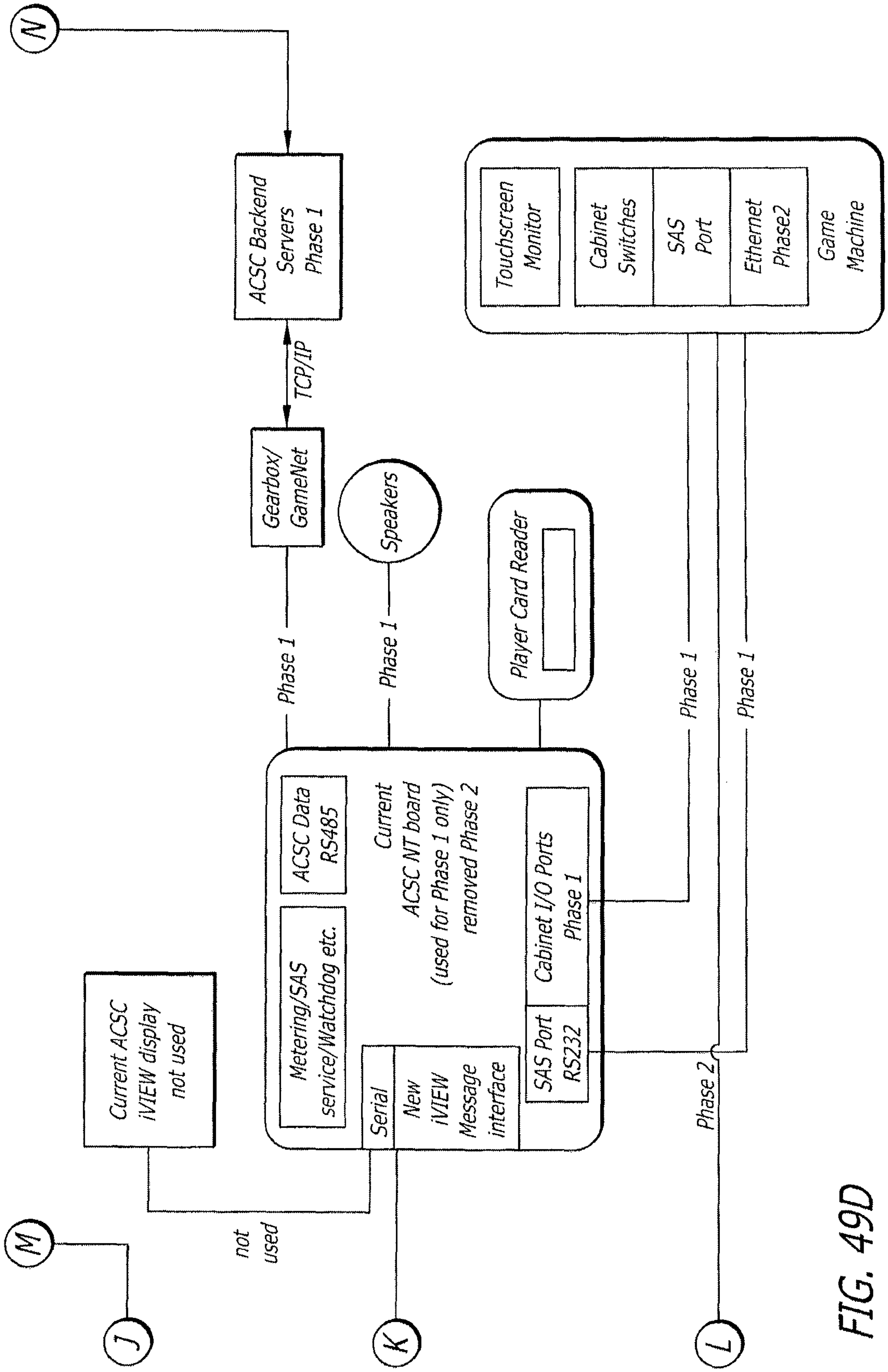

In one embodiment, the software and media types on the IVIEW interface 216 include but are not limited to the following: Windows CUD or Windows XP® embedded software, Dot Net Compact Framework® 2.0 or higher, Java® applets, Java® Applications, Java® Midlets, HTML, DHTML, JavaScript®, Macromedia® Flash®, animated GIF, JPEG, BMP, PNG, C# applications, Visual Basic.Net® applications, Internet Explorer®, XML, ASPX, ASP, Shockwave®, and VBScript®, Windows® Forms. The client side game system on the IVIEW interface 216 is capable of playing, for example, and not by way of limitation, Java®, Shockwave®, Flash®, C#, C++, Visual Basic® games. With reference to FIG. 48, a block diagram illustrates the relationship between client hardware and software, and the system gaming servers according to one embodiment.

FIG. 49 is a block diagram illustrating components of a unified IVIEW/GMU board and software according to one embodiment. In the embodiment of FIG. 49, the Integrated GMU/IVIEW board is provided in addition to their NT board and a System Data Service 250 board. This board serves as the Display Processor and PIN pad interface. All of the GMU 218 functionality is moved into the Integrated GMU/IVIEW board of FIG. 49, including the function of monitoring the base game 202, meters, and the like.

Other Services Available

Other features or services can be provided to the player of the IVIEW device 218 or the associated web portal in the system. For example, onscreen notifications are provided in one embodiment. These notifications can be shown between games and during games. A casino can directly enter messages to a player.

Other uses of IVIEW interface 216 include player or customer surveys for free eGameCash or prizes or sweepstakes opportunities. The casino can use such a survey to enter player demographics into the database 160. More opportunities to play can be provided for entry of the survey information, or more bonus points are awarded. Further, for example, the IVIEW interface 216 can be used for customer service and help desk support with a video and microphone link to a customer service agent. In one embodiment, player chat and instant messaging (IM) with other players is provided.

Figure 50:
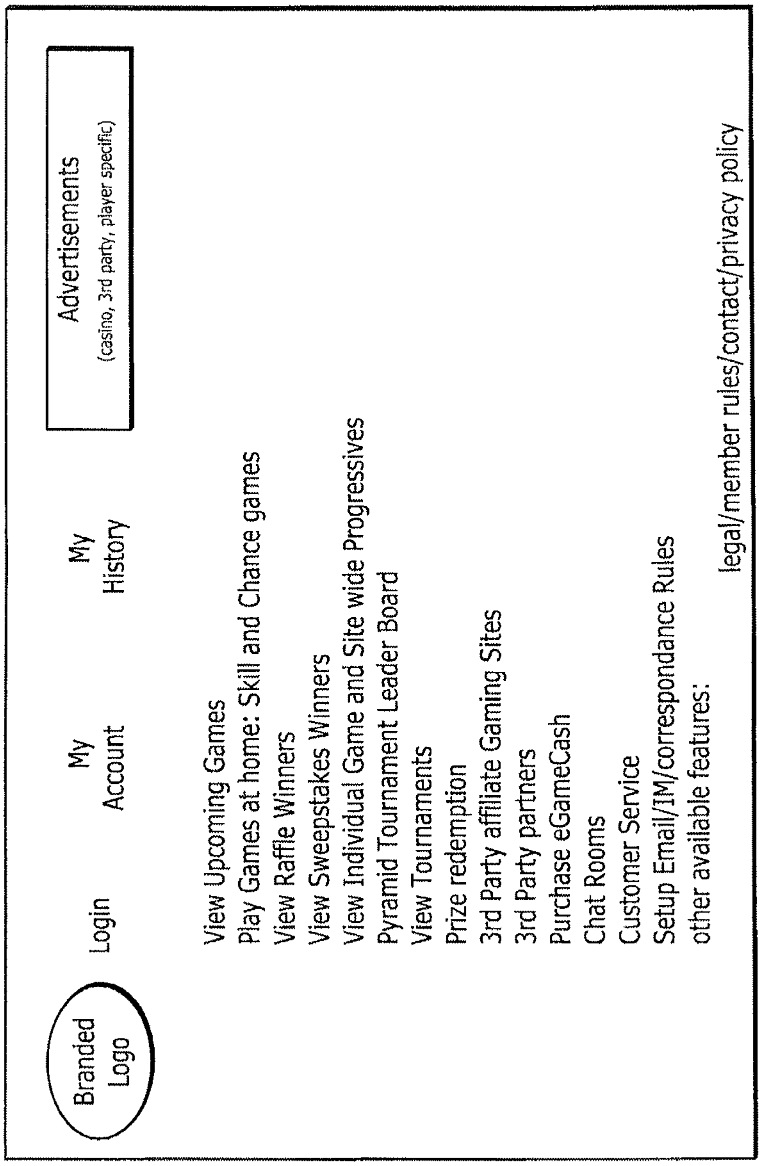
FIG. 50 is a sample screen shot from one embodiment of a gaming web portal site.
Figure 51:
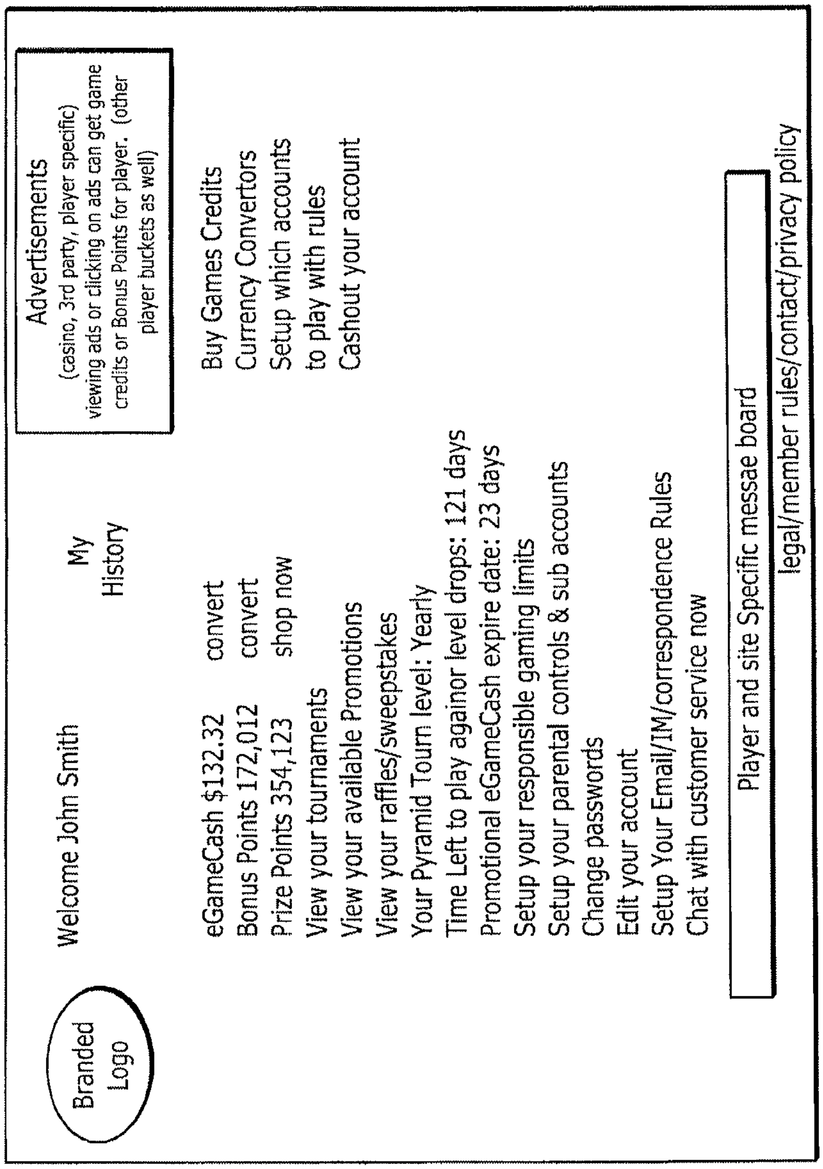
FIG. 51 is a screen shot from a player account page of a system game web site according to one embodiment.

In one embodiment, the system game website for remote clients operates as a system game web portal. A sample screen shot from one embodiment of the web portal site is shown in FIG. 50. With reference to FIG. 51, a player account page from the system game website, according to one embodiment, is shown.

Third Party Gaming Transaction

Figure 52:
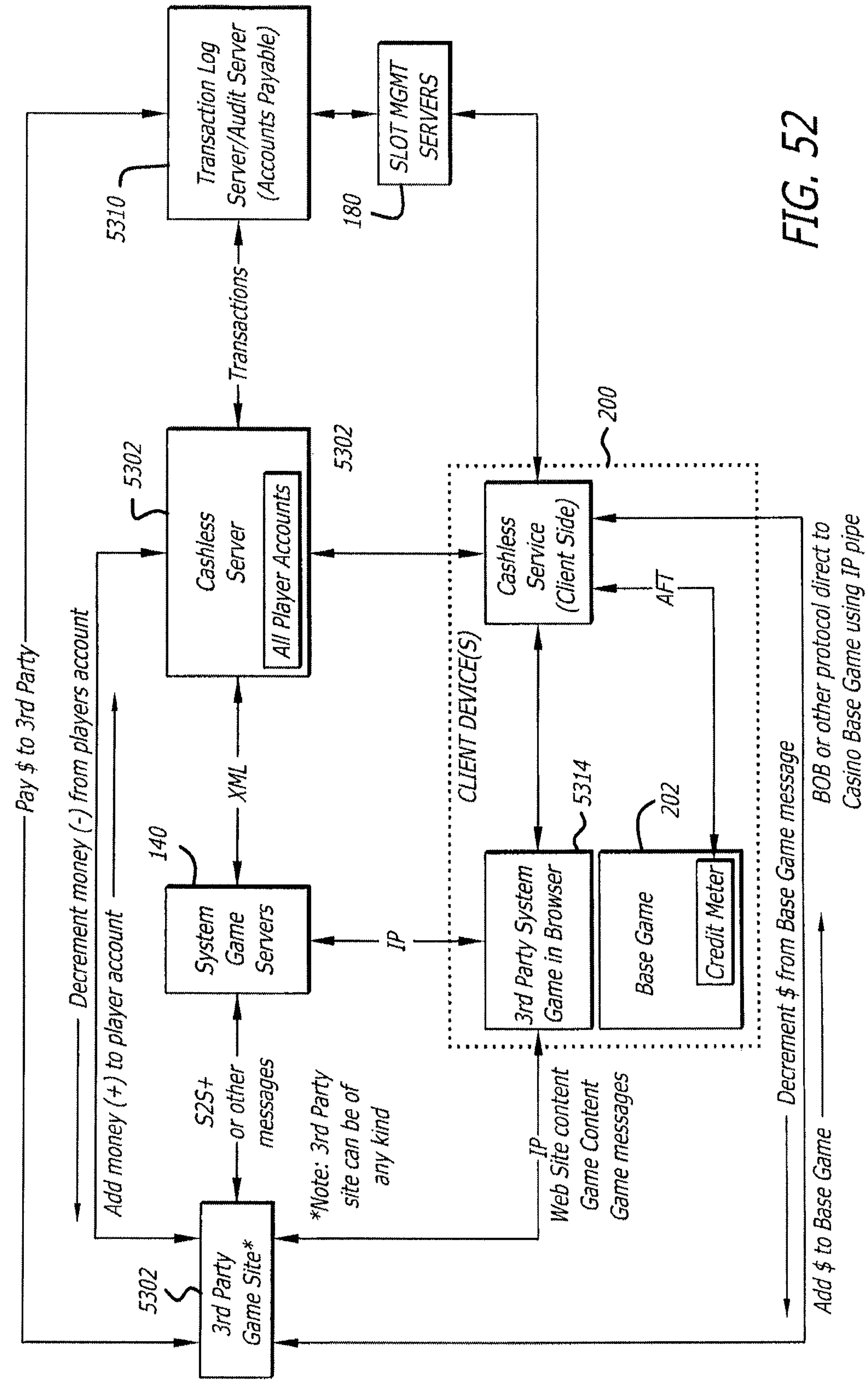
FIG. 52 is a block diagram that illustrates the interaction between a gaming and third party gaming servers according to one embodiment.

In one embodiment, third party servers have access to eGameCash, or other accounts, on the system gaming server 140 for purchase of products or services. With reference to FIG. 52, a block diagram illustrates the interaction between the system and third party gaming server 5302. The third party gaming server 5302 requests for money directly from a base game 202 by forwarding the request to a client side cashless server 5304 to retrieve the money. The service 5304 either retrieves the funds from the base game 202 credit meter, or retrieves the funds from the player's server-side cash account 5308. Otherwise, in one embodiment, the third party server 5302 directly requests the cashless server 5302, or system gaming server 140 for funds. Transactions are logged by a transaction log server 5310, and at the end of a billing period, a check is sent to the third party server 5302 for gaming services rendered.

In one embodiment, a third party system game in a browser 5314 is either a thick or thin client function. In the case of a thin client, images, sounds, videos, and other media are resident on the client (downloaded). However, outcome of the game play is determined by the third party server 5302, and sent to the client 218. All meter calculations are performed at the third party gaming server 5302, and updates are sent to the client 5314.

In the case of thick client implementation, the entire third party game is resident on the client (downloaded). All game play outcomes and meter calculations are performed on the client. The third party server 5302 communicates with the client 5314 primarily regarding the player's account activity.

Save Game State

In one embodiment, a currently playing game is able to save its current state for game recovery. This is accomplished by the game making a SaveGameState( ) SDK call into the gaming server 140. The data from the SaveGameState( ) is stored as complete software objects, or strings of data, in one embodiment, in XML format in the data store 160. In another embodiment, the saved data is stored in a safe local storage medium. The local storage medium, in one embodiment, is a non-volatile battery backed RAM, or physical storage medium such as an EEPROM, hard drive, or compact flash. In one embodiment, system game software moves save game state data to the system game server as a second level of redundancy, in case of a complete client side failure of the local storage medium. Along with the data stored by server software, in one embodiment, by way of example, and not by way of limitation, the following other metadata regarding the game state data is stored: timestamp, casino ID, player ID, IVIEW ID, game ID, game history ID, random number seed, and random number index. In one embodiment, the SaveGameState( ) function call made by the system game also stores the game specific game state data too.

With this data, any client gaming device 4400, 216 and/or system game server 140 can recover a specific game, even if a power outage or system crash occurs, or a software crash in the middle of play. In one embodiment, the game can recover and be played at the server, or at the client device 4400, 216, and the game state recovery data is moved into the game play software, wherever it resides for the particular game. The next time the client device 4400, 216 boots up, the game state data is returned by the system gaming server 140 to the game play software. Each game has parameters which define what needs to be saved regarding its object states, and can recover the game to its exact or near exact state after it receives the game state data automatically, or upon request with a GetGameState( ) function call. In one embodiment, a game can optionally retrieve the game state data at any time it is requested.

If the player leaves the gaming device in the middle of a system game being played, in one embodiment, the game can be recovered the next time the player logs into the system at any system game client device 4400, 216. If a player removes the player's player card, logs out, stops playing for a period of time, or cashes out of the base game 202, the game state data is saved for later replay. Any unfinished game is restarted at the beginning of the game with the same settings, or continued exactly where the player left off. In one embodiment, the system recovers the exact random generator list of numbers that would have been used if the player completed play on the previously played device, or prior to the power crash, or software crash. Pointers to the correct prize in the database are maintained. This means the exact same card deck and card index used prior to recovery can now be played after recovery. The same can be done for any game theme that uses a random number generator.

This SaveGameState( ) function can be advantageous for a player to continue play on another gaming device 4400, or at a later date. For example, and not by way of limitation, the first 2 minutes of a 5 minute base game tournament are played on one base game 202, and the remaining 3 minutes on another base game 202. This continued play technique can be advantageous for a player because the player can move to a base game where the player feels luckier or on a location where the player feels more comfortable. In another example, the first 10 balls on a Bingo game can be earned on the first base game 202, the remaining 10 balls can be earned on a second base game, or at a later date on any gaming client device 4400.

In one embodiment, the client side game device 4400, 216 can also save any data it determines is needed to ensure a proper recovery occurs after a critical failure. In one embodiment, the player's session preferences are saved in local non-volatile memory so the player's choices can be quickly restored after re-powering up the device 4400, 216. A re-power up cycle occurs automatically in one embodiment, with hardware and software "watchdog" services provided on client gaming device 4400, 216. In one embodiment, the client gaming device 4400, 218 tracks whether a game was in process or not at the time of reboot. If a game was running, then the client device 4400, 216 recovers itself first, launches the last game that was running, and then fetches the SaveGameState( ) data out of the non-volatile memory so that the game can recover itself.

In one embodiment, system game credits or eGameCash is returned to the player in the case of critical failure, or for any reason an EndGame( ) call (end of game message) to the server 140 fails to be posted. The server 140 returns the game credits, or allows the game to be played over again from scratch, or from where the game left off. In one embodiment, these recovery choices are configured by the casino. In one embodiment, the player can optionally be given the choice of how the player would like to get a refund back after a failure. After relogging in, the player is given the choice to continue where he left off, start a new game, or just get the credits back.

Sample Games

In one embodiment, a game called "Payoff Poker" is a stand-alone game that runs on the IVIEW interface 216. Payoff Poker progresses by spending eGameCash earned through base game 202 play. The eGameCash is used to purchase a poker hand. The faster the player plays the base game, the faster they earn eGameCash and the faster they receive cards. In one embodiment, as a default setting, the player receives 1 hand of poker for each $0.05 of eGameCash.

The player plays the base game 202 (slots, poker, etc. . . . ) and earns eGameCash promotional dollars. The eGameCash accumulates on the IVIEW interface 216. As the player accumulates eGameCash, a card is slowly dealt onto a playfield to start a Payoff Poker game. Each card received by the player costs an additional amount of eGameCash. Each individual game funds its own prizes from the eGameCash spent on that game. A player earns eGameCash at the set rate of a percentage of the handle pull on the base game. This value is set by the casino, but, in one embodiment, is between 5%-25%. At the top end of this range it is $0.01 of eGameCash earned for each $4.00 played on the base game.

In one embodiment, the player earns 5 poker cards that are dealt face down as they are individually earned, as the eGameCash is being earned. After the last card is earned and dealt, all 5 cards flip over to reveal a winning or losing hand. The player is then awarded their prize and the next game begins with more play on the primary game.

In one embodiment, to show the player that the game is active, a sparkle effect animates over the empty card spaces in-between games, and when the cards are partially dealt but not currently moving. A power bar in the top left corner of the IVIEW interface 216 display grows as the eGameCash accrues to give another visual clue as to the progress of the current card being dealt. When a card is completely dealt, there is animation around the card to show the player that it is locked in place and fully earned. The cards that comprise the winning hand are highlighted when the player wins. After showing the player how much they won, a "winnings box" is incremented. A message area at the top of the screen has several different context sensitive messages. For example, and not by way of limitation, the player is reminded to play the primary game to progress a card, press a menu button to collect their winnings, or the like.

Figure 53:
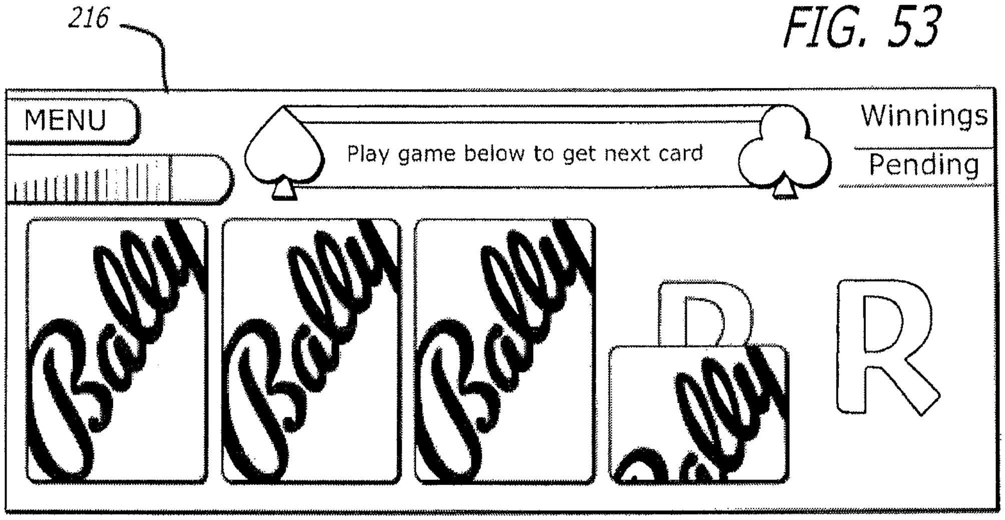
FIG. 53 is a screen shot of a sample screen of a poker game according to one embodiment.

With reference to FIG. 53, a sample screen of PayDay Poker executing on the IVIEW interface 216, is shown according to one embodiment. In the screen of FIG. 53, cards are filling in as the player plays the base game 202.

Figure 54:
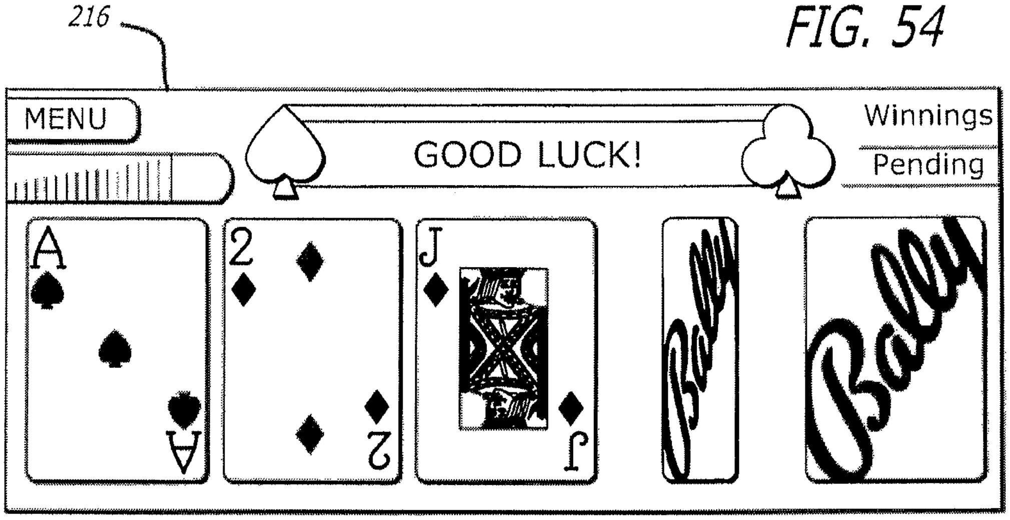
FIG. 54 is a screen shot of another sample screen of the poker game of FIG. 53.

With reference to FIG. 54, another sample screen of PayDay Poker executing on the IVIEW interface 216 according to the embodiment of FIG. 53. In the screen shot of FIG. 54, cards are flipping over after all the cards are filled in.

Figure 55:
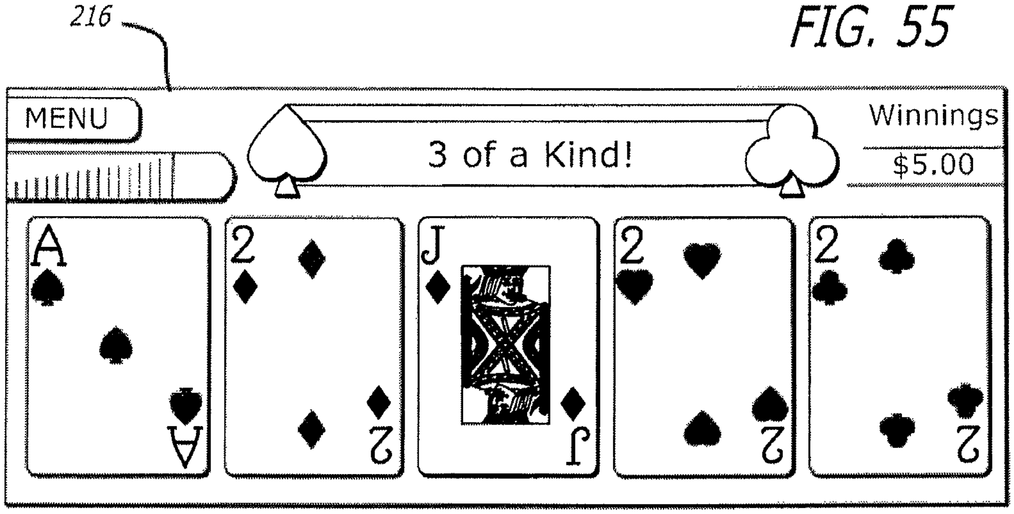
FIG. 55 is a screen shot of another sample screen of the poker game of FIG. 53.

With reference to FIG. 55, another sample screen of PayDay Poker executing on the IVIEW interface 216 according to the embodiment of FIG. 53. In the screen shot of FIG. 55, a poker hand is judged, and the winning cards are highlighted.

Boom Bingo is another stand-alone game that executes on the IVIEW interface 216. Boom Bingo progresses by spending eGameCash earned through base game 202 play. The eGameCash is used to purchase bingo balls. The faster the player plays the base game 202, the faster eGameCash is earned, and the faster bingo balls are received. In one embodiment, as a default setting, the player receives 3 different bingo cards and 20 bingo balls.

The player plays the base game 202 and earns eGameCash. The eGameCash accumulates on the IVIEW interface 216. When the player has accumulated enough eGameCash to start a Boom Bingo game, the player receives an initial bingo ball draw. Each ball received by the player costs an additional amount of eGameCash. Each individual game funds its own prizes from the eGameCash spent on that game. A player earns eGameCash at the rate of a set percentage of the handle pull on the base game.

The player receives three random bingo cards. The card on the very left is a straight bingo card, where any five balls in a row horizontally, vertically, or diagonally will produce a win. The other two cards have patterns marked on them that the player has to match to win. In one embodiment, by default, the player receives 20 balls after which, if there is not a winner, the cards reset, and a new game will begin. Each card has a winning amount over the top of it. It is a small win for the easy (left hand) card, and increases in value for each of the other 2 cards, as the difficulty of the pattern, the player must match increases. Making a bingo on any card awards the player the win and blocks out that card for further play until the next game. The game continues until all 20 balls are drawn. Players can win on multiple cards.

Figure 56:
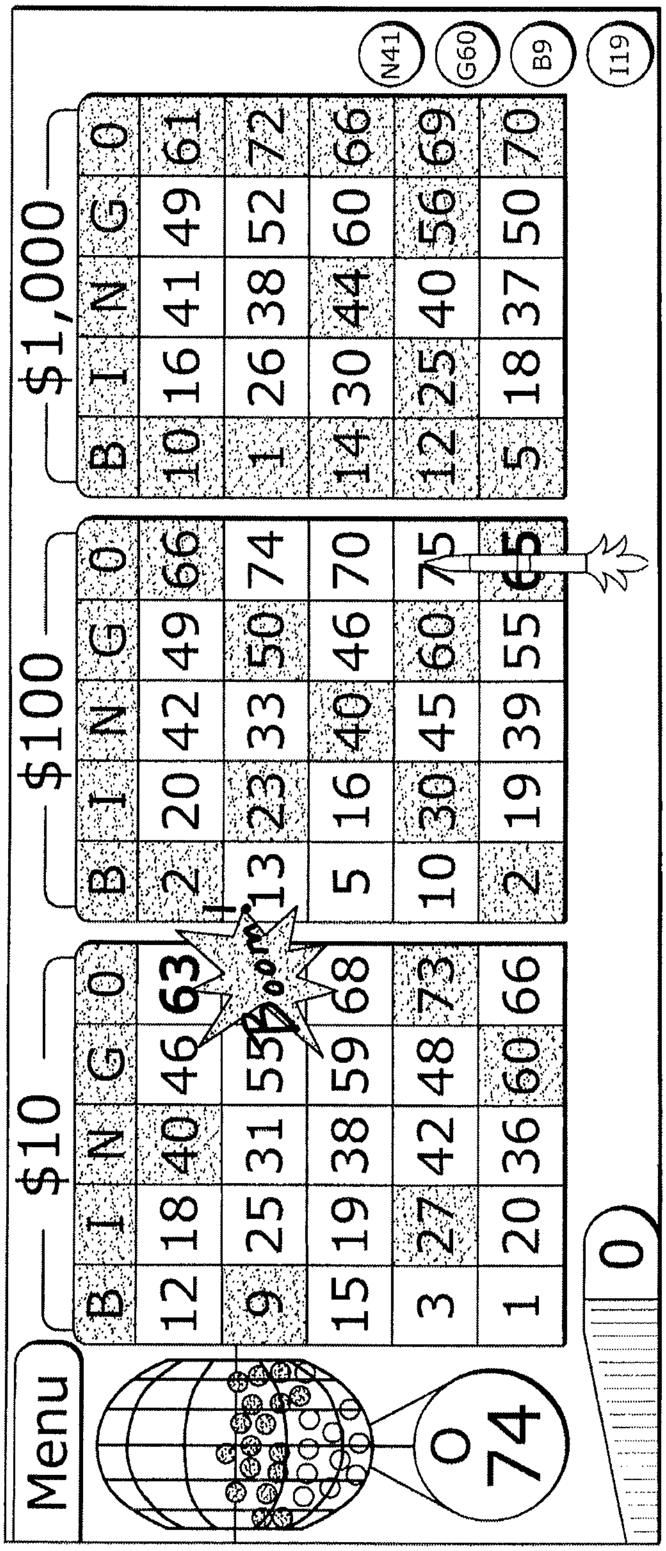
FIG. 56 is a screen shot of a sample screen from a bingo game according to one embodiment.
Figure 57:
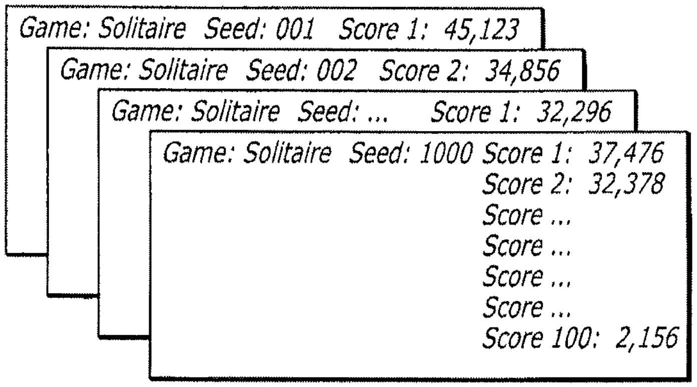
FIG. 57 is a block diagram illustrating records in a seed library according to one embodiment.

As the player earns eGameCash, an on-screen power bar fills. When the player has accumulated $0.01 of eGameCash, the number on power bar reads 1, a ball will drop out of the hopper, and the power bar will count down 1 to 0. Starting with the left hand card, a rocket will fly up from the bottom of the screen flying over the column that matches the letter on the drawn bingo ball. If there is not a match for the number on the bingo ball on that card, the rocket will continue to fly up and off the screen. If there is a match, it will explode as it reaches the matching number. This will be repeated for the remaining 2 cards. The rockets mark matching spots on multiple cards if applicable. After the player has paid for the first 10 balls ($0.10 total eGameCash), the remaining 10 balls launch as freebies. Overall, this gives the player a fun show to watch every 5-10 minutes depending on their play rate. A screen shot of the Boom Bingo game is shown in FIG. 56.

Skill Score

In one embodiment, an all-skill method of game play and scoring is used in a redemption game that awards prizes. In the system, a player's game score is compared against other players' game scores who played the exact same game with the same scoring potential. The skillful actions of the player determine the player's game score. The game score is ranked using a percentile system to determine a skill score. The skill score is used to determine a prize award. The skill score removes all elements of chance within the game.

Figure 58:
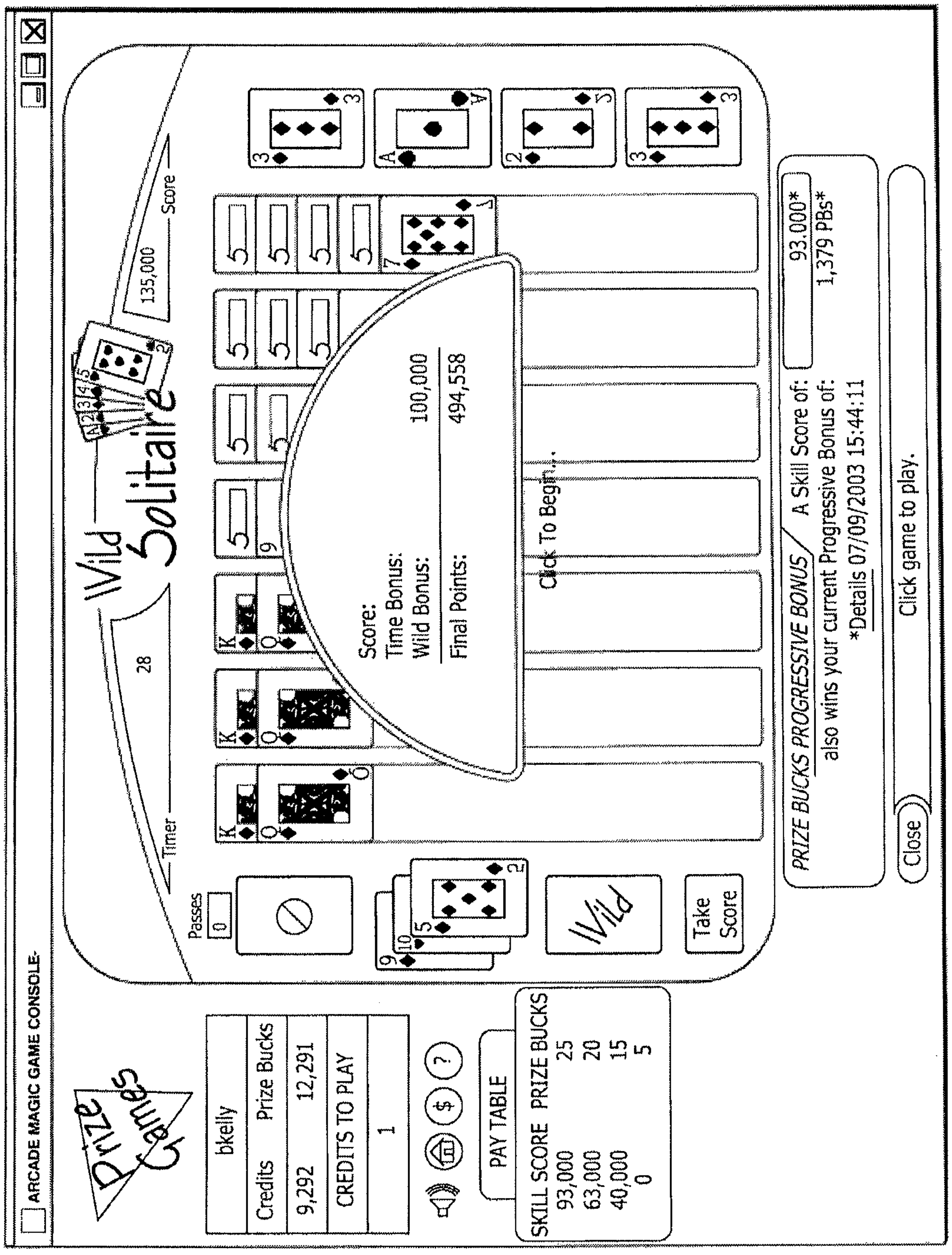
FIG. 58 is a screen shot that shows an example end game score box for a prize-award based solitaire game in one embodiment.

In this embodiment, a seed is the value that determines in which order a deck of cards are dealt, what the starting play field for each round looks like in a puzzle-style game, or any value that determines the initial state of a game. All players have equal opportunity for the highest score available for that seed. A game score includes points achieved for the skillful actions of a player in a specific game. Skillful actions include knowledge, dexterity, speed of play, strategy, and other well-known skillful actions. The game score table per seed includes the all-time high score and low score within the most recent scores. The game score table is specific to each game and each seed. The game score position is the percentile position of the game score when compared to the game score table per seed. A game score position is an integer between 0 and 100, wherein 100 means the score is equal to or greater than the all-time high score, 0 means the game score is lower than the previous all-time low score, and 50 means the game score is above half of the scores in the game score table per seed and lower than the other half. A prize award includes "prize bucks" (non-cash funds that are used in the system for purchase or playing games) or cash winnings. A seed library, in one embodiment, includes up to 10,000 seeds that are stored for each game. With reference to FIG. 58, a depiction of seed library wherein 1,000 seeds are available for a game named solitaire is available. In this embodiment, there are 100 scores stored for each seed.

Active seeds are a subset of the seed library. The active seeds are those seeds available for play at any given time. The subset of active seeds is rotated hourly so that the seeds available to players never become predictable and the game play experience remains rich. The skill value is the sum of the game score position and a decimal skill value explained below.

The decimal skill value is a fractional value wherein the numerator equals the difference in the game score of a current game and the game score of the next lower game score position. The denominator equals the difference in the game score of the next higher game score position and the next lower game score position. The calculated fraction is truncated to the second decimal place so that only one hundred values are possible (i.e., 0.00, 0.01, 0.02, . . . , 0.99). For example, and not by way of limitation, a game score table per seed excerpt for one specific seed of one specific game is shown in table 14.

TABLE 14

Sample Excerpt From Game Score Table Per Seed

| Game Score Position | Game Score |
|---|---|
| . . . | . . . |
| 74 | 4,700 |
| 73 | 4,200 |
| . . . | . . . |

A newly achieved game score 4,550 is inserted into game score table per seed, and the excerpt with the newly achieved game score entered is shown in Table 15.

TABLE 15

Modified Sample Excerpt From Game Score Table Per Seed

| Game Score Position | Game Score |
|---|---|
| . . . | . . . |
| 74 | 4,700 |
| 73 | 4,575 |
| 72 | 4,200 |

The skill value is the game score position plus the decimal skill value as illustrated as follows:

$$\begin{aligned}\text{Skill Value} &= \text{Game Score Position} + \text{Decimal Skill Value}\\ &= 73 + ((4{,}575 - 4{,}200)/(4{,}700 - 4{,}200))\\ &= 73.75\end{aligned}$$

The skill score is displayed to the player after being calculated using the following equation:

Skill Score=Skill Value*1,000

Given the example above with the skill value of 73.75, the skill score is 73,750. The prize award for the skill score is then determined. The skill score and the prize award are displayed in the IVIEW interface 216. In one embodiment, players are awarded prizes using a pay-table populated with either prize bucks or cash amounts. In another embodiment, players are awarded progressive bonuses. Table 16 is a prize award table in which prize bucks are awarded by way of example, and not by way of limitation.

TABLE 16

Sample Prize Bucks Awards

| Skill Score | Prize Award |
|---|---|
| 93,000 and above | 25 Prize Bucks |
| 63,000 to 93,000 | 20 Prize Bucks |
| 48,000 to 63,000 | 15 Prize Bucks |
| 0 to 48,000 | 5 Prize Bucks |

Figure 59:
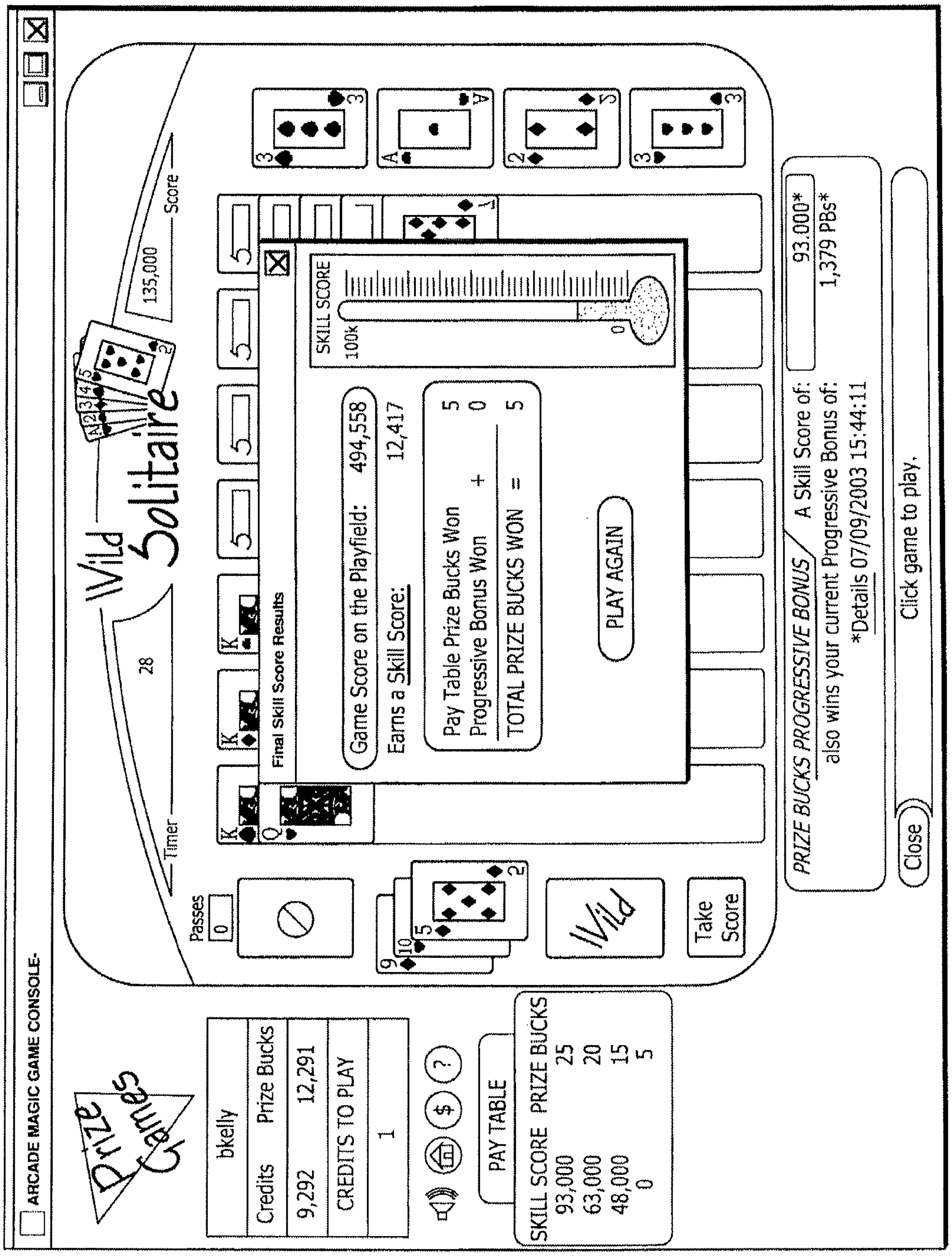
FIG. 59 is a screen shot that shows the game score to skill score conversion and final prize award for the solitaire game of FIG. 58.

In this embodiment, a score of 93,000 or more also wins the player's current progressive bonus, for example, 1,379 prize bucks. With reference to FIG. 58, an IVIEW interface 216 screen shot shows an example of an end game score box for a game called "Wild Solitaire." In this example, the game is in a "PrizeBuck" mode of play, meaning that prize bucks are awarded, instead of, for example, cash. The score box shows a final game score of 494,558 points. With reference to FIG. 59, an IVIEW interface 216 screen shot shows the game score to skill score conversion and final prize award for the player for the wild solitaire game for the game in the sample screen shot of FIG. 58.

Table 17 is a cash award table in which cash is awarded by way of example, and not by way of limitation.

TABLE 17

Sample Cash Awards

| Skill Score | Prize Award |
|---|---|
| 93,000 and above | $ .25 |
| 63,000 to 93,000 | $ .20 |
| 48,000 to 63,000 | $ .15 |
| 0 to 48,000 | $0.00 |

Figure 60:
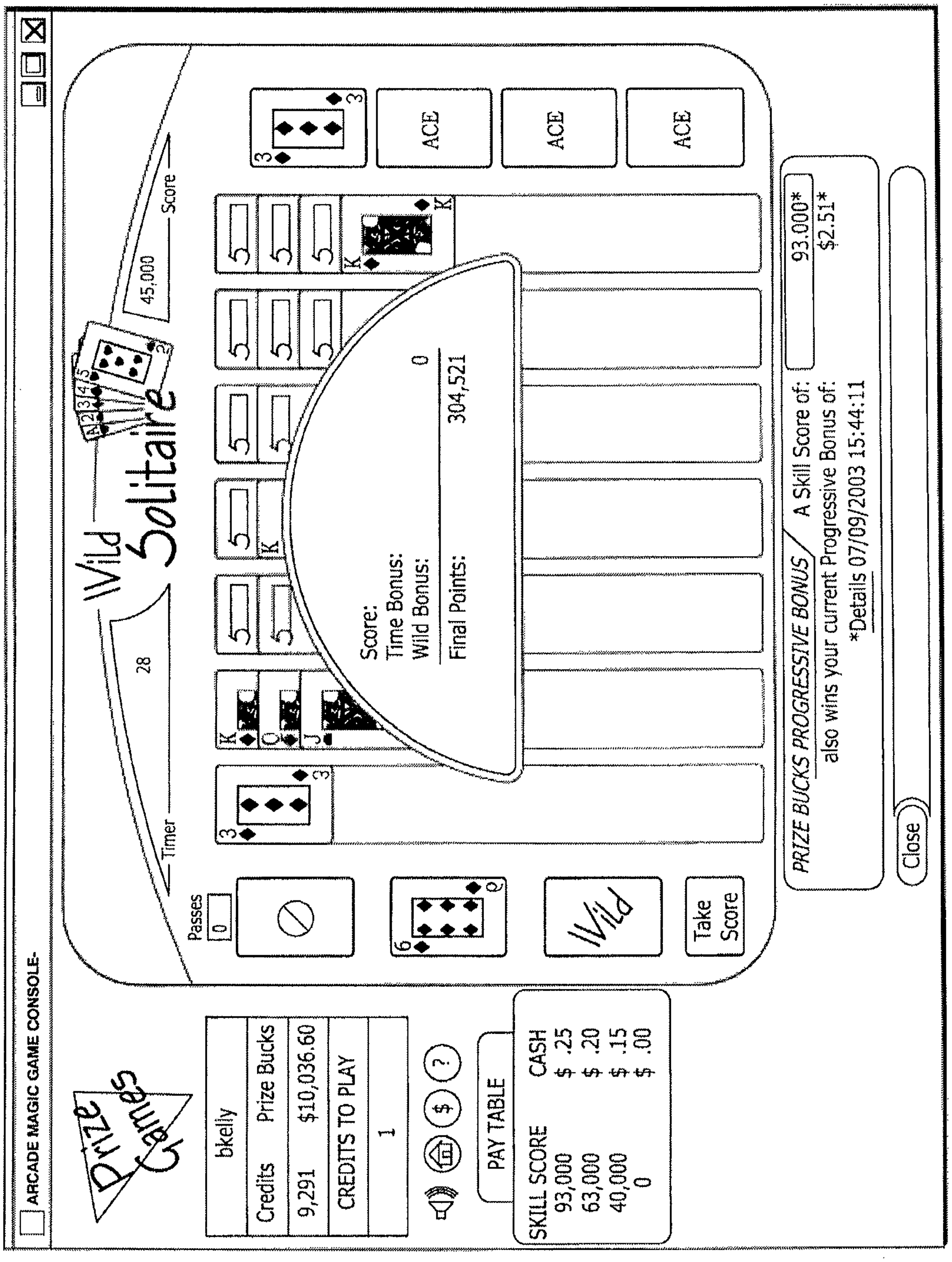
FIG. 60 is a screen shot that shows an example end game score box for a cash-award based solitaire game in one embodiment.
Figure 61:
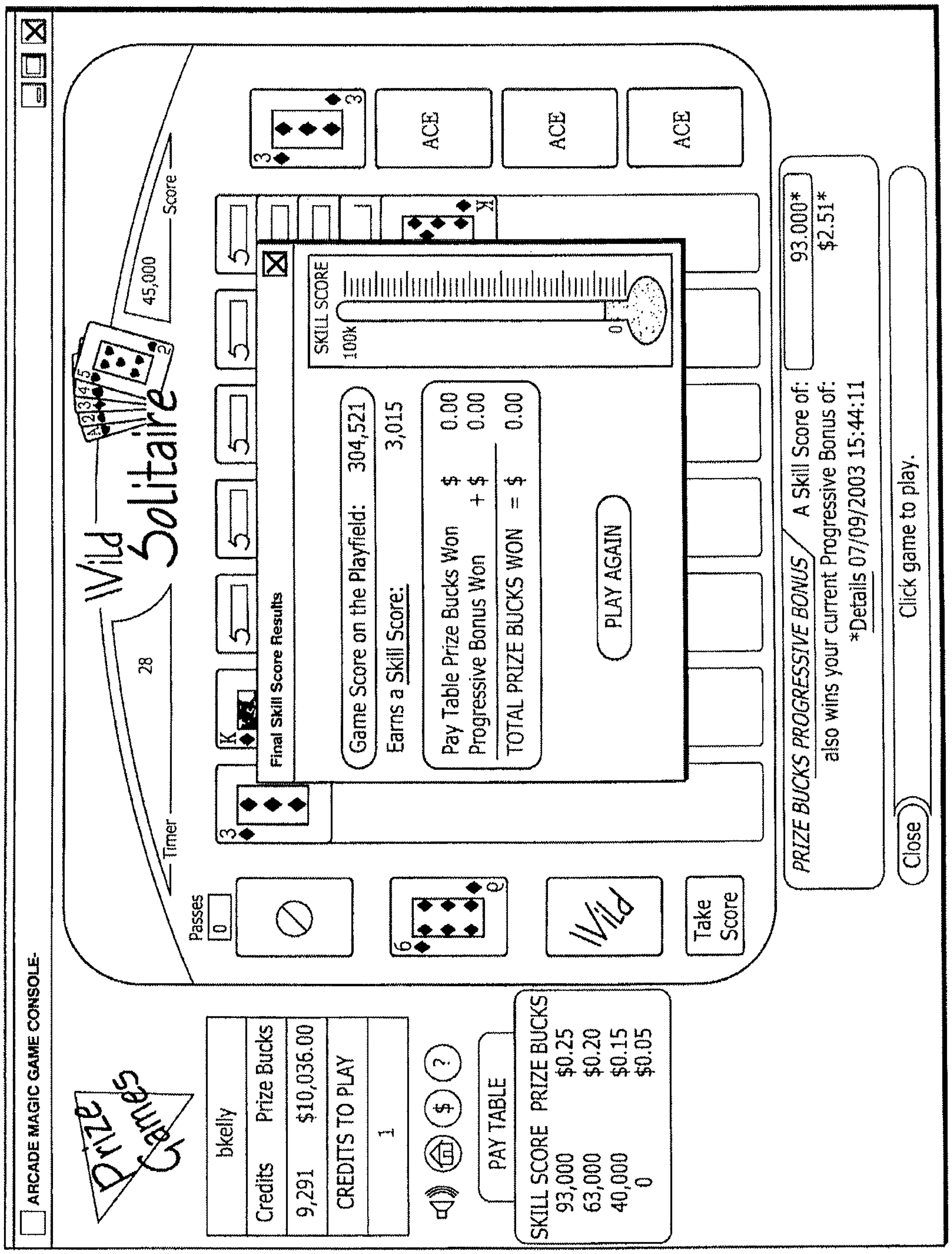
FIG. 61 is a screen shot that shows the game score to skill score conversion and final cash award for the solitaire game of FIG. 60.

In the example of Table 15, a score of 93,000 or more also wins the player's current progressive, for example, a bonus of $2.51. With reference to FIG. 60, on the IVIEW interface 216, an end game score box for the Wild Solitaire Game in "Insta-Cash" mode of play is shown, wherein the "Insta-Cash" mode of the game awards cash instead of prizes. The score box shows a final game score of 304,521 points. With reference to FIG. 61, the game score to skill score conversion and final prize award for the player in Insta-Cash mode of play is shown.

With regard to seed generation, in one embodiment, first, a seed has to be created and grown, meaning it uses some sample scores stored for the seed. Having sample scores ensures that during pay-to-play modes, the first scores achieved will not easily get the top or bottom payout. Scores from guest play games where there is no consideration and no prize award are used to initially grow seeds with a set of real scores. Then with real scores and other statistical data, the seeds are moved into the seed library.

Second, several thousand seeds are used to ensure that the play experience is not dull or predictable for the players. However, several thousand seeds, all active at the same time, present data processing hurdles. Therefore, in one embodiment, at any given hour, 100 seeds (the active seeds) from the seed library are available for use by pay-to-play games. Then, after one hour, a new set of 25 to 100 or more active seeds are selected for use by players. This rotation of active seeds from within the seed library enables several thousand seeds to be used while minimizing data processing complications.

Third, in one embodiment, seeds are self-maintained by replacing the past scores with the more recent scores achieved by actual game play. New seeds are constantly being grown in the guest play games. A floodgate system is maintained so that the seed library grows to 10,000 seeds, and then for each new seed permitted into the seed library, an older seed is removed. These rules, in this embodiment, keep seeds fresh with competitive scores for prize award, and fresh with new seeds for an evergreen play experience.

In one embodiment, seeds are generated randomly and associated with a certain game. Seeds become available for guest play right after creation and start accumulating guest (sample) scores until the limit of 20 scores is reached. From the 20 scores recorded, the top 10 are used to initially populate the game score table per seed. After that, a seed is marked as complete and a new seed is created to replace the complete seed. At established time intervals (e.g., daily or hourly) a scheduled process called a "job" executes and moves the necessary number of seeds with all the scores into the seed library. The seed library is populated with newly grown seeds until there are 10,000 seeds per game. After that, a specified number of the oldest or most played seeds are deleted from the seed library, and the same number of newly-grown seeds are inserted into the seed library.

In one embodiment, the procedures of making seeds available for a game rely upon certain assumptions and considerations. For example, and not by way of limitation, some of those assumptions and considerations include:

Seeds are picked randomly;

A minimum of 1,000 seeds growing to 10,000 seeds are used for a game to ensure a reasonably small probability of any player gaining any advantage from potentially playing the same seed more than once;

Each seed in the seed library has at least 10 and up to 100 scores attached to it to provide an adequate fidelity of skill score calculation; and Any score after the $100^{th}$ score is stored and the oldest score is deleted (preserving the maximum and minimum scores for the seed).

In one embodiment, considering an example when there are 100 games available for play, under the above rules, there will be 1,000,000 seeds and 100,000,000 scores in the seed libraries of games. Large data sets like that make it difficult to query, let alone dynamically update, especially when speed of processing is a factor to the game play experience.

To overcome this hurdle, in one embodiment, the active seeds table is used wherein only a subset of the whole seed library is used. The active seeds are those currently in use by games. Every hour a job executes and moves 100 seeds per game from the seed library into the active seeds table. Likewise, 100 formerly active seeds are deactivated but left in the active seeds table for another hour to make sure that all games that started using those seeds are successfully processed after an end game. Then, after two hours total, those hundred seeds are moved back into the seed library. This procedure diminishes the size of an active data set 50 times, which enables fast processing. At the same time, having totally different 100 active seeds per game every hour provides satisfactory randomness of play field experiences.

In one embodiment, the process that picks up the next 100 seeds from the seed library uses a "LAST_USED" data field for each seed. Therefore, the least recently used seeds are selected, thus eliminating the probability of the same seed being used as an active seed twice in a row, and also further minimizing the probability of any one player seeing the same seed repeatedly.

With reference to FIG. 62, a flow diagram illustrates steps performed for seed creation and use. In step 6300, seeds are randomly selected for use. Scores from actual games played are captured and used to populate the initial game score table per seed. In step 6302, mature seeds, which in one embodiment are those with at least 10 actual scores, are moved into the seed library from the seed generation process, and are made available for rotation into the active seed table. In step 6304, at any given time, 100 seeds from the seed library are actively being served to players for their own game experience.

In another embodiment, a skill score is used to determine the winner of a tournament-style game. For tournament-style games, in some embodiments, one of two methods are used for seed selection depending on the type of tournament. A limited entry type tournament with 5 or fewer players uses the same seed from the active seed pool for all entries. With so few entries and two winners in the 5 entry tournaments, a player is not rewarded for playing the same seed (i.e., same play field) more than once—there is no advantage for the player. Likewise, displaying the exact same game experience where possible is appealing for the player experience.

A tournament with unlimited entries (e.g., time-based progressive tournament) or a limited entry tournament with more than 5 entries randomly selects a seed from the pool of active seeds for each individual entry in the same way as described above. Therefore, each player could be playing the game with a different seed, yet the skill score is used to determine the most skillful player and the prize awards.

In one embodiment, the seed library and pool of active seed values are protected by an existing enterprise level network infrastructure by Arcade Planet®, which includes the latest firewall and cryptographic technologies. Any breaches of security are noted in the minutes of the System Quarterly Compliance Review meetings, discussed by a compliance committee, and appropriate corrective and preventative actions are taken.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for providing an instant-close casino tournament such that an actual casino player is always the last casino player to enter the tournament, comprising:

a plurality of casino gaming machines, wherein at least a first gaming machine enables play of a first base game that has a first theoretical payout percentage, and wherein at least a second gaming machine enables play of a second base game that has a second theoretical payout percentage;

a communication link connecting the plurality of casino gaming machines, wherein the instant-close casino tournament has a number of player spots;

a casino tournament controller connected to the communication link, wherein the casino tournament controller is configured to execute the casino tournament; and a casino tournament history table that stores previous casino tournament information for a plurality of previous players in the casino tournament, wherein, when determined by the system, the previous casino tournament information is selected by the casino tournament controller to configure one or more simulated casino players in the casino tournament to fill each player spot in the tournament, except for a final player spot that is filled by the actual casino player, thereby ensuring that the actual casino player is the last player to enter and join the casino tournament;

wherein calculation of each tournament score uses the theoretical payout percentage from each respective base game.

2. A system for providing an instant-close casino tournament, comprising:

a plurality of casino gaming machines, wherein each gaming machine enables play of a base game that has a theoretical payout percentage;

a communication link connecting the plurality of casino gaming machines, wherein the instant-close casino tournament has a number of player spots;

a casino tournament controller connected to the communication link, wherein the casino tournament controller is configured to execute the casino tournament; and a casino tournament history table that stores previous casino tournament information for a plurality of previous players in the casino tournament, wherein, when determined by the system, the previous casino tournament information is selected by the casino tournament controller to configure one or more simulated casino players in the casino tournament to fill in multiple player spots in the tournament to conclude the tournament more quickly;

wherein calculation of each tournament score uses the theoretical payout percentage from each respective base game.

3. A system for providing an instant-close casino tournament such that an actual casino player is always the last player to enter the casino tournament, comprising:

a plurality of casino gaming machines, wherein at least a first gaming machine enables play of a first base game that has a first theoretical payout percentage, and wherein at least a second gaming machine enables play of a second base game that has a second theoretical payout percentage;

a communication link connecting the plurality of casino gaming machines, wherein the instant-close casino tournament has a number of player spots;

a casino tournament controller connected to the communication link, wherein the casino tournament controller is configured to execute the casino tournament; and a casino tournament history table that stores previous casino tournament information for a plurality of previous players in the casino tournament, wherein, when determined by the system, the previous casino tournament information is selected by the casino tournament controller to configure one or more simulated casino players in the casino tournament to fill each player spot in the tournament, except for a final player spot that is filled by the actual casino player, thereby ensuring that the actual casino player is the last player to enter and join the casino tournament, wherein the casino tournament is displayed in a player tracking user interface that is embedded in each of the plurality of gaming machines;

wherein calculation of each tournament score uses the theoretical payout percentage from each respective base game.

* * * * *

UNITED STATES PATENT AND TRADEMARK OFFICE

CERTIFICATE OF CORRECTION

PATENT NO. : 8,622,806 B2
APPLICATION NO. : 13/158177
DATED : January 7, 2014
INVENTOR(S) : Bryan M. Kelly et al.

It is certified that error appears in the above-identified patent and that said Letters Patent is hereby corrected as shown below:

In the Specifications

Column 5, In line 5, change “sever” to --server--

Column 10, In line 45, change “many” to --may--

Column 11, In line 11, after “180.” “remove return and move text up from the next line”

Column 22, In line 30, after “on” delete “a”

Column 29, In line 53, change “IS” to --is--

Column 31, In line 5, after “followed” insert --by--

Column 32, In line 20, change “2chars” to --2 chars--

Column 36, In line 47, change “customer relationship” to --Customer Relationship--

Column 38, In line 3, after “decrement” delete “to”

Column 38, In line 9, change “tickers” to --tickets--

Column 40, In line 39, after “202” insert --is--

Column 40, In line 39, change “play” to --played--

Column 41, In line 53, after “engine” insert --)--

Column 42, In line 23, after “account” change “,” to --.--

Column 49, In line 29, change “actively” to --activity--

Column 52, In line 8, after “conduct” delete “of”

Signed and Sealed this
Twenty-ninth Day of April, 2014

Michelle K. Lee
*Deputy Director of the United States Patent and Trademark Office*

Column 52, In line 23, after "as" insert --to--

Column 54, In line 26, after "is" insert --a--

Column 55, In line 34, after "winnings" delete "will"

Column 57, In line 35, after "embodiment" change "." to --,--

Column 59, In line 65, after "So" change "for" to --far--

Column 64, In line 49, after "score" insert --.--

Column 65, In line 39, change "TYPE" to --type--

Column 65, In line 48, after "like)" insert --.--

Column 65, In line 49, after "or" add --s-- to "use"

Column 84, In line 47, add --s-- to "take"

Column 84, In line 47, delete "s" from "places"